United States Patent [19]
Bergh et al.

[11] 3,820,079
[45] June 25, 1974

[54] BUS ORIENTED, MODULAR, MULTIPROCESSING COMPUTER

[75] Inventors: Arndt B. Bergh, Los Altos Hills; Bert E. Forbes, Palo Alto; James O. Hamilton, III, Sunnyvale; Joseph C. Mixsell, Jr., Palo Alto, all of Calif.

[73] Assignee: Hewlett-Packard Company, Palo Alto, Calif.

[22] Filed: Nov. 20, 1972

[21] Appl. No.: 316,429

Related U.S. Application Data

[63] Continuation of Ser. No. 194,764, Nov. 1, 1971, abandoned.

[52] U.S. Cl. .......... 340/172.5
[51] Int. Cl. .......... G06f 15/16
[58] Field of Search .......... 340/172.5

[56] References Cited

UNITED STATES PATENTS

| | | | |
|---|---|---|---|
| 3,295,102 | 12/1966 | Neilson | 340/172.5 X |
| 3,445,822 | 5/1969 | Driscoll | 340/172.5 |
| 3,470,542 | 9/1969 | Trantanella | 340/172.5 X |
| 3,480,914 | 11/1969 | Schlaeppi | 340/172.5 |
| 3,560,934 | 2/1971 | Ernst et al. | 340/172.5 |
| 3,623,011 | 11/1971 | Baynard, Jr. et al. | 340/172.5 |
| 3,633,169 | 1/1972 | Bickford | 340/172.5 |
| 3,731,283 | 5/1973 | Carlson et al. | 340/172.5 |

*Primary Examiner*—Raulfe B. Zache
*Attorney, Agent, or Firm*—A. C. Smith

[57] ABSTRACT

A multiprocessing computer is structured in modular form around a common control and data bus. Control functions for the various modules are distributed among the modules to facilitate system flexibility. Modules separate from the central processor handle input/output operations to free the central processor for data manipulation. The central processor includes circuitry for instruction and data pipelining, single, double and triple shifts, preadding and memory mapping and interleaving. The central processor also includes a read only memory look-up table for microprogramming instructions.

19 Claims, 111 Drawing Figures

Overall Block Diagram

Overall Block Diagram

PATENTED JUN 25 1974

3,820,079

SHEET 04 OF 105

NOTES:
1. ALL RESISTANCE IS IN OHMS.
2. ALL UNMARKED RESISTORS ARE 4,64K.

PATENTED JUN 25 1974 3,820,079

SHEET 15 OF 105

Figure 4A – Figure 49H

NOTE: FIGS. 4A THROUGH 49H HAVE BEEN CANCELLED BUT THE NUMBERS ARE BEING RETAINED SO THAT ALL FIGURES APPEAR IN SEQUENCE.

PATENTED JUN 25 1974 3,820,079

SHEET 31 OF 105

BASIC COMPARISON OF MULTIPLEXER AND SELECTOR

702 LOW SPEED DEVICE CONTROLLER

| QS | DS | BASE | 6 | 7 | 8 | 9 | 10 | 11 | 12 | 13 | 14 | 15 | RANGE |
|---|---|---|---|---|---|---|---|---|---|---|---|---|---|
| 0 | 0 | P | 0 | +/- | ← | | | DISP | | | | → | 255 |
| 0 | 1 | DB+ | 1 | 0 | ← | | | DISP | | | | → | 255 |
| 1 | 0 | Q+ | 1 | 1 | 0 | ← | | DISP | | | | → | 127 |
| 1 | 0 | Q- | 1 | 1 | 1 | 0 | ← | DISP | | | | → | 63 |
| 1 | 1 | S- | 1 | 1 | 1 | 1 | ← | DISP | | | | → | 63 |

| | MODULE OP COPE | |
|---|---|---|
| | 0 | 1 |
| NOP | ø | 0 |
| CW | 0 | 1 |
| RW | 1 | 0 |
| RNW | 1 | 1 |

PATENTED JUN 25 1974 3,820,079

SHEET 49 OF 105

Figure 68 — Figure 77H

NOTE: FIGS. 68 THROUGH 77H HAVE BEEN CANCELLED BUT THE NUMBERS ARE BEING RETAINED SO THAT ALL FIGURES APPEAR IN SEQUENCE.

EXTERNAL INTERRUPT PROCESSING

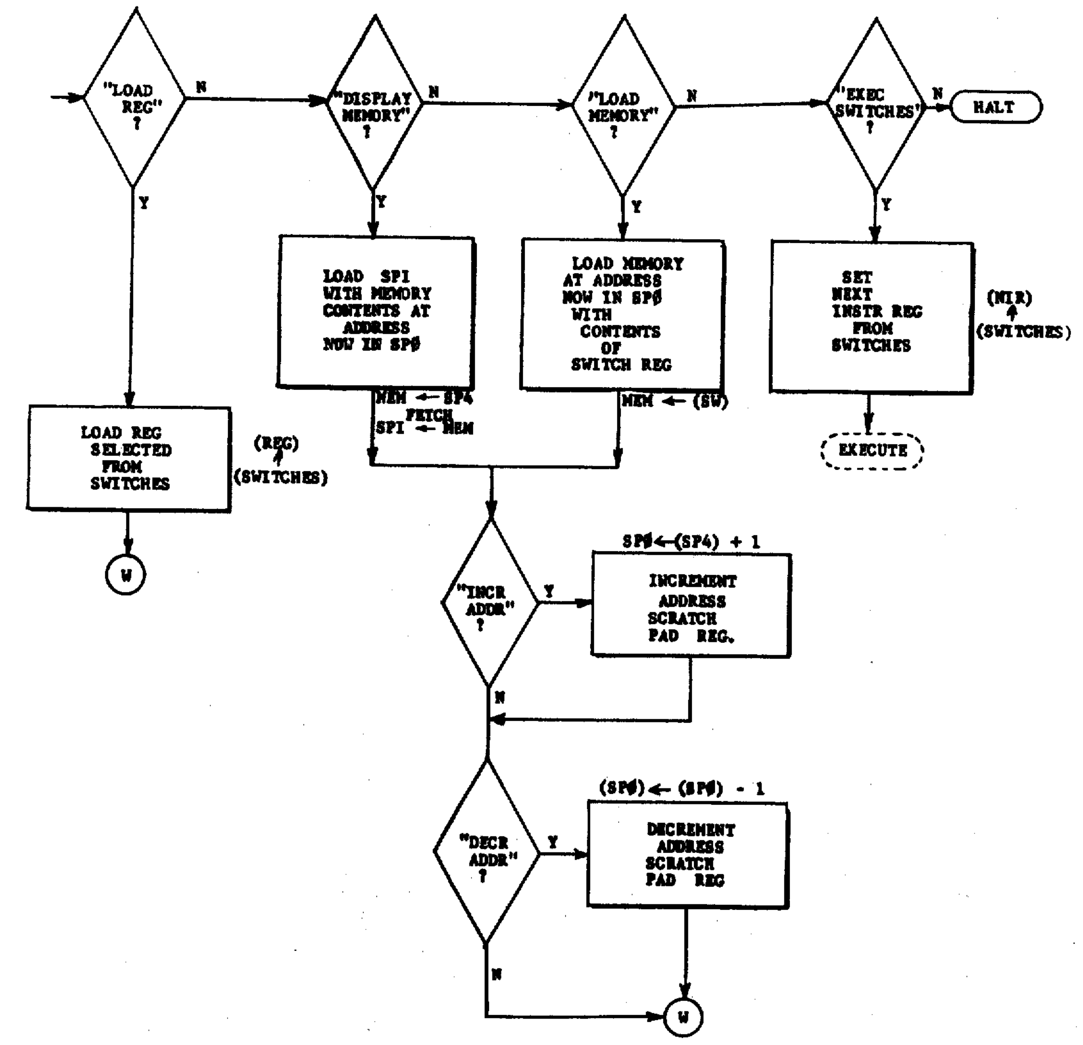

INTERNAL MICROCODE

ISF (INTERRUPT STACK FLAG) = {1 if on ICS; Ø if not on ICS}

DF (DISPATCHER FLAG) = {1 if Dispatcher Executing; Ø if Dispatcher not Executing}

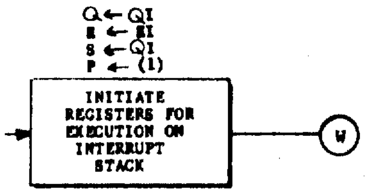

NOTES

(1) SPØ IS CPU SCRATCH PAD REGISTER # 1

(2) SPI IS CPU SCRATCH PAD REGISTER # 2

(3) SR IS STACK POINTER CPU REGISTER (4) CSTP IS CODE SEG TABLE POINTER LOCATED IN ABSOLUTE MEM LOC 1.

(5) BY DEFINITION: SEG # Ø-7 ARE PROCESSED ON ICS
SEG # 8-15 ARE PROCESSED ON CURRENT STACK (6) RAR IS ROM ADDRESS REGISTER (7) ICS IS INTERRUPT CONTROL STACK (8) SW IS SWITCH REGISTER

FIGURE 85H

INITIATION OF AN SIO PROGRAM

OUTBOUND XFER TO MPLX SIO CARD
(CAUSED BY DEVICE END) WITH A
XFER ERROR DETECTED BY MPLX SIO CARD

ADDRESS XFER W/O DEVICE END OR WORD COUNT ROLLOVER

ADDRESS XFER WITH WORD COUNT ROLLOVER

DEVICE NUMBER XFER DUE TO RECEIPT OF A DEVICE END

DEVICE NUMBER XFER W/O DEVICE END OR WORD COUNT ROLLOVER

WRITE TO A DEVICE CONTROLLER
WITH WORD COUNT ROLLOVER

RETURN RESIDUE FROM MPLX SIO
CARD W/O A XFER ERROR

INBOUND XFER FROM A DEVICE CONTROLLER
WITH A XFER ERROR DETECTED BY MEMORY (A) DATA FROM MEMORY IS TRANSFERRED INTO HSC, BECAUSE HSC RECOGNIZES THAT MEMORY MODULE Ø WAS ADDRESSED, AND BECAUSE IT IS MODULE #N. SYS PARITY IS CHECKED DURING THIS CYCLE.

THE TRANSFER CYCLE ENABLES THE IOPCNT TO THE ADDRESS LINES FOR THE FETCHING OF THE NEXT IOCW

DATA IS PRESENT ON THE DATA LINES FOR THE DURATION OF CHANNEL SERVICE OUT.
IT IS NOT VALID AT THE LEADING EDGE OF THE PROGRAMMED STROBES.

READ WITH NO CHAINING, WHEN DEV END IS RECOGNIZED, THE READ STROBE AND READ NEXT WORD STROBE ARE ABORTED.

(A) DATA IS LOADED INTO INPUT BUFFERS WITH THIS ENABLE. THIS ENABLE IS GENERATED BY ANDING READ STROBE AND CHANNEL ACK.

- - - WITHOUT CHAIN
..... WITH CHAIN (A) DEV. SER. REQ ENABLED INTO THE HSC. THE HSC WILL NOT HONOR PENDING DEV SR FOR DATA UNTIL THIS TIME.

BUS ORIENTED, MODULAR, MULTIPROCESSING COMPUTER

CROSS-REFERENCE TO RELATED APPLICATION

This is a continuation application of U.S. Pat. application Ser. No. 194,764, now abandoned, entitled BUS ORIENTED, MODULAR, MULTIPROCESSING COMPUTER filed Nov. 1, 1971, by Arndt B. Bergh, Bert E. Forbes, James O. Hamilton III, and Josepth C. Mixsell, Jr.

Table of Contents

Summary of Invention
- Module control unit
- Input/Output Processor
- High speed channel
- Memory mapping and interleaving
- Pipelined microprocessor
- Look-up table
- Pre-adder
- Shifting scheme for arithmetic operations
- Read and lock memory operation Description of the Drawings
Description of the Preferred Embodiment
- Overall computer system
- Central processing unit
- Module control unit
  - Functional descriptions
  - Receive operations
  - MCU Bus description
  - MCU Detailed Functional description
  - MCU Bus Transmission
  - To Fetch an operand
  - To Store an operand
  - To Command a module
  - Control of multiplicity of data inputs
  - MCU priority resolution
- Input/Output Processor
  - IOP Module control unit
- SIO Multiplexer
  - DRT Fetch
  - I/O Program Word Transfers
  - Data Transfers
  - Interrupts
- High Speed Channel
- Memory Mapping and Interleaving
- Pipelined Microprocessor
- Look-up Table
- Pre Adder
- Shifting scheme for Arithmetic operations
- Read and Lock Memory Operations Appendix 1
Explanation of Microinstruction Fields
Appendix 2, Mnemonics and Abbreviations
Appendix 3, External Reference Specification
Appendix 4, Multiplexed SIO Card
- Appendix I — Address Transfer Sequence
- Appendix II — Data Transfer Sequence
- Appendix III — Operating Wave Forms
- Appendix IV — Flow Charts Appendix 5, High Speed Selector Channel
- Appendix I — Channel SO cycles
- Appendix II — Timing diagrams
- Appendix III — Flow Charts
- Appendix IV — Channel-Device Interface
- Appendix V — Port Controller Interchange
- Appendix VI — Device SRFF

Claims

SUMMARY OF THE INVENTION

High system flexibility and multiprocessing capabilities are a marked asset in a modern computer. The computer of the present invention combines a number of advances over the prior art into one operating system. Due to the complexity of the system, each aspect of the system will be described separately and thus, each portion of the invention is summarized separately below. Portions of the computer that are not described in this application are described in the following copending applications assigned to the assignee of the present invention: Robert J. Frankenberg, Ser. No. 191,086, filed on Oct. 20, 1971, and entitled "Means and Method for Computer Memory Temperature Compensation" now issued as U.S. Pat. No. 3,750,119 James A. Katzman, "Stack Register Renamer", filed July 28, 1971, Ser. No. 166,867 now issued as U.S. Pat. No. 3,737,871; and John C. Barrett, Arndt B. Bergh and John E. Price, "Integrated Circuit Read Only Memory Bit Organized in Coincident Select Structure", filed Feb. 18, 1970, Ser. No. 12,262, now issued as U.S. Pat. No. 3,721,964.

MODULE CONTROL UNIT

The Module Control Unit (MCU) controls the interface between each module of the computer and the MCu bus, the primary communication path between the modules. This bus system differs from those in the prior art in that it is open loop rather than closed loop. A closed loop or handshaking bus system requires request and acknowledge signals for each operation and is therefore slower than an open loop system. To obtain this speed the bus operates synchronously, with a two level priority resolver determining which module has access to the bus. The bus system of the present invention has the additional advantage that the bus is not tied up while a requesting module is waiting for an answer, as is the case with a closed loop bus. The priority network guarantees that the receiving module is listening when the sender is permitted to transmit data, so the sending module does not need to retain control of the bus while the receiving module is getting ready. Another distinguishing feature of the MCU is its distribution throughout the computer. Each module has an MCU to interface it with the MCU bus, rather than each module interfacing with one MCU in the Central Procesing Unit (CPU), for example, as is done in the prior art. A distributed MCU is advantageous becaue it allows one module to communicate with another without going through the CPU. Also, a modular or distributed MCU means that any particular configuration of the computer need have only enough priority resolution hardware to handle the modules in use. More MCU hardware can be added as more modules are added.

INPUT/OUTPUT PROCESSOR

The Input/Output Processor (IOP) provides an interface between the computer and peripheral devices such as printers, teletypes, card and tape readers and recorders, disc memories or other data sources or receivers. The IOP has two basic functions: 1) The execution of direct I/O instructions and the passing of the results to the CPU, and 2) transferring data and I/O program words between memory and device controllers. The IOP takes care of the I/O details so that the CPU is free to execute other instructions without interruption. In addition the IOP provides system flexibility because it will interface special purpose processors such as a fast fourier analyzer with the computer. The IOP also can interface the computer to another complete computer system, through the I/O bus. This is possible because the part of the IOP that resides in the main frame can function as the instruction sequencing unit of a general purpose processor. IOP is a distributed processor, the instruct-fetch part of it being in the CPU, and the execution part of it, the SIO multiplexers, being located near the device controllers for the peripheral devices.

Because the IOP is distributed, it can be configured differently to accommodate various special purpose peripherals without changing anything in, say, the CPU, as would be necessary in most prior state of art computers.

HIGH SPEED CHANNEL

The high speed channel, which encompasses the port controller, channel control logic and the channel register logic, will interface with up to eight different device controllers concurrently although it will run only one program at a time. It is designed to facilitate maximum transfer from the device controllers to and from memory at the maximum data transfer rate of the computer. In order to achieve these speeds, the high speed channel does prefetching of data and program orders. The high speed channel anticipates data transfers and sets up the linkage to memory to minimize the amount of time that the data is present in the selector channel. The selector channels interace directly with the MCU bus through the port controller, and thus can realize the maximum MCU data rate because the data does not have to pass through an SIO multiplexer and the IOP.

MEMORY MAPPING AND INTERLEAVING

The memory mapping and interleaving provide a flexible way of utilizing a number of separate memory modules having different capacities and speeds. Memory mapping allows the use of a consistent system of addressing independent of the number of memory modules or the capacity of each one. The interleaving places adjacent memory addresses in separate memory modules to increase data transfer rates to and from memory.

PIPELINED MICROPROCESSOR

A mechanism is provided to pipeline the execution of the control microinstructions in parallel with the pipelining of the data path. This pipelining is achieved by interfacing an arithmetic logic unit with registers that are constantly filled with the data and instructions moving through the arithmetic logic unit. This pipelining has the advantage that the control sequences move at the same rate as the data sequences.

Look-Up Table

The look-up table introduces a vector or legal entry into the main Read Only Memory and provides multiple entry points for different classes of instructions and, only a few integrated circuit patterns in order to change operation of the computer for a different format of instructions.

Pre-Adder

There are two principal functions of the pre-adder. The first is to allow the computer to effectively add three operands together in doing address computation in one pipeline clock time. The other use is to provide an automatic decoding of the various size operands in the current instruction register to relieve the microprocessor of the microcode from having to do this a step at a time, so that hardward provides, in one operation, the proper number of bits fully expanded to a 16-bit operand.

SHIFTING SCHEME FOR ARITHMETIC OPERATIONS

The main characteristic of the shifting scheme in the CPU is that it makes multiple use of existing shifting registers in the CPU to facilitate the implementation of single word, double word and triple word shifts. These various types of shifts are the type that are needed to allow very easy single cycle implementation of the complex process of multiply/add step operations and divide/subtract type step operations, which one needs to do to implement multiply and divide hardware algorithms.

READ AND LOCK MEMORY OPERATION

In multiprocessing computers it is desirable to provide an operation which permits access to certain portions of memory to only one CPU at a time. This is done in the present invention by placing a lock word at the beginning of a critical section of a program whenever a CPU accesses such a program. The lock word is written into memory simultaneous with access by the first CPU to address the critical portion of memory and the work is removed when access is finished.

DESCRIPTION OF THE DRAWINGS

| | |
|---|---|
|
FIG. 85a–h: | Interrupt Processor; |
|

-Continued

Figure 118:
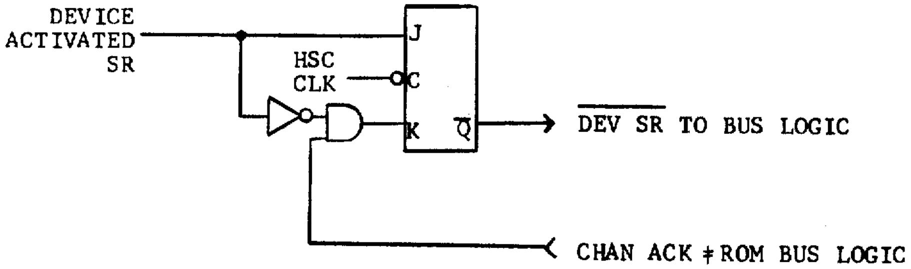
Figure 94:
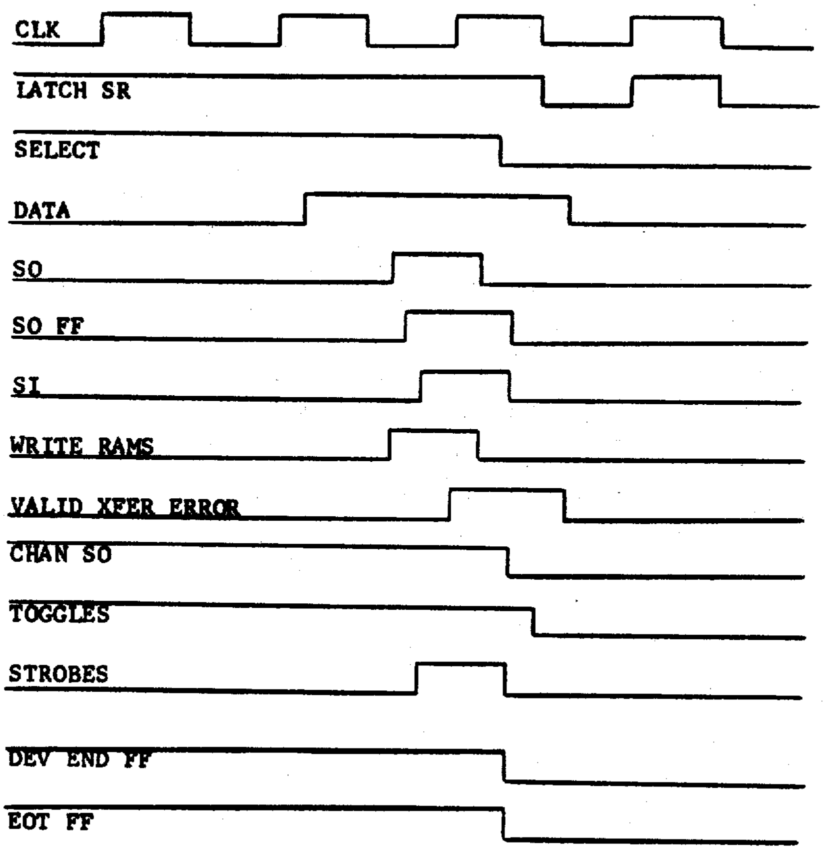
Figure 92:
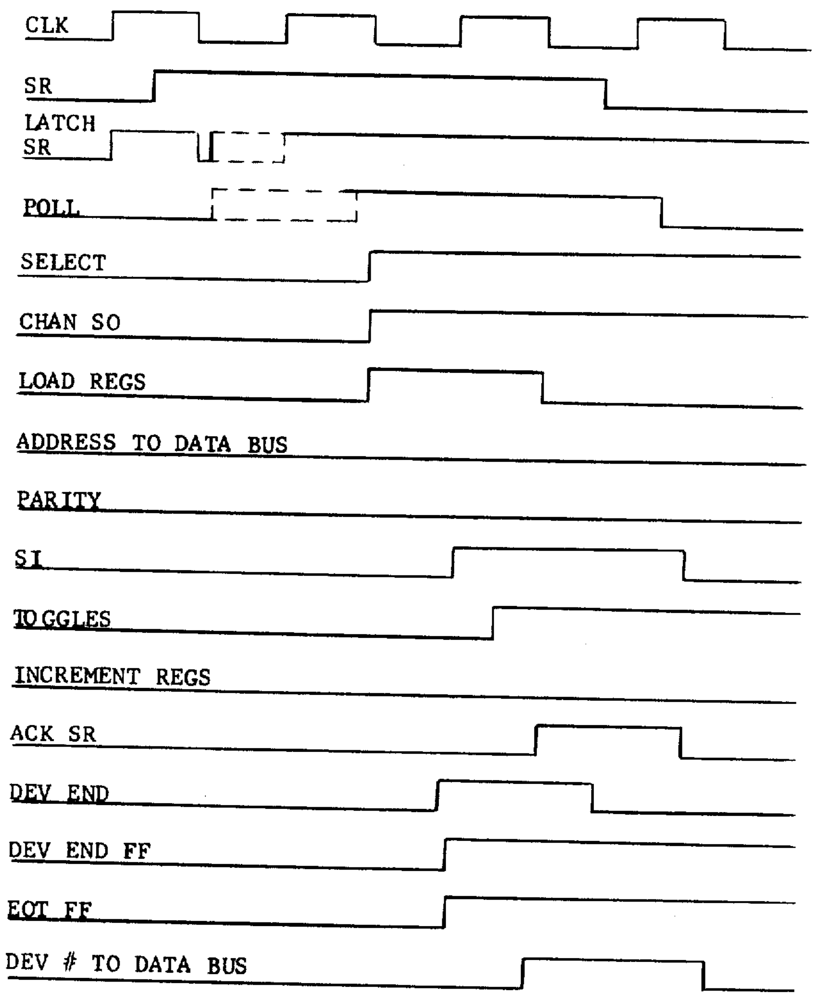
Figure 93:
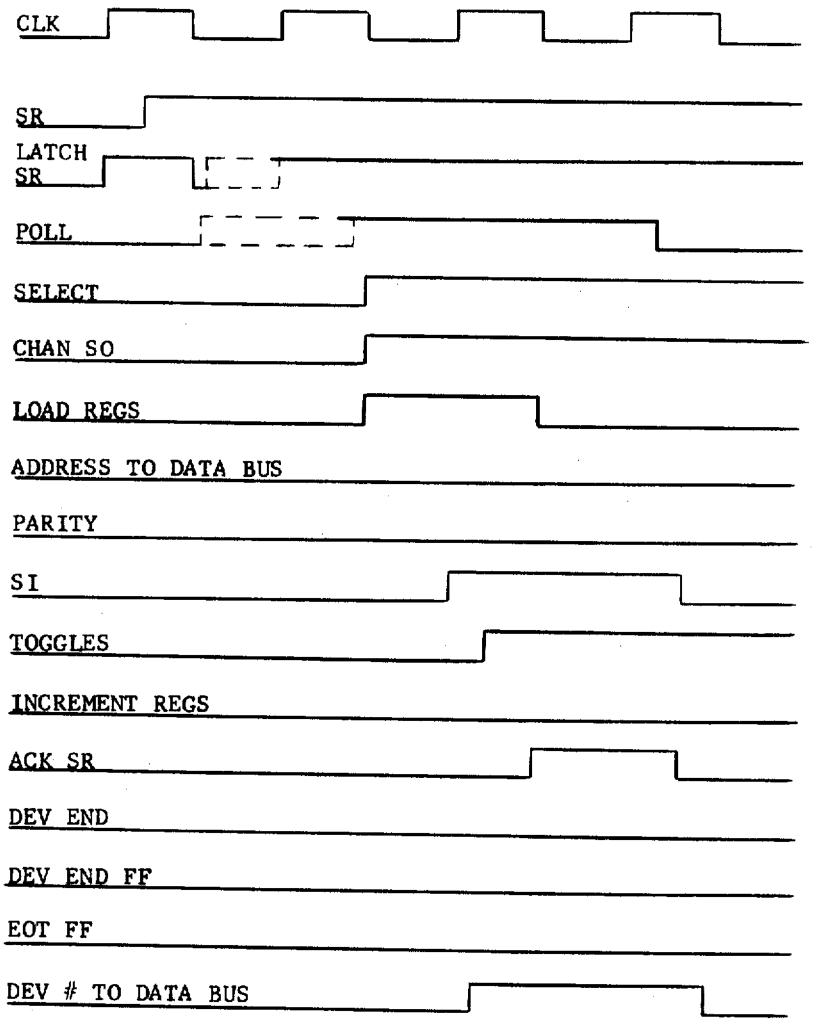
Figure 95:
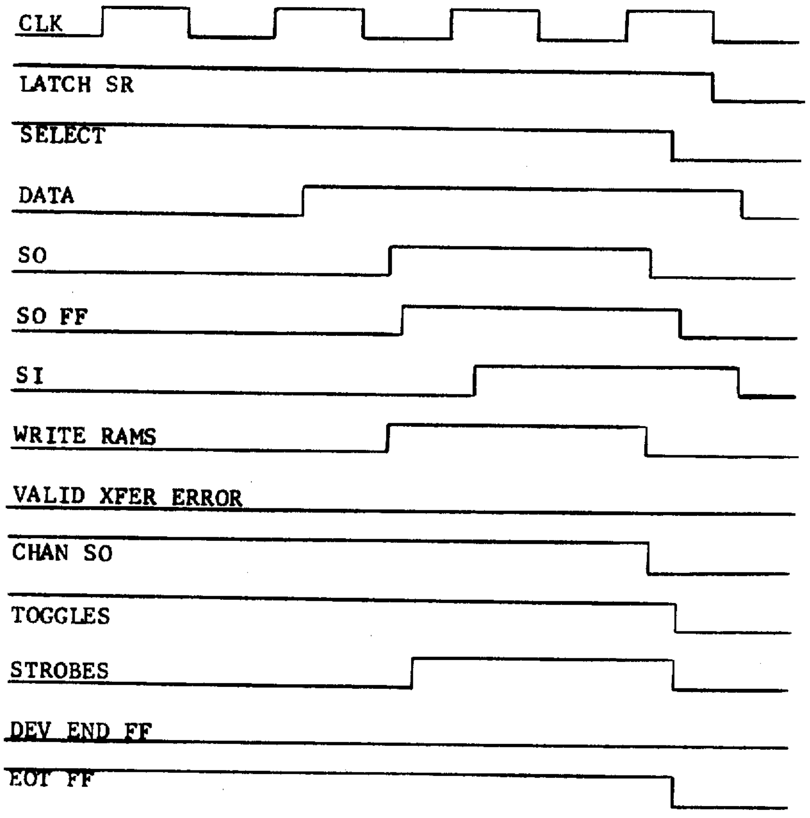
Figure 96:
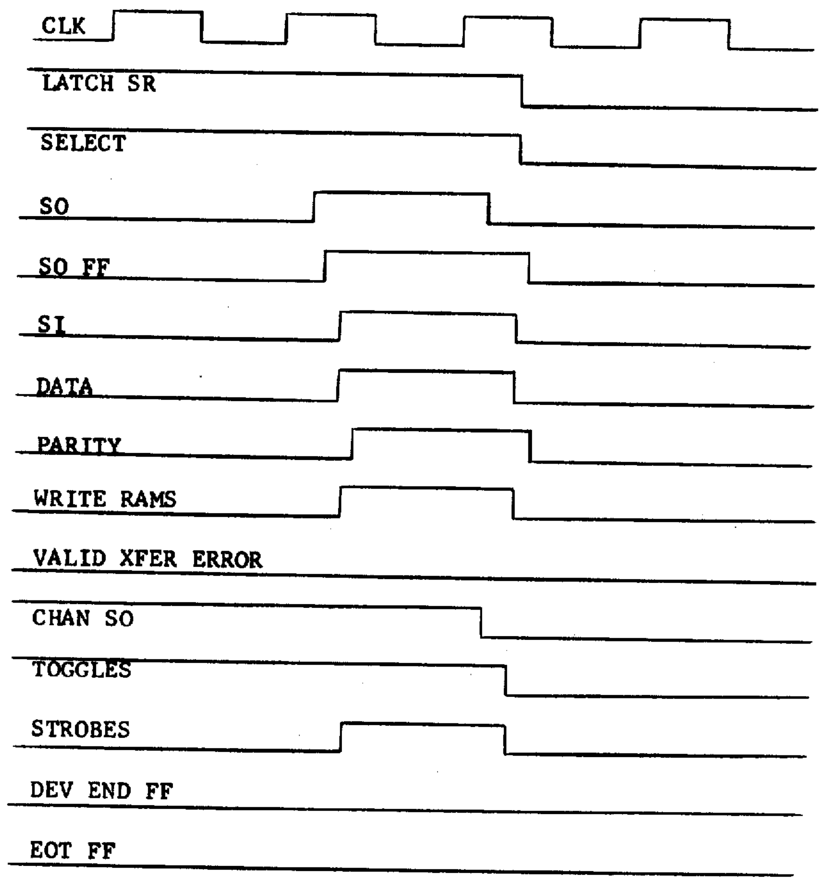
Figure 97:
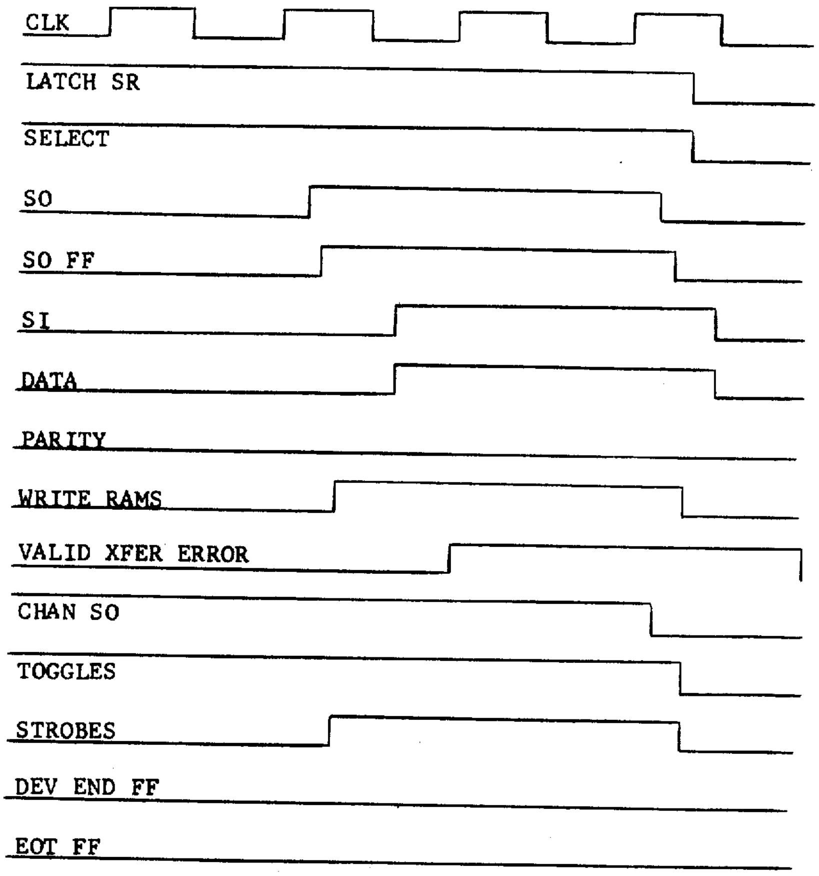
Figure 98:
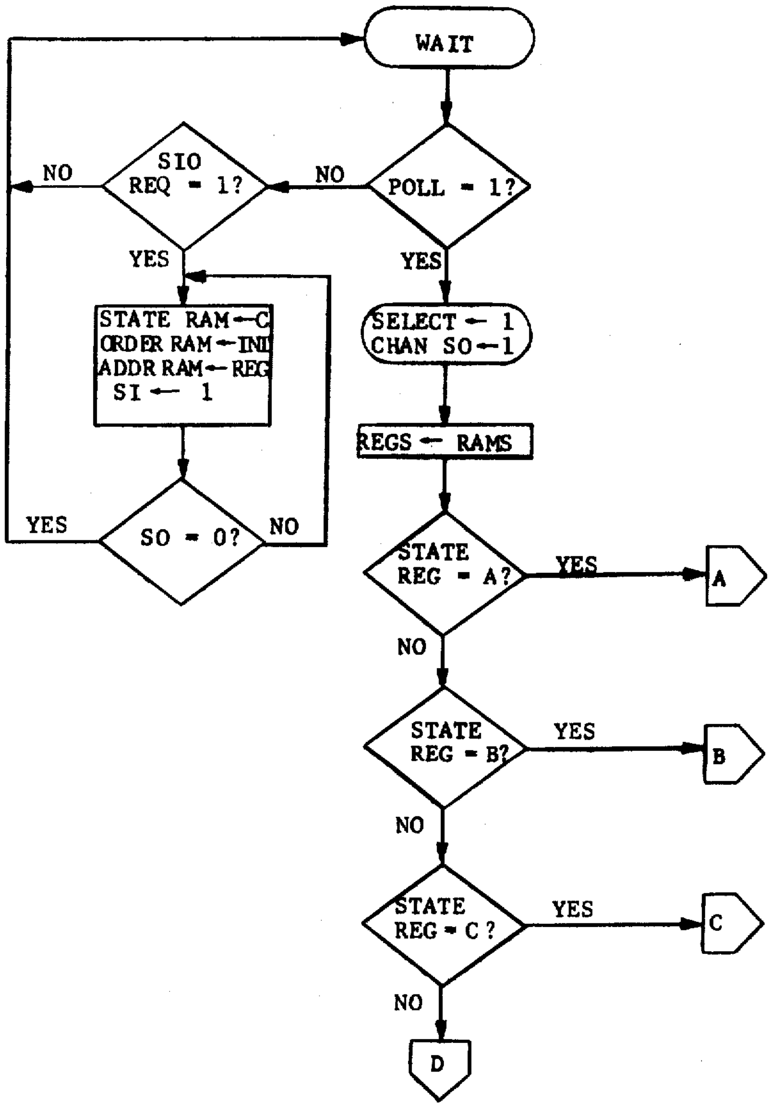
Figure 99:
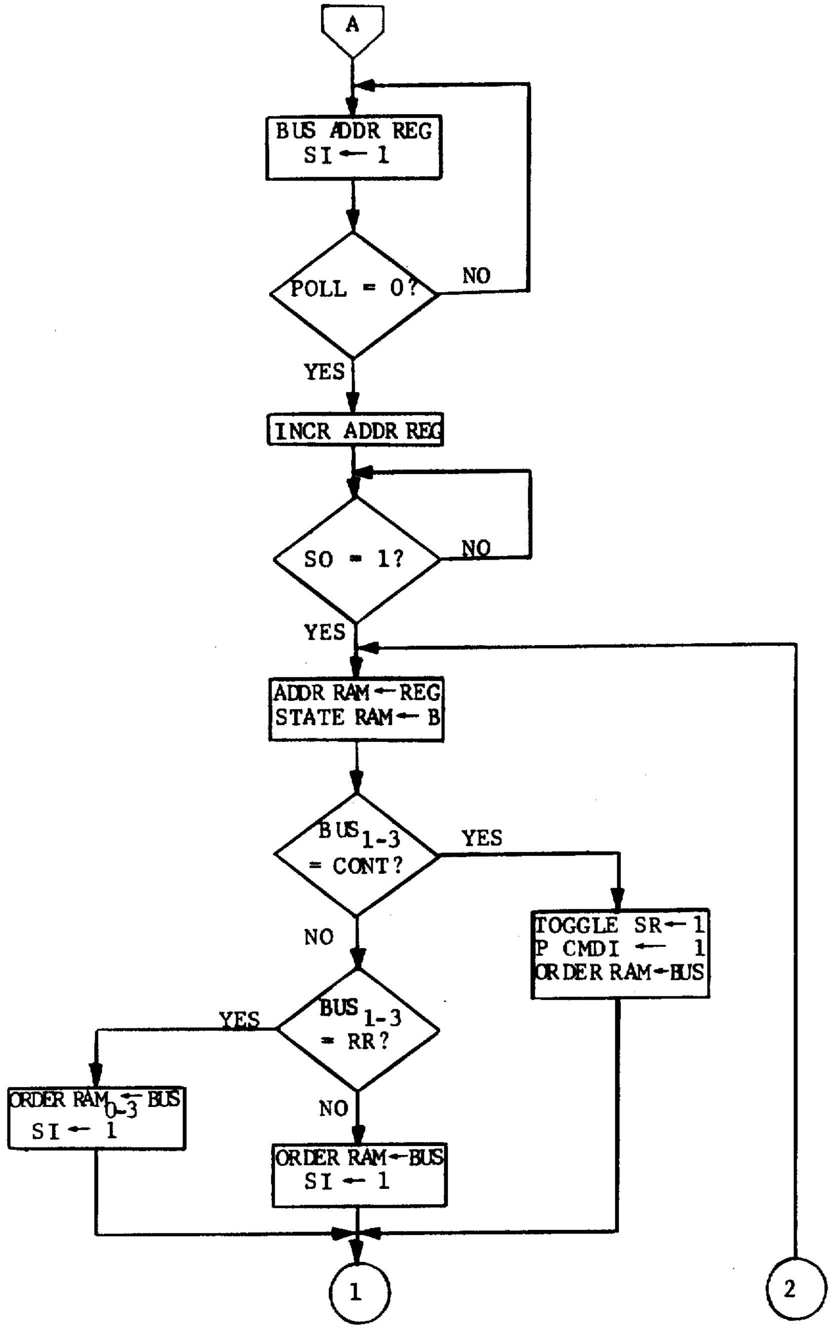
Figure 100:
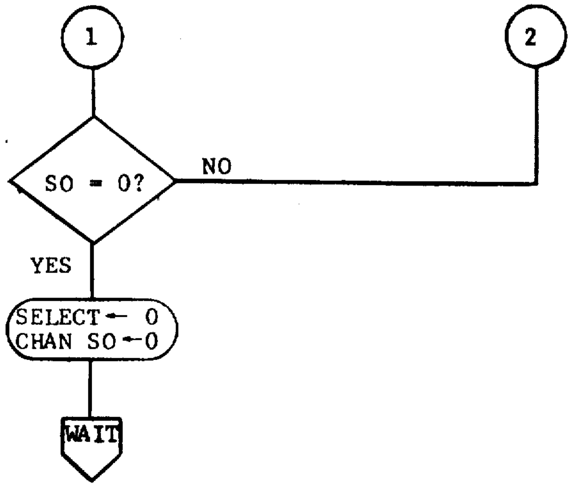
Figure 105:
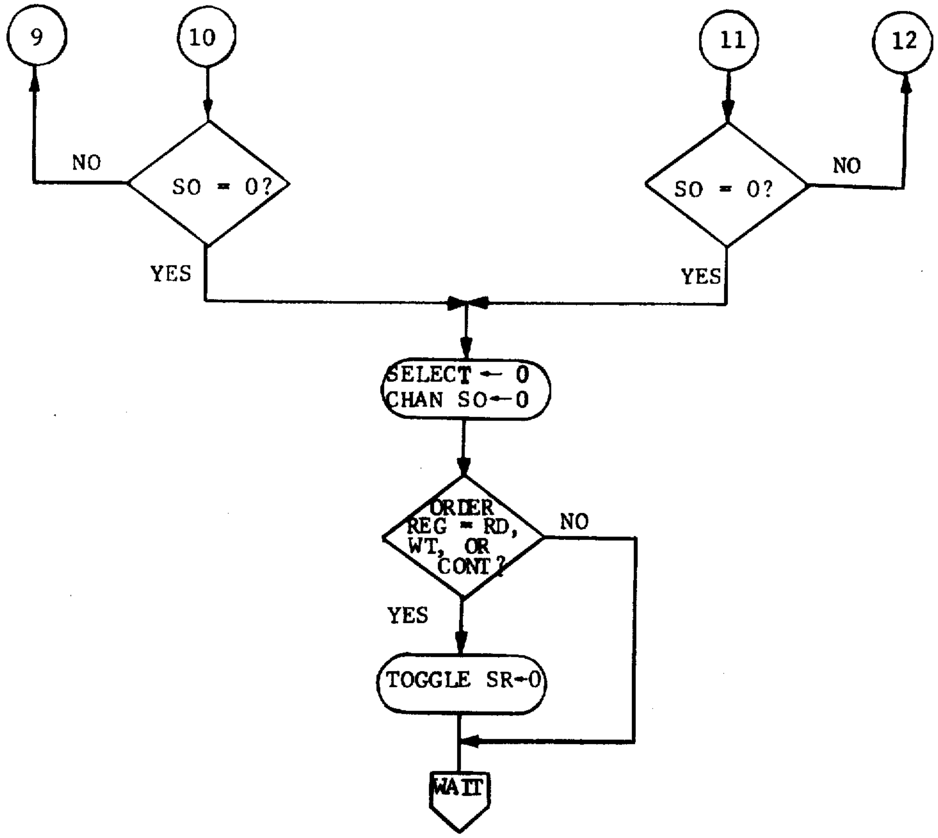
Figure 101:
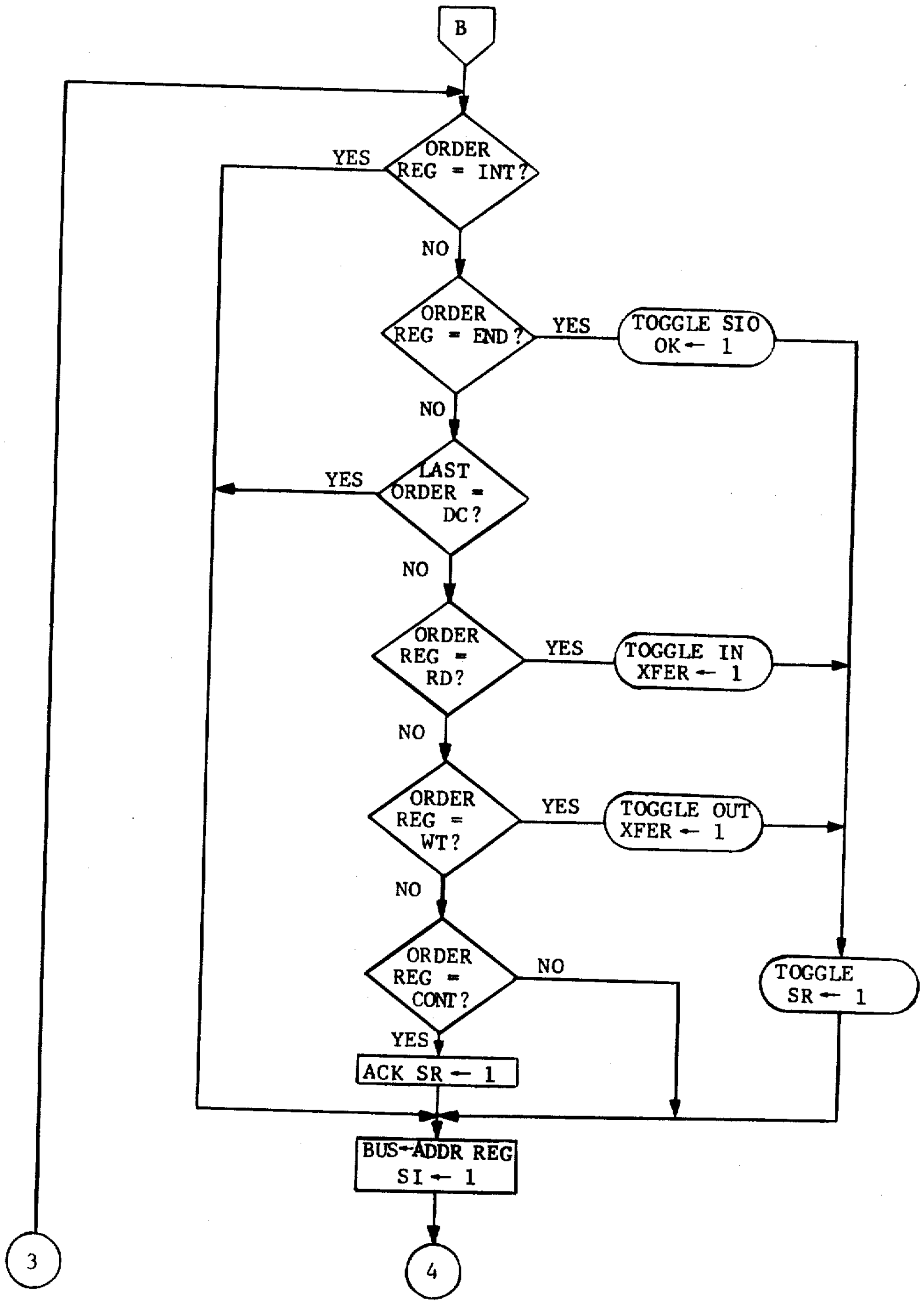
Figure 102:
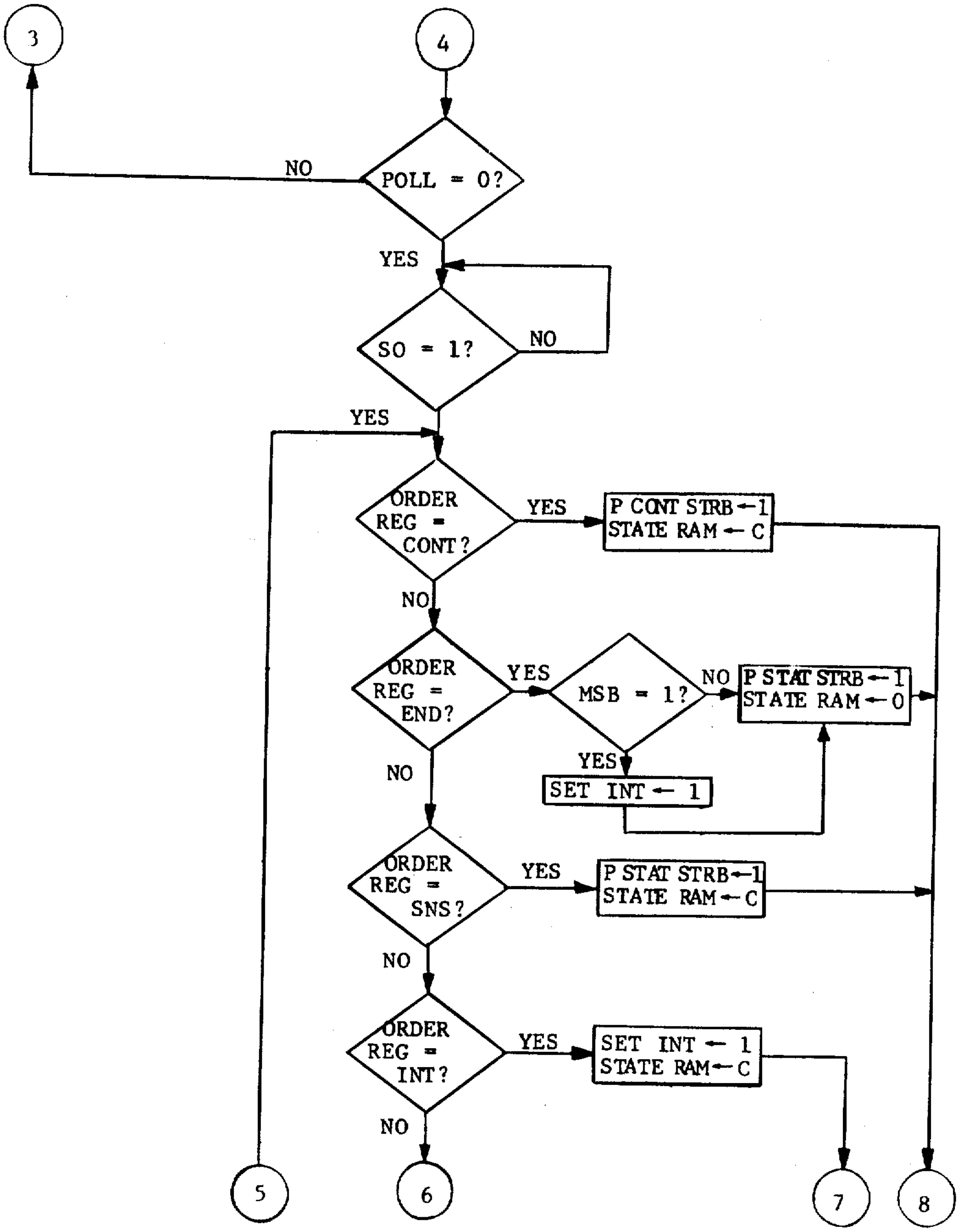
Figure 103:
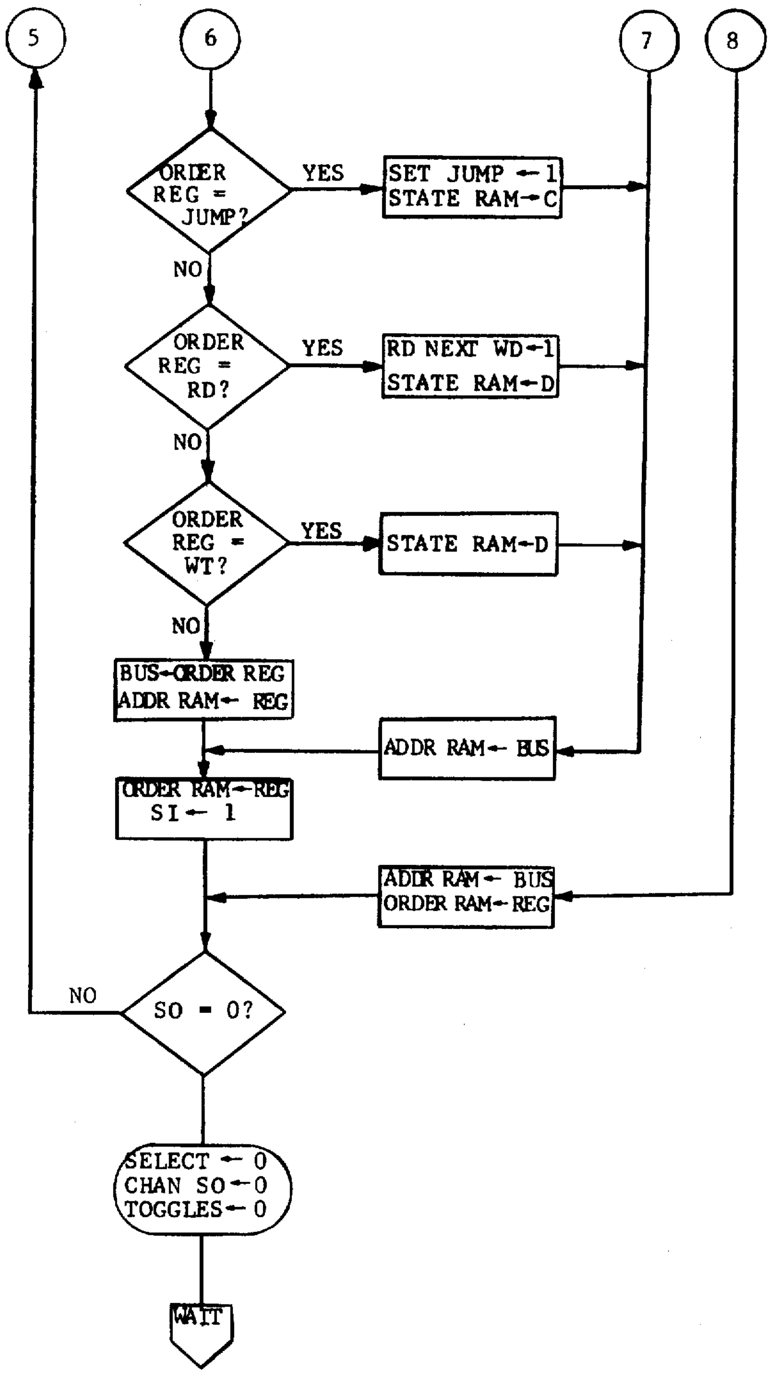
Figure 104:
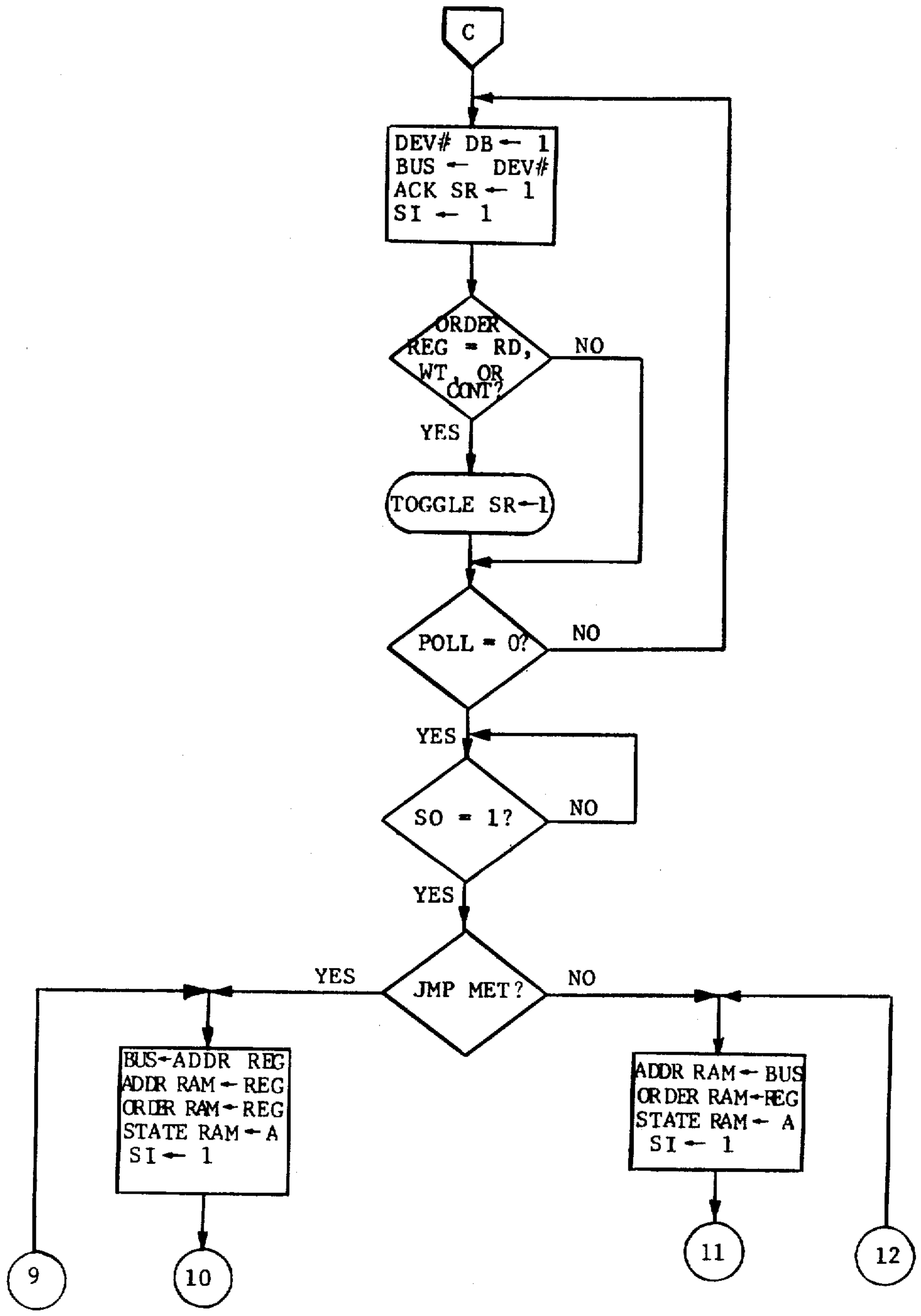
Figure 106:
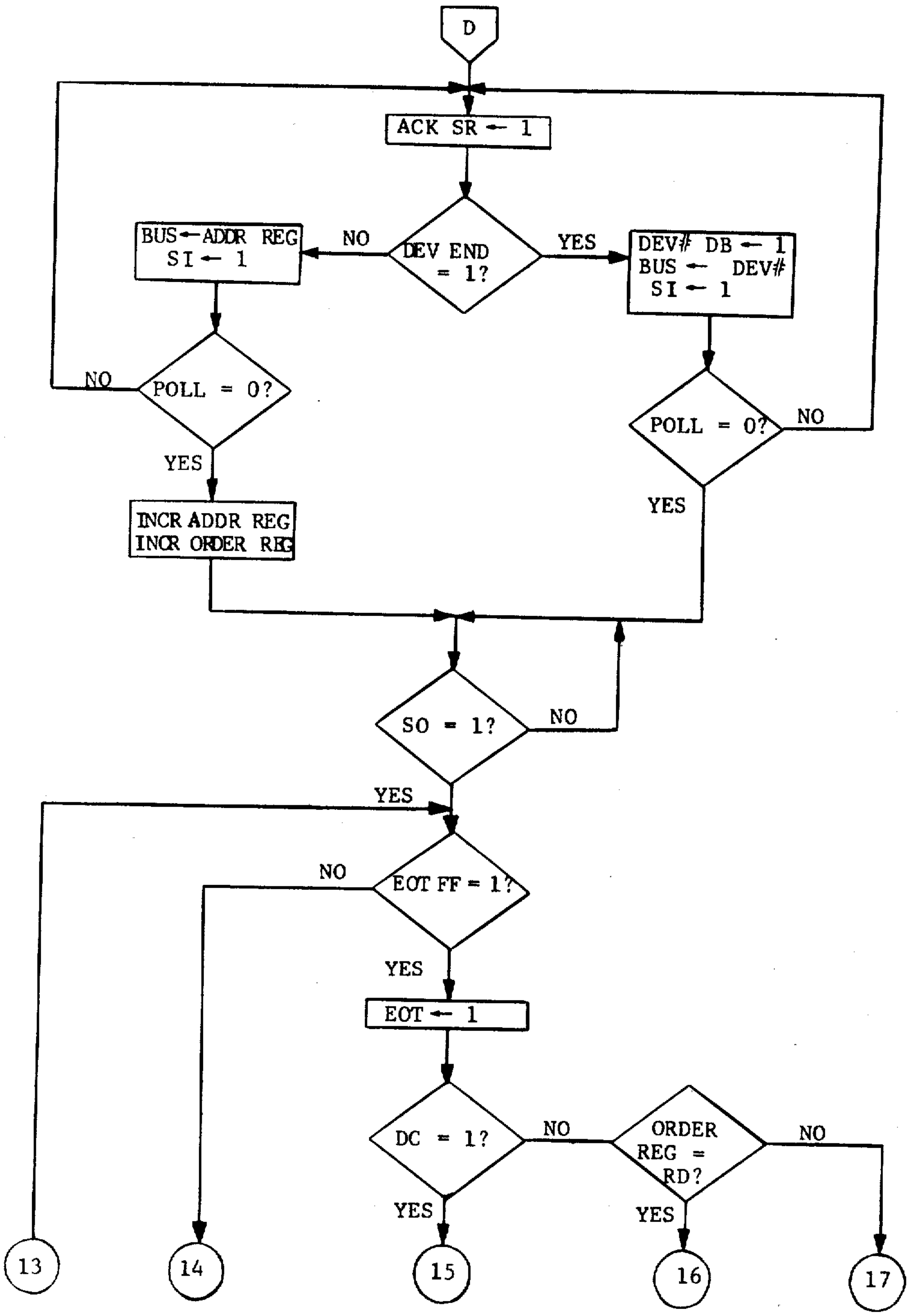
Figure 107:
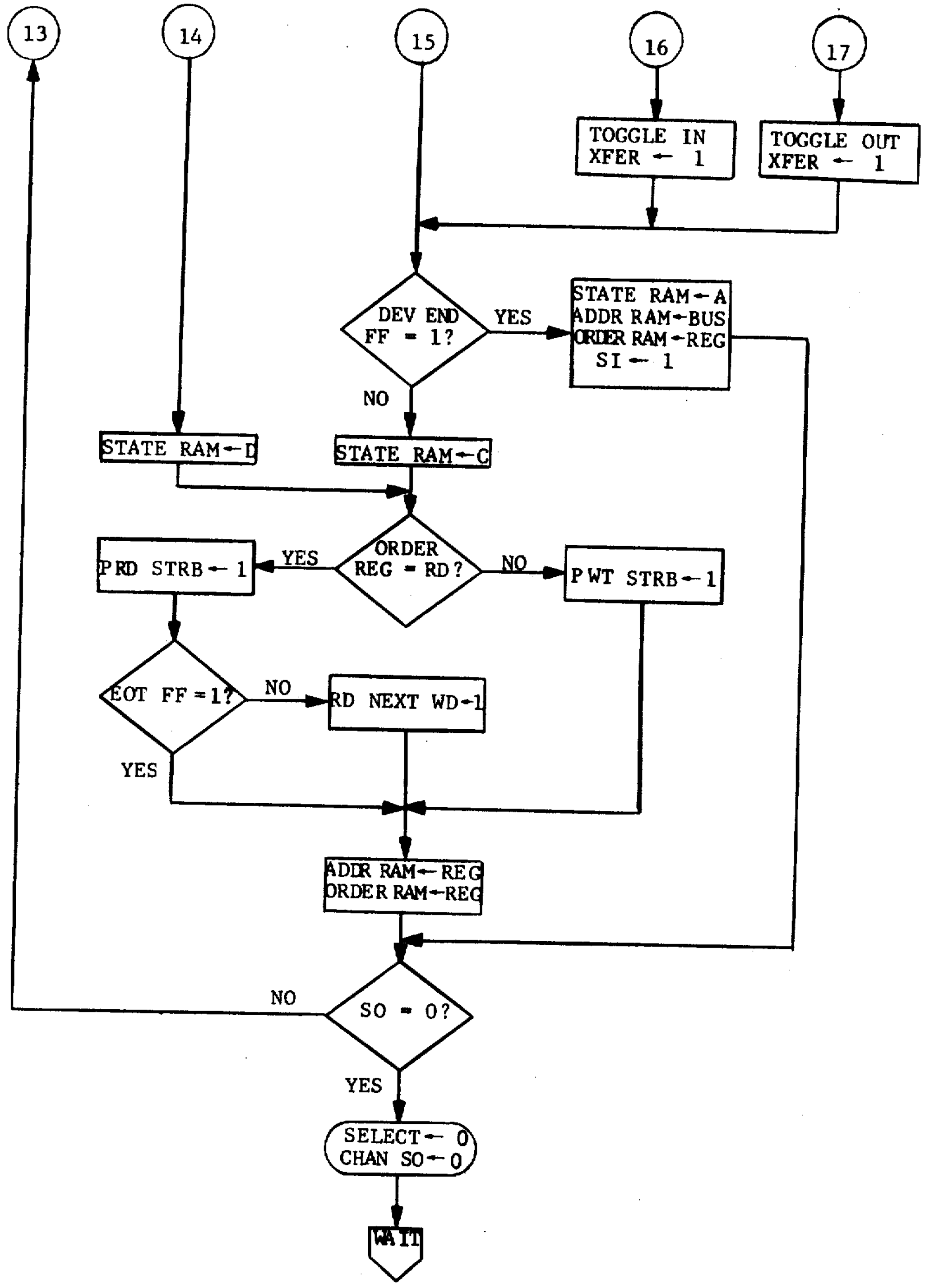
Figure 108:
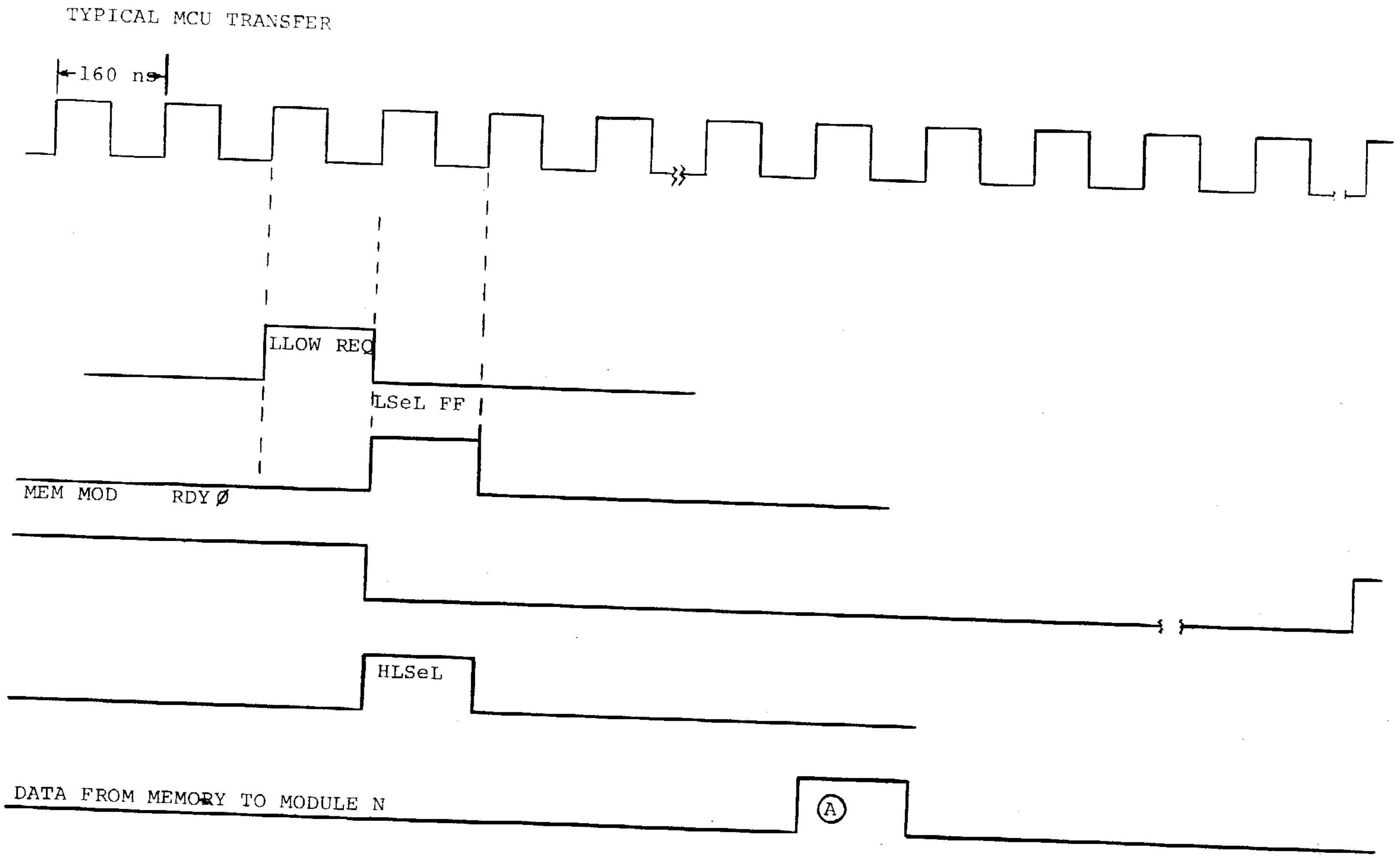
Figure 110:
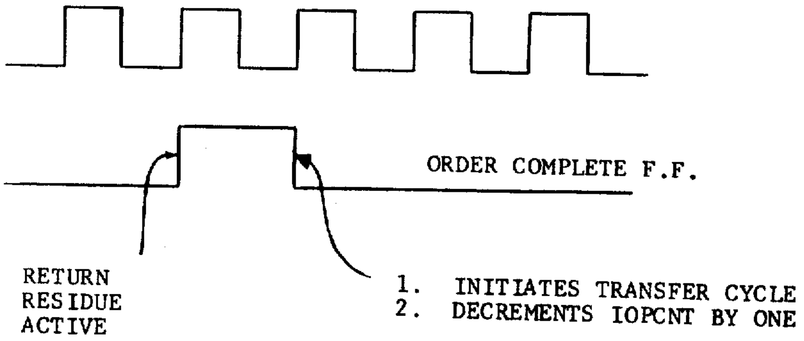
Figure 109:
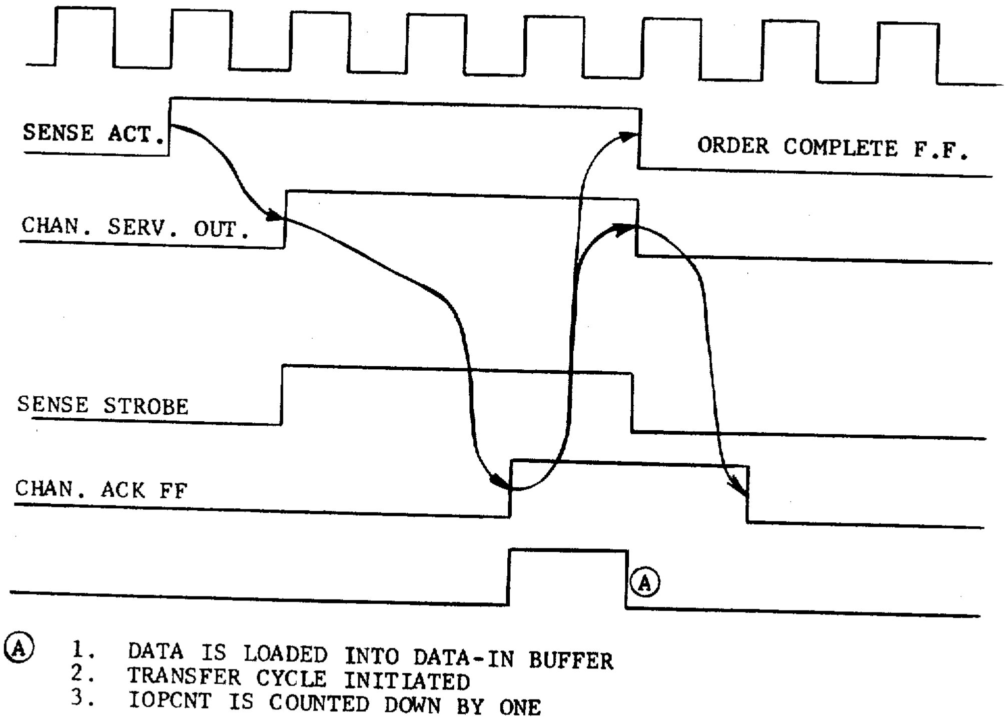
Figure 113:
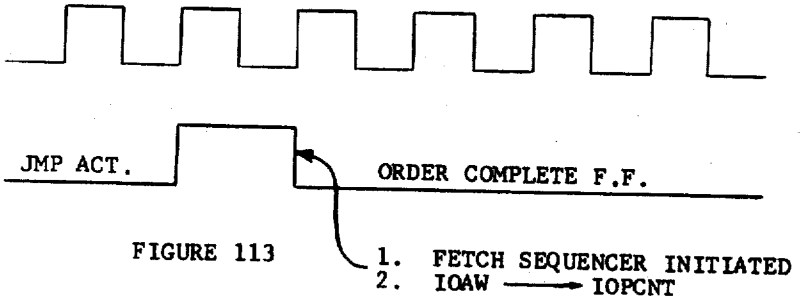
Figure 111:
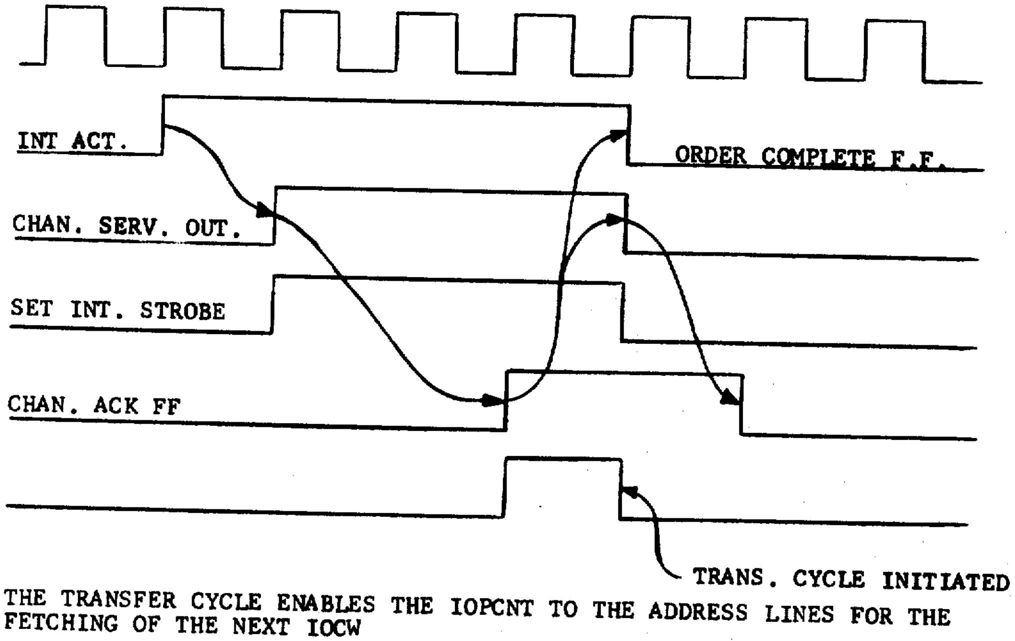
Figure 112:
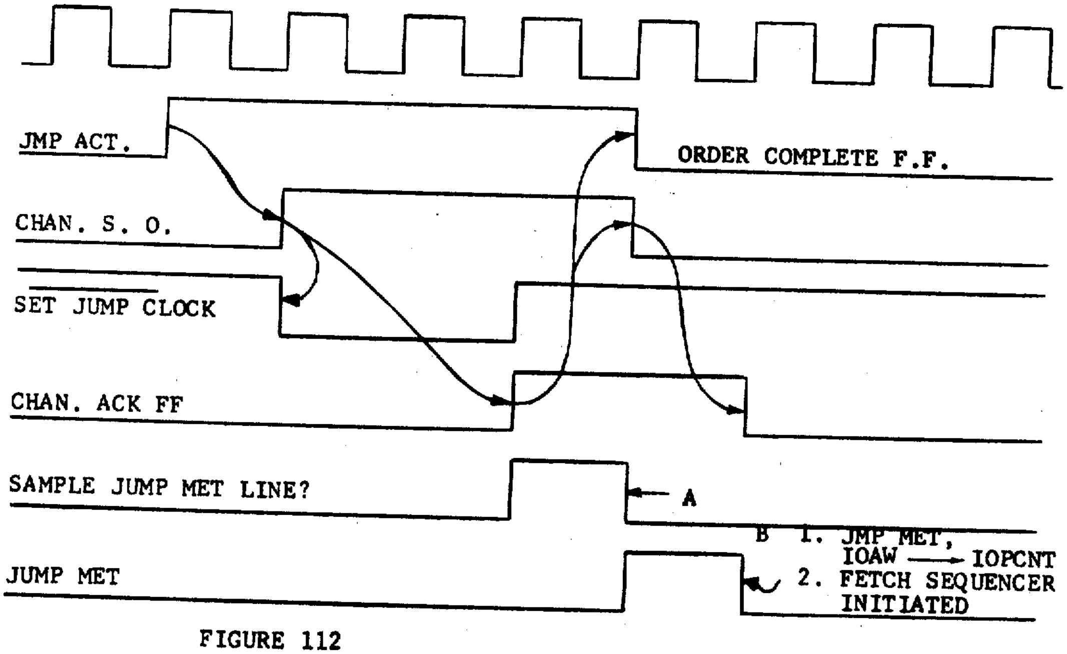
Figure 114:
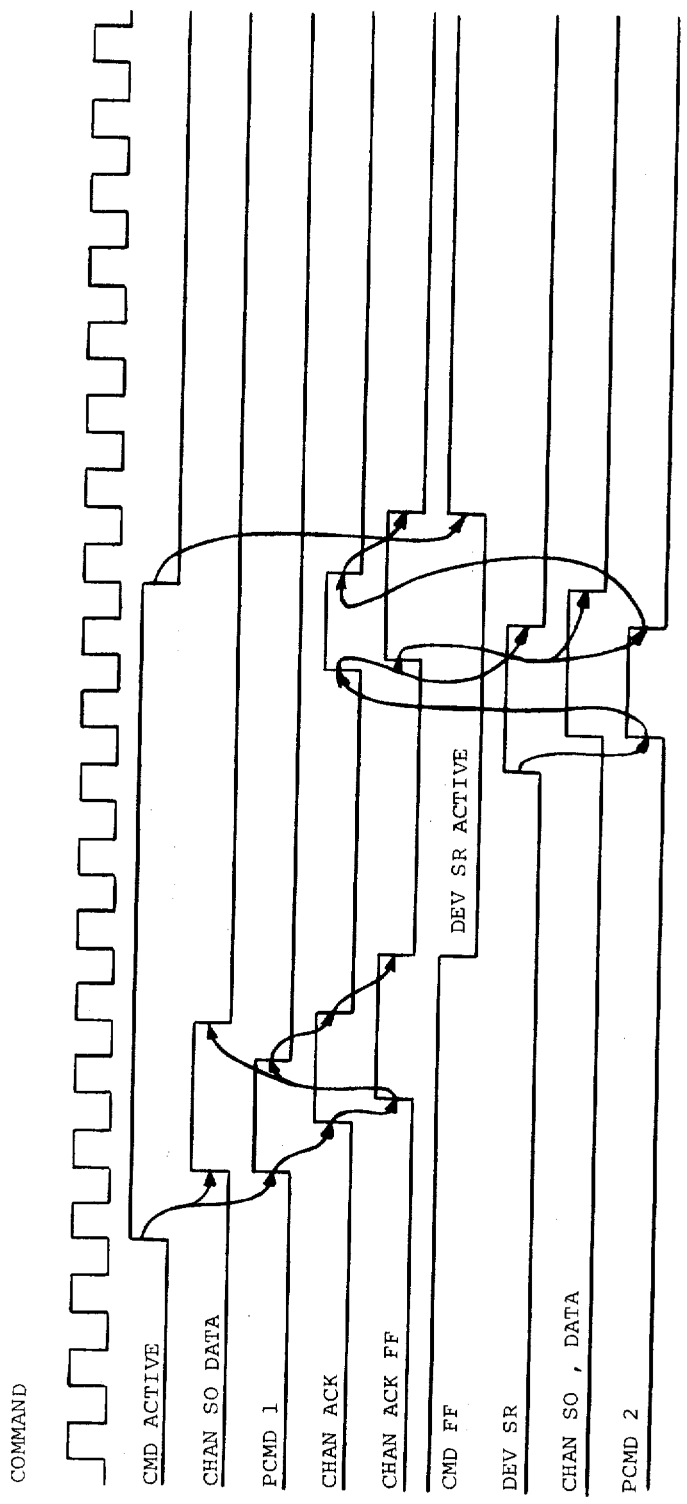
Figure 115:
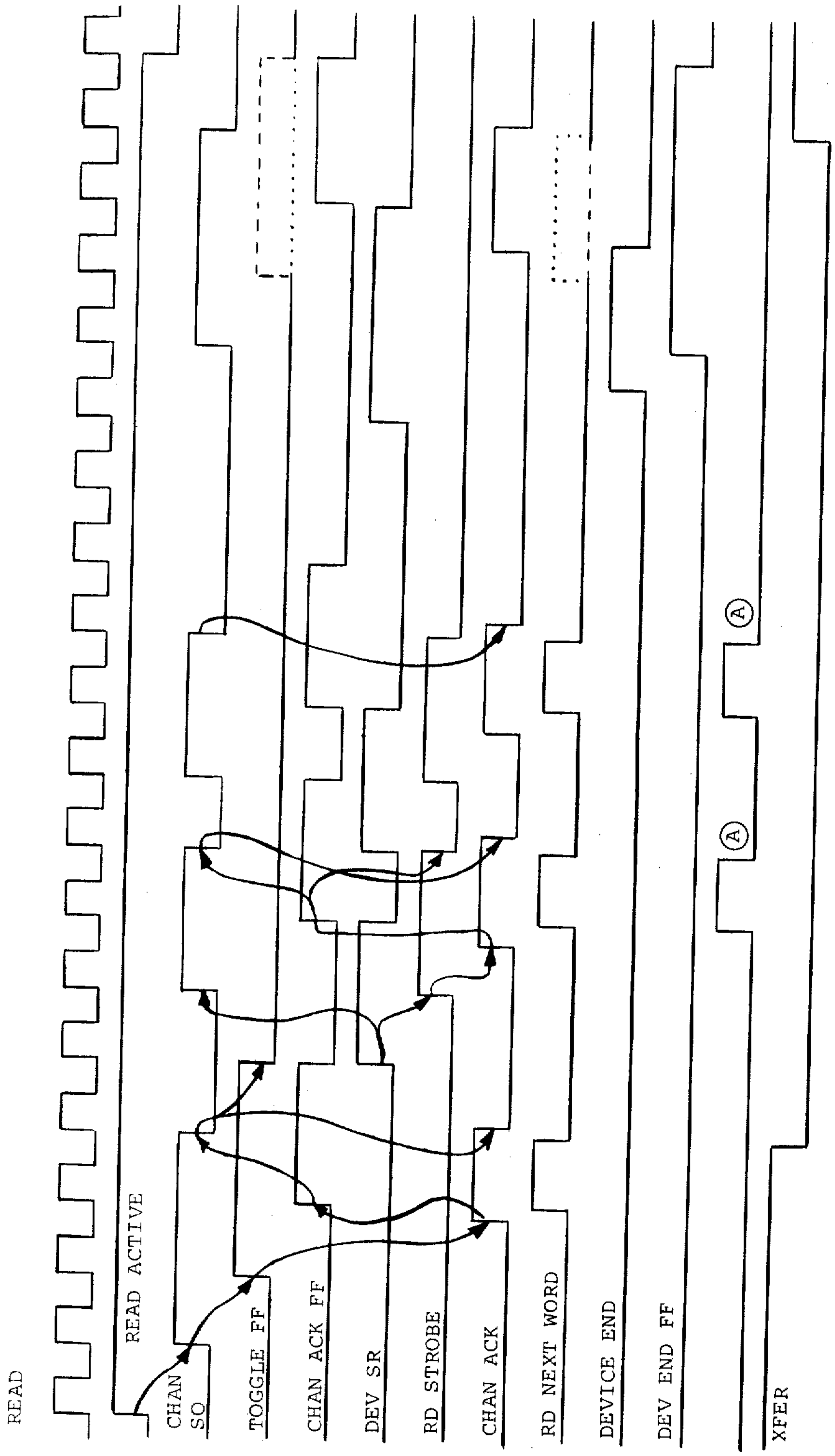
Figure 116:
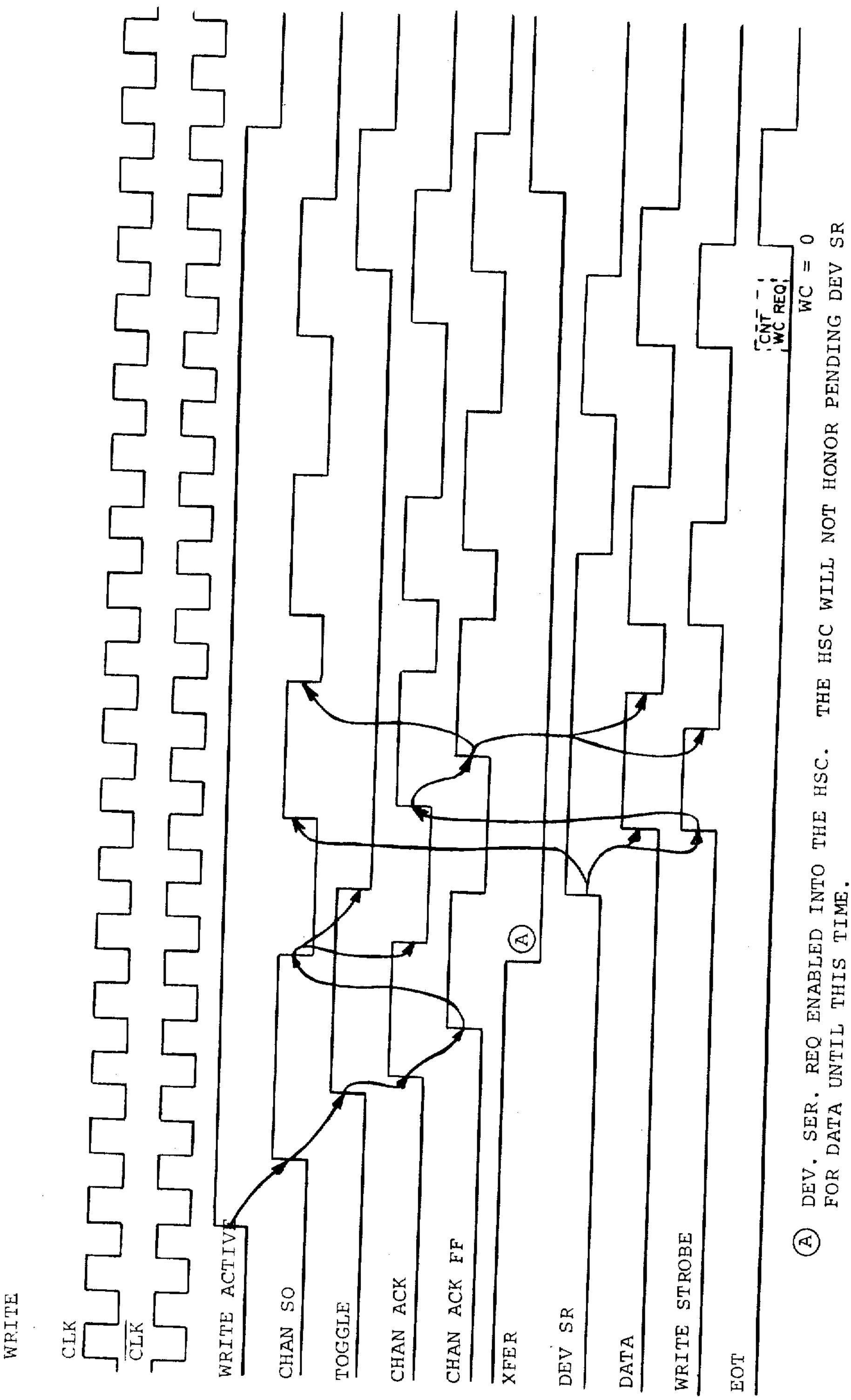
Figure 117A:
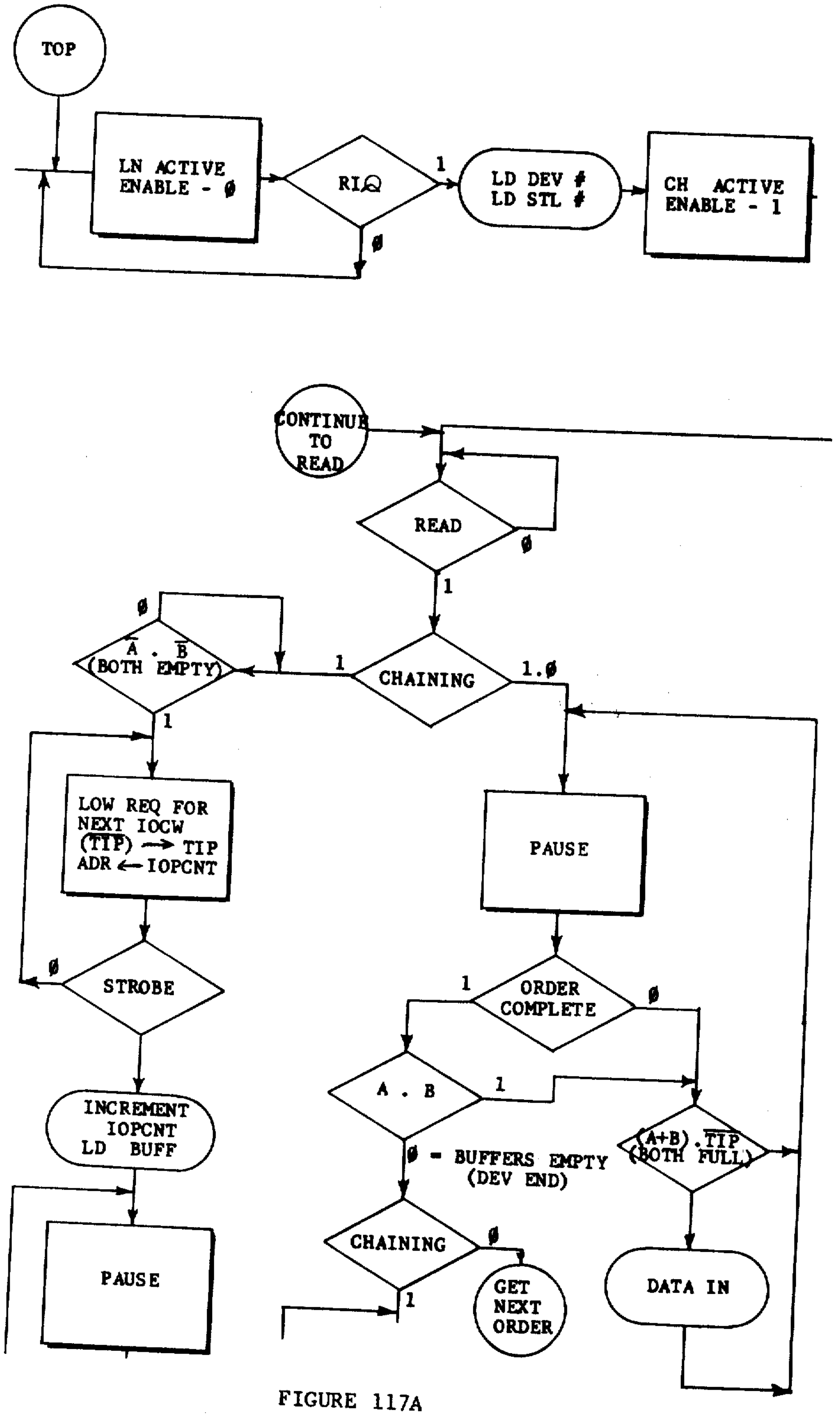
Figure 117B:
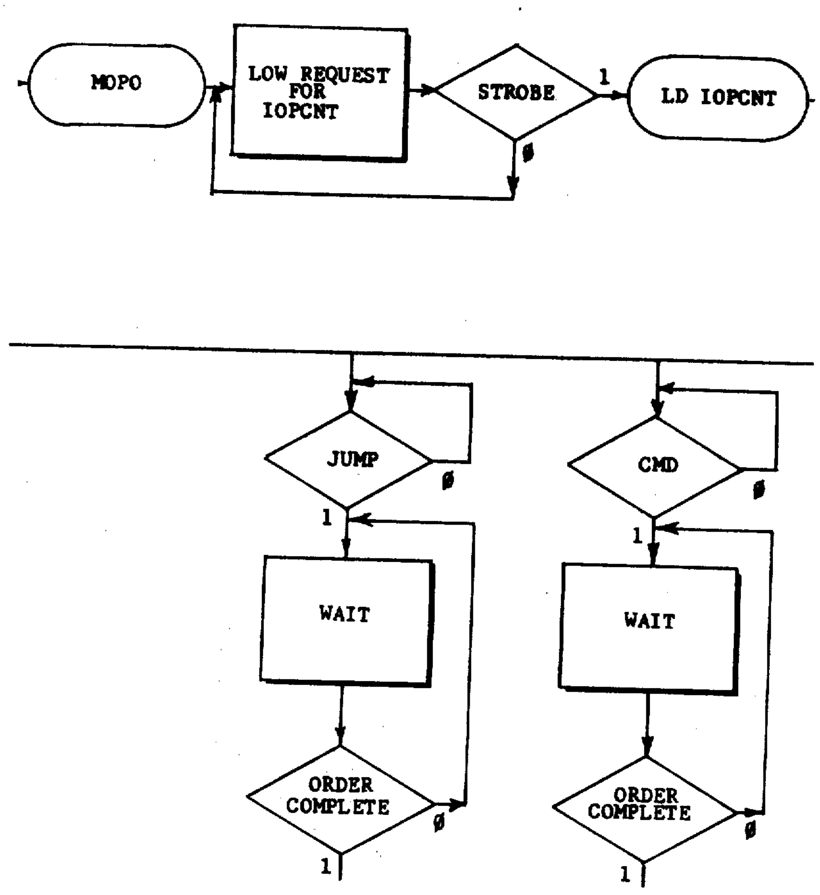
Figure 117C:
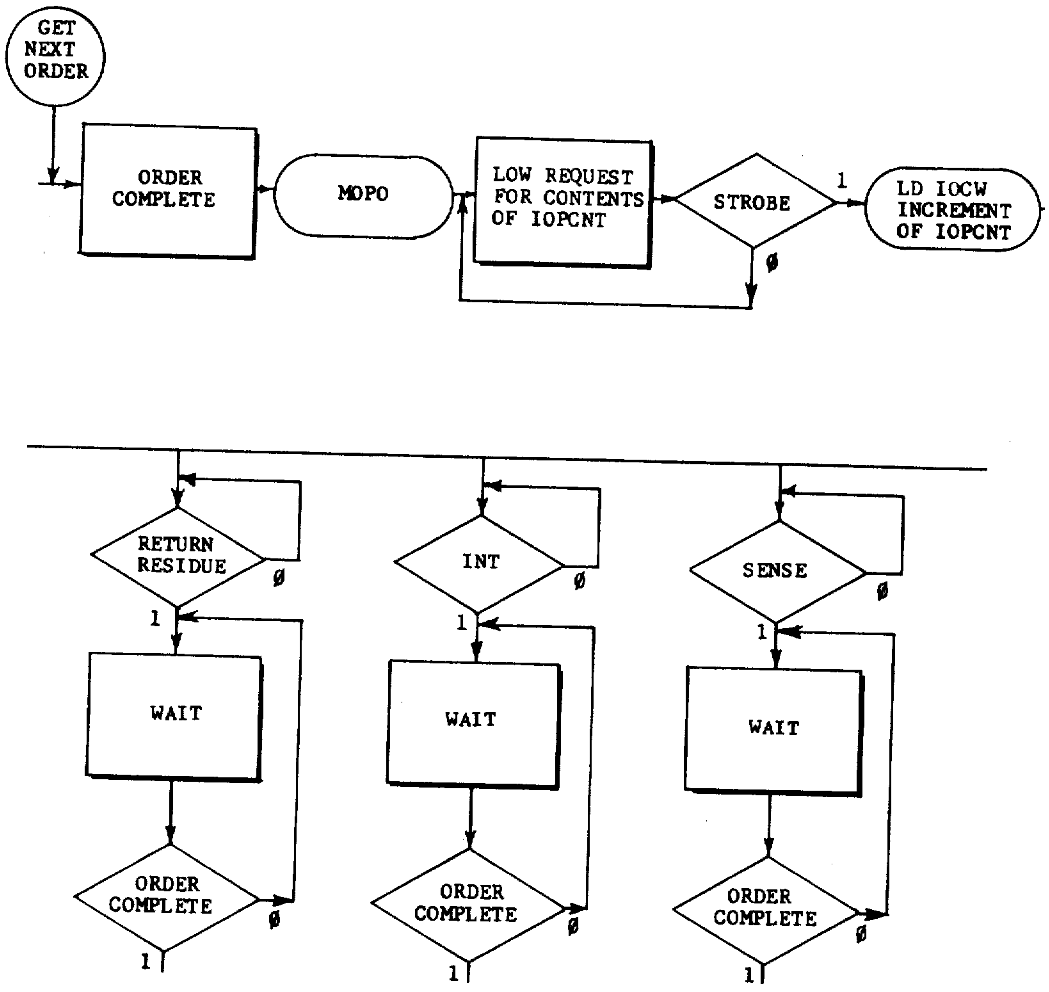
Figure 117D:
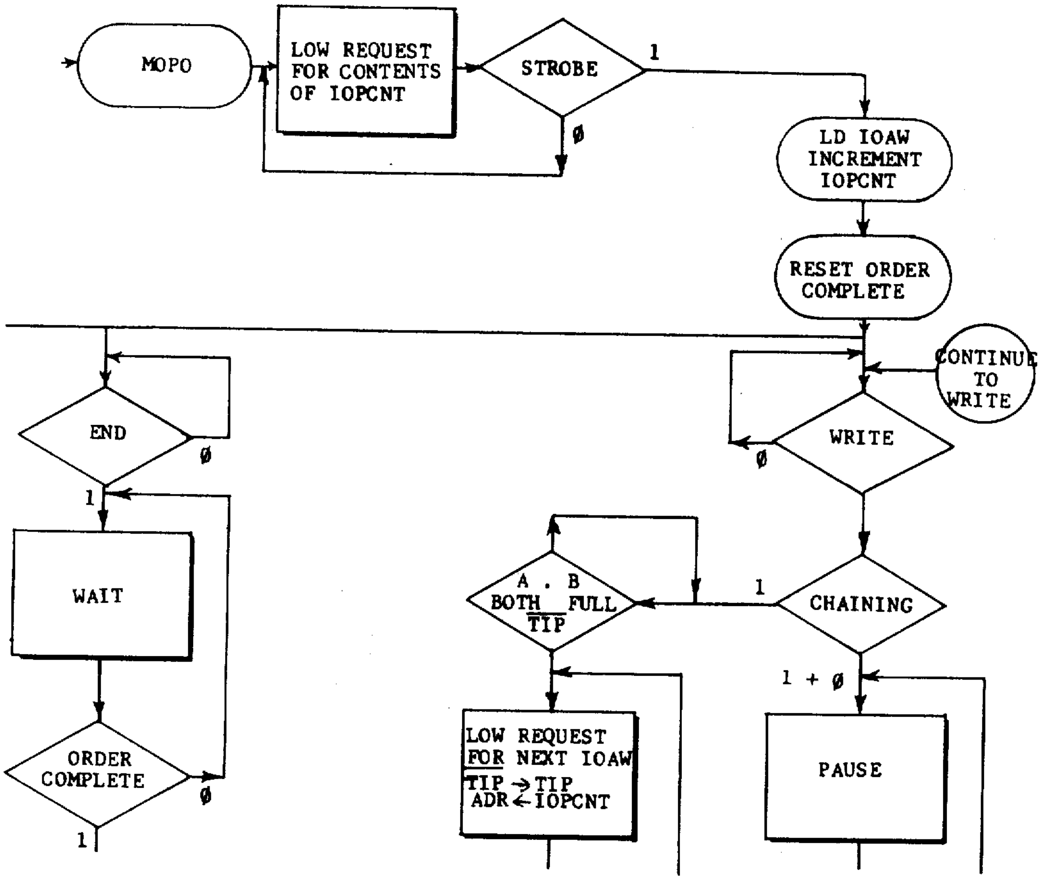
Figure 117E:
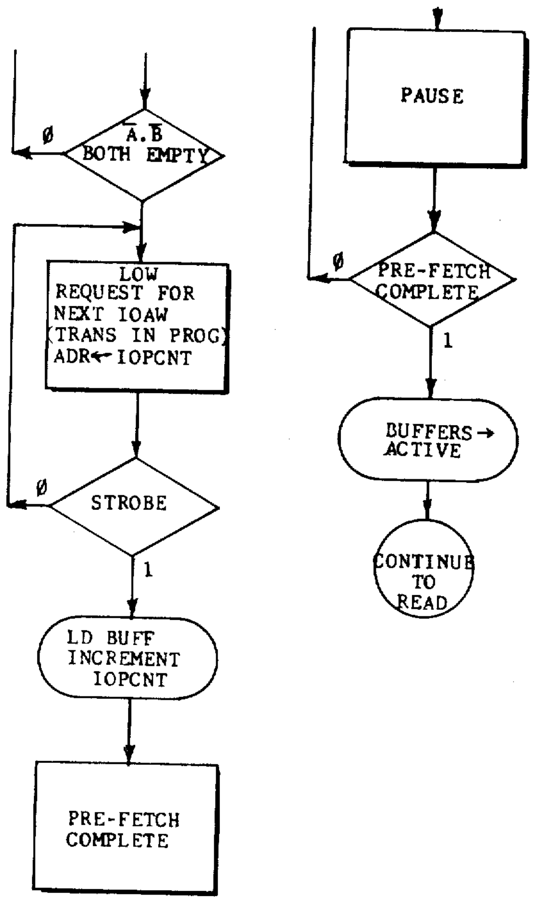
Figure 117F:
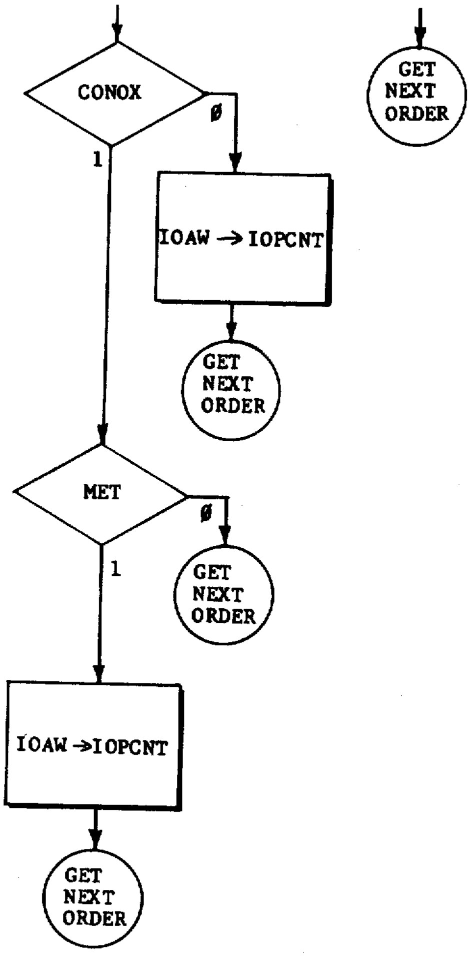
Figure 117G:
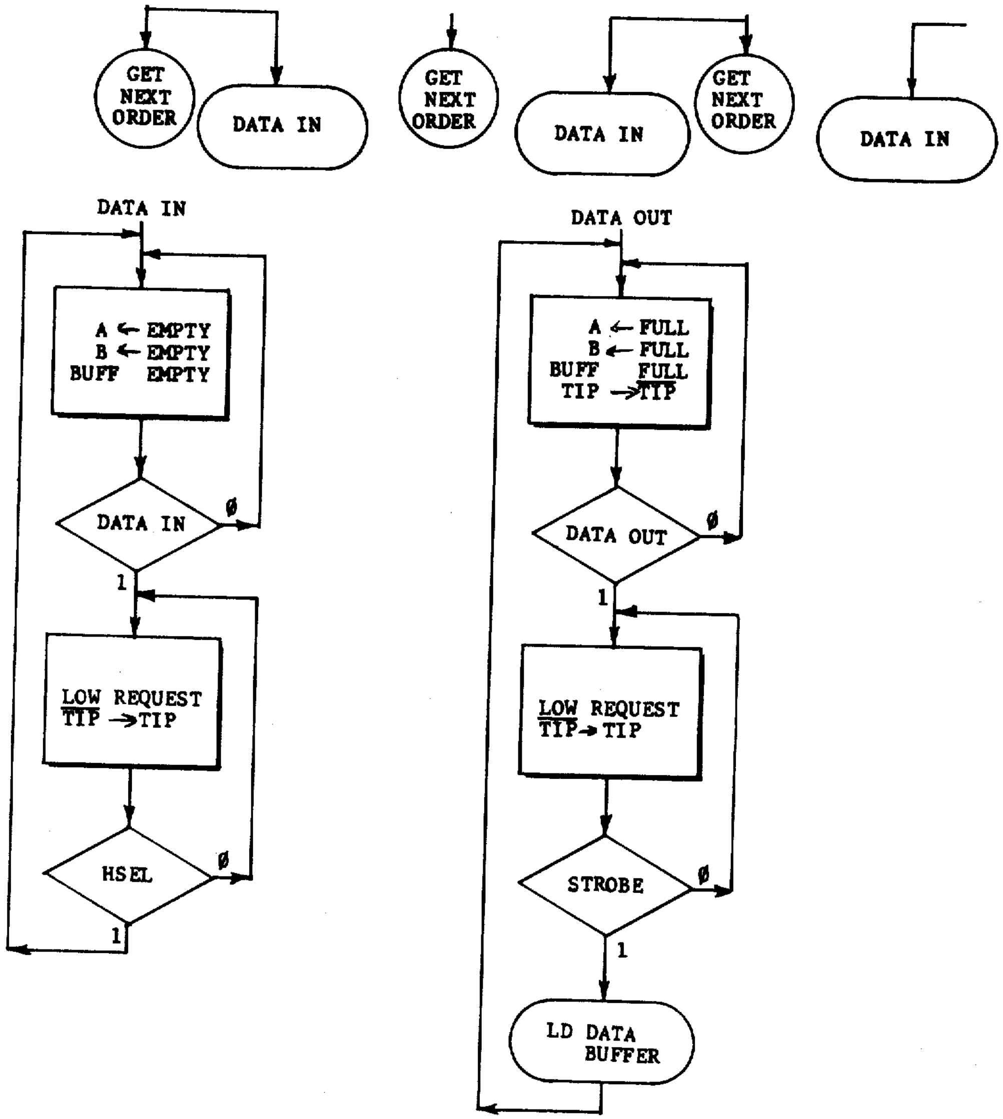
Figure 117H:
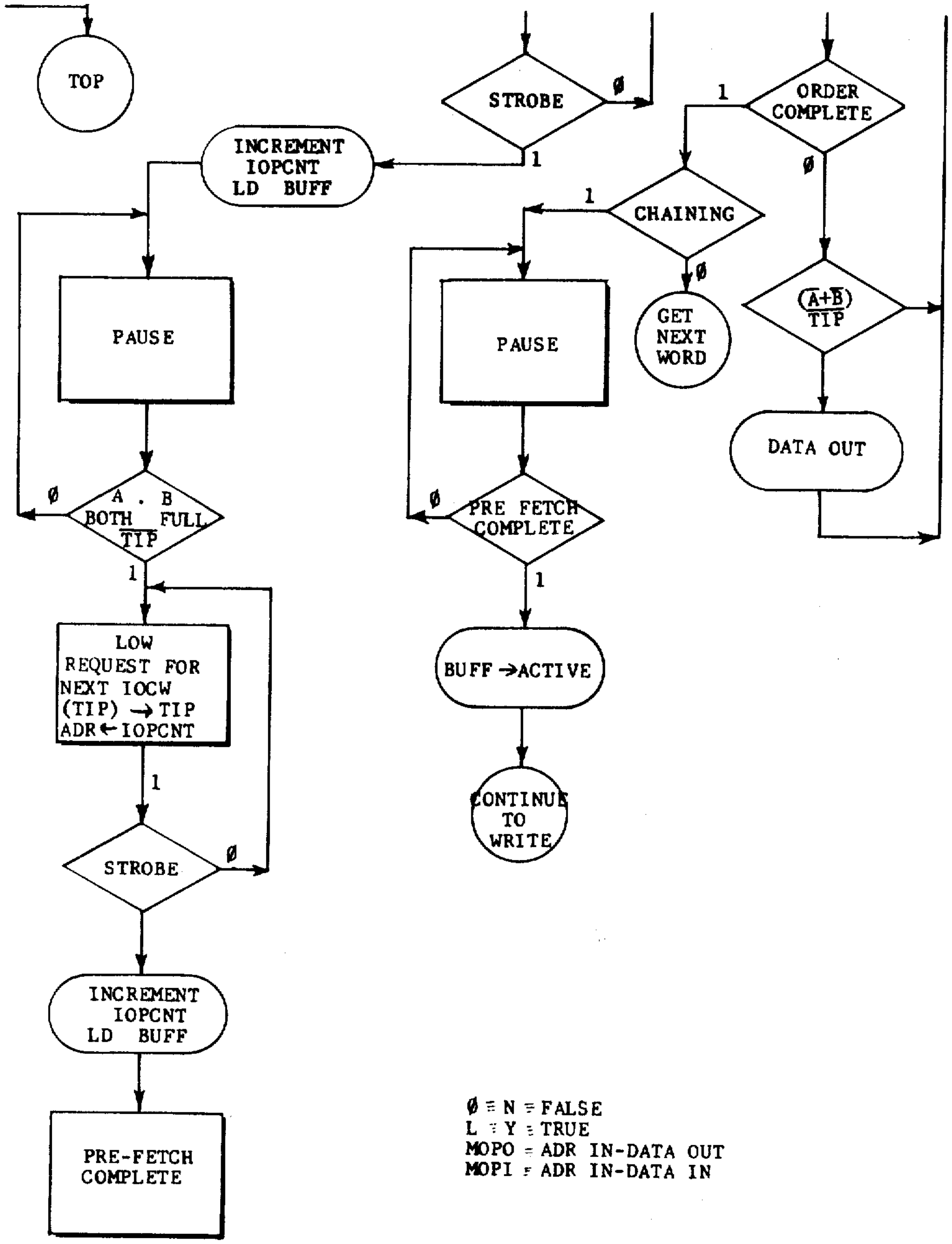

| | |
|---|---|
| FIG. 92: | Device Number Transfer due to Receipt of a Device End Waveforms; |
| FIG. 93: | Device Number Transfer W/O Device End or Word Count Rollover Waveforms; |
| FIG. 94: | Outbound Transfer to MPLX SIO Card (caused by Device End) with a Transfer Error Detected by MPLX SIO Card; |
| FIG. 95: | Write to a Device Controller with Word Count Rollover Waveforms; |
| FIG. 96: | Return Residue From MPLX SIO Card W/O a Transfer Error |
| FIG. 97: | Inbound Transfer From a Device Controller with a Transfer Error Detected by Memory Waveforms; |
| FIGS. 98–107: | Functional Flow Charts Depicting Multiplexer Channel Operation; |
| FIG. 108: | Typical MCU Transfer Waveforms; |
| FIG. 109: | Orders Executed by HSC Waveforms; |
| FIG. 110: | Return Residue Execute Waveforms; |
| FIG. 111: | Fetching the Next IOCW Waveforms; |
| FIG. 112: | Conditional Jump Waveforms; |
| FIG. 113: | Unconditional Jump Waveforms; |
| FIG. 114: | Command Operation Waveforms; |
| FIG. 115: | Read Order Waveforms; |
| FIG. 116: | Write Order Waveforms; |
| FIG. 117*a–h*: | Over-all Flow Chart for Selector Channel; |
| FIG. 118: | SR FF Schematic. |

DESCRIPTION OF THE PREFERRED EMBODIMENT

OVERALL COMPUTER SYSTEM

Figure 1:
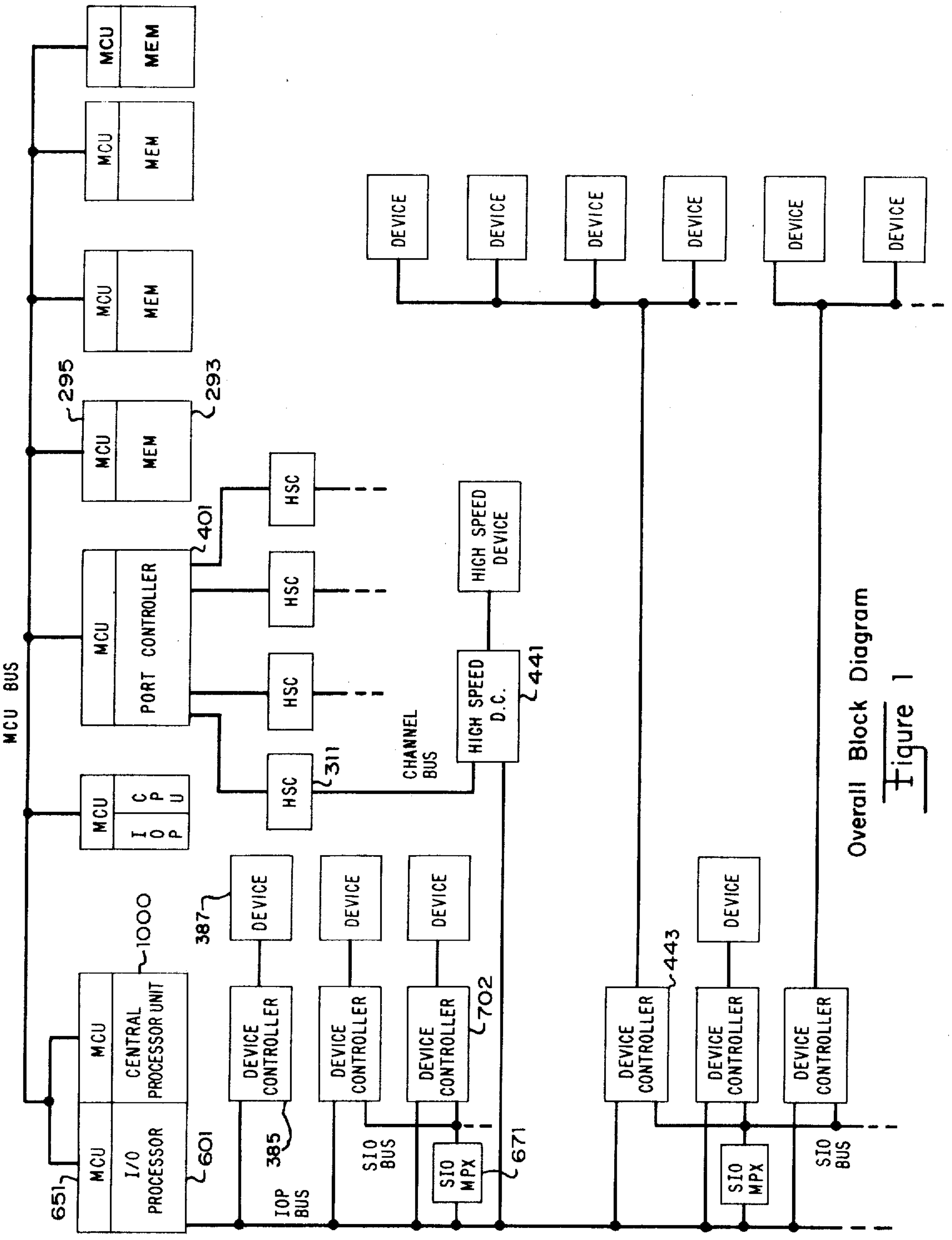
FIG. 1 shows an overall block diagram of the preferred embodiment of the computer of the present invention; the drawings listed below show portions of FIG. 1 in greater detail.

FIG. 1 shows an overall block diagram of the computer system encompassing the present invention. As illustrated, the system can have up to 4 memory modules, 293, two central processor units (CPU) 1000 and a port controller 401 for four high speed channels (HSC) 311. Each CPU has an input/output processor (IOP) 601 along with it and each modular unit has a module control unit (MCU) such as 651. Each MCU interfaces the MCU bus, the main communication link between computer modules. A number of the many different peripheral configurations are illustrated in FIG. 1 and some will be discussed in more detail in the sections that follow.

The discussion of the preferred embodiment has been divided into sections for convenience and clarity. Each of the sections refers to some portion of FIG. 1 in connection with the more detailed figures following FIG. 1. Appendix 2 has also been included at the end of the Description of the Preferred Embodiment to provide a convenient reference for the abbreviations used in the descriptions. Appendix 3 contains an overall operational description of the computer system.

CENTRAL PROCESSING UNIT

Figure 2:
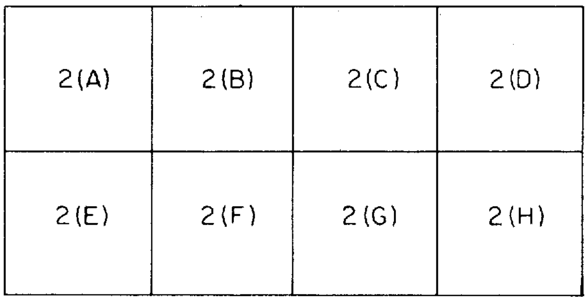
FIG. 2a–h: | Central Processing Unit block diagram; |
|
Figure 2A:
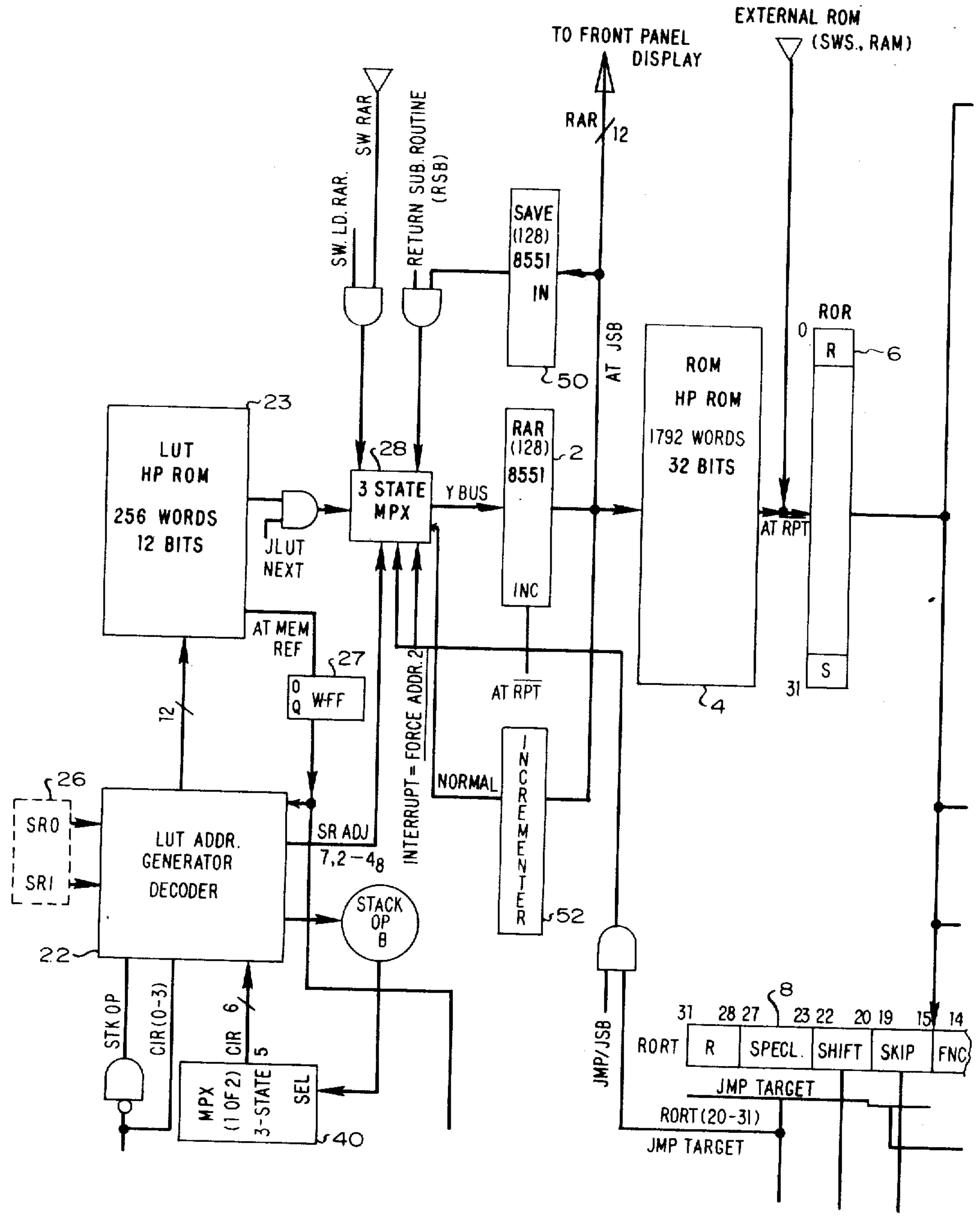
Figure 2B:
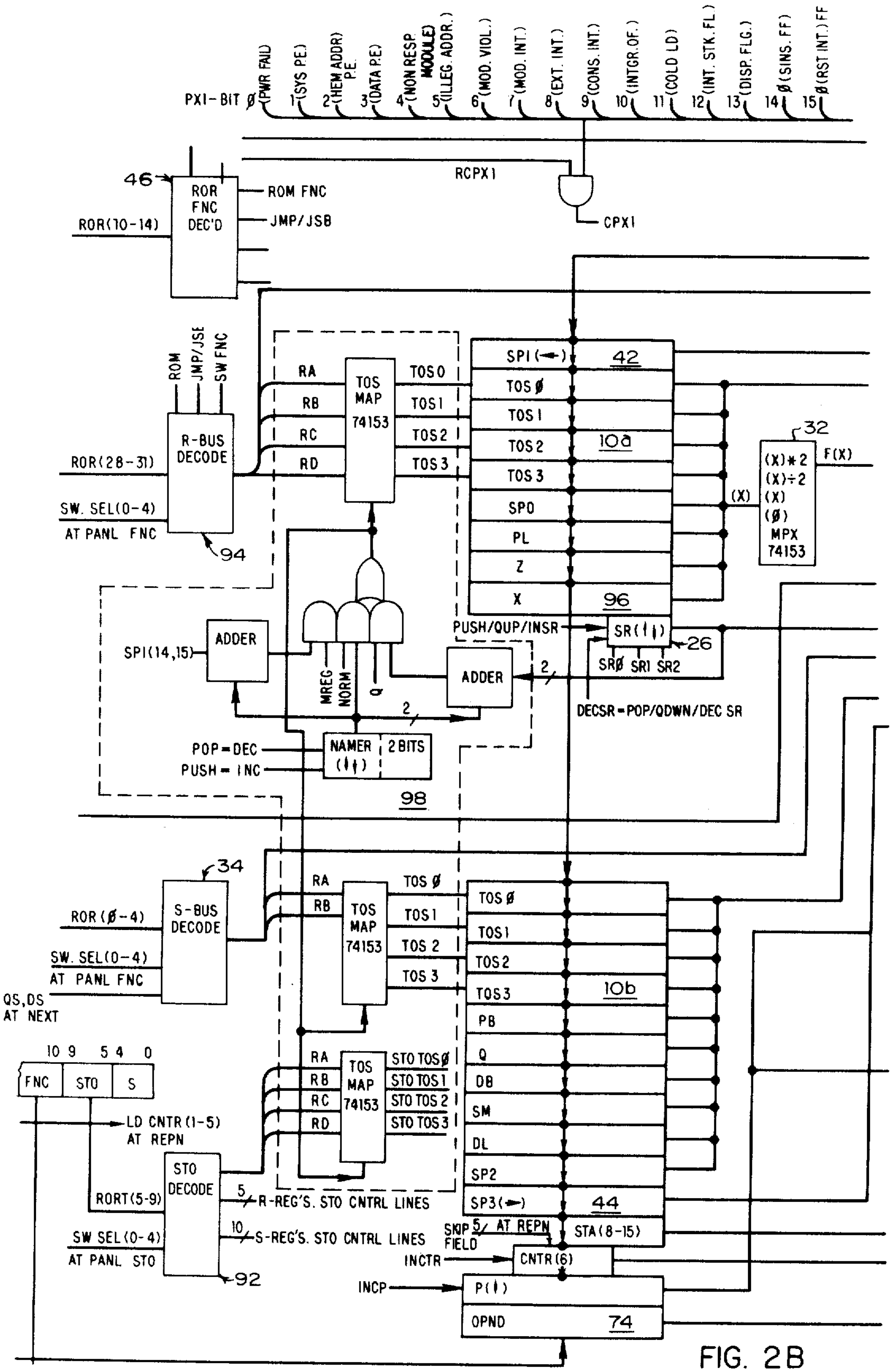

Referring to FIG. 2, there is shown a simplified block diagram of the central processing unit according to the present invention. The ROM address register 2 consists of 12 bits of delay-type flip-flop storage elements of standard MSI function having an output that is coupled to the ROM 4, which consists of a 1,024-bit semiconductor, bipolar ROM's of commercially available design having a 32-bit wide word format consisting of seven fields, as defined by the RORT 8 which consists of 32 bits of flip-flop storage. The ROM output register 6 consists of 32 bits of flip-flop storage. The S-bus decoder 34 includes ordinary $T^2L$ combinatorial logic gating and also includes three-state $T^2L$ logic of commercial design. The register file **10*a* includes a number of registers of various varieties. For example, scratch-pad one (SP1) 42 is a standard shift left and parallel load resister and most of the others are simply conventional parallel-loading registers. The SR register 26 is an up-down counter implemented in ordinary JK flip-flops. Register file 10*b* includes ordinary 16-bit wide data storage registers and also includes scratch-pad three (SP3) 44 which is a shifting register that not only stores data but may also shift right one place as well. Register file 10*b* also includes a 6-bit counter including a 6-bit data storage register and a discrete logic incrementing network which may store back into the counter to give the effect of incrementing by one. The P register is a MSI up counter with parallel store like all the other registers in the file 10b. Operand register 74** is an ordinary data storage register, which receives data from the MCU bus.

Figure 50A:
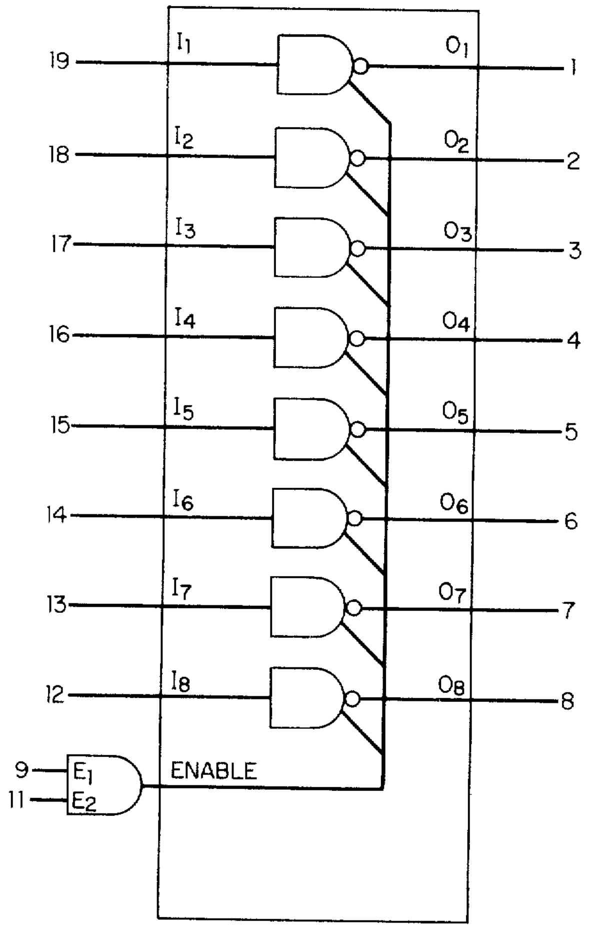
FIG. 50a–c: | Three State Logic Gates; |
|
Figure 50B:
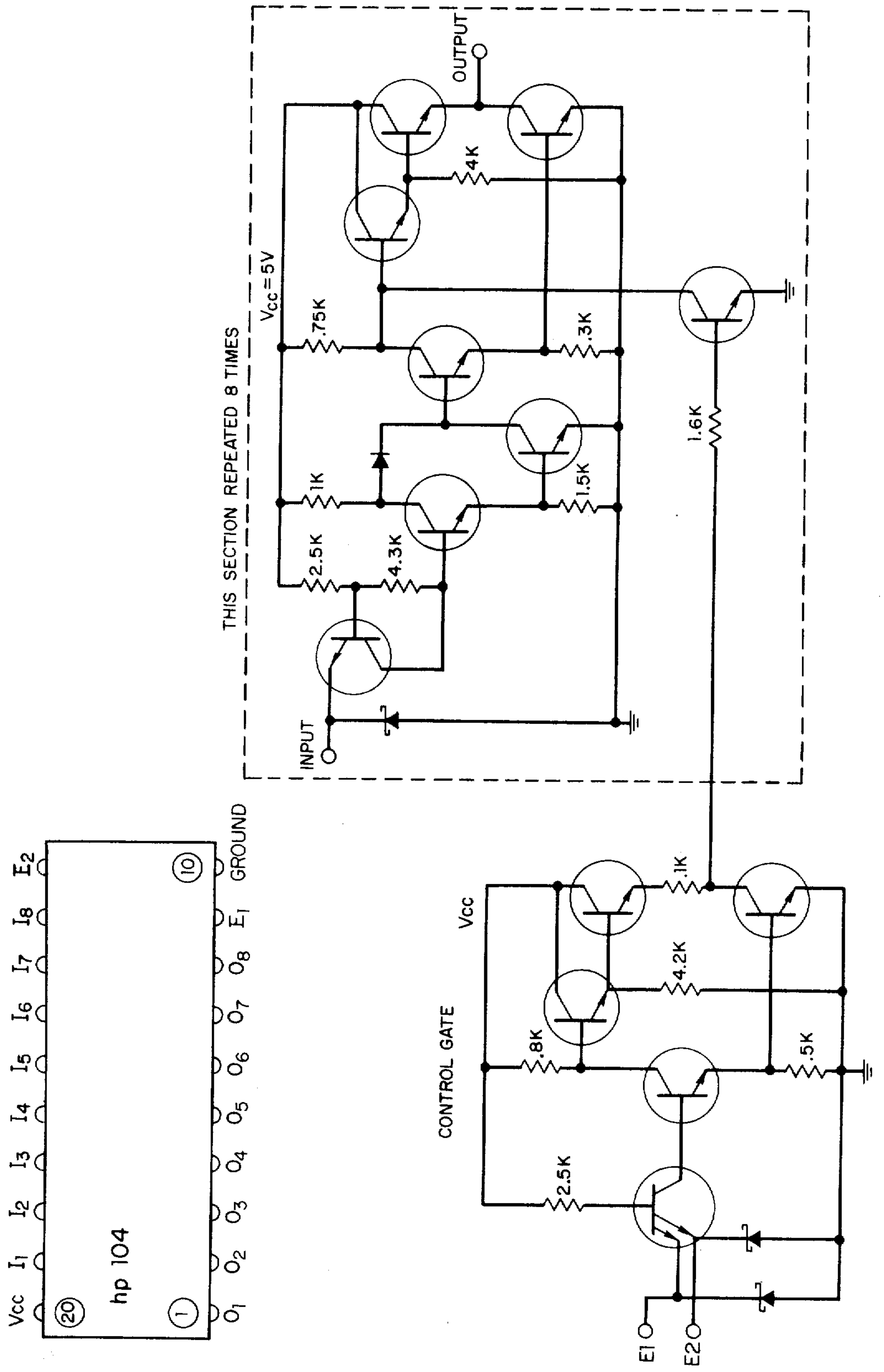
Figure 50C:
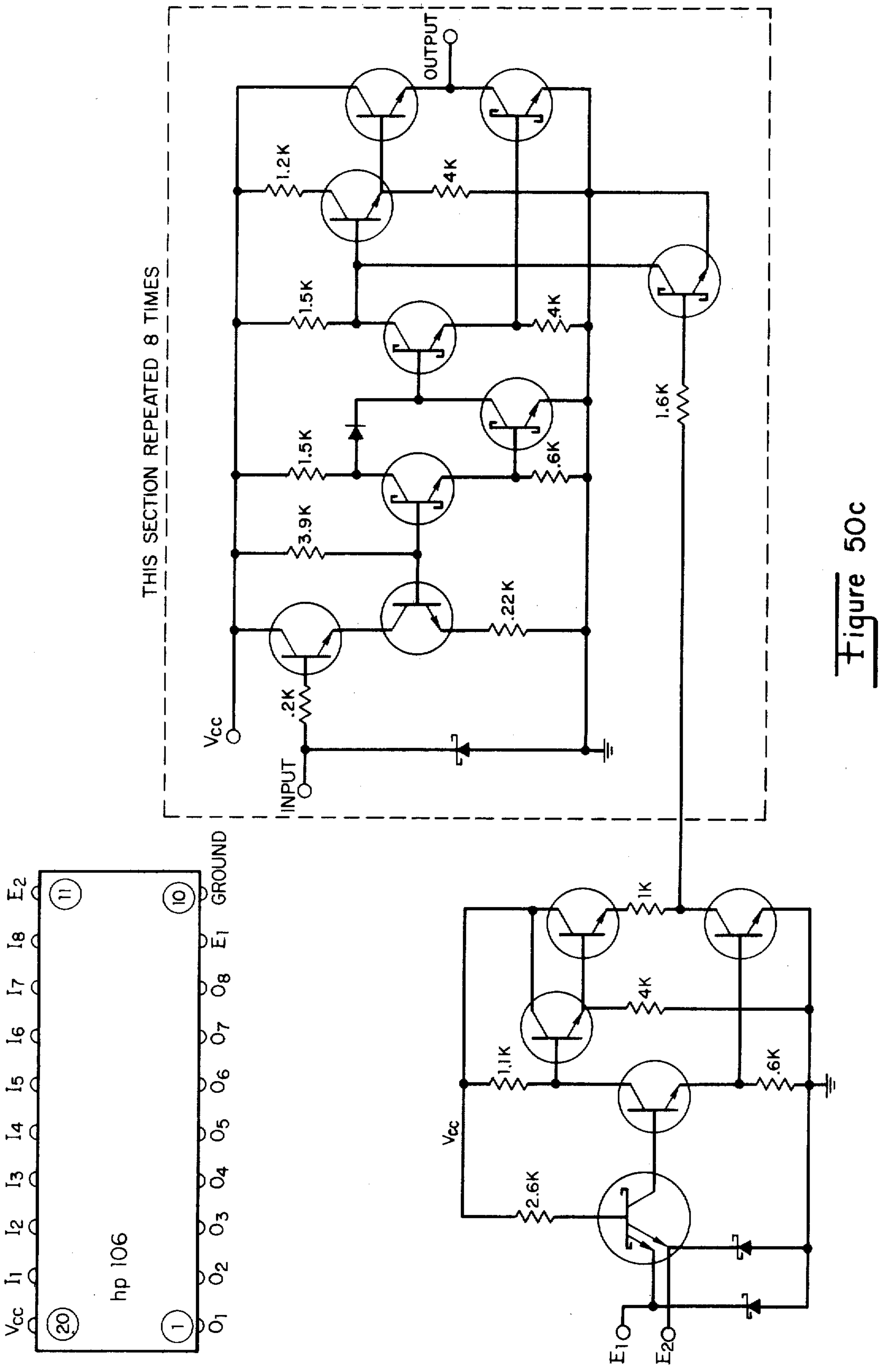

The selection circuitry **12*a* and 12*b* includes three-state logic gates as shown in FIG. 50,** which mutually exclusively OR's tie signals. This constitutes a selection mechanism since only one of the three-state outputs may be on at any given time.

The temporary pipeline registers **14*a* and 14*b* consist of MSI parallel-load shift registers, as later described. The arithmetic logic unit 16 includes standard commercially available MSI circuits which perform arithmetic and logic functions in response to six-line controls into them to given one of thirty-two arithmetic functions out. The shifter 18 also includes three-state gates, as shown in FIG. 50, to provide the U-bus output which is selectively fed back for storage in register files 10*a* and 10*b*, and fed back to the selection circuitry 12*a* and 12*b*. The NEXT instruction register (NIR) 20) includes 16-bit wide, standard MSI latches and the current instruction register (CIR) 21 also includes 16-bit wide standard MSI latches. The multiplexer 40 between the NIR 21 and the CIR 22 also includes three-state gates, as shown in FIG. 50. The look-up table address generator 22 is standard combinatorial logic and the look-up table (LUT) 23 includes three 255-by-4 ROM's of the type described with respect to ROM 4. Block 28 is a three-state multiplexer which acts on V-bus at the input to the ROM address register 2 and which has three-state outputs defined by the look-up table 23 and the other sources of data into the ROM address register 2 such that a portion of it is in each source of data. The W flip-flop 27 is a single flip-flop that stores the W-bit which comes out of the look-up table 23. The pre-adder control 36 is combinatorial logic based on the W-bit and bits 8 through 15 from the current instruction register 21,** as later described.

MODULE CONTROL UNIT

Module Control Unit (MCU) is the means by which a module interfaces to the MCU bus. The MCU bus is the universal means of communication between all the modules in the computer system. Each module, in order to communicate with another module in the system, must obtain a time slice on the MCU bus and transmit its "message" to another module during that time slice. Each time slice on the bus consists of one clock cycle. Modules, in order to obtain a bus cycle must request the bus from their MCU. Each module has a priority rank such that if more than one module request the bus simultaneously, the module with the highest priority gets the next bus cycle. Each module in the computer system has an assigned module number, This number is used for addressing the module in all communications with that module.

FUNCTIONAL DESCRIPTION

TRANSMIT OPERATION

Figure 51:
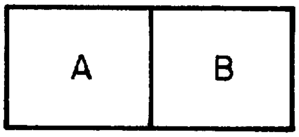
FIGS. 51, 51a and 51b: | Central Processing Unit Module Control Unit; |
|
Figure 51A:
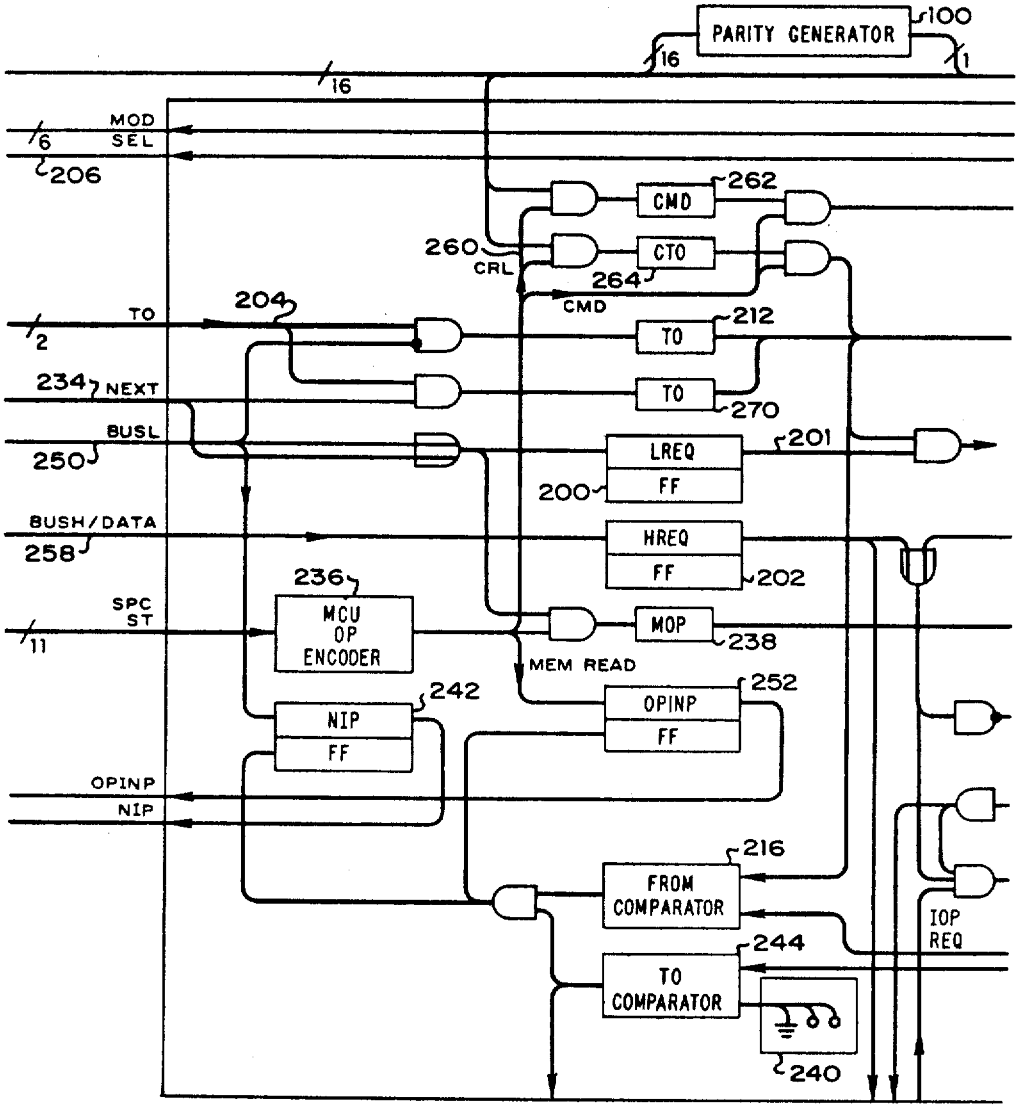
Figure 51B:
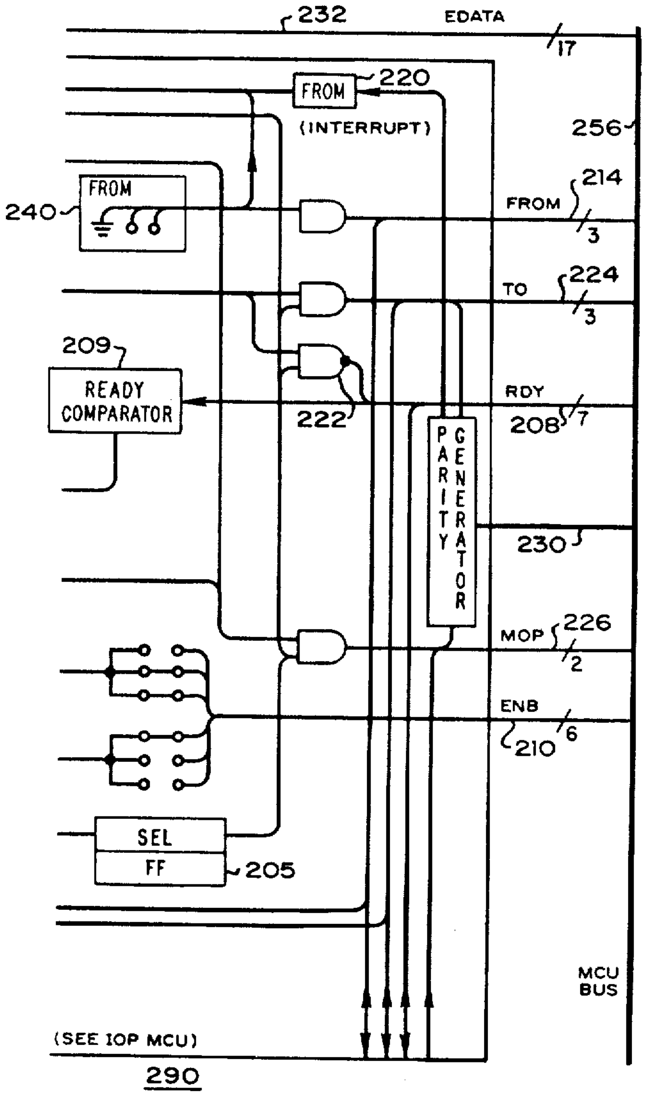

Referring now to FIG. 51, when a module decides to transmit a message to another module, it must present its MCU with either a LO REQUEST 200 (LEQ) or a HIGH REQUEST 202 (HREQ) and the module number 204 of the destination module. It must then wait for the MCU to send it a SELECT (SEL) 206 line. Module uses SEL as a go ahead signal to send the message to the destination. MCU depending on the modules specific requirement can be designed to handle LREQ and/or HREQ.

Figure 52:
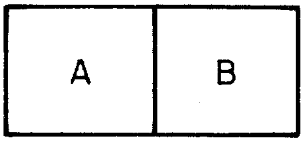
FIGS. 52, 52a and 52b: | Module Control Unit Priority Network; |
|
Figure 52A:
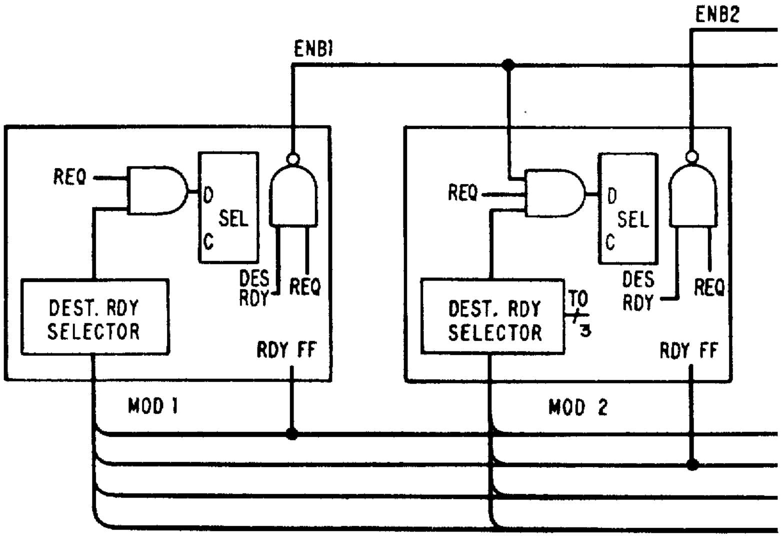
Figure 52B:
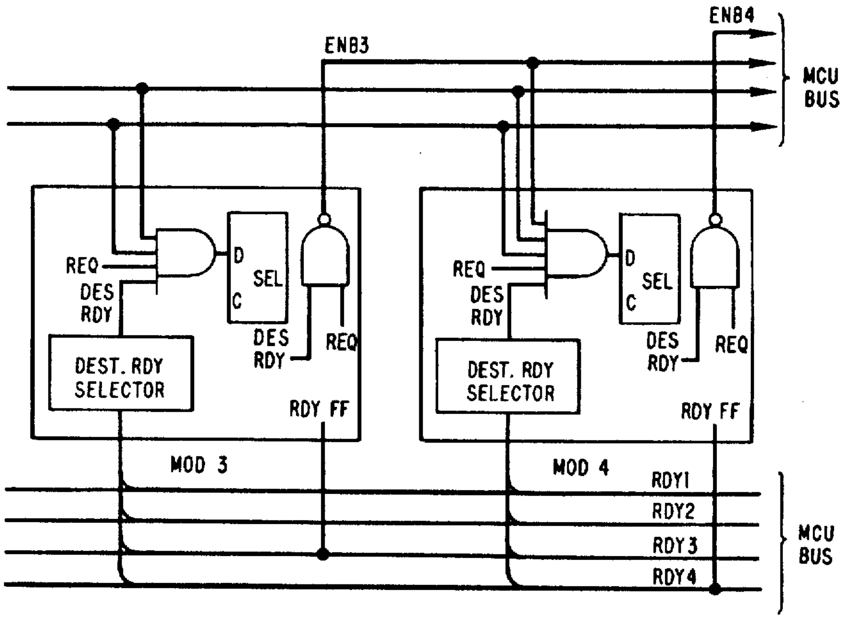

For LREQ, MCU checks two items;

a. It checks the RDY line of destination module 208 to see if it can accept a message or not (see FIG. 51 209). If the destination RDY line is true, the transmitting module must then pull its ENB 210 line low to keep all lower priority modules from using the bus.

b. It checks the ENB lines of all the higher priority modules to see if any higher priority module is waiting to transmit a message on the bus, if so, this module must stay away from the bus until all ENB lines of the higher priority modules are high, i.e., no higher priority module is waiting to use the bus (see FIG. 52).

If both (a) and (b) check positively, i.e., the destination module is ready and no higher priority module is trying to use the bus, this module will then receive the "SELECT" line from its MCU during the next clock cycle.

For HREQ, MCU checks item (*b*) only. This is because MCU expects the host module to use the HREQ when the destination module is "busy," e.g., during the CWA (Clear Write Address) to memory, two messages must be transferred to the memory. The first message is the memory address and the second message is the data that must be stored in the memory at that address. After the address is transmitted to the memory, memory goes "busy" waiting for the data to arrive. The transmitting module must therefore use HREQ in order to be able to transmit the data to the memory.

FIG. 51 shows typical interface lines between a module and its MCU.

RECEIVE OPERATION

There are two receive modes:

a. Expected receive mode, in which module is expecting to receive a message from another module. In this mode, the expecting module must store the module number of the module that it is expecting to receive a message from 212. When addressed, module must compare 216 the stored module number with the content of FROM BUS 214 (0,1,2) (containing the module number of the transmitting module). If they compare the message received is from the expected module (See FIG. 51).

b. Unexpected receive mode. In this mode a module receives a message from another module when it is not expecting it. This mode, if applicable, causes different actions in different modules 220. For example, in memory modules, unexpected messages, if accompanied by non NOP opcode, is interpreted as the address for RWA or CWA.

MCU BUS DESCRIPTION

READY

The RDY 208 (1–7) lines indicate the busy/ready status of the modules numbers, one through seven. High state indicates the module is RDY. There is one RDY line per module. RDY lines are bi-directional. They are pulled low ("busy" state) by the transmitting MCU during the transmission cycle 222. This is done to keep the receiving module from getting selected on the cycle after it receives the message. It is, however, up to the receiving module to maintain its "busy" status thereafter, until the operation complete time, if it so desires. RDY lines can change state no later than 20 *ns* after the clock reference edge.

ENABLE

The ENB 210 (1–7) lines are unidirectional. Each line is dedicated to a single module. Module uses its ENB line to disable the lower priority modules from using the bus by pulling it to the logical low state (see FIG. 51). The conditions that must be present before a module can pull on its ENB Line is according to the following equation.

$$ENB(n) = LREQ \cdot RDY\ (destination) + HREQ$$
$$n = 0\text{–}6$$

The part of the MCU logic that pulls down on the ENB line must be designed such that the path after the RDy receivers to the input of the ENB driver is no longer than 20 *ns*.

TO BUS

The TO 224 bus (0, 1, 2) carries the module member of the destination module (line 0 is the most significant bit). TO BUS is bi-directional, it is used by all modules. The module that is selected to use the MCU BUS in the current cycle must gate its destination onto TO BUS no later than 20 *ns* after the reference edge of the clock.

FROM BUS 214

This bus carries the module number of the source module (line 0 is the most significant bit). FROM BUS is bi-directional, and is used by all modules, The module that is selected to use the MCU BUS in the current cycle must gate its own module number onto TO BUS no later than 20 *ns* after the reference edge of the clock.

OPCODE BUS 226

The OPCODE bus (0,1) is a bi-directional bus that carries the two bits opcode. Opcode can mean different operations to different modules, e.g., memory interprets these two bits as follows:

0,0 =NOP
0,1 = Write
1,0 =Read
1,1 = Read No Write

CONTROL PARITY 230

The CPAR line carries odd parity for combined TO, FROM, MOP buses. This parity is calculated by the transmitting module, and is checked by the receiving module. If an error is detected the receiving module must activate the Control Parity Error (CPE) line for one cycle, and ignore the current transmission. The transmitting module must gate CPAR no later than 20 ns after the reference edge of the clock.

MCU DATA 232 bus

The MCU DATA bus (0–16) is bi-directional and carries address, data, and control information between transmitting and receiving modules. This bus is 17 bits wide, of which the 17th bit is the odd parity on the first 16 bits. The parity must be generated on the 16 bits data by the transmitting module before the SELECT cycle, so that the 16 bits data and the one bit parity are gated onto the bus, during the select cycle, no later than 20 *ns* from the reference edge of the clock.

MCU DETAILED FUNCTIONAL DESCRIPTION

FIG. 51 illustrates in simplified form the logic of the CPU Module Control Unit. This MCU is representative, and will be used as an example in the following discussions.

Since the purpose of the MCU is to effect bus transmissions, the logic is best described by following the sequence of operations involved in different types of bus transmissions. Refer to the next major heading, MCU Bus Transmissions.

MCU BUS TRANSMISSIONS

The procedures discussed under this heading describe how an instruction is fetched, how an operand is fetched and stored, and how a module is given an operation code. As mentioned before, the diagrams are simplified, and so not all features are shown. For example, none of the error checking logic is shown, nor is the gating that prevents undesired simultaneous operations. Flip-flop resets are not shown unless they are particularly significant, and clock inputs are not shown at all. Functionally similar logic has been combined in some cases, whereas in actual fact some circuits are duplicated in the interest of speed.

TO FETCH NEXT INSTRUCTION

CPU TRANSMIT. The first step in fetching an instruction is to send an address to memory and tell memory what to do with that address (read contents and send back to CPU). The following three paragraphs describe this step.

When a NEXT 234 microinstruction is decoded from the ROM Skip field, a NEXT signal loads the contents of the P-register (address of instruction to be fetched) into the CPU Output Register. NEXT also transfers the Next Instruction Register contents into the Current Instruction Register (CIR). The CPU may proceed to execute the CIR contents while the following operations are in progress.

The objective now is to refill the Next Instruction Register. Assuming that the transmission may proceed, NEXT sets the LREQ (Low Request) flip-flop in the MCU. (The difference between low request and high request is that low request always checks to see if the destination module is ready to receive a transmission; high request assumes that the destination module is expecting the transmission, so readiness is not checked.) By this time, the MCU Operation Decoder 236 has encoded the appropriate memory opcode (MOP), which is now in the MOP register 238. The memory opcode is a two-bit code which tells memory what to do when it receives bus data. The four possible codes are NOP (No Operation), CW (Clear/Write), RR (Read/Restore), and RNW (Read/No Write). In this case the memory opcode is RR. NEXT locks this code in the MOP register, and sets the NIP 242 (Next in Process) flip-flop. Setting NIP "opens" the Next Instruction Register, so that it will load all MCU bus transmissions until told to stop (by resetting NIP, later). NEXT also locks the TO register, which now contains the destination module number from the mapper.

Figure 53:
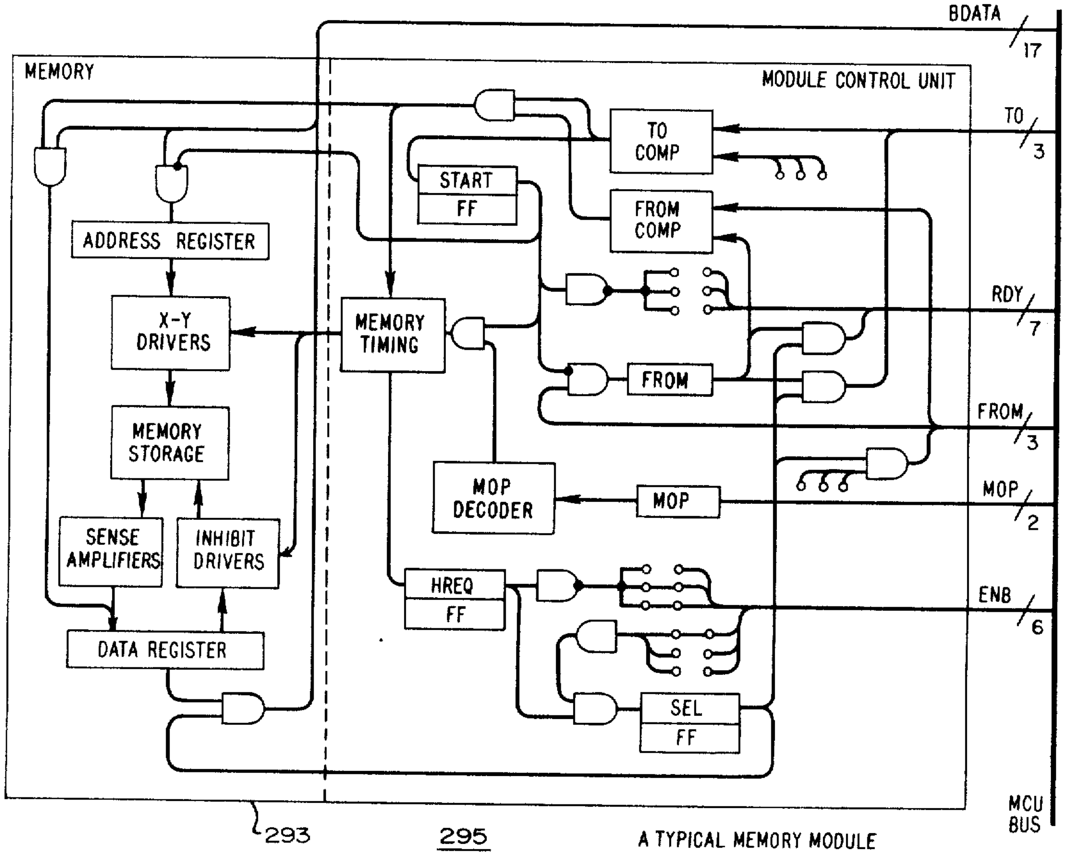
FIG. 53: | Typical Memory Module; |
|
Figure 54:
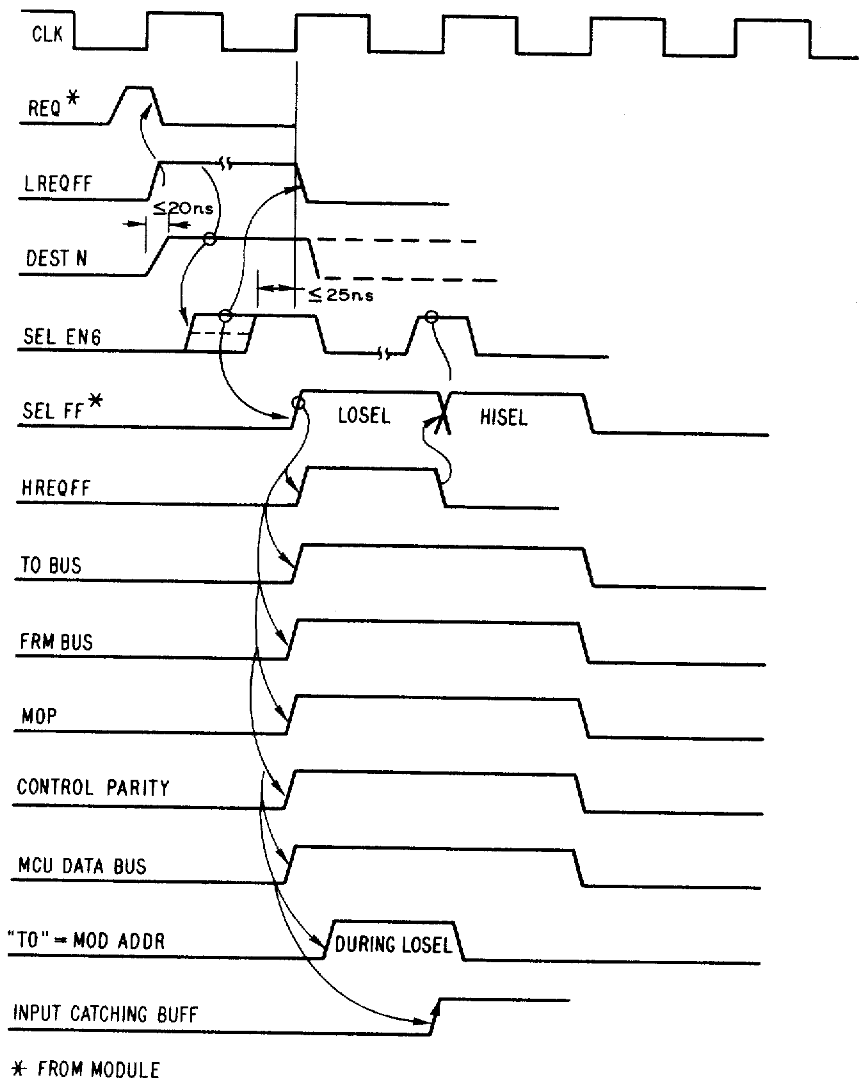
FIG. 54: | Module Control Unit Timing Diagram; |
|

The LREQ signal 201 reads the TO register 212 contents into the Ready Comparator, which checks the RDY 208 (Ready) line from the intended destination to see if that module is ready to receive. If not, nothing further happens until the RDY line is true. The output of the Ready Comparator 209 (through a set of changeable jumpers) disables the Enable (ENB) 210 lines for lower priority modules. Provided that no higher priority module has disabled the ENB line to this module (through a second set of jumpers), and provided the I/O Processor is not requesting the bus, the output of the Ready Comparator now sets the Select (SEL) flip-flop 205. The SEL signal reads out the CPU Output Register contents to the MCU bus, as well as the TO 212 and FROM 240 module numbers and the memory opcode. SEL also disables the destination module's RDY line for one cycle, so that other modules will not assume the memory module is ready before memory has a chance to disable the RDY line itself on the next cycle. MEMORY RECEIVE AND TRANSMIT. The next step in the process is for memory to receive the address from the bus, read the contents of the addressed location, and transmit the contents back to the CPU. The following two paragraphs describe this step. See FIG. 53. The TO Comparator identifies the code on the TO lines as its own module number and sets a Start flip-flop. The Start signal locks the address word from the bus into the address register, and locks the FROM bits into the FROM register. The Start signal also keeps the module's RDY line disabled (the CPU) had disabled it temporarily in the preceding cycle), and together with the decoded memory opcode begins the read/write memory cycle. The X-Y drivers begin to read the contents of the addressed memory location into the data register, via the sense amplifiers. Meanwhile, after a fixed delay, the MCU begins the process of requesting access to the bus by setting the HREQ flip-flop. (Since memory transmits only to modules that are expecting the transmission, only high requests are used.) The HREQ signal disables the ENB lines for lower priority modules and, provided no higher priority module has disabled ENB to this module, sets the Select flip-flop.

By this time, the memory location contents are in the data register, and the SEL signal reads the contents out to the MCU bus. SEL also reads out the wired FROM code and the TO code (which is simply the saved FROM code, since transmission is back to the CPU).

CPU RECEIVE. The last step in the process is for the CPU to receive the instruction word, which is now on the MCU bus, and load it into the Next Instruction Register. The following paragraph describes this step.

The TO Comparator 244 identifies the code on the TO lines at its own module number, and gives a true output. Also, the FROM 216 Comparator identifies the transmission as the one it was waiting for by comparing the saved TO register 212 contents with the FROM 214 lines of the bus; it therefore also gives a true output. (If the FROM code is not the expected one, it is loaded into the FROM register 220, and the bus information is processed as an interrupt from the identified module.) The two true outputs together reset the NIP flip-flop 242. The Next Instruction Register, which up until now has been freely loading all bus transmissions into itself, is now inhibited from further loading, since it now contains the expected next instruction.

TO FETCH AN OPERAND

The procedure for fetching an operand from memory is very similar to the procedure for fetching an instruction. The main differences are that the initiating signals are different, and the receiving register is the Operand (OPND) Register rather than the Next Instruction Register. The following descriptions are therefore somewhat abbreviated, primarily giving the overall flow of information. Refere back to the preceding descriptions if further logical details are necessary.

CPU TRANSMIT. The process of sending an address to memory begins when a BUSL 250 (Bus Low) signal from the ROM Store field loads the U-bus contents into the CPU Output Register and sets the LREQ 200 flip-flop. The MCU Operation Decoder gives a memory opcode to the MOP register 238 and sets the OPINP (Operand in Process) flip-flop 252. The OPND register now begins to load all bus transmissions. The LREQ signal 201 causes the Ready Comparator 209 to check if the destination module is ready and, if so, enters the priority structure. When priority allows (ENB present 210), the Select flip-flop 205 is set, causing the address in the CPU Output Register to be read out to the MCU bus.

MEMORY RECEIVE AND TRANSMIT. The memory module, after recognizing its TO code and setting the Start flip-flop, locks the address from the bus into the address register. The Start signal, together with the decoded memory opcode, initiates the reading of the addressed location into the data register. Meanwhile, the HREQ flip-flop is set and priority is established. When ENB Is present, the Select flip-flop is set causing the operand, now in the data register, to be read out to the MCU bus. The saved FROM code is used to identify the destination (TO) as the CPU module.

CPU RECEIVE. The TO 244 and FROM 216 Comparators together cause the OPINP 252 flip-flop to reset, thus locking the operand from the bus into the OPND register.

TO STORE AN OPERAND

Storing an operand in memory involves much the same logic operations that were discussed in the preceding fetch transmissions. The main difference here is that instead of being a round trip, CPU to memory and then memory to CPU, there are two consecutive transmissions from CPU to memory. The first transmission is the address, the second is the operand. The following paragraphs, again condensed to illustrate the overall flow of information, describe these transmissions. CPU ADDRESS TRANSMIT. A BUSL 250 signal from the ROM Store field loads the U-bus contents into the CPU Output Register and sets the LREQ 200 flip-flop. The MCU Operation Decoder 236 gives a memory opcode to the MOP register; in this case the opcode is Clear/-Write rather than Read/Restore as in the previous cases. (Neither NIP nor OPINP flip-flops are set). After checking if the destination module is ready and ENB 210 is present, the LREQ signal 201 causes the Select flip-flop to be set. This reads out the address to the MCU bus 256.

MEMORY RECEIVE. The memory module, after recognizing its TO code and setting the Start flip-flop, locks the address from the bus into the address register. The Start signal together with the decoded memory opcode, causes a "clear" half-cycle. The Start flip-flop remains set, and the FROM, MOP and address registers remain locked. Also the RDY line remains low, so no other modules may send a new address to this memory module.

CPU DATA TRANSMIT. The CPU, meanwhile, has put the operand on the U-bus, and a DATA 258 signal from the ROM Store field loads it into the CPU Output Register. The DATA signal also sets the HREQ flip-flop 202. (Destination readiness does not need to be checked, since memory is expecting a data transmission from this module.) After priority checks, the HREQ signal sets the Select flip-flop 205, which reads out the operand to the MCU bus.

MEMORY RECEIVE. In the memory module the TO Comparator recognizes its TO Code and the FROM Comparator verifies transmission from the correct module. The true outputs from both of these comparators cause the operand from the bus to be loaded into the data register, and additionally cause the memory timing to proceed with the second half of the clear/-write memory cycle. This causes the operand to be stored into the addressed location.

TO COMMAND A MODULE

The instruction set includes an instruction, CMD, which permits priviledged executive programs to issue commands directly to a module (assuming the module is equipped to handle such commands). When programmed, the CMD instruction takes a 16-bit word from the top of the stack and sends it to a module whose module number (and two-bit opcode) are given in another word in the stack. (See CMD instruction definition.) The logic operations involved in this type of transfer are described in the following paragraphs.

A BUSH 258 signal from the ROM Store field loads the word containing the opcode and intended module number into the CPU Output Register. The TO code is the CPU's own module number so that, after select occurs, the CPU transmits to itself. The five effective bits from the bus are loaded by a CRL 260 (Control) signal into the CMD 262 (Command) and CTO 264 (Command TO) registers in the MCU. The CPU, meanwhile, has read the top-of-stack word onto the U-bus, and a BUSL 250 signal from the ROM Store field loads this word into the CPU Output Register. A CMD 262 signal from the MCU Operation Decoder enables the CMD 262 and CTO 264 registers to be read out when select occurs, rather than MOP and TO respectively. Thus when the Select 205 flip-flop is set, the 16-bit word in the CPU Output Register is tranmitted to the module specified by CTO 264, with the CMD opcode on the MOP 226 lines.

CONTROL OF MULTIPLICITY OF DATA INPUTS

The MCU is used to control a multiplicity of data inputs. Essentially any module can request information from any other module. Most often this is done with a memory module and the MCU can remember internally what it is going to use that data for when it comes back. Typically, in the case of the memory, the data is going to be either an instruction or an operand in a computation. When an initial request is made on the MCU bus, actually a register and several control bits are set to designate what module the request is going to. The appropriate module number will be put in the register and a flip-flop will be set to designate the type of information requested. For example if the CPU requests an instruction fetch 242 flip-flop will be set to remember that we have requested an instruction. Associated with that flip-flop there is a register 212 that stores the number of the memory module transmitted to, for example memory module 0. Now, on the next transmission a request might be made for data for the current instruction, and a request would be sent out to the MCU logic for data. By that operation an operand wait 252 flip-flop would be set and associated with that would be another register 270 to store the number of the memory module in which that operand is located. Since we can have up to four memory modules, that operand might be in memory module 1. Now, even though the information from module O was requested before that from module 1, the information from module O may not come back before that from module one since module 1 may be a fast memory. It is therefore necessary to determine what is coming back.

The data comes back into the MCU and it makes a choice based on the flip-flops and the registers set. The first thing the MCU looks at is the module number 214 of the data source. The MCU compares that module number to the numbers stored in the two registers (212) or (270). If the comparison recognizes module 1 as the sender, the data is therefore an operand in process 270. The information provided by the operand wait flip-flop 252 tells the MCU to route that information into the operand register rather than the instruction register. When the next instruction is received it will be routed to the instruction register. The advantage of this mode of operation by the MCU is the ability to set several memory modules to work at once, even though the modules may be of different sizes and speeds. If information comes to the CPU from a module that does not match either of the numbers stored in the MCU registers, that is called an interrupt 220. An interrupt requires yet another action from that previously described, depending on the type of interrupt. When the data comes back from module 0 on FROM lines 214 and its source matches module number 0 contained in register 212, the MCU notices that a next instruction is in process by 242, and that information is clocked into the next instruction register 20. There is an additional in-process flip-flop 112 to tell whether the information in the next instrucion register is valid at any given mement. In addition to those registers already discussed, a third register for an I/0 transfer in process, and a third 3-bit register to hold the third module number FROM. Therefore the CPU can actually be waiting for three different memory modules simultaneousy and the MCU will match up the information coming back with the proper register.

MCU PRIORITY RESOLUTION

There are two levels of priority requests. First there are high priority requests and low priority requests. Low priority requests are granted to a module only when the destination module is ready or not busy. A high priority request is granted regardless of the ready-busy state of the destination module, so that a high priority request takes precedent over a low priority request. Second there are priority assignments among modules. On this level of priority the module number zero may be assigned a higher priority than module 1 which has higher than 2 on down to module *n*. On this level the devices that need a higher priority have a lower module number. And, the first level of priority deals only with the type of data that is being transmitted. For some data it is desirable to be sure the module is ready before the data is sent, i.e., it is necessary to make sure the module is expecting it. On other occasions, the module sending the data will already know the receiver is expecting data and the goal will be to send the data as fast as possible. On those occasions one would not want to sacrifice speed by waiting for a ready acknowledge from the receiver. For example, when the CPU requests information from a memory, a two step process takes place. First the CPU makes a low priority request to memory to send the address and then the CPU gets off the MCU bus to let some other module use the bus while the memory is fetching the information. Since the memory may take several clock cycles to get the information, the bus is therefore not wasting time waiting idly. When the memory is ready to return the information, it makes a high priority request. It knows the CPU is waiting for the data and the memory it gets on the MCU bus very rapidly because of the high priority request. The information is sent back immediately when available and the bus is again freed for use by other modules.

The priority resolution system is essentially a system of two queues: a high-request queue and a low-request queue. Both of these queues are what are known as daisy-chains. As mentioned above, every module in the high-request queue is serviced before any module in the low-request queue. If there are several modules that are high-requesting the priority within that set is serviced through the high priority network. Then, when there are no more high-requests pending the low-request queue takes over. But, of course, any time a high request comes, it will take precedence over all the low requests. The only criterion is that request zero comes up. In the implementation of the daisy-chain, all of the select lines are on a bus, that part comprising the MCU select bus. As can be seen from FIG. 52 each gate in the daisy-chain is connected to the bus. In operation module one will get selected if it is requesting, and select zero is not on (that is if module 0, which has a higher priority, is not being selected. In similar fashion module 2 will get selected if and only if it is being requested and, neither module 0 or module 1 has been requested. This particular implementation one is essentially a parallel implementation commonly known as a daisy-chain priority resolver.

INPUT/OUTPUT PROCESSOR

Figure 55:
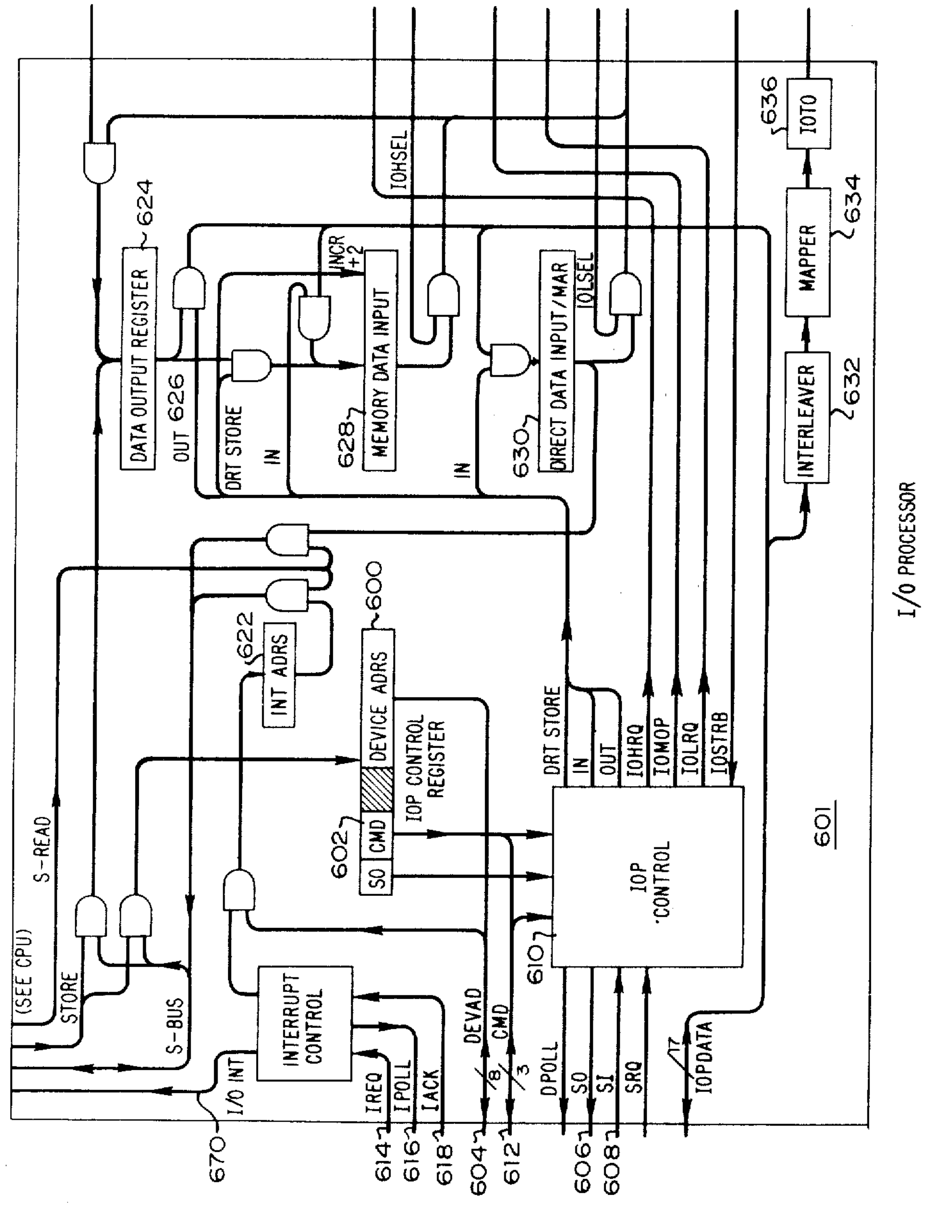
FIG. 55: | Input/Output Processor; |
|
Figure 56:
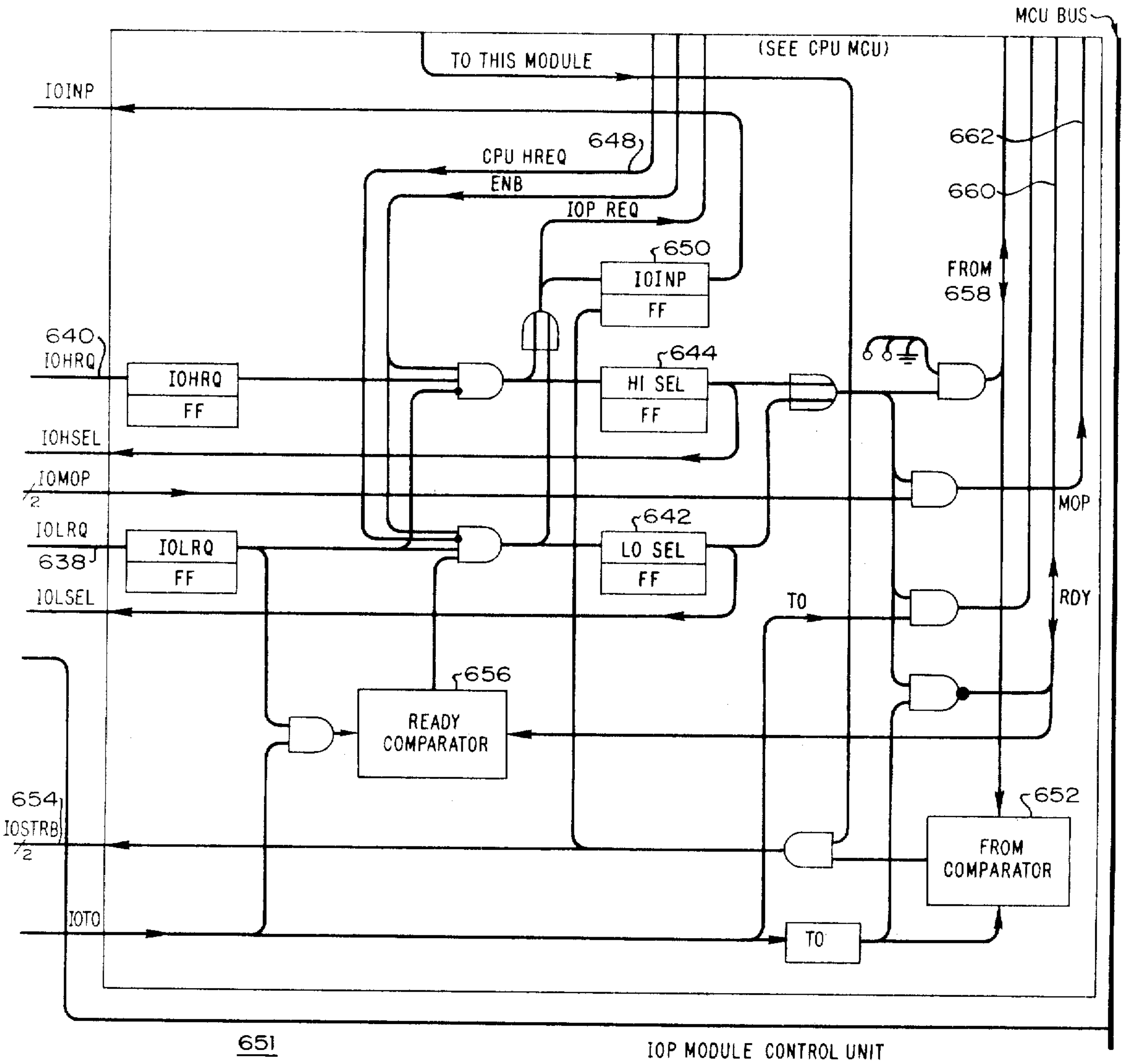
FIG. 56: | Input/Output Processor Module Control Unit; |
|

FIG. 55 is a simplified logic diagram of the I/O Processor portion of the CPU/IOP module. The signal lines at the left of the diagram are the IOP bus. The lines at the top connect to the CPU. FIG. 56 will be discussed later under the heading IOP Module Control Unit.

IOP LOGIC

Basically, the functions of the I/O Processor are to: 1) execute direct I/O instructions and pass the results to the CPU, and 2) transfer data and I/O program words between memory and device controllers, so that the CPU may continue to execute other instructions without further intervention. The operations performed by the I/O Processor will be seen throughout the remainder of this section, when actual transfer sequences are discussed. The following paragraphs describe the blocks identified in FIG. 55.

IOP CONTROL REGISTER 600. This register receives the I/O instruction information, which has been combined by the CPU into a single word. The instruction code from the code segment has been tranlated into a 3-bit command (CMD) 602. This can now be read out onto the CMD 612 lines of the IOP bus. The device address has been obtained from the stack, and can now be read out on the DEVAD lines 604 of the IOP bus. The SO bit 606 (Service Out) tells the addressed device to accept and respond to the accompanying information. (The device controller must return SI 608, Serice In.)

IOP CONTROL 610. This block represents sequencing logic for transfers between the device and the CPU. Each of the lines shown entering or leaving this block will be discussed later when transfer sequences are described.

INTERRUPT CONTROL. The interrupt control logic accepts an Interrupt Request (IREQ 614) from the device controllers on the IOP bus, interrogates the device controllers with IPOLL 616 to find the highest-priority request, and, when Interrupt Acknowledge (IACK 618) is received, loads the device address into the Interrupt Address register. If the device address is not equal to zero, it then issues an Interrupt (I/O Int 620) signal to the CPU.

INT ADRS. The Interrupt Address 622 register holds the address of the interrupting device so that, upon command, the CPU may read the contents onto its S-bus for interrupt processing.

DATA OUTPUT REGISTER 624. There are actually two Data Output Registers, one for memory data received from the MCU bus, and one for direct data received from the S-bus of the CPU. For simplicity FIG. 55 combines the two registers into one. Signals from IOP Control can either read the contents out onto the IOP bus (OUT 626), or transfer the contents into the Memory Data Input register (for updating a DRT entry).

DATA INPUT REGISTERS. There are two input registers. The Memory Data Input 628 register is used for sending data to memory via the MCU bus. This register is loaded either from the IOP bus (In) or, for DRT entry updating, from the Data Output Register. When doing a DRT store, the Memory Data Input register is incremented by two before the transfer is made. The second input register may be used either as a Direct Data Input 630 register or as a Memory Address register (MAR). It is loaded from the IOP bus. When direct I/O is being executed, the register contents are read onto the CPU S-bus. When addressing memory, the register contents are read out to the MCU bus.

INTERLEAVER 632 AND MAPPER 634. These circuits are the same as described earlier for the CPU. The purpose of these circuits is to derive an appropriate module number when transmitting to memory. The memory module number for each transmission is loaded into the IOTO 636 register.

IOP MODULE CONTROL UNIT

FIG. 56 illustrates the Module Control Unit for the I/O Processor. This MCU is a simplified form of the CPU MCU discussed earlier. Both of these MCUs, in fact, are physically located on the same printed-circuit card. They operate basically in parallel, but not independently. Since both MCU's share the same access to the MCU bus, it is necessary to resolve priority when both IOP and CPU simultaneously attempt to use the bus.

Priority is resolved such that all IOP requests take precedence over CPU requests, except that a CPU high request takes precedence over an IOP low request. This exception means simply that the CPU is in the middle of a transfer, having sent an address to memory, and the high request is an attempt to follow up by sending the data. The CPU low request, on the other hand, represents the beginning of a transfer (attempt to send an address) and so is of lesser importance.

Note the logic in FIGS. 56 and 51 which accomplishes this priority resolution. In FIG. 56 the IOP REQ is generated when either a low (IOLRQ 638) or a high request (IOHRQ 640) is about to set one of the Select flip-flops (LO SEL 642) or (HI SEL 644). This signal, in FIG. 51, inhibits the CUP's Select flip-flop from being set. Note, however, that a CPU HREQ 648 from the CPU can inhibit IOLRQ 638 from generating the IOP REQ signal.

The IOINP 650 flip-flop provides a function similar to the NIP and OPINP flip-flops in the CPU MCU. IOINP (I/O In process) is set when a request sets either LO SEL or HI SEL, if the memory opcode (MOP) is Read/Restore. When data is returned from memory the From Comparator 652 in FIG. 56 checks that the transmission is from the same memory module that the address was sent to (by comparing with the contents of the TO register). Also, the TO Comparator in FIG. 51 checks that the transmission is to "this module". Together, the outputs of these two comparators generate an IOSTRB (I/O Strobe) 654 signal which resets the IOINP flip-flop. This causes the IOP to lock the DATA Output Register 624, since it now contains the correct information from the MCU bus. IOSTRB also tells IOP Control that the data is ready for output via the IOP bus.

The Ready Comparator 656 checks if a destination module is ready, so that an I/O low request can set the Low Select (LO SEL 642) flip-flop. Setting the LO SEL slip-flop causes the contents of the Data Input Register, FROM 658, to 660, and MOP 662 to be read out onto the MCU bus for transmissions to memory.

SIO MULTIPLEXER

As explained earlier under the heading of Transfer Modes, the purpose of the SIO Multiplexer 700 is to execute the I/O programs of up to 16 devices on a multiplexed (word-by-word) basis. All data transfers for these 16 devices are also multiplexed on a word-by-word basis. A wired-in select code in each device controller determines its priority in being serviced.

Figure 58:
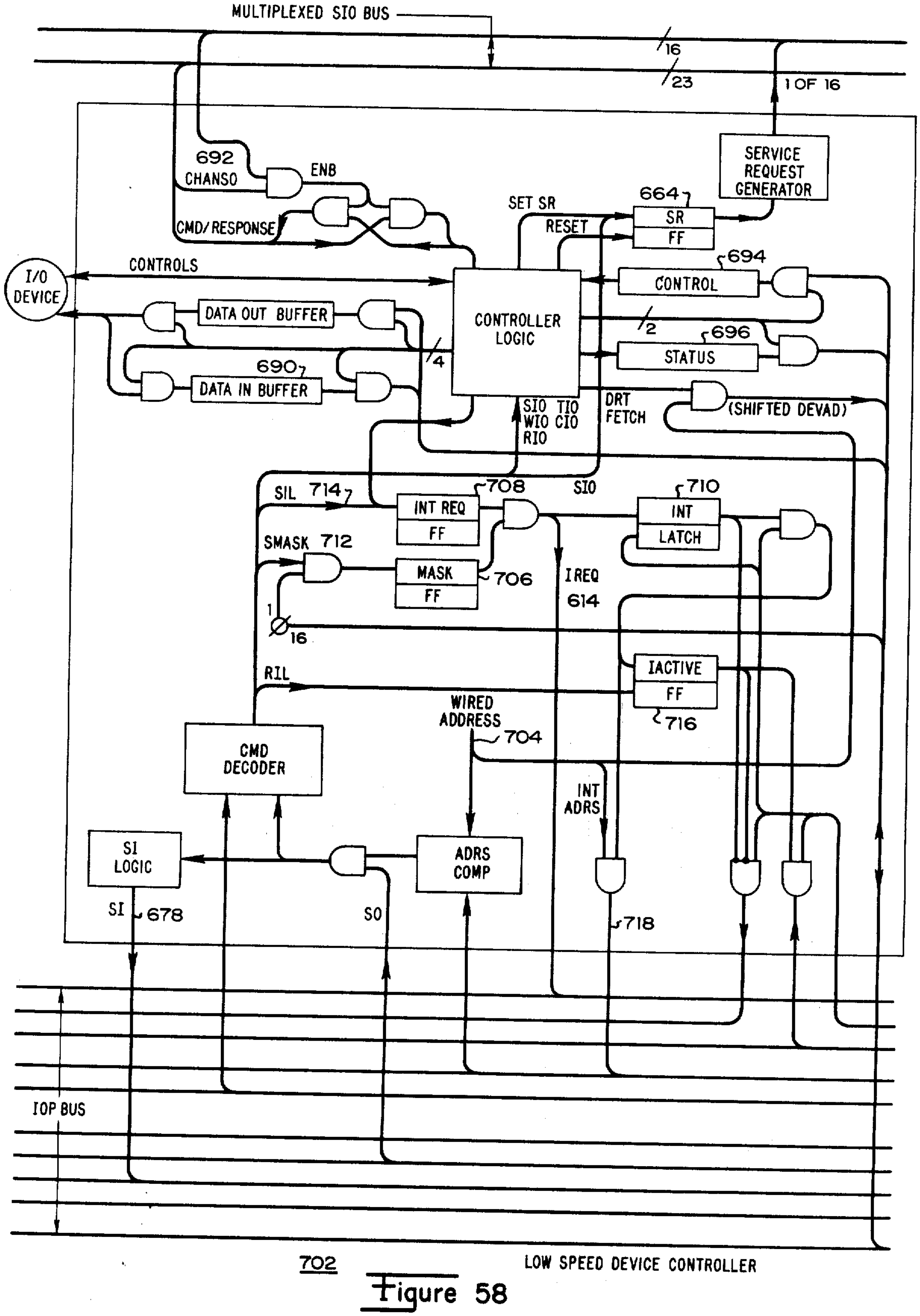
FIG. 58: | Low Speed Device Controller; |
|
Figure 59:
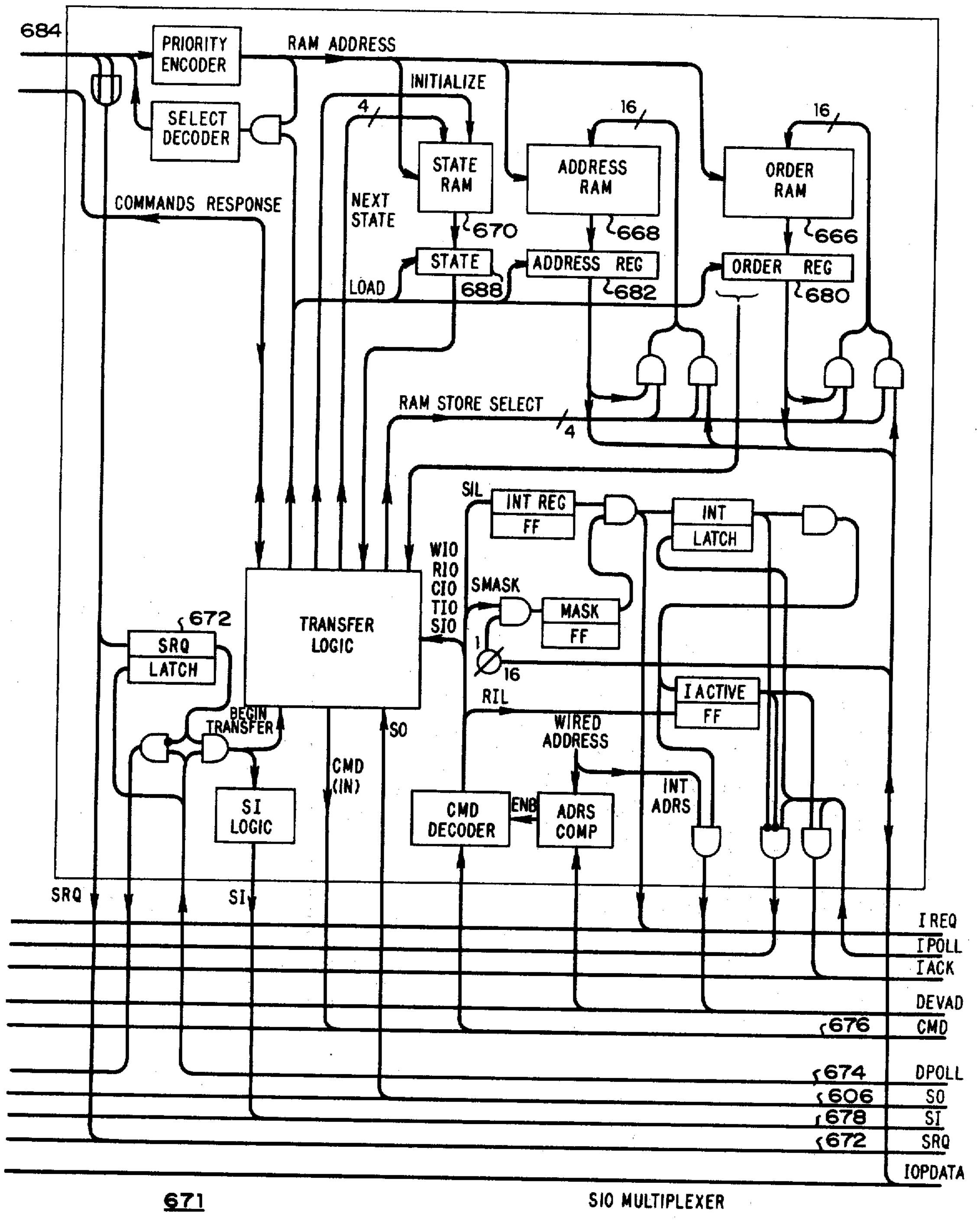
FIG. 59: | SIO Multiplexer; |
|

FIGS. 58 and 59 show in simplified form, the logic which accomplishes this purpose. FIG. 59 is the SIO Multiplexer and FIG. 58 shows one device controller connected to the multiplexed SIO bus (top of diagram). The IOP bus runs across the bottom of both diagrams and connects to the I/O Processor at the right. (See FIG. 55).

The following descriptions which refer to these two figures, describe the major operations that were outlined briefly under the Transfer Modes heading. Reference should also be made to the External Reference Specification in Appendix 4.

INITIALIZE

When the CPU encounters an SIO instruction the CPU, under control of its SIO microprogram, outputs a command word to the IOP Control Register. (See FIG. 55). The I/O Processor, in turn, relays this information to the device controller (FIG. 58) via the IOP bus. Note in FIG. 58 that the device address on the bus (DEVAD) is compared with the internal wired address. A true result, together with the SO (Service Out) signal from the I/O Processor, enables the CMD (Command) to be decoded. The CMD in this case is SIO which, when decoded, sets the SR 664 (Service Request) flip-flop, and sends an initialization request to the SIO card via the SIO bus.

The Service Request is sent via 1 of the 16 Service Request lines of the multiplexed SIO bus to the SIO Multiplexer 700. This SR is encoded into a 4-bit binary code and is used as a "RAM Address", to enable one of the 16 locations in the solid-state memory. The solid-state memory consists of three separate "RAM's , or Random-Access Memories, one each for the IOCW 666 and IOAW 668 parts of the I/O program doubleword, and one to specify the "state" 670 (or next operation) - in this case a DRT fetch. The IOCW is contained in the Order RAM (16 bits), the IOAW is contained in the Address RAM (16 bits), and the state is contained in the state RAM (4 bits). Each of the 16 addressable locations therefore contains 36 bits.

For the initialize operation, the State RAM location for the requesting device is forced to the condition required for a DRT fetch while the order RAM is forced to the code for Interrupt. Once this is done, the SIO Multiplexer 700 returns SI 678 (Service In) to the I/O Processor.

DRT FETCH

The Service Request received at the SIO Multiplexer 700 from the device controller causes SRQ 672 (the SIO Multiplexer's Service Request) to be issued to the I/O Processor, and also sets the SR Latch. Any of the 16 SR inputs can set this latch and generate SRQ; however, only the highest priority request will be honored by the Priority Encoder.

When the I/O Processor receives SRQ, it issues DPOLL 674 (Data Poll) to all SIO Multiplexers 700. The highest priority SIO Multiplexer stops the propagation of the poll (Since SR Latch is set), and its transfer logic is enabled. First, the contents of the RAM location given by the priority encoder output are loaded into the State, Address, and Order Registers. The State bits tell the transfer logic to send out a command to the device controller via the multiplexed SIO bus, along with the Service Response signal (which is returned on the same line used for Service Request) and CHANSO (Channel Service Out). This command tells the device controller to read out its address to the IOP bus. (Note: The approximately 20 command and response lines shown as part of the multiplexed SIO bus have not been individually identified, as they represent greater detail than is required at this level of discussion.)

The device controller, for a DRT fetch, reads out its address (Shifted DEVAD) onto the IOPDATA lines. Instead of being read onto the eight least significant lines of the bus (8 through 15), the address is read onto lines 6 through 13, which is left-shifted by two bits. This effectively multiplies the address value by four, thus automatically providing the correct address for that device's DRT entry. (Remember that each device uses four locations in the DRT.)

Meanwhile, the SIO Multiplexer 700 is returning an SI 678 (Service In) response to the I/O Processor, along with a CMD 676 (Command) which tells the I/O Processor to accept the address existing on the IOPDATA Lines, and that a DRT fetch from that address is required.

Now the I/O Processor proceeds to fetch the DRT entry, as follows. (Reference can be made to FIGS. 55 and 56.) The I/O Processor issues IOLRQ 638 to its MCU, with an appropriate MOP to read memory. When Select occurs, the address is transmitted to memory, and when memory returns the DRT entry contents, IOSTRB 654 loads the word into the Data Output register. The contents of this register are then read onto the IOPDATA lines, and SO is issued.

On receiving SO 606, the SIO Multiplexer 700 loads the DRT word into the Address RAM, re-stores the Order register contents into the Order RAM, and sets the State RAM to the condition required for an I/O program word fetch.

The I/O Processor, meanwhile, transfers its copy of the DRT word from the Data Output register to the Data Input register, increments it by two, and sends it back to the DRT in memory. (This is an anticipatory move, as the Address RAM presently contains the desired address for the next operation; the incremented address in the DRT will not be used until the next DRT fetch.)

At this point the DRT fetch operation is complete. Some other operation for another device could be interleaved here.

I/O PROGRAM WORD TRANSFERS

Each I/O program word consists of two words in memory, the IOCW (I/O Control Word) and the IOAW (I/O Address Word). Therefore two memory transfers are required. The first transfer is to fetch the IOCW. Depending on the order that the IOCW contains, the second transfer may be either a fetch or a store. The differences will be pointed out in the following descriptions. IOCW FETCH. The SR flip-flop in the device controller is still set from the previous procedure, so SRQ is still present at the I/O Processor. The I/O Processor therefore issues a new DPOLL. The SR Latch 672 in the SIO Multiplexer 700, which had reset on the trailing edge of the previous SO 606, has become set again, since the SR input was still present at the next clock. Thus DPOLL 674 is stopped from further propagation, and the transfer logic is enabled again.

Again, the contents of the addressed RAM location are loaded into the State 670, Address 668, and Order 666 registers. The state specifies an IOCW fetch, so the transfer logic reads out the contents of the Address Register and issues SI 678 and CMD 676 ("transfer from memory") to the I/O Processor. The address now on the IOPDATA lines is the word previously fetched from the DRT, indicating the address of the I/O program word.

The I/O Processor loads the address into the Memory Address Register (MAR) and issues IOLRQ 638 to its MCU, with MOP 662 (Read/Restore). The MCU, when priority allows, transmits the address to memory. When memory returns the IOCW, IOSTRB 654 loads this word into the Data Output Register in the I/O Processor. The I/O Processor then reads the word out to the IOPDATA lines and issues SO.

On receiving SO 606, the SIO Multiplexer 700 loads the IOCW into the Order RAM 666. (If the order is Control, the SIO Multiplexer issues a command through the multiplexed SIO bus, so that the device controller may also load the IOCW into its Control register.) The contents of the Address 682 Register, incremented by one, are re-stored in the Address RAM 668, and the next state (fetch or store IOAW) is stored in the State RAM 670.

At this point the IOCW fetch is complete. Some other operation for another device could be interleaved here.

The next operation, transfer of the IOAW, begins the same way for each of the orders. That is, SR to the SIO Multiplexer 700 causes SRQ 672 to the I/O Processor. The I/O Processor returns a DPOLL 674 which enables the SIO Multiplexer 700 to load the contents of the addressed RAM location into the State 670, Address 682, and Order 666 Registers. The action after this point varies, depending on the order that the IOCW contains. The following paragraphs describe each the various courses of action. IOAW FETCH. The Read, Write, Jump, Control and Interrupt orders each cause an IOAW fetch. However, the action taken on receiving the IOAW varies in each case, as will be pointed out.

The IOAW fetch begins by reading out the contents of the Address Register (incremented on the trailing edge of DPOLL 674 in the IOCW fetch procedure) to the IOPDATA lines. The SIO Multiplexer 700 also issues SI 678 and CMD 676 ("transfer from memory") to the I/O Processor. The I/O Processor, in turn, issues IOLRQ 638 with MOP 662 to its MCU to request a memory read.

When memory returns the contents of the addressed location, IOSTRB 654 loads it into the Data Output Register 624 in the I/O Processor. The I/O Processor then reads out the contents of this register to the IOPDATA lines and issues SO 606. For Read, Write and Jump orders, the SIO Multiplexer 700 will store the word (IOAW) into the Address 668 RAM. For a Control order, the SIO Multiplexer 700 issues a command via the multiplexed SIO bus to tell the device controller to load the word into its Control register 694. For an Interrupt order, the fetched information is disregarded.

In addition, for Read, Write, and conditional Jump, a command is sent to the device controller to specify conditions for the next action. For Read, the "in-transfer" condition is set. For Write, the "out-transfer" condition is set. For conditional Jump, the controller is given the choice of setting or not setting the "jump met" condition. If "jump met" is true in the next DRT fetch sequence (or if an unconditional Jump was given), a store operation (instead of fetch) will occur. That is, the SIO Multiplexer 700 will cause the contents of the Address Register 682 to be sent to the I/O Processor, which will increment the value by two before storing in the DRT. (The Address RAM 668 already contains the correct jump address, so a DRT "fetch" is not necessary.)

IOAW STORE. The Sense, End, and Return Residue orders each cause an IOAW store operation. This operation begins as the SIO Multiplexer 700 reads the incremented contents of the Address Register 682 out to the IOPDATA lines and issues SI 678 with a "transfer-to-memory" CMD 676.

The I/O Processor loads this address into its Memory Address Register (MAR) and issues IOLRQ 638 to its MCU with a "Clear/Write" MOP 662. The ensuing MCU bus transmission prepares memory for receiving data.

Meanwhile, the I/O Processor has issued SO 606 to the SIO Multiplexer 700 to ask for data. Depending on the current order, the SIO Multiplexer 700 either gates the Order Register 680 contents out to the IOPDATA lines (Return Residue order) or issues a command to the device controller, telling it to read its Status 696 register contents out (Sense or End orders). When either action occurs, SI 678 is returned to the I/O Processor, which causes the I/O Processor to load the IOPDATA information into its Memory Data Input 628 register.

The I/O Processor then proceeds to transmit the information to memory by issuing IOHRQ 640 to its MCU. When the transmission occurs, the appropriate information will be stored into the IOAW location of the I/O program double-word. NEXT OPERATION. At this point (after the IOAW fetch or store), the I/O program word transfer is complete. In addition, all orders except Read and Write (i.e., Control, Sense, Return Residue, End, Jump, and Interrupt) are fully executed. The next operation for any of these orders (except End, which terminates the program) is to return to the DRT fetch operation.

For Read or Write, however, a data transfer indicated. Procedures for data transfers are next described.

DATA TRANSFERS

Data transfers are very similar to the I/O program word transfers described above, in that the basic operation is to fetch or store information using a memory address that has been put in the Address RAM by a previous operation. (For I/O program word transfers, the previous operation was the DRT fetch; for data transfers, the previous operation is the I/O program word transfer.)

The main difference is that the data transfer is device-initiated. That is, when the device is ready for a transfer, it so informs its device controller, which then issues a Service Request 684 to the SIO Multiplexer 700. Another difference is that the word count and memory address contained in the Order 680 and Address Registers 682 must be incremented during each word transfer.

Each data transfer consists of two distinct steps: the transfer of an address to memory, and the transfer of data to or from that address. The first step is the same for either output or input, and is described first. Output and input data transfers are then separately described, followed by the end-of transfer operations.

ADDRESS TRANSFER. When the device sets the device controller's SR flip-flop 664, the SR signal to the SIO Multiplexer 700 generates an SRQ 672 signal to the I/O Processor. The I/O Processor returns DPOLL 674, which enables the SIO Multiplexer to begin its transfer. First, the contents of the addressed RAM location are read out to the State 688, Address 682, and Order 680 registers. Then the Address Register contents are read out to the IOPDATA lines. Also SI 678 and an appropriate CMD 676 ("transfer to memory" or "transfer from memory") are sent to the I/O Processor.

I/O Processor loads the address into its Memory Address Register (MAR) and issued IOLRQ 633 to its MCU, with a "Read/Restore" or a "Clear/Write" MOP 662. When priority allows, the MCU will transmit the address to memory.

Meanwhile, the SIO Multiplexer 700 resets the device controller's SR flip-flop, via the multiplexed SIO bus, and increments the Address 682 and Order 680 Registers.

OUTPUT TRANSFER. When memory returns a data word, IOSTRB 654 loads the word into the Data Output Register 624 in the I/O Processor. The I/O Processor then reads the contents of this register out to the IOPDATA lines and issues SO 606. On receiving SO, the SIO Multiplexer 700 issues a command to the device controller via the multiplexed SIO bus, telling the controller to load the word on the bus into the controller's Data Out Buffer. The device controller returns SI 678 to the I/O Processor and proceeds to output the word to the device.

Meanwhile, the SIO Multiplexer re-stores the contents of the State 688, Address 682, and Order 680 Registers into the RAM 670, 668, 666 location, and the output data transfer is complete. Some other operation for another device could be interleaved here. Otherwise, the entire data transfer procedure repeats.

INPUT TRANSFER. As the input data transfer procedure begins, memory is expecting the data. The procedure begins when the I/O Processor sends SO 606 to the SIO Multiplexer to ask for data. On receiving SO, the SIO Multiplexer issues a command to the device controller via the multiplexed SIO bus, telling the device controller to read the contents of its Data In Buffer 690 out to the IODATA Lines. When the controller does so, it also sends an SI 678 response, which causes the I/O Processor to load the data into its Memory Data Input register. The I/O Processor then issues IOHRQ 640 to its MCU, with a "Clear/Write" MOP 662, thus causing a data transmission to memory via the MCU bus.

Meanwhile, the SIO Multiplexer re-stores the contents of the State 670, Address 668, and Order 666 Registers into the RAM 670, 668, 666 location, and the input data transfer is complete. Some other operation for another device could be interleaved here. Otherwise, the entire data transfer procedure repeats.

END OF TRANSFER BY WORD COUNT. If the word count rolls over while incrementing (during the address transfer sequence), then in the data transfer sequence the SIO Multiplexer will issue a command which will reset the "in-transfer" or "out-transfer" condition in the device controller. Also an End-of-Transfer (EOT) signal accompanies the last command from the SIO multiplexer to read or write. The controller logic will therefore not transfer any more data to or from the device. It will, however, issue one more SR 664.

In the SIO Multiplexer, the transfer logic sets the next state to "DRT fetch", when re-storing the RAMs at the end of the final data transfer. When the SIO Multiplexer receives the SR 664 from the device controller, and when priority conditions are satisfied, a new DRT fetch procedure will begin. This advances the I/O program to the next IOCW.

END OF TRANSFER BY DEVICE. On termination of a transfer by a device, the controller will issue a SR 664 to the SIO Multiplexer. When the SIO Multiplexer responds with CHANSO 692, the device controller returns a "device end" signal. This causes the SIO Multiplexer to terminate the data transfer before the word count has reached zero and to initiate a DRT fetch, thus advancing the I/O program to the next IOCW.

INTERRUPTS

Since both the SIO Multiplexer 700 and the device controller 702 can have their own device addresses 704, each is also able to generate an interrupt on being given an Interrupt command by the I/O Processor. The interrupt logic for both, in FIGS. 58 and 59, is identical.

As explained earlier in this manual, each device address can be assigned to an interrupt mask group. If the mask bit 706 for that group is not set, no interrupt from that device can occur. Note in both figures that setting the Mask flip-flop 706 will allow the Interrupt Request flip-flop 708 to set the Interrupt Latch 710. The conditions that set the Mask flip-flop are: 1) that the I/O Processor has issued a CMD of SMASK 712 (Set Mask); 2) that the mask word given on the IOPDATA lines includes a true bit corresponding to the single bit that is wired to the Mask flip-flop 706 input. Several cards (device controllers, SIO Multiplexers, etc.) may have their Mask flip-flop wired to the same IOPDATA line; thus these cards form one interrupt mask group.

An interrupt is initiated either by: 1) CPU instruction (SIN, Set Interrupt), for any device address; 2) by an I/O program order (device controllers only); 3) the I/O device. A SIN instruction causes the I/O Processor to issue a CMD of SIL 714 (Set Interrupt Level) with the appropriate DEVAD, which sets the Interrupt Request flip-flop. An Interrupt order causes the SIO Multiplexer to issue a "set interrupt" command to the device controller via the multiplexed SIO bus; the controller logic then directly forces the Interrupt Request 708 flip-flop to set. From either cause, setting the Interrupt Request flip-flop will result (only if the Mask flip-flop is set) in an IREQ 614 signal to the I/O Processor and the setting of the Interrupt Latch.

INTERRUPT HANDLING. The first latch or Interrupt Active flip-flop (716) encountered by the poll stops is further propagation.

If the poll is stopped by a set Interrupt Latch the associated Interrupt Active flip-flop will be permitted to be set. At the same time the Interrupt Address 718 is sent to the IOP via the DEVAD lines. An Interrupt Acknowledge (IACK) is also sent, telling the I/O Processor to load the DEVAD lines into its Interrupt Address register.

If the IPOLL Is stopped by a set Interrupt Active flip-flop an IACK will be sent to the IOP, but no Interrupt Address is gated to the DEVAD lines, creating DEVAD O.

When the IOP receives IACK with DEVAD O the IREQ is considered lower priority than the interrupt being currently processed by the CPU. Thus the IOP will not issue an I/O Interrupt 620 signal to the CPU. If the DEVAD is not O, then the IOP will send I/O Interrupt to the CPU.

A set Interrupt Active flip-flop, then, will inhibit any interrupts of lower priority than itself, as determined by the IPOLL chain, from interrupting the CPU.

An interrupt of higher priority than the one currently being serviced will be able to interrupt the CPU processing, so that it can be serviced. This approach is essentially a hardware stacking of interrupts based on priority - the highest priority interrupt being serviced first, on down to the servicing of the lowest priority interrupt.

HIGH SPEED CHANNEL

The high speed channel allows a peripheral device to send data directly to the MCU bus without passing through the IOP. In addition the IOP communicates directly with the device controller for control operations instead of doing so through an SIO multiplexer. The high speed channel thus allows a peripheral device faster access to the main computer modules such as memory. Reference should be made to the High Speed Selector Channel External Reference Specification in Appendix 5 along with the following description.

Figure 57:
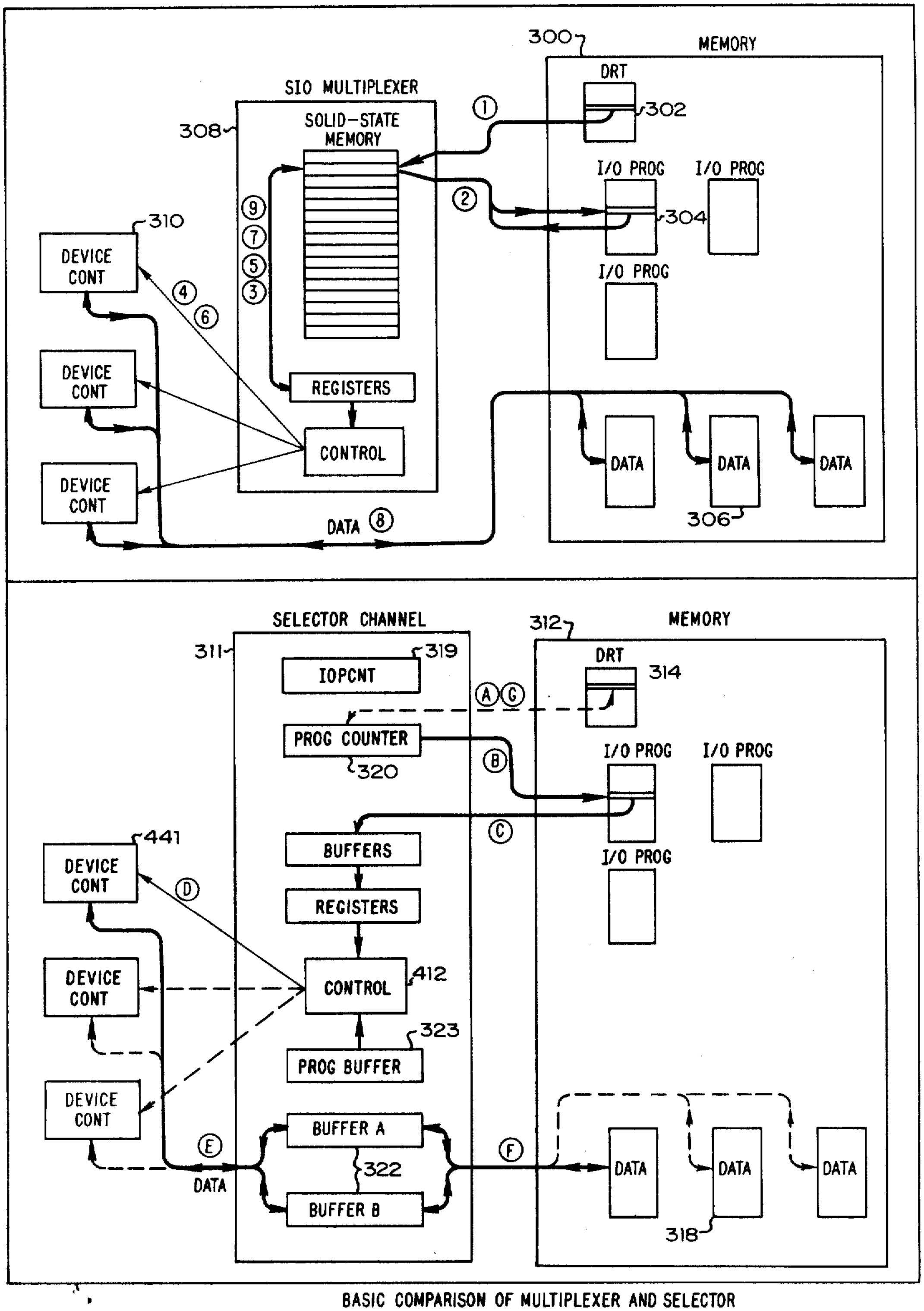
FIG. 57: | Basic Comparison of SIO Multiplexer with Selector Channel; |
|

With reference to FIG. 57, the SIO multiplexer will be compared with the high speed channel. There is shown a memory 300 and various subassemblies within the memory: a data reference table (DRT) 302, I/O programs 304 and a typical data base 306. The DRT is a table in memory containing reference information about a peripheral device such as its device number, and pointers to I/O and interrupt programs in memory. Now a typical SIO multiplexer 308 interfaces with the I/O processor and the I/O-bus and in essence executes I/O programs, for example 304, which are stored in memory. The location of the I/O programs is found in the DRT table entry 302. This table must be updated and must be fetched for each device controller as its program is being run and for each order in the program. The SIO multiplexer stores temporarily orders for 16 different programs, executes these on a priority basis from the device controller, such as typical device controller 310, and transfers data to and from memory and the device controller from the data base for example 306.

Now the selector or high speed channel 311 has an equivalent memory mapping illustrated as memory 312, DRT table entry 314, I/O program 316 and data base 318. In the SIO multiplexer scheme, in order to fetch line I/O program 316 it is first necessary to fetch the DRT table entry 314. This is no longer true in the selector channel because the entry from the DRT table 314 is stored permanently in a hardware counter 319 (IOPCNT) in the selector channel. This allows the I/O program to be fetched independently of having to go to the DRT table and obtain the pointer. It also allows the selector channel to do prefetching and it is used by the selector channel to transfer some of the data words into the I/O program. The selector channel has two data buffers 322 which are different in the SIO multiplexer. We will call these buffer A and buffer B. These buffers are used during data transfer to facilitate the speed of that transfer. In other words, the channel automatically does prefetching of data during data transfers so that independently of what the device is demanding, the channel will try to keep these buffers full for outbound data transfers. For inbound data transfers, there are two equivalent buffers in the channel for data coming from the device to memory, and the channel independently of the device controller will try to keep these data buffers empty so that the selector channel, in some respects, is operating independently of the device controller.

Now, in situations where the channel is prefetching orders, that is, where the orders are doing data chaining, the goal is to maintain a very fast response from one order to the next order. The channel will prefetch the following order it is going to execute and store it into the program buffers 323 to set up the channel for the next order that it is going to execute. So in essence, the main operational difference between the selector channel and the SIO multiplexer is the comparatively greater speed at which the data and the program can be executed by the channel.

Figure 60:
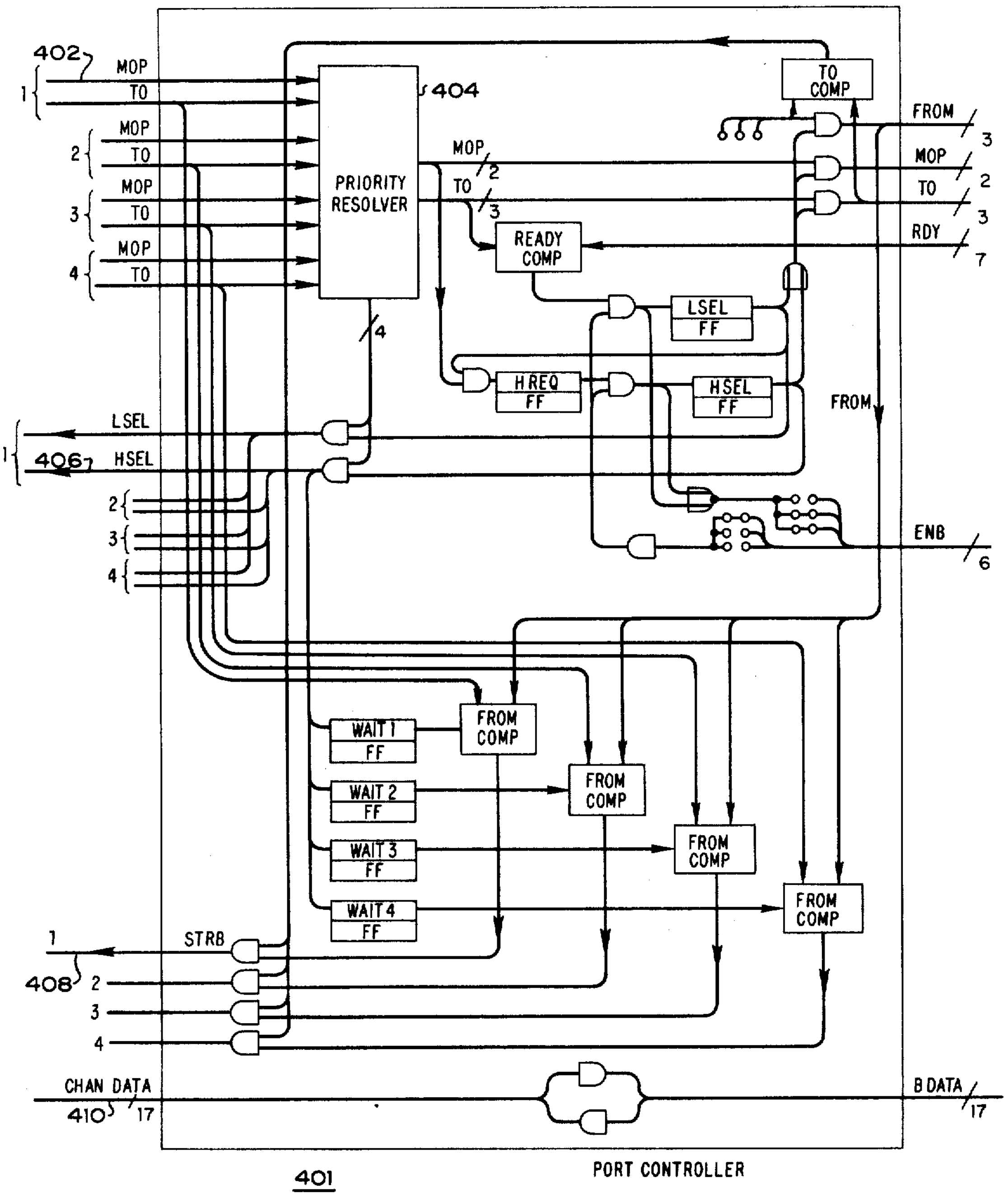
FIG. 60: | Port Controller; |
|
Figure 61:
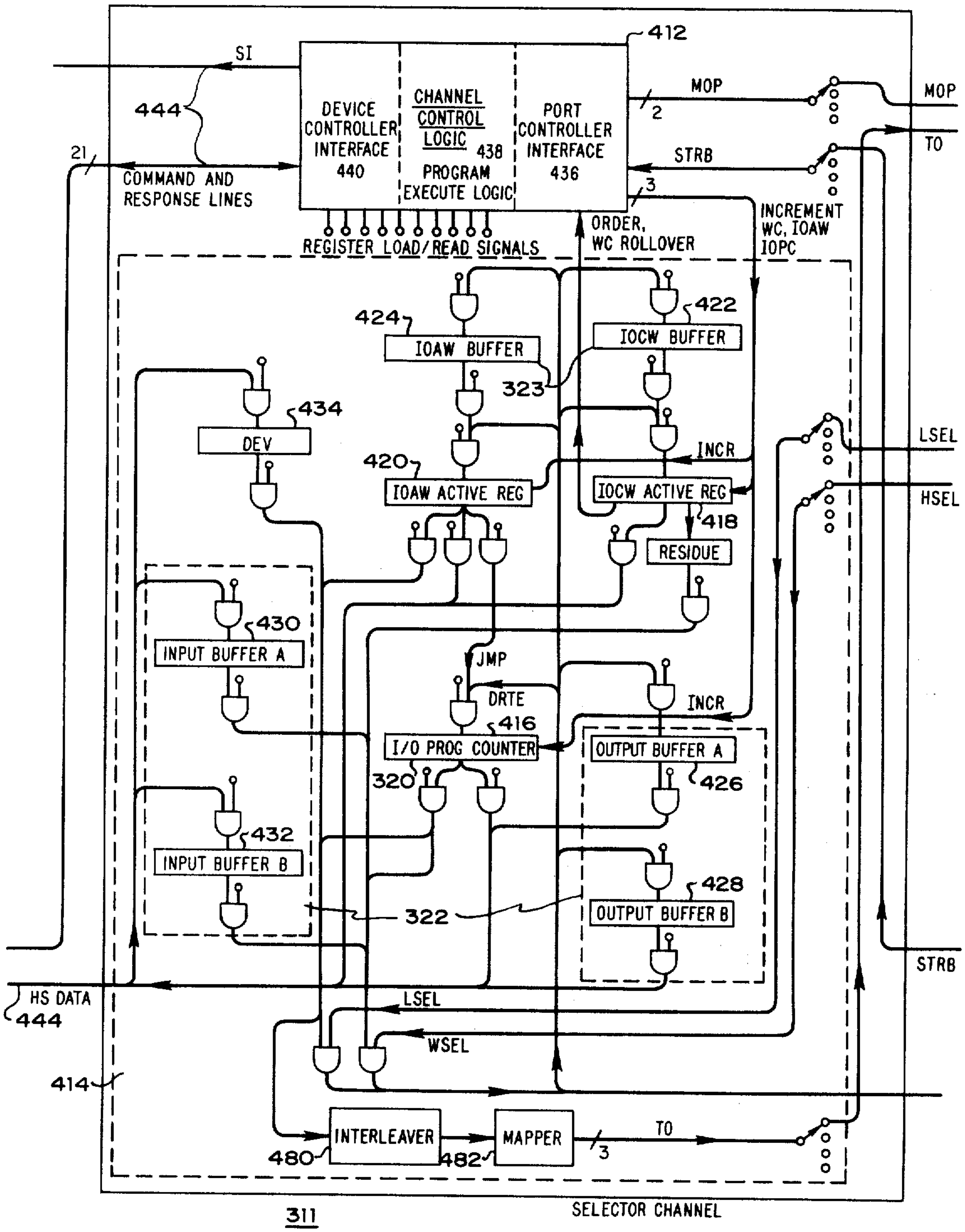
FIG. 61: | Selector Channel; |
|

The high speed channel is illustrated in three figures: FIG. 60, the port controller; FIG. 61, the selector channel; and FIG. 62, the high speed device controller required to interface with the selector channel. The port controller for the selector channel interfaces directly with the module control unit (MCU) bus 400 in the computer. That bus is the main data bus in the computer and the logic in the port controller is similar to the logic in the CPU I/O processor or any other module that connects onto the MCU bus. The port controller is a true multiplexer in the sense that it will allow four high speed selector channels concurrently to access the MCU bus with single module number. That is to say, each module on the MCU bus has a distinct number from 1 to 7 and the port controller will use one of those numbers and allow four high speed channels to multiplex through it concurrently. The maximum band width of the controller is limited by that of the MCU bus which in the present preferred embodiment is 3.3 megawords per second. Each high speed channel will access or request the port controller's service through a set of lines called MOP (Memory output lines 1, 2, 3 and 4). MOP 1 stands for channel 1, MOP 2 stands for channel 2, etc. and MOP 1 is labeled 402 in FIG. 60. Each high speed channel will request port controller's service by the MOP lines. These lines are also strobed to indicate to memory what the particular request is, that is, whether there is a clear write or read-write request, for example. Each high speed channel when it is requesting port controller's service, will send out information on TO lines 402 of the MCU bus. These TO lines are used to address the module of the memory that the particular high speed channel wants to talk with. These lines connect to a priority resolver 404. The priority resolver assigns to each channel, 1, 2, 3 and 4, a priority. Channel 1 being the highest priority, channel 2 being the next, and channel 4 being the lowest priority. If simultaneous requests for service are made to the port controller from all channels, then 1 will be serviced first, 2 will be serviced second, 3 will be serviced third and 4 will be serviced last. There is an additional priority built into the priority resolver which is a high select prioirty or a data priority. The previously described priorities are low select priorities. For example when one channel has made a request to memory and is being serviced with a low select priority function, if it also has a high select cycle or a data cycle, then the high select cycle will automatically assume priority over all future low select cycles until it completes. Such a high select priority would occur if we were sending data to memory, for example.

The port controller generates the high select and the low select signals which are shown here as low select 1, high select 1 etc. for each channel and is designated 406. There is a high select strobe for each channel, denoted 408. These strobes, after a particular channel has made a request to the port controller, indicate to that channel that the device may now put data or an address onto the MCU bus. A low select is for an address; a high select for data. Once a channel has made a request, it waits for the high select or the low select to come from the controller before the channel will continue. Similarly, when a channel is making a request to memory for data, as opposed to sending data to memory, the lines which indicate that data is coming from memory to that high speed channel are the strobe lines 408. So if a low select request is made to memory for data to be sent to the channel, then the high speed channel that selected that particular data will receive a strobe on its proper line indicating that the data is present.

In this embodiment the port controller can be configured to have module addresses 3, 4, 5 or 6. It can talk directly to any memory. It does not interface with the CPU in any way; thus it is a master module. There are 16 data lines and one parity line denoted 410 which represents the MCU data path which are buffered in the port controller and are passed out to the high speed channels directly. The data is loaded onto and taken off of these lines by the channels. In summary, the port controller is a multiplexer. It will permit four high speed channels to run concurrently with/the maximum total band width of the computer clock, in this instance, 3.3 megahertz. Therefore every usable clock cycle of the MCU bus can be used by the port controller.

FIG. 61 shows the actual selector channel. There can be four of these for each port controller. Each port controller emits a port controller bus which comprises the MOP and I/O lines, the high and low select lines, the strobe lines and the channel data lines. The port controller bus goes to each selector channel. Each selector channel is broken into two segments: channel control logic 412 and the channel register 414. The high speed channel control logic 412 contains all the control logic for the channel. The high speed channel register contains the counters, the buffers, parity checking and generation, and all necessary logic to load and read out of the buffers. The control logic contains all that logic which is necessary to make requests to the port controller for service and it also runs the I/O program. The control logic executes the I/O program and it interfaces with the device controller logic, sending out the required strobes and reading data to and from the device controller interface logic. In the channel register, there are three counters. There is an I/O program counter 416 which, as in any program counter, just stores the next location in core to be fetched and executed. There is an I/O address word counter 420 and the I/O command word buffer 418.

The I/O command word buffer 418 holds the presently executing order. The I/O address word register 420 contains either an address, data or an operand which will either go to the device controller or be used by the high speed channel. For example, during the JUMP order the inital I/O word address content is the JUMP target. During the execution of a JUMP order, this is transferred to the I/O program counter 416. Also there are the I/O control word buffer 422 and the I/O address word buffer 424. These buffers are loaded during data chaining with the next read or write order to be executed. The order automatically is fetched by the channel and loaded into these registers. When the presently executing order, which is located in the active registers 418 and 420, completes, then the contents of the buffer registers are transferred to the active registers and the next order begins to execute immediately. There are also output data buffers 426 and 428. These output data buffers hold data for the device. The data are fetched independently of the device and held into these buffers until the device requests the data from the channel. There are also two input data buffers 430 and 432. These data buffers are used during the execution of a read order or inbound data transfer and are filled up by the device controller The channel will then later transfer the contents of these data buffers to memory and unload them. There is an additional register which is called the device number 434. Ther device number register holds the device number of the device controller which is presently executing an I/O program through the high speed channel.

The control logic 412 can be broken into three segments. The port controller interface 436 is the logic which interfaces with the port controller. This logic makes requests to the port controller for service, for example to fill up the buffer, transfer data, or fetch an IO program. The program execution logic 438 actually executes the particular orders that are fetched out of memory one at a time and provides the various strobes to the device controllers and the various manipulations of the registers and the counters in the high speed channel. The third portion of the control logic is the device controller interface 440. This logic generates the stobes and the timing required for the device controller as it send out data and reads data back in.

Figure 3:
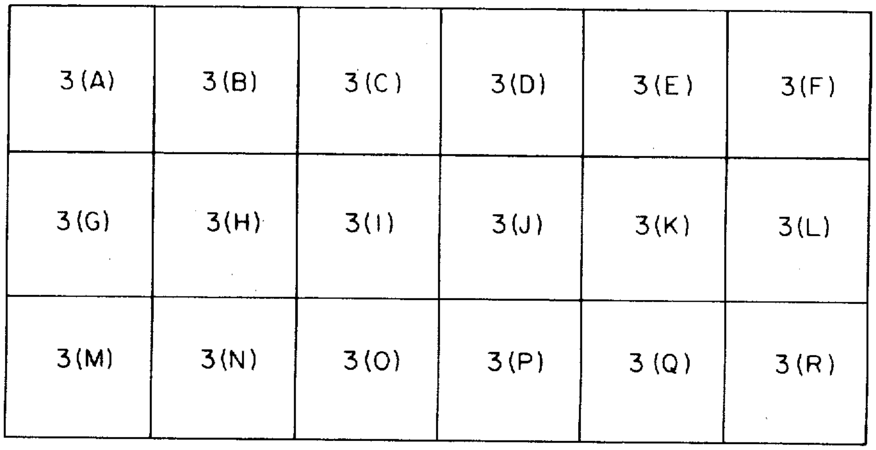
FIG. 3a–r: | High Speed Channel Control Logic; |
| FIGS. 4a through 49h have been cancelled but the numbers are being retained so that all figures appear in sequence. | |
|
Figure 3A:
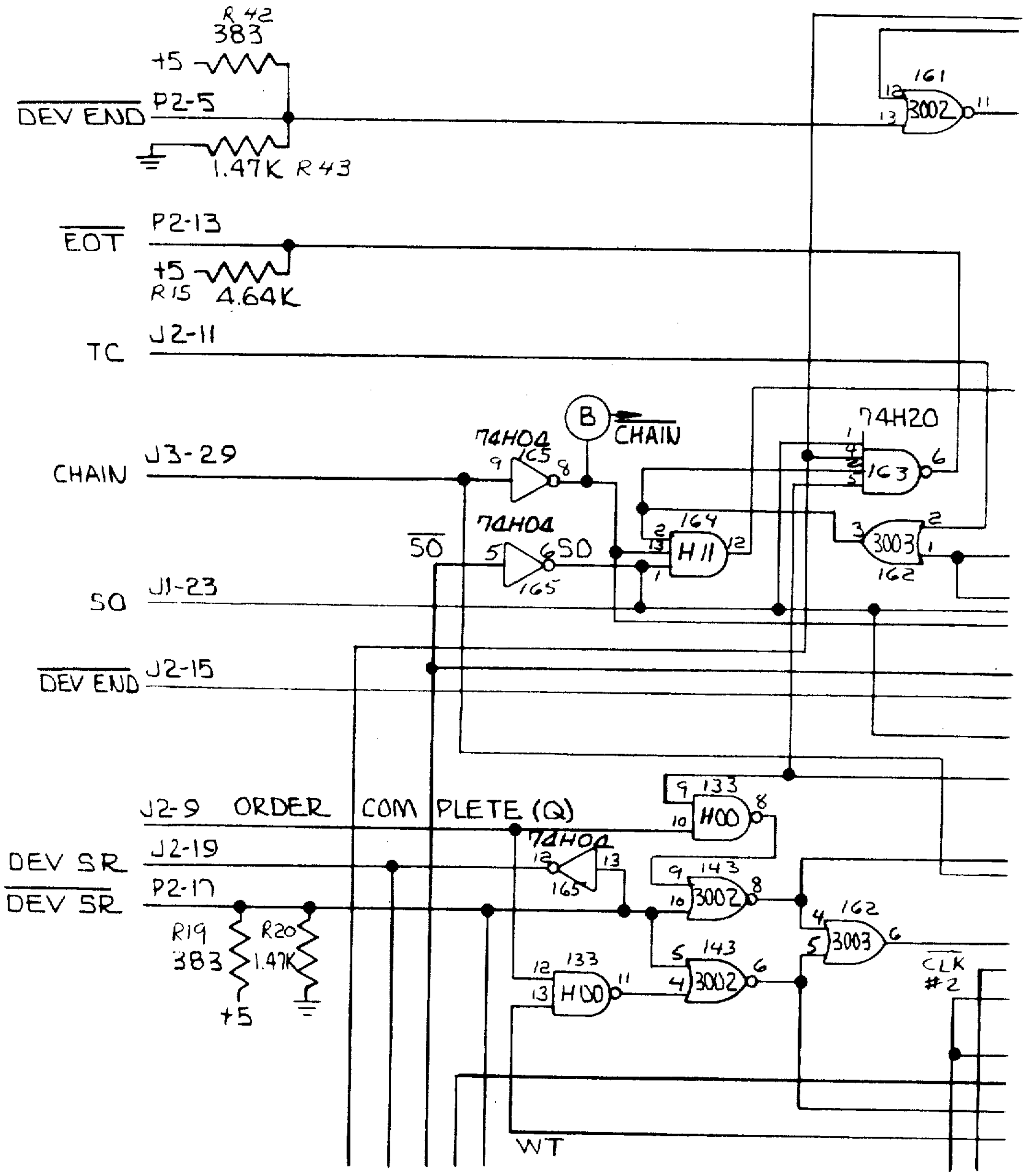
Figure 3B:
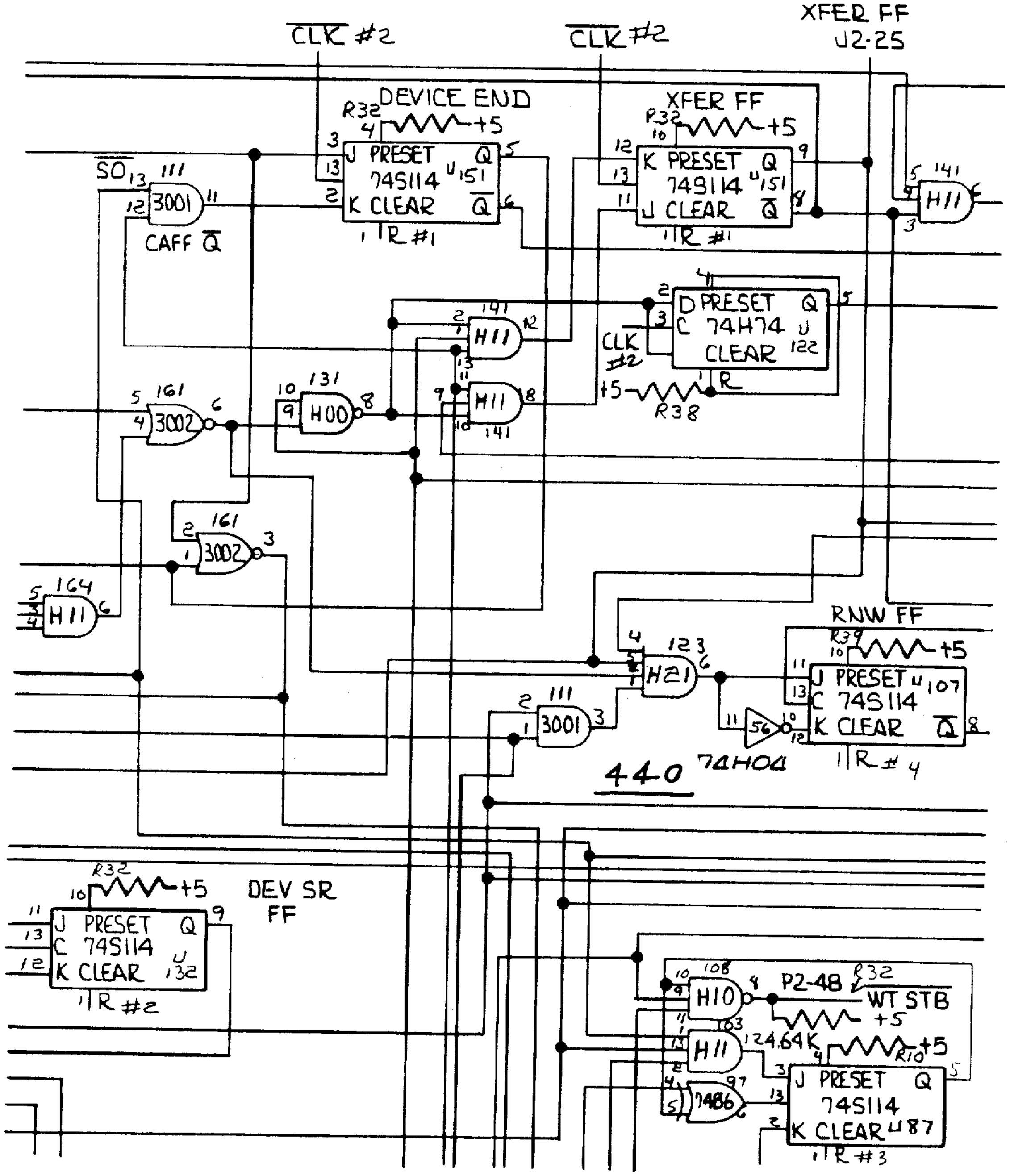
Figure 3C:
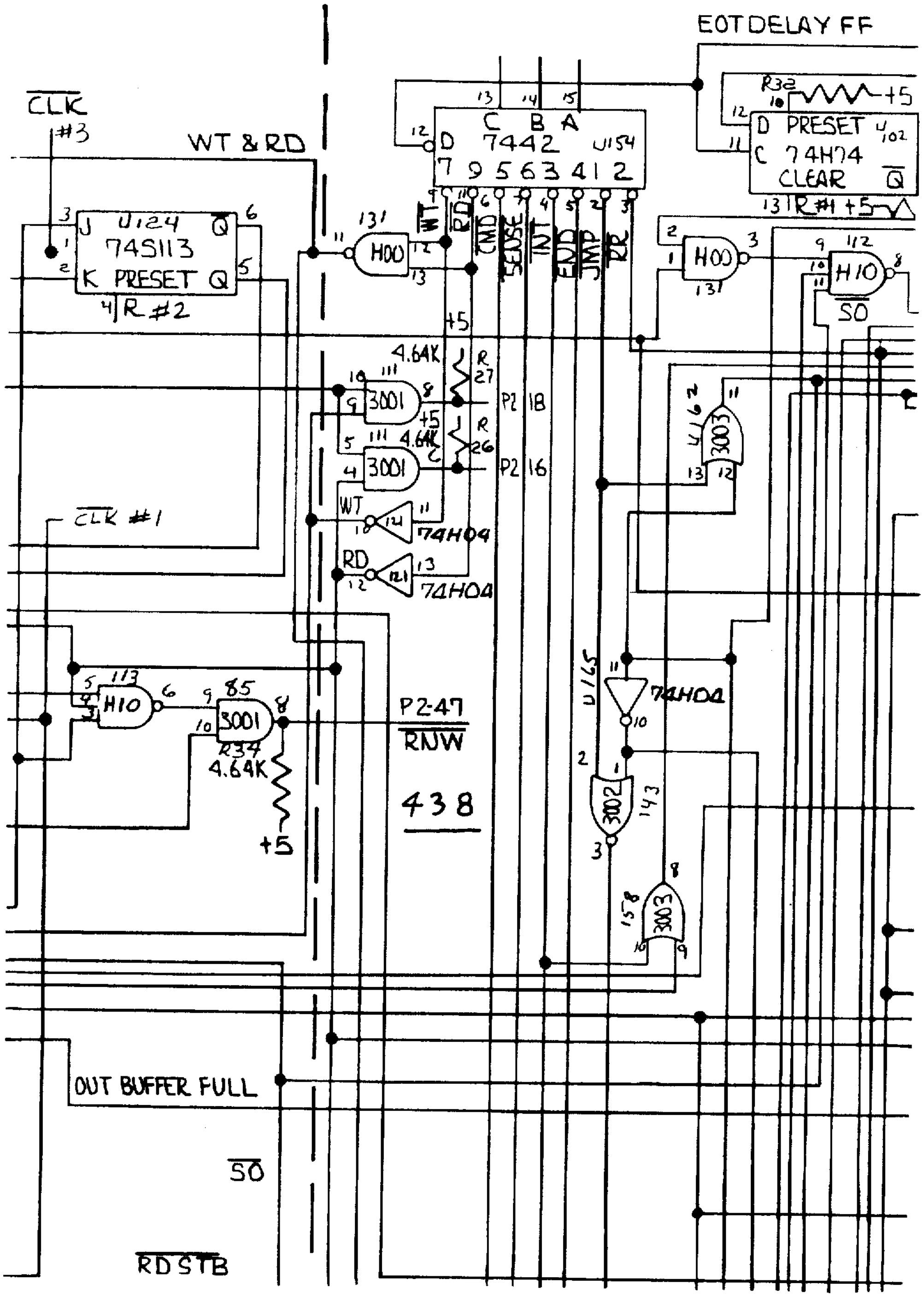
Figure 3D:
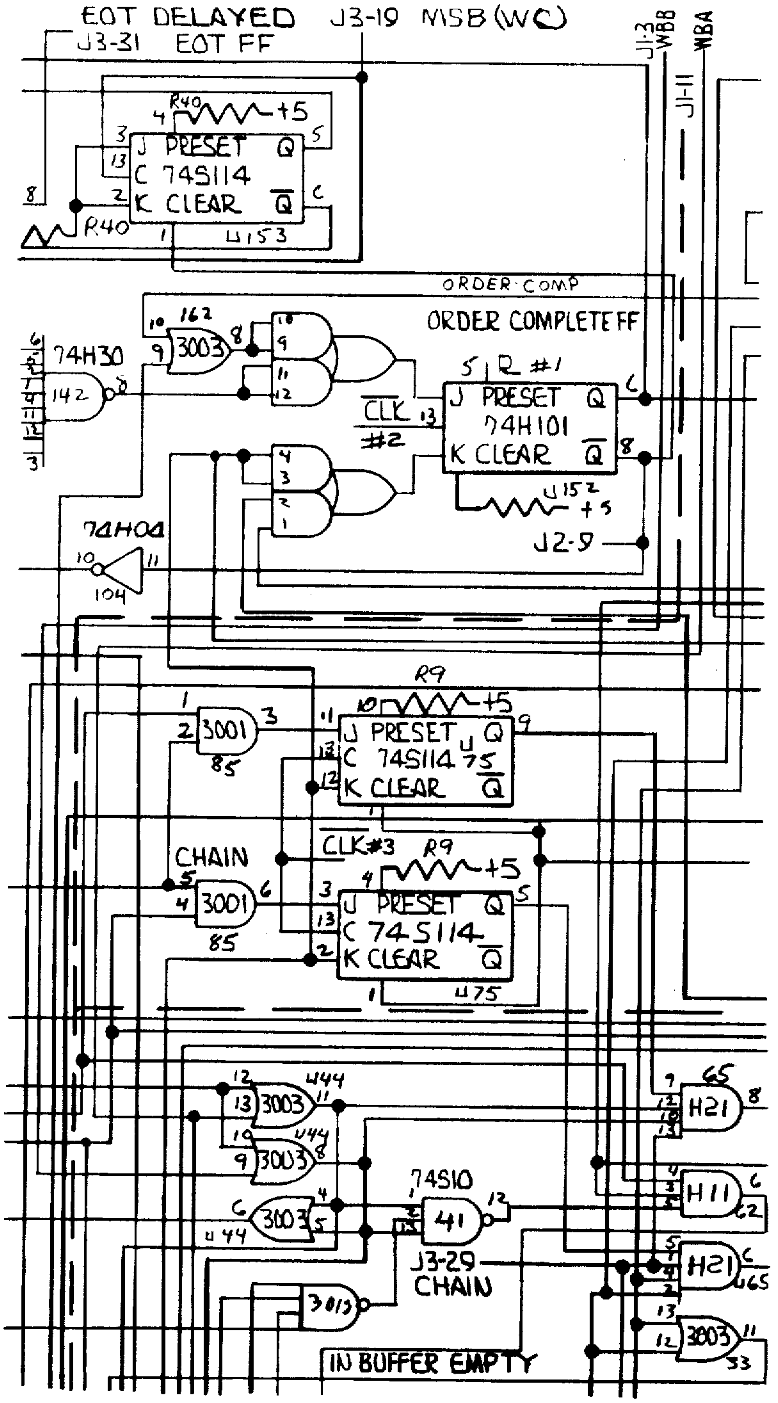
Figure 3E:
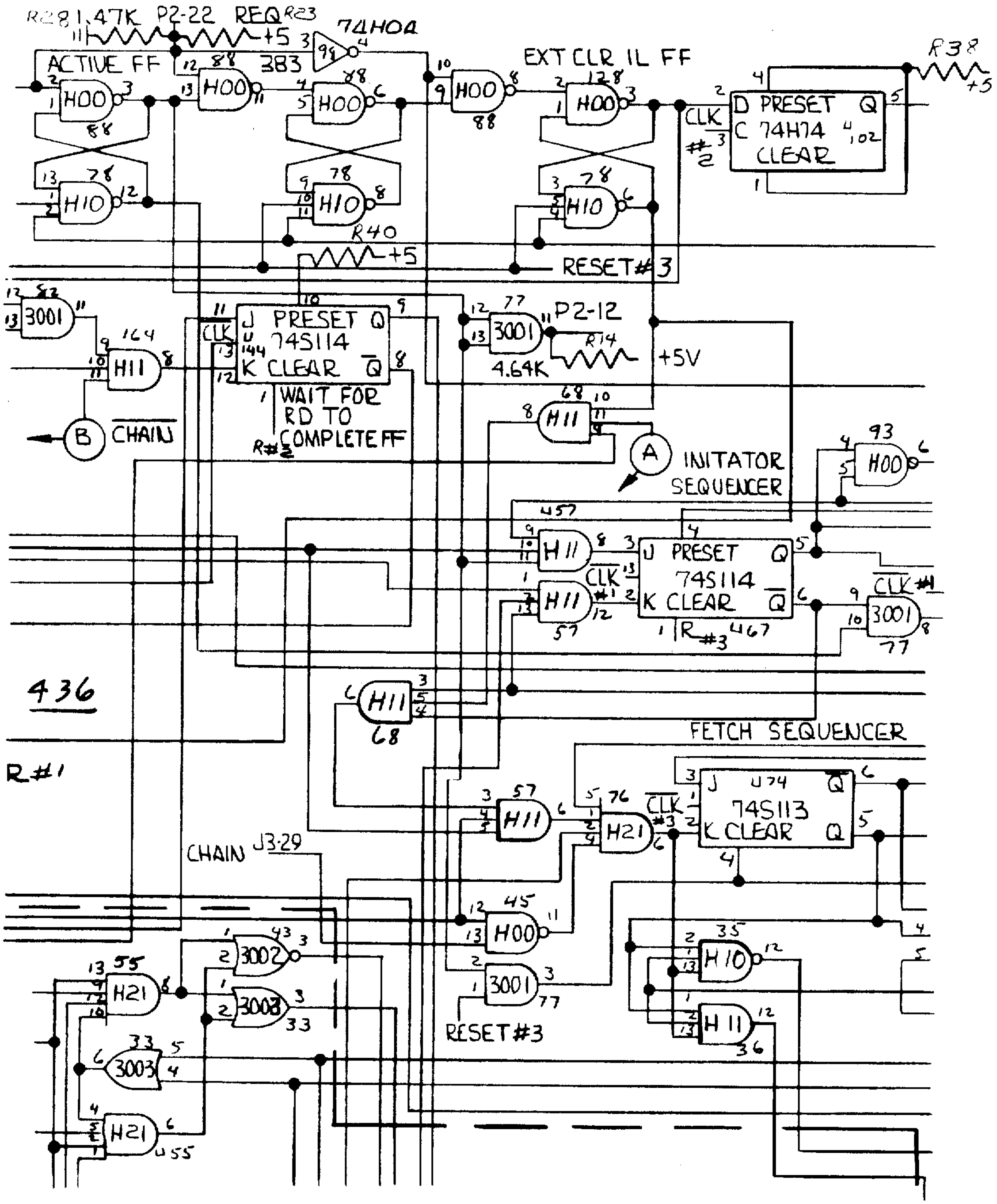
Figure 3F:
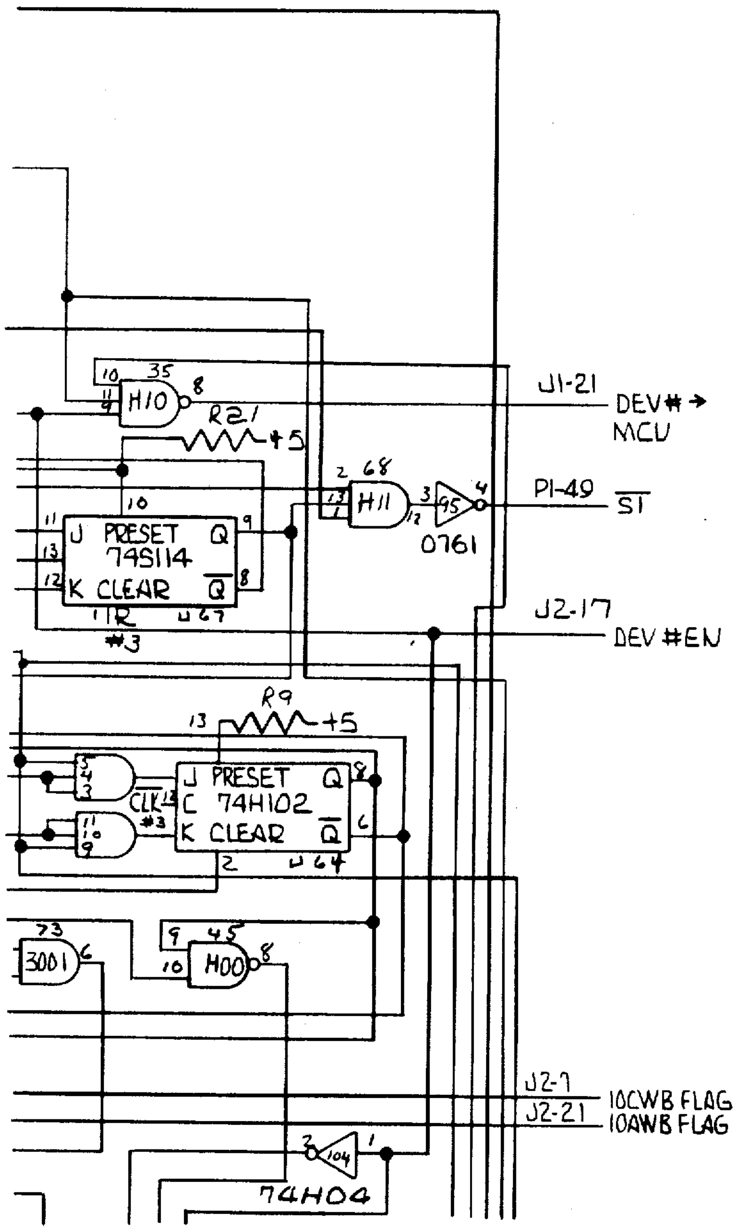
Figure 3G:
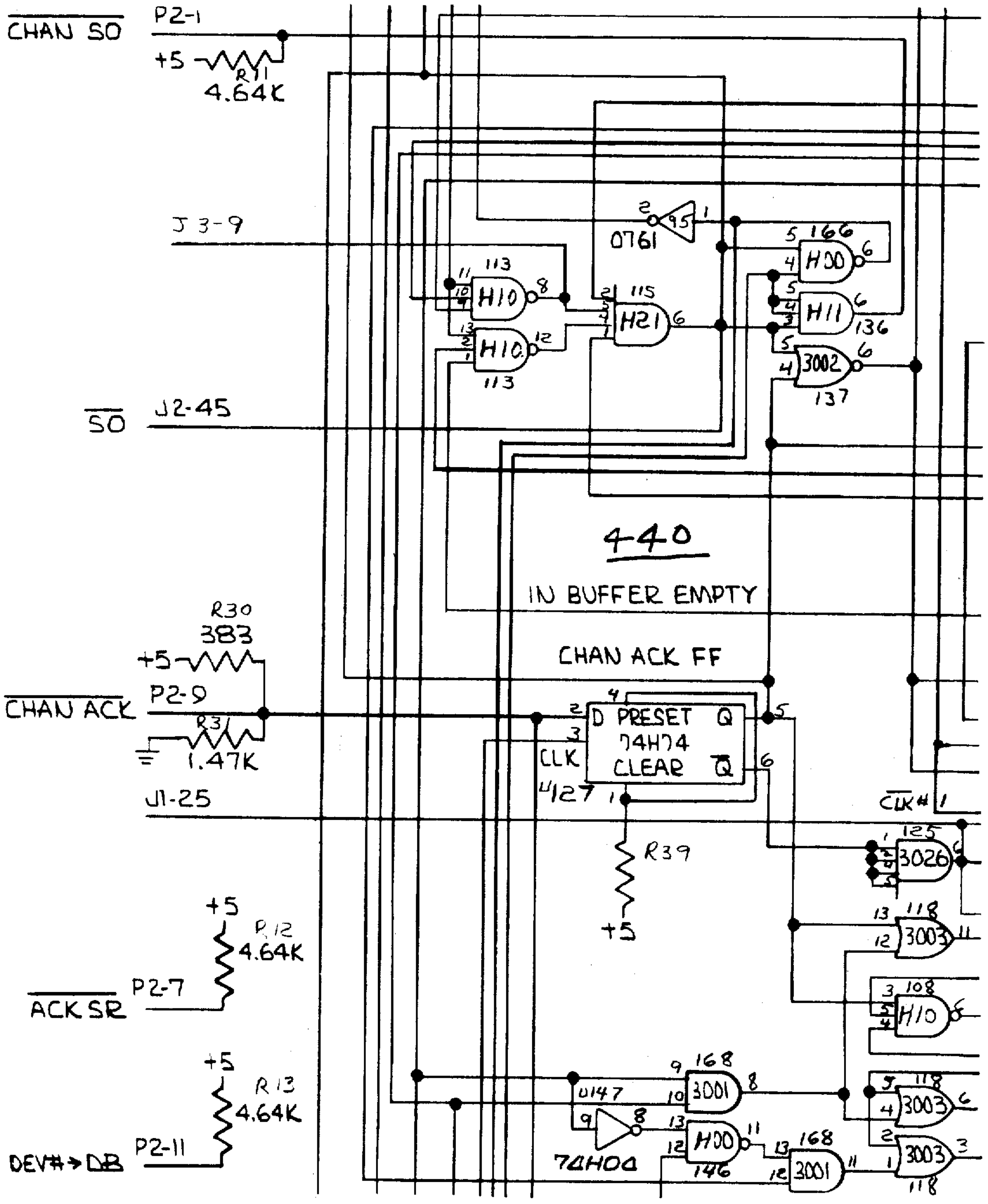
Figure 3H:
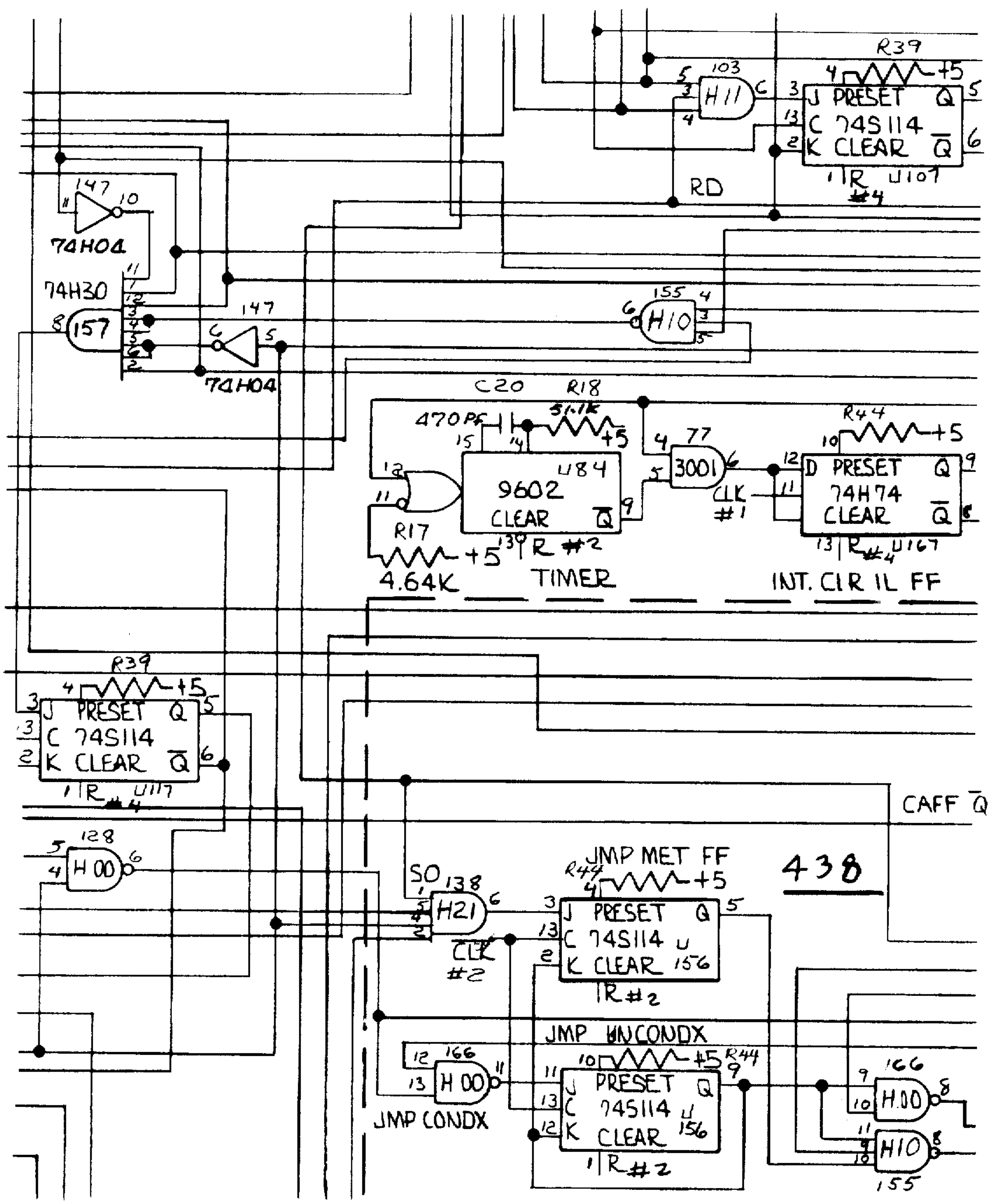
Figure 31:
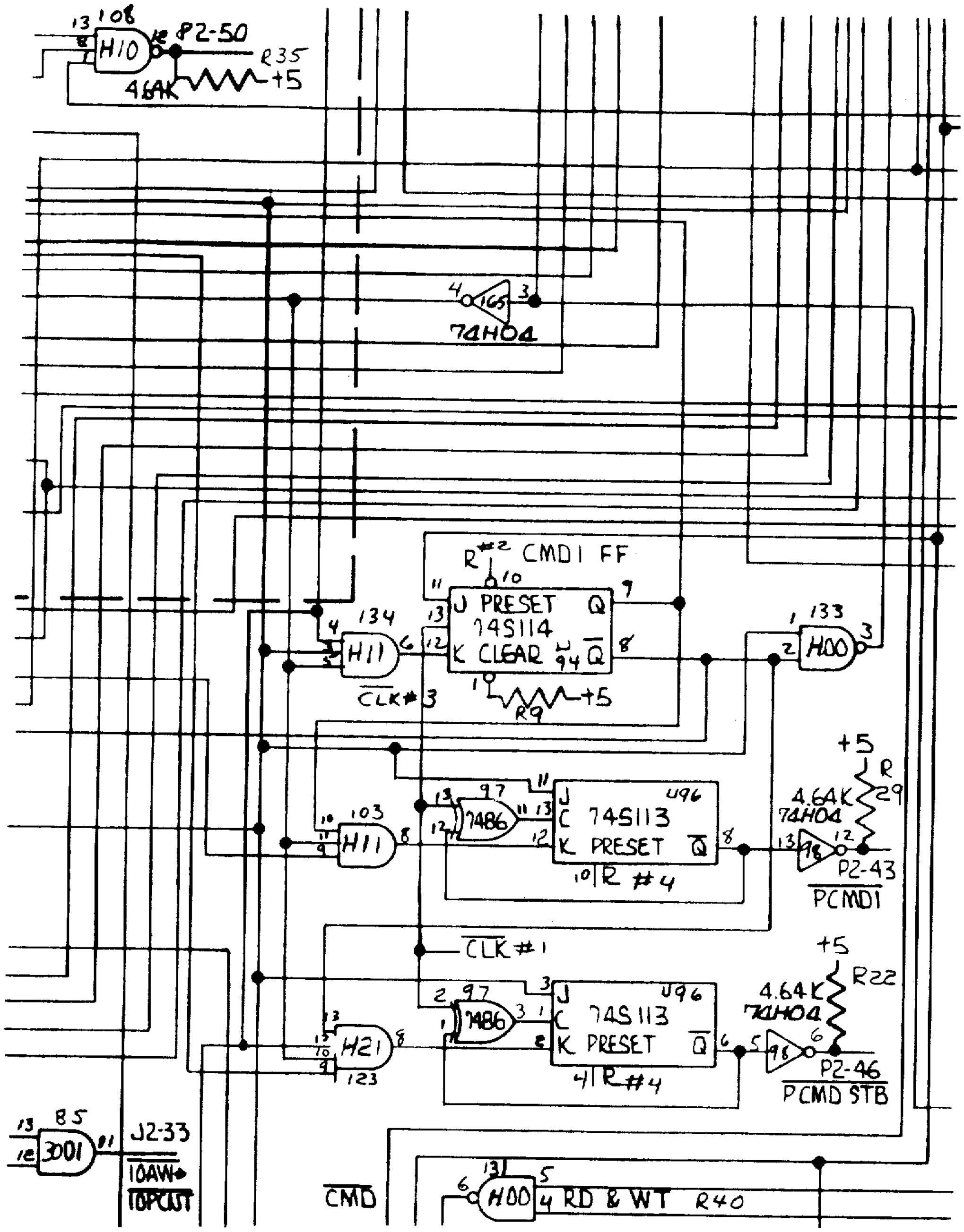
Figure 3J:
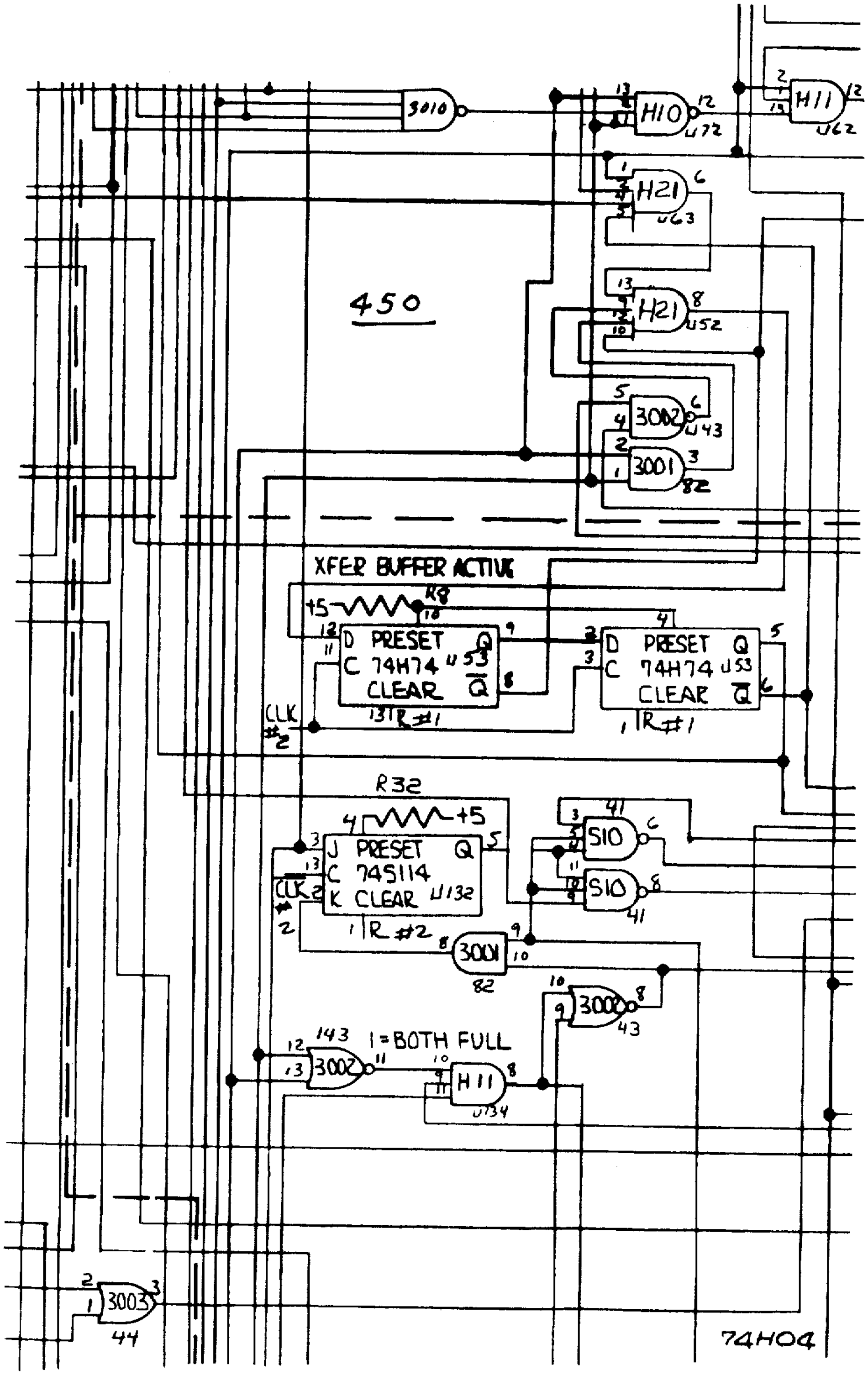
Figure 3K:
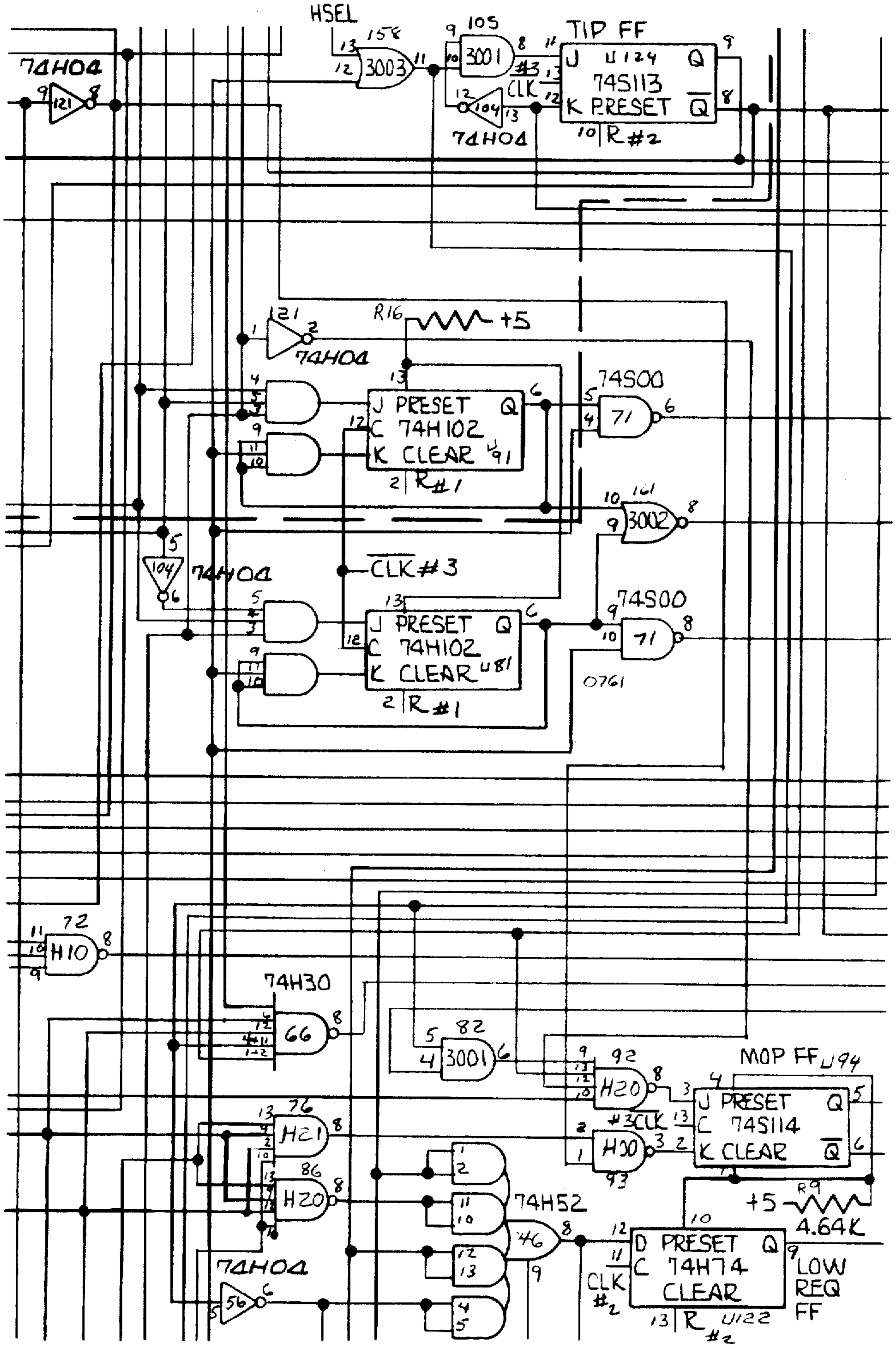
Figure 3L:
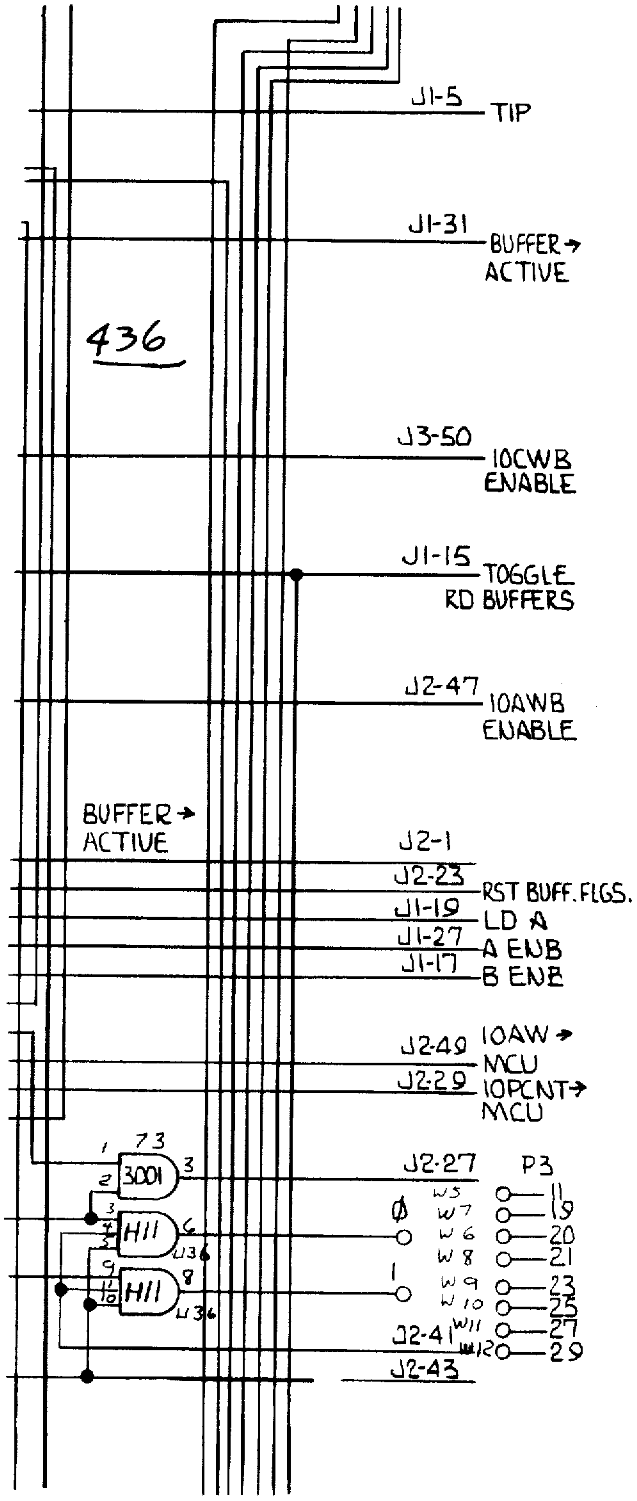
Figure 3M:
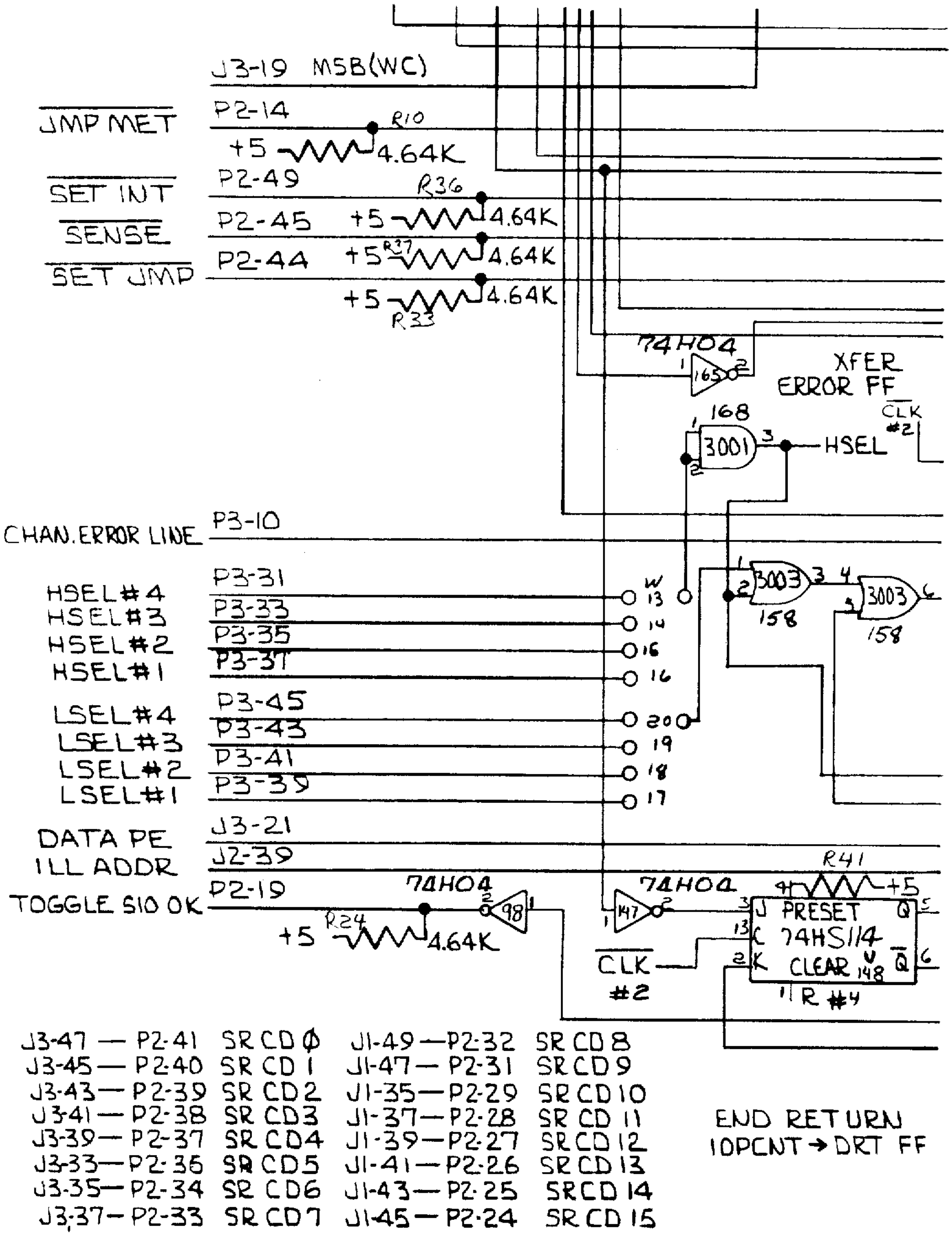
Figure 3N:
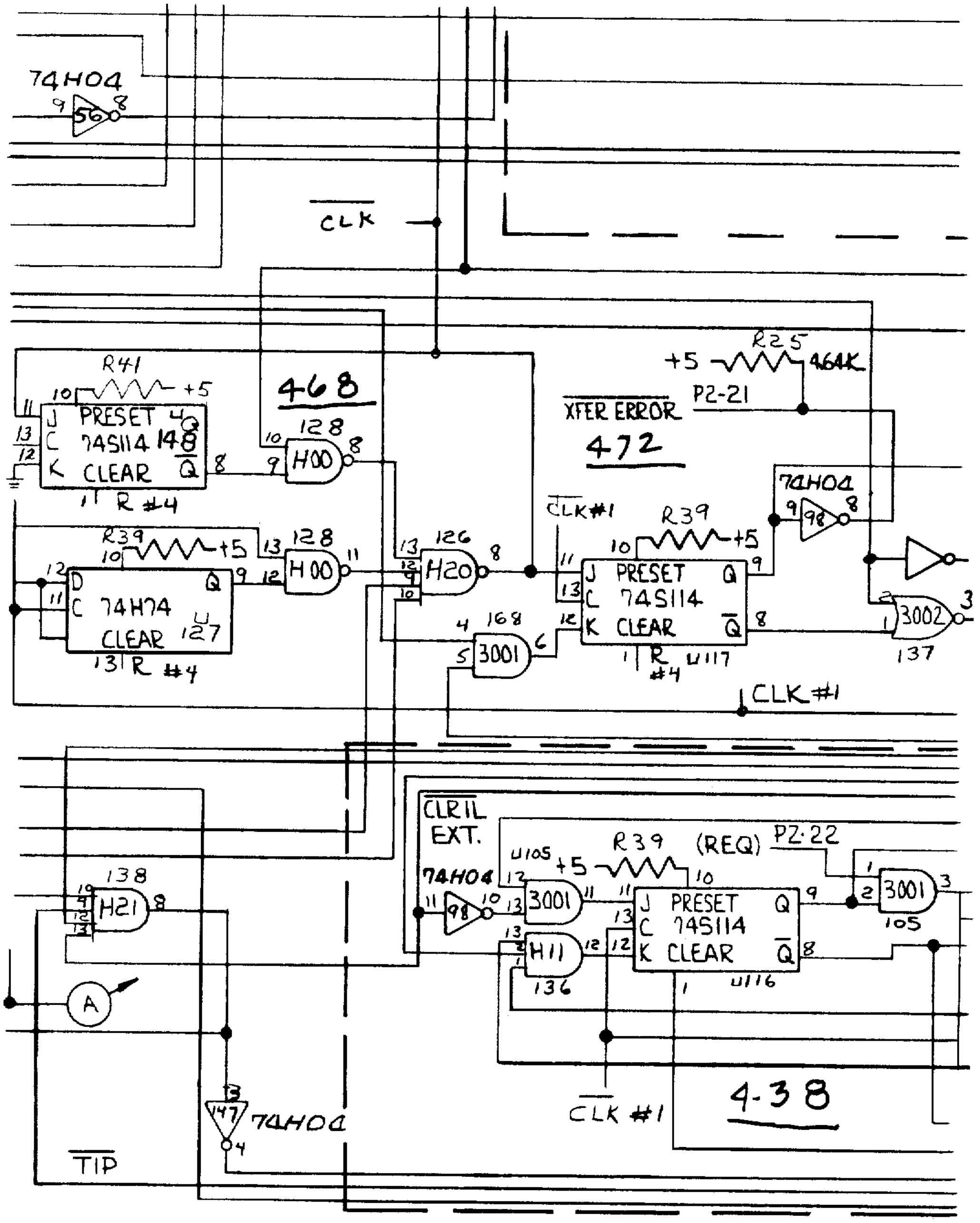
Figure 30:
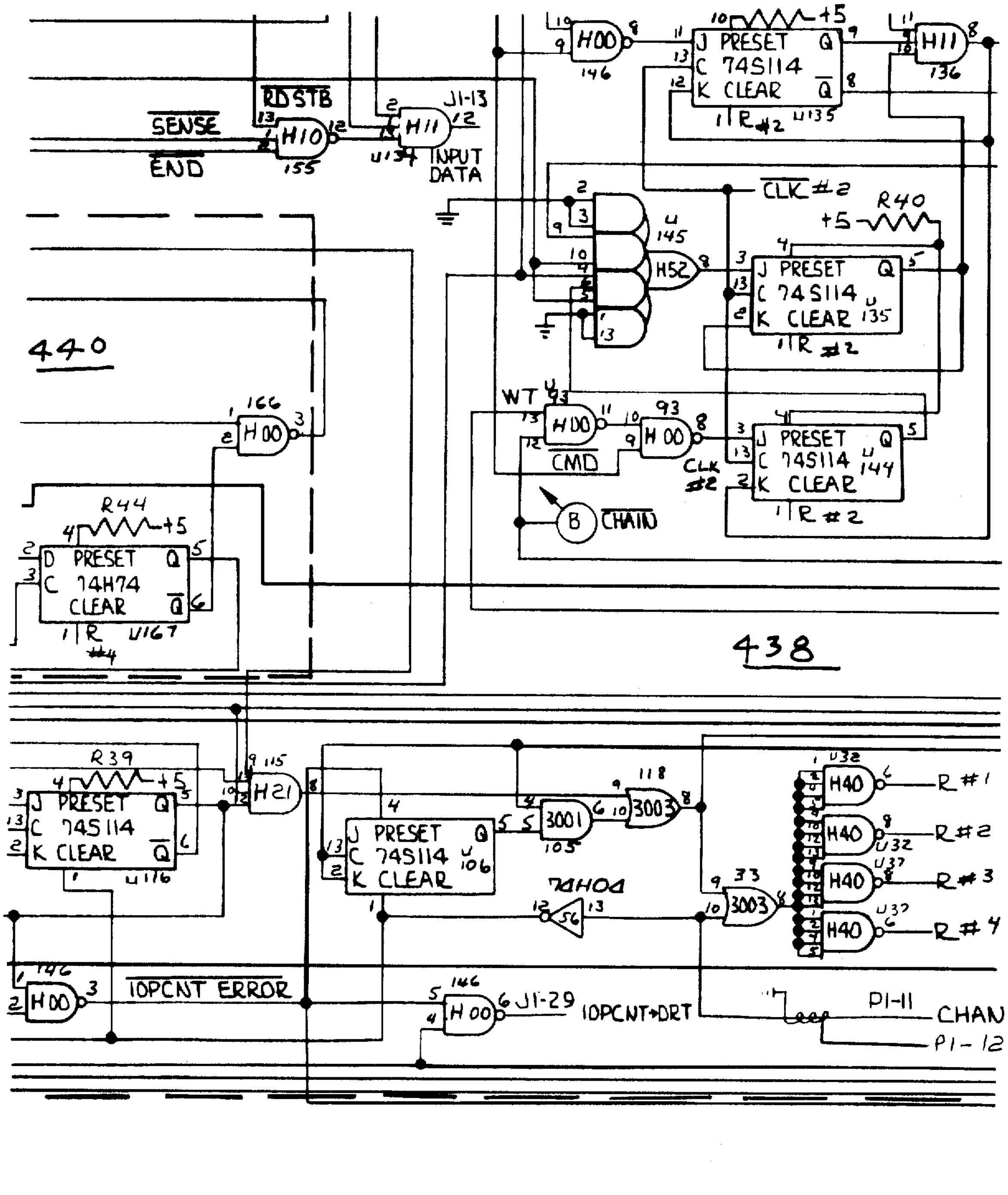
Figure 3P:
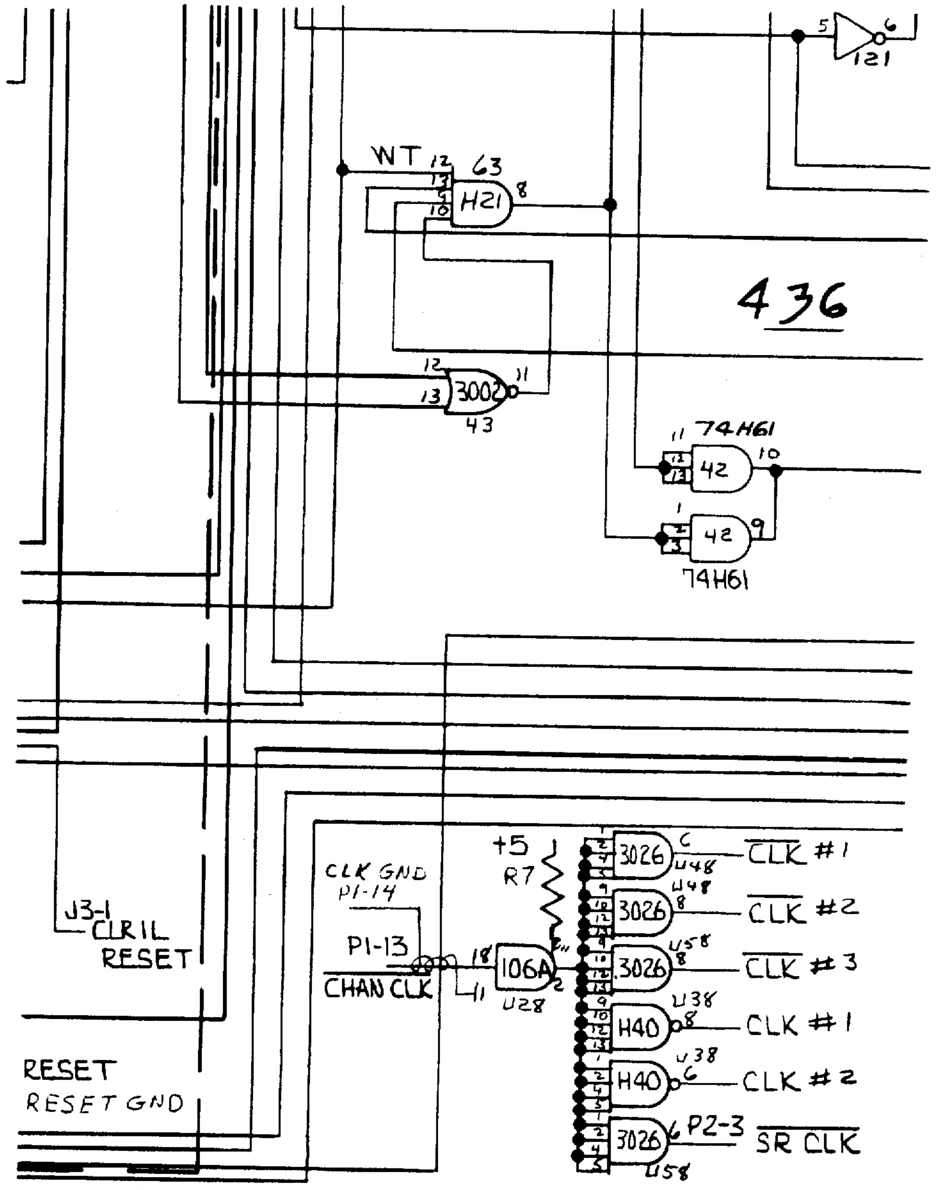
Figure 3Q:
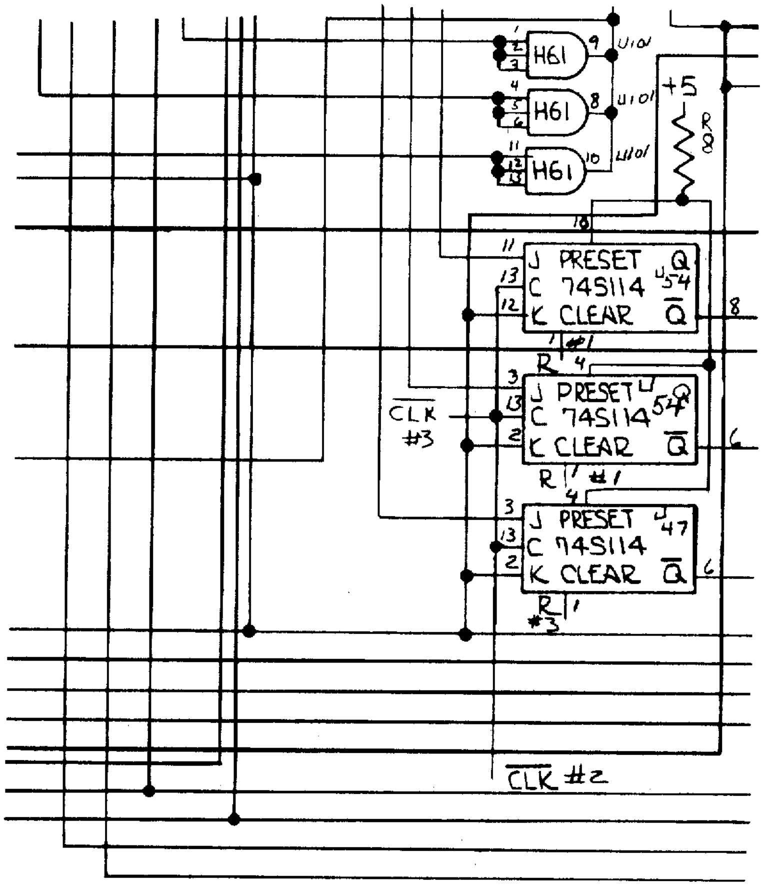
Figure 3R:
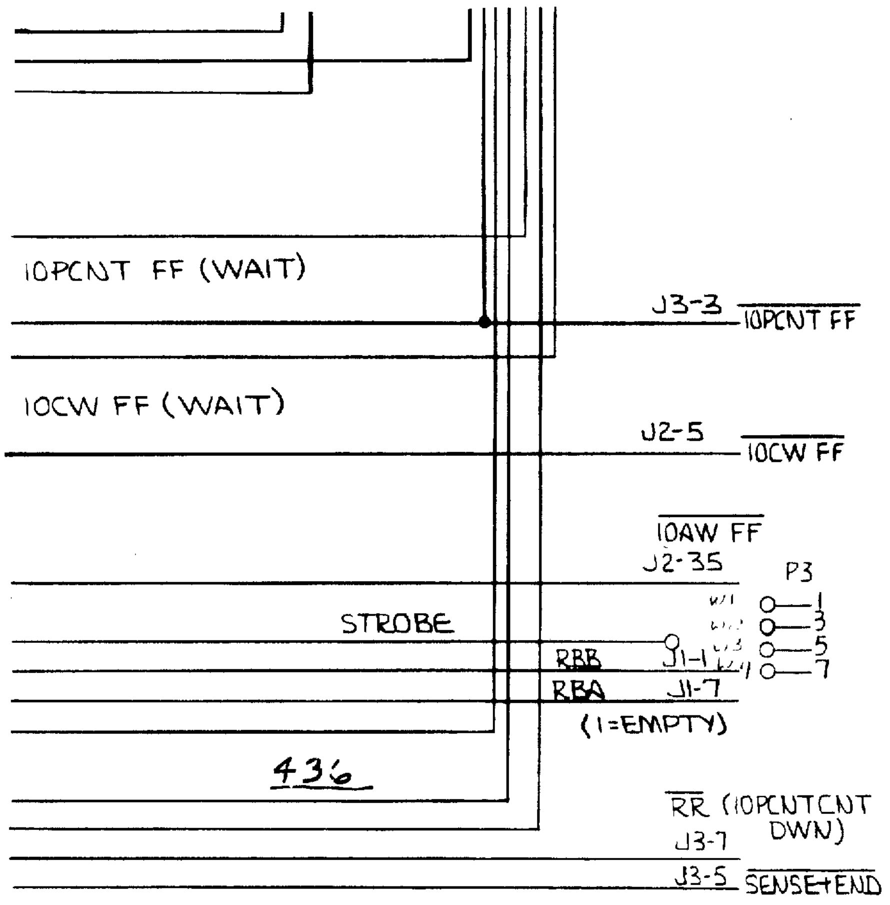

In the program execution logic 436, the block labeled 450, in FIG. 3*a–n*, shows the logic which performs the prefetching and the anticipation of data transfers to the device. It is this block which permits the channel to run at high speeds. The order complete flip-flop 452 is a steering flip-flop and is set during the execution of an order and resets during the termination of an order. Block 454 is a decoder which is decoding the various orders, end job, interrupt, sends command, read, write and the like. Device controller interface 440 handles inter alia signals of device service requests, channel service out, channel acknowledge, lines 456, 458 and 460 respectively. These three signals are the main signals. The device service request, indicating that the device wants service is a request either for data from a device or a request to transfer data to or from memory. Channel service out is a signal to the device and channel acknowledge is asignal from the device. They are the basic gating and strobing signals out of the channel which indicate to the device controller either that data is now present or that data should be sent to the channel. Channel acknowledge from the device controller to the channel indicates that the channel can now move onto the next state. Blocks 462 and 464 are the sense strobe and the interrput strobe. The signals on these lines indicate to the device controller an attempt to read or to set the interrput flip-flop. The channel service out lines 458 and channel acknowledge 460 are the basic handshaking lines in the high speed channel from the device controller.

The error detecting circuit in the channel will look for four different errors and on anyone of these errors indicate to the device controller to terminate its IO program. These are listed as lines 466, 468 and 470. Line 466 is data parity error, meaning that the channel has realized that there is an error in the data from memory. Line 468 is an illegal address, which might be an attempt by the high speed channel to address a memory module that does not exist. Line 470 is the channel error line which carries two error signals from the port controller that the port controller detects. The channel error is an address parity error, that means that an address that the channel has sent to a memory is incorrect. The second signal is a system parity error, which means that there has been an error on the addressing lines on the MCU bus. These two errors are sent to the channel that was last utilizing the service of the port controller and are in turn passed out to the device controller as a signal called transfer error 472. The device controller then, on receipt of transfer error will terminate its IO program by initiating a clear interface which is the same as request 474.

To initiate an IO program, the device controller will signal on request line 474, which will set the active flip-flop 476. When the active flip-flop is set, if the request line is once again signalled on, this will indicate a clear interface condition which will set the clear interface flip-flop 478. The channel will terminate the IO program, restore the contents of the DRT table, reset the active flip-flop 476, and will wait for a new request. Thus the request line serves two purposes. First it will start the program, and second, it will terminate the program if the active flip-flop in the channel is set.

The channel control logic emits a bus called the SI or the channel bus 444. This bus has got the data in it for the device control data path, i.e., the strobes, the various toggle lines and all the things required to manipulate the logic in the device controller in step with the high speed channel for transferring data and the various control signals. It is comprised of the command and respond lines and the data path. We will call that all 444.

Figure 62:
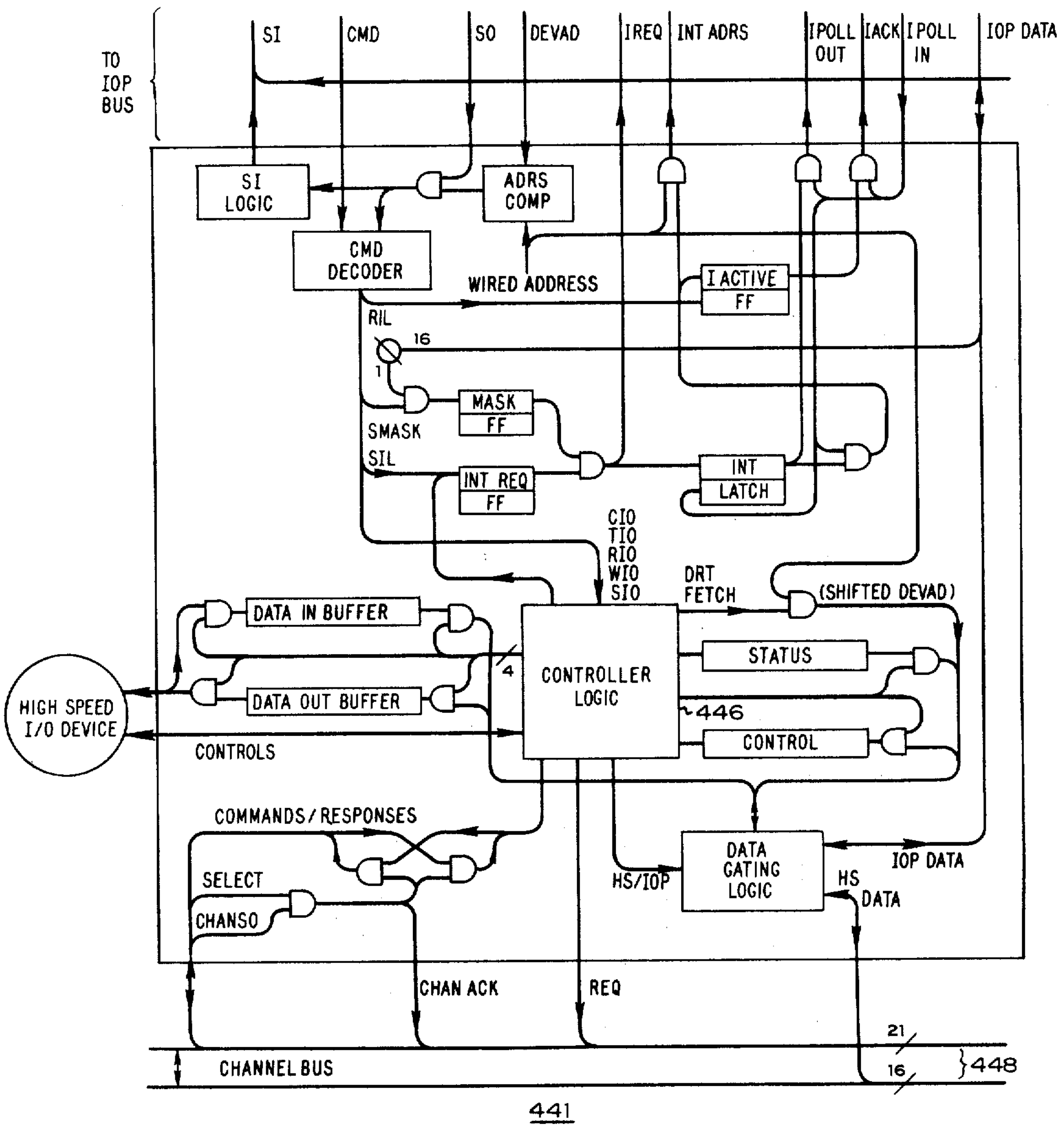
FIG. 62: | High Speed Device Controller; |
|

FIG. 62 shows the high speed channel device controller logic. This is the logic that is required to interface a disc or other high speed device with the high speed selector channel. It is comprised principally of a controller logic block 446. This control logic block interfaces with a channel bus 448. The channel bus contains the command and response lines, the data lines and the select lines. These lines manipulate the device controller logic, for example to input data, to accept data or to jump.

MEMORY MAPPING AND INTERLEAVING

Although the memory mapping and interleaving function together, they may be discussed individually. The memory mapping will be discussed first, generally with reference to FIG. 63, because that is more or less independent of the interleaving. Given that there is the module control unit system where one may have different modules on a common data control bus, there may be multiple memory modules. Each of these memory modules may be separate and independent, so that some way must be provided for the central processor to determine which module any given physical memory address is in. For instance, a possible configuration would be two 8,000 word modules wherein the first module would have addresses from 0 to 8,000, and the second, 8,000 to 16,000. A typical memory address is expressed as a 16-bit number. This number must be mapped into an address that specifies which module the address is in and where in that module the address is. For convenience, a module is defined as a block of 8,000 words minimum. If there are 16 bits total for an instruction address, then 13 of those 16 bits are necessary to specify one of those 8,000 words within a module. The three remaining bits, then, are used to map the address into a memory module and there can be up to eight different combinations of three bits. Now, a module is not necessarily restricted to 8,000 words. It can just as well be 8 or 16 or 24 or 32 thousand words.

Figures 63, 65:
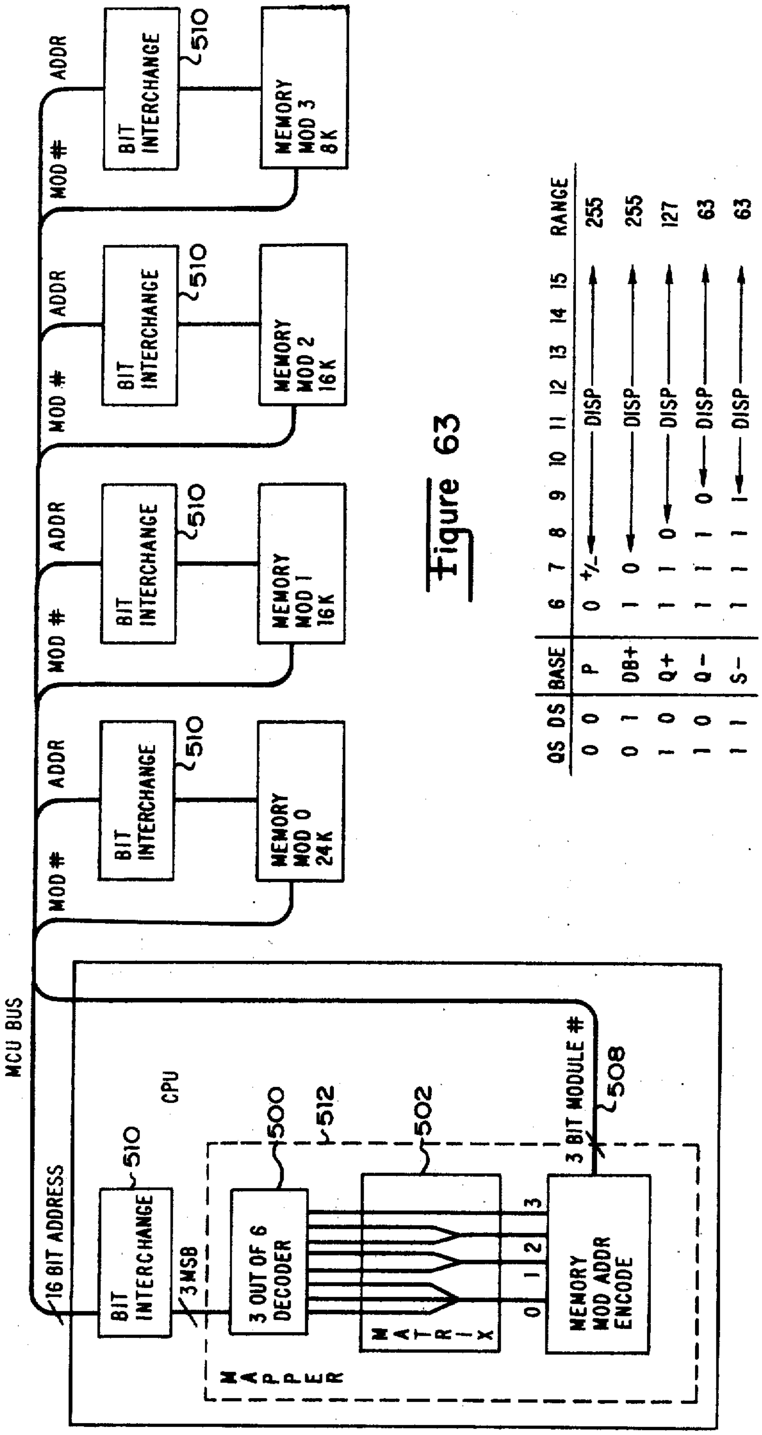
FIG. 63: | Memory Mapping and Interleaving; |
|
FIG. 65: | Address Modes; |
|

Some integral number of these 8K units of address will reside in each module and if the bus is limited, for example, to a maximum of 4 memory modules, the module addresses are restricted to be numbers 0, 1, 2 and 3. Each one of these memory modules has associated with it a certain group of 8,000 word addresses, for instance, module 0 might be a 24K and it would contain the module addresses 0, 1, 2, as shown in FIG. 63. The next module might be 16K, and it would contain the module addresses 3 and 4. There might be another module of 16K and it would have module addresses 5 and 6. The last module would then be 8K with an address of 7. It should be realized that any such grouping is arbitrary. The mapper includes a decoder 500 that decodes these three module address bits into 8. The output of three to 8 decoder 500 is hard wired to the memory modules to generate the module address matrix 502. Once a system is configured each module always has addresses. In the case of this example, $2n$ bits only are needed to identify any given module. In the general case one would need n bits to identify n modules of minimum size. Although the memory module address matrix 502 is shown as being hard wired, the mapping function it performs could be done electrically, which would allow the mapping function to be changed dynamically. One might use an electrically alterable memory mapper for instance, if one wished to provide for dynamic memory module renaming in case of a memory module failure.

Figure 64:
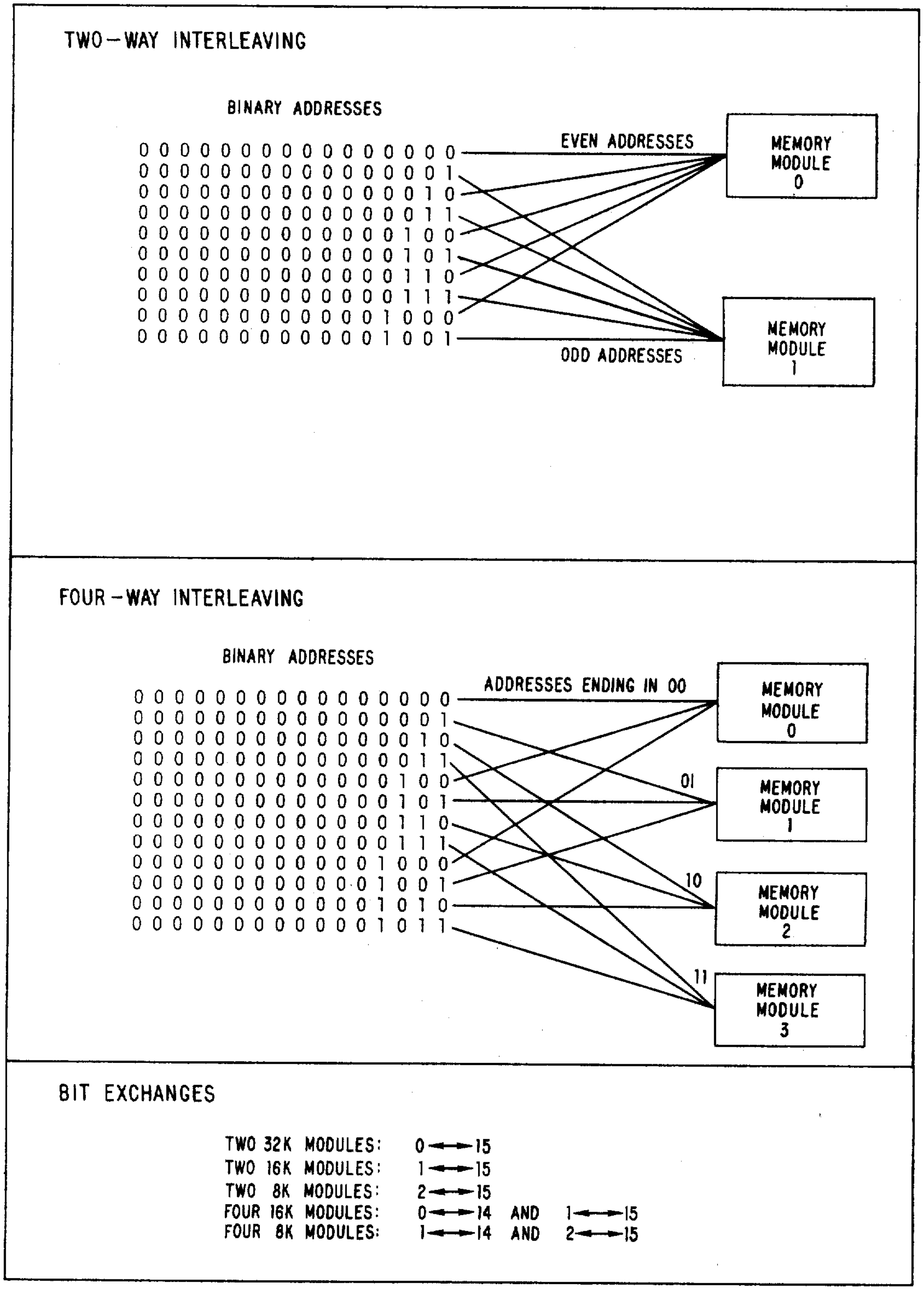
FIG. 64: | Memory Interleaving; |
|

There are situations in which it is advantageous to spread words out over alternate memory modules. This process is called interleaving and is shown in FIG. 64. Two-way interleaving, for example, uses two modules of memory: Address 0 is put into a first module and address 1 into second module, then address 2 into the first module and address 3 into the second, alternating back and forth. Similarly there is four-way interleaving, whete there are four modules: Addresses 0, 1, 2, 3 are placed in successive modules and then the process is repeated. In the preferred embodiment of the present invention, the mechanism of interleaving interacts with the module mapping. Module number cannot be determined unless it is known how the information is interleaved. Therefore, memory mapping not only depends on what physical size each module is but also on how much interleaving is being done.

One method of achieving interleaving is by interchanging the proper number of low order and high order bits in an address expressed as a binary number. For example, for two-way interleaving, the least significant bit is interchanged with one of the most significant bits, and that alternates module address addresses. In the CPU after the bit interchange-510 is performed, the address goes into the mapping mechanism 512. The output of the memory mapping mechanism is put on the bus to make the desired request to the appropriate memory module. However, the memory address that is sent over the MCU bus is the original unmodified address. The unmodified address is sent over the bus so that other modules or pieces of equipment connected to the bus will receive a clean 16-bit address unaffected by bit swapping. The memory module then, has the same bit interchange network as is in the CPU and it does the bit interchange and then simply looks at the proper number of least significant bits to determine the proper address location. Thus, if the memory is an 8,000 word module, it looks only at the least significant 13 bits after the interchange. Thus the memory mapper selects the appropriate memory module for the unmodified 16-bit address to be sent to. The selected memory module will then perform the bit interchange on that address to determine the proper address location within the module. Interleaving must be done in both the CPU and the memory module. It must be done in the CPU so the CPU can perform its function of selecting the proper module. It must also be done in the memory module to fill up all adjacent addresses. The computer user can select the appropriate interleaving pattern by setting some manual switches in Interleaver 510. Ordinarily the desired form of interleaving will be set once and left undisturbed, unless a memory module fails.

PIPELINED MICROPROCESSOR

Referring now to FIG. 2, there is shown a ROM output register 6 of rank one and ROM output register 8 of rank two and two banks of register files 10*a* and 10*b*. The selection circuitry, which is a direct function of the first rank output register 6 is referred to as 12*a* and 12*b*. The pipelining data registers 14*a* and 14*b* are coupled to the arithmetic logic unit ALU 16, the output of which is coupled to the shift register 18. The output of the shift register 18 is stored back into the two register blocks 10*a* and 10*b* based selectively on the microprogram.

The flow of data then is out of register file 10*a*, 10*b* and through the selector mechanism which selects which one of the registers in each bank 12*a* and 12*b*. The output of the selector mechanism then is stored in a temporary register, i.e., the output of 12*a* is stored in register 14*a* and the output of 12*b* is stored in register 14*b*. Registers 14*a* and 14*b* are simple temporary holding registers which hold the data so that the data is available at their outputs at the beginning of a new cycle as the input to the ALU unit 16. In one cycle of the data path, these registers are read out and stored in temporary registers 14*a* and 14*b* as just described. In the next consecutive cycle, the outputs of registers 14*a* and 14*b* are operated on in ALU unit 16 and the output of the ALU 16 is shifted in some form by the shift register 18. The output of the shifter 18 is then fed back and may be stored selectively into one of the registers in either 10a or 10b. That completes the cycle and it takes two cycles to complete this data path. In order to control this two-cycle data path, there must be a two-cycle control mechanism. First, it should be pointed out that during a cycle of operation, the output of 14*a* and 14*b* through the ALU 16 and the shifter 18, a new register is simultaneously selected from register files 10*a* and 10*b* by means of the selection mechanisms 12*a* and 12*b* for storage in registers 14*a* and 14*b*. Just like a pipeline, the circuitry through 14*a* and 14*b* is filled, then while that portion is being processed through the second portion, the first portion is being filled again with new words.

The control mechanism for doing this must be able to execute controls to do selections at the same time arithmetic operations are being done in the ALU 16 and then being shifted to register 18. This is accomplished using the two ranks of the ROM output registers 6 and 8 that contain the instructions which control the flow of data. The start of the sequence is back at the ROM address register 2 in which is stored the address of the microinstruction contained in the read-only memory (ROM) 4 which is the control store for the machine. The contents of the ROM 4 at the address contained in ROM address register 2 are read out into the ROM output register 6. This one logical instruction specifies which register is to be read out of register file 10*a*, which register is to be read out of register file 10*b*, what operation is to be performed by the ALU 16, what shifting is to be done by shifter 18, and what register of register files 10*a* or 10*b* is to store at the end of the second cycle. In addition, this logical instruction also specifies such functions for testing the operands as for either positive/negative, zero/non-zero, etc. This single logical micro-instruction is stored in the ROM output register 6. However, because of this pipelining in the data path, the only two portions or fields of the microinstruction that we use out of the output register 6 are the R-field and the S-field. R-field is a four-bit field that specifies which register of register file 10*a* is to be read out and the S-field is a five-bit field that specifies which register is to be read out from register file 10*b*. Thus, these two fields specify the selection that is done by the selection circuitry 12*a* and 12*b* and is equivalent to the first cycle of pipelining in the data path, as previously described.

At the same clock time that the data selected by circuitry 12*a* and 12*b* is being stored in the data registers 14*a* and 14*b*, the contents of the ROM output register 6 are being stored into the ROM output register 8, such that the control instructions will be moved along in the control pipeline at the same rate that the data will be moved along in the dat pipeline. Thus, at the end of the first cycle, data is stored in data registers 14*a* and 14*b* as a result of the R- and S-fields from output register 6. Simultaneously, the micro-instruction in output register 6 is transferred into output register 8 and a new, logical micro-instruction is being read out of the ROM 4 into the ROM output register number 6, thus filling the "pipeline" behind the micro-instruction transferred into output register8. Now, with the microinstruction out of output register 8, the remaining five portions or fields of the instruction may be executed. These remaining fields are: the special field, the shift field, the skip field, the function field and the store field. Each of these controls some function related to the data as previously described. For example, the function field specifies what operation the ALU 16 performs; the shift field specifies what the shifter 13 does; the store field specifies which register of the register files 10a ro 10b will be storing back into; the skip field specifies some kind of test function performed on the output of the ALU 16 or the shifter 18 and the special field specifies miscellaneous operations that may or may not have to do with the data field, i.e., the setting up of control flip-flops somewhere else in the machine. These five fields are executed in the cycle after the R- and S-fields are executed, because they are executed out of register 8, not register 6. This provides a physical pipeline control mechanism that matches the physical pipelining of the data in the data path.

At the same time the five fields out of register are being executed, the R- and S-fields of the next sequential micro-instruction out of register 6 are also being executed. This has the advantage that a single line of microcode may be written to specify all seven fields as one logical unit, so that the microprogrammer does not have to be concerned about the fact that the data is handled in a distinct channel. The control mechanism being pipelined takes care of this by making the data sequence at the same rate as the control sequences.

LOOK-UP TABLE

Referring now to FIG. 2, there is shown a look-up table (LUT) 23 which includes read-only memory chips, each organized twelve bits wide by 256 entries long. It contains starting addresses of microprograms in the main read-only memory of ROM 25. The look-up table 23 is addressed by look-up table address generator 22 that produces an output which depends on the contents of the current instruction register (CIR) 21 and on some other information like the SR register 26 (in register file 10*a*) and the W-bit flip-flop 27 which, in turn, is controlled by the look-up table 23. The CIR 21 contains a current instruction which can have many formats. These formats are translated by the LUT address generator 22 intoan 8-bit address that is applied to the look-up table 23. The look-up table 23 produces an 11-bit address which is strobed into ROM address register 2 and also produces a W-bit whch is fed back through flip-flop 27 into the LUT address generator 22. This enables the ROM address register 2 to point at a certain address in the ROM 4 to start execution of a microprogram. The logic element 28 between the look-up table 23 and the ROM address register 2 is selectively enabled in response to a control signal (later described) to allow the look-up table 23 to store an address in the ROM address register 2 by a NEXT micro-option. Such NEXT micro-option signifies the end of a microprogram and also clocks in a new current instruction from the next-instruction register 20 into the current-instruction register 21 to restart the logic path. Alternately, by a special function called JLUI (jump look-up table indirect), the logic element 28 may be re-enabled to prevent a change in the contents of the current instruction register 21. The input to logic element 28 is controlled by the JLUI and NEXT inputs from the ROM 4. These two commands can re-enable logic element 28.

The look-up table 23 can logically be thought of as having two halves. For the memory reference group of instructions, when the operation codes are detected in current instruction register 21, the W-bit associated with that current instruction indicates to the look-up table 23 whether or not there is or is not a JLUI input pending. That W-bit, along with the current instruction register being a memory reference instruction, indicates that the look-up table 23 should expect a JLUI input to re-enable logic element 28 at some later time. When the JLUI input is given, the W-bit input, along with the memory reference instruction from CIR 21, causes the LUT address generator 22 to switch to a new address in the look-up table 23, which gives a new address in RAR 2 and addresses another section of ROM 4. Thus, the memory reference class of instructions contains two entry points for several instructions, the first of which contains an address computation routine and the second of which contains the starting address of the instruction itself. The other class of instructions includes all the other instructions available from the current instruction register 21. For such other class of instructions, consider the top-of-stack register (SR) 26 which indicates how many top-of-stack registers are valid in the ranges from zero to four. Based on that information, and the current instruction in the current instruction register 21, an 8-bit address comes out of the LUT address generator 22 which addresses an entry in the look-up table 23. This introduces another address again into RAR 4 which, based upon the state of SR 26, starts either a pre-adjust routine (if the state of SR 26 is not the right condition for that given instruction) or the main instruction itself (if the state of SR 26 is in the right condition for that given instruction). Thus, there are two phases for the non-memory reference based upon the state of SR 26. Also, since the LUT is twelve bits wide and only eleven bits are used for the ROM address register, the twelfth bit is still a W-bit and, for the non-memory reference group of instructions, it is now used to determine the contents of the pre-adder 30. The pre-adder 30 is a register that receives signals from the current instruction register 21. The W-bit now determines whether the pre-adder 30 is to either add or subtract a portion of the field a portion of the current instruction register 21 to present at its output either the negative or positive contents of a portion of the current instruction register 21. This permits the use of the same micro-instruction for several different operation codes and, based on those operation codes, a W-bit forces either a positive or negative quantity out of the pre-adder 30. The look-up table 23 thus introduces a vector or a legal entry into the main ROM 4. It also provides multiple entry points for different classes of instructions. Also, since the look-up table 23 is made out of read-only memory, there is greater flexibility in being able to change the machine easily into a different set of instructions, or a different set of entry points, without having to change the hardware except for only a few integrated circuit patterns.

PRE-ADDER

FIG. 2 shows a simplified block diagram of the computer including the pre-adder 30 and its controls for operation within the central processor. Of the two portions, namely, memory address computation and operand or argument evaluation of a particular instruction, the memory address computation is described first as follows.

Figure 2C:
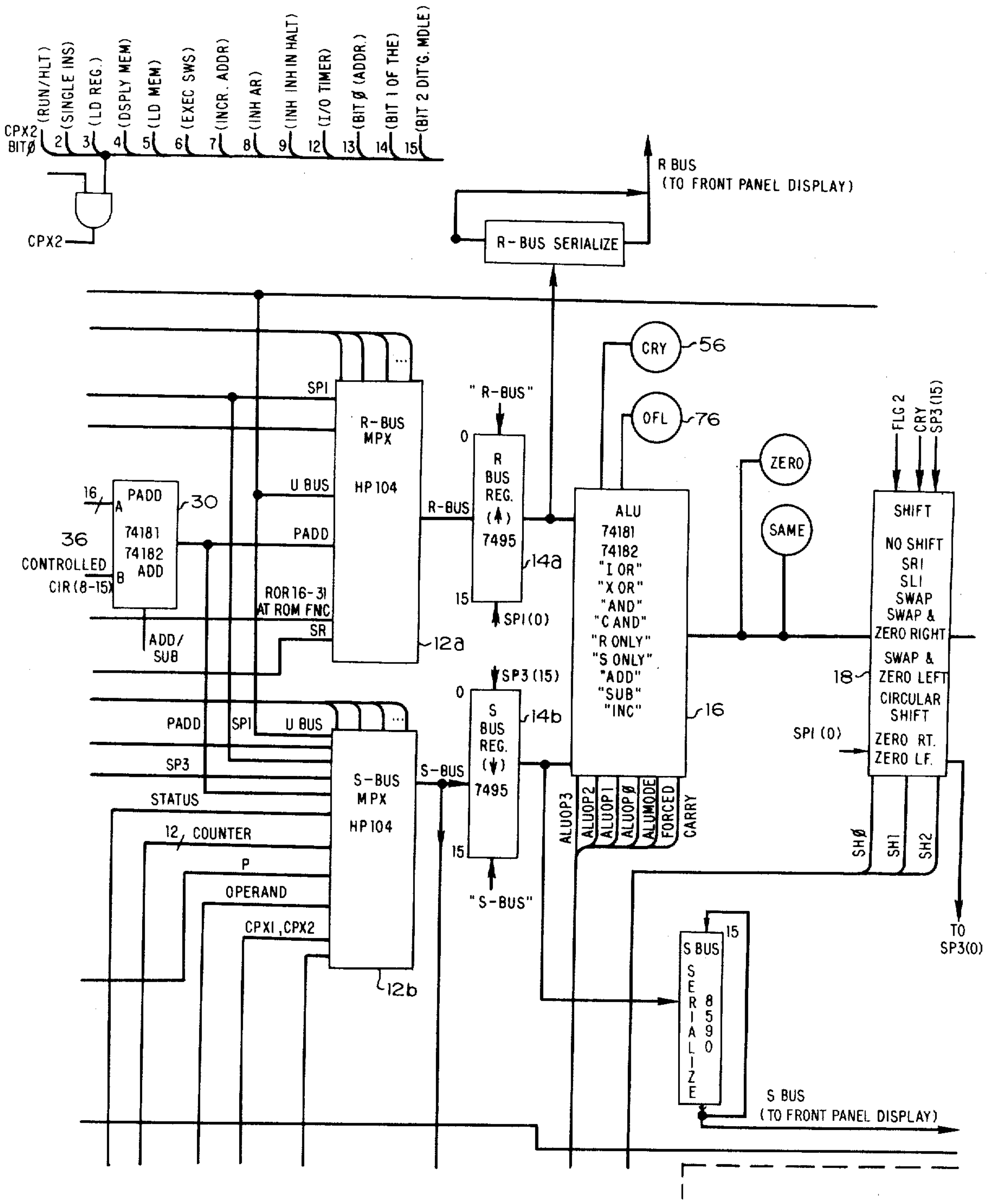
Figure 2D:
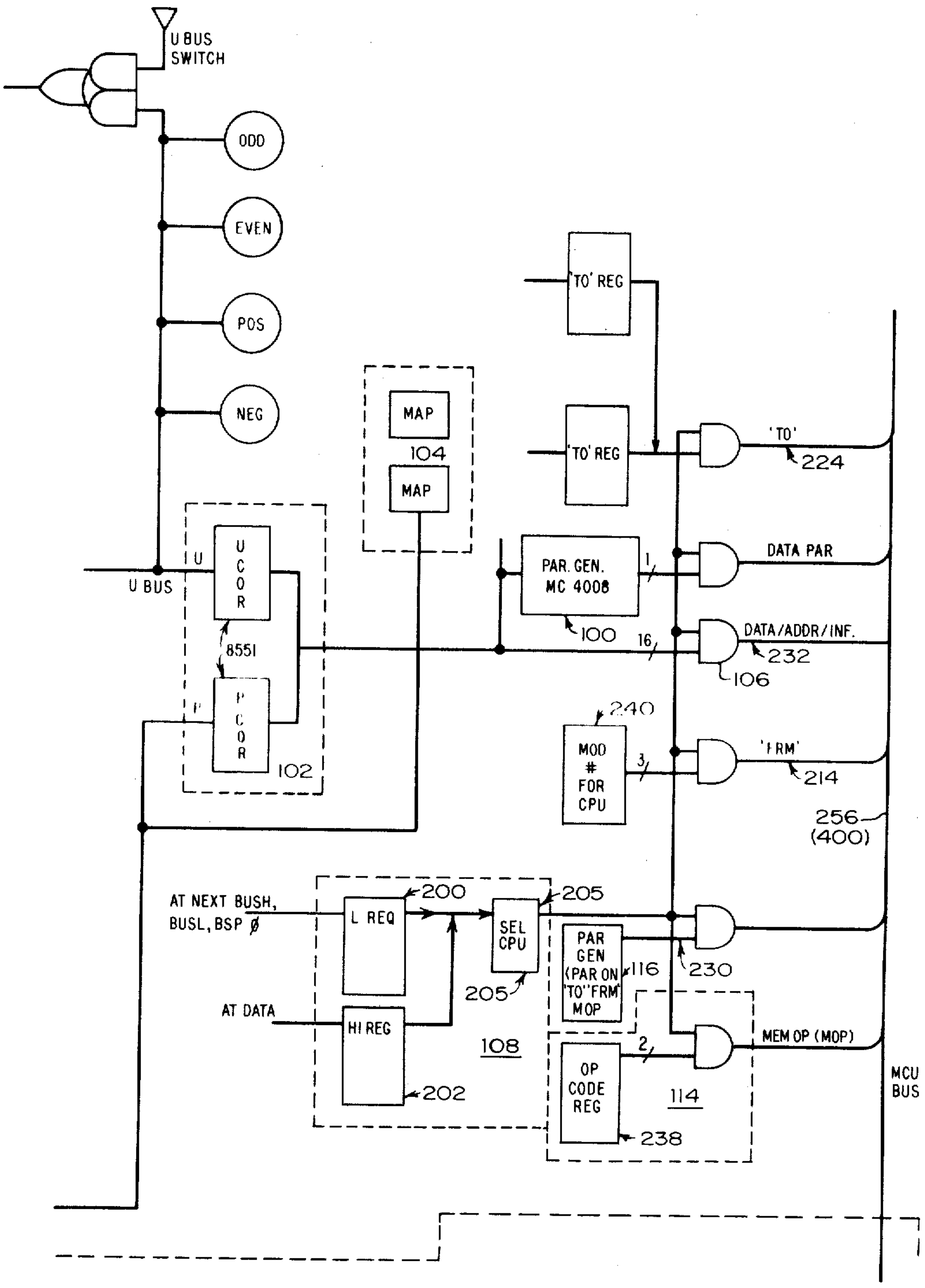
Figure 2E:
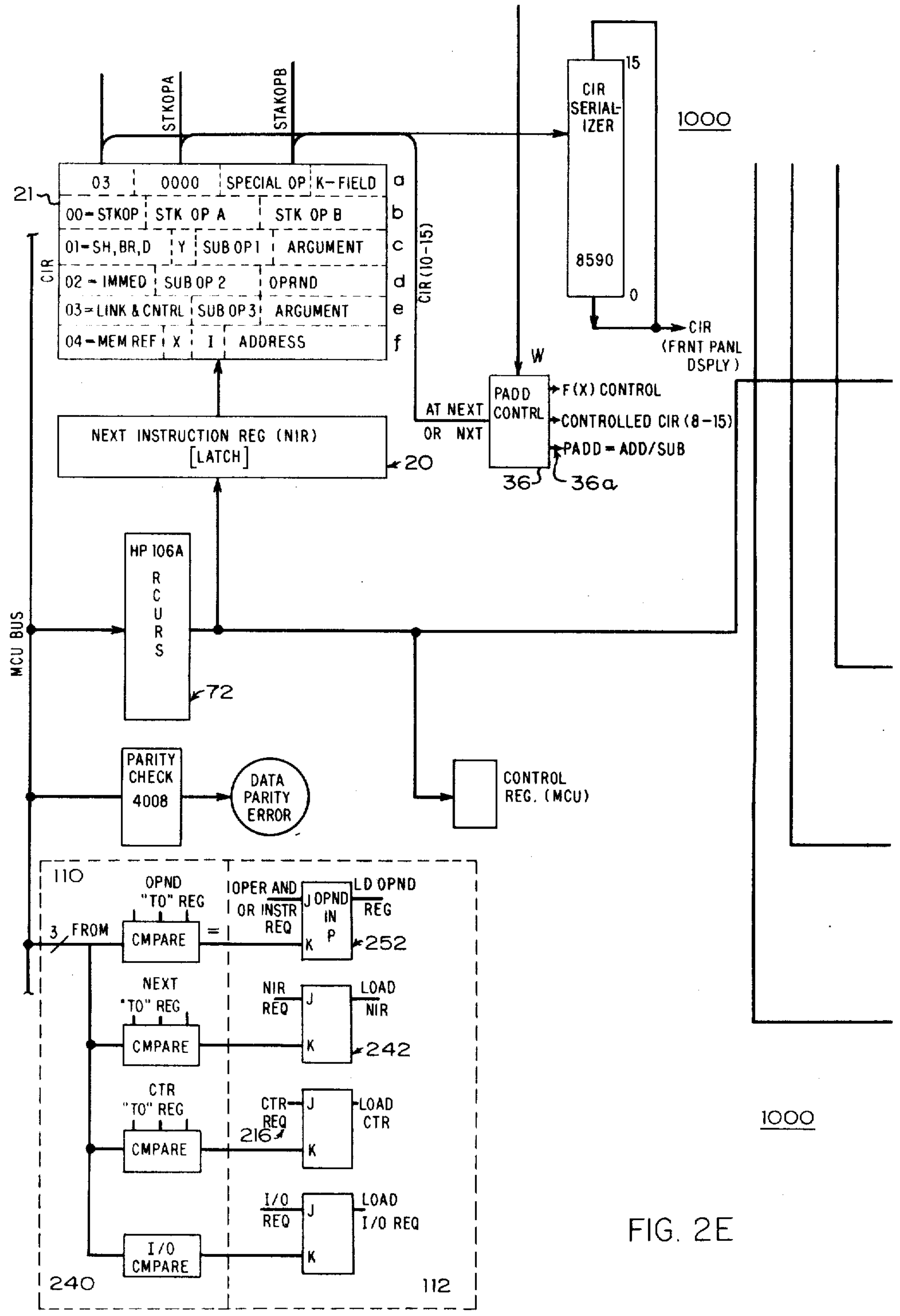
Figure 2F:
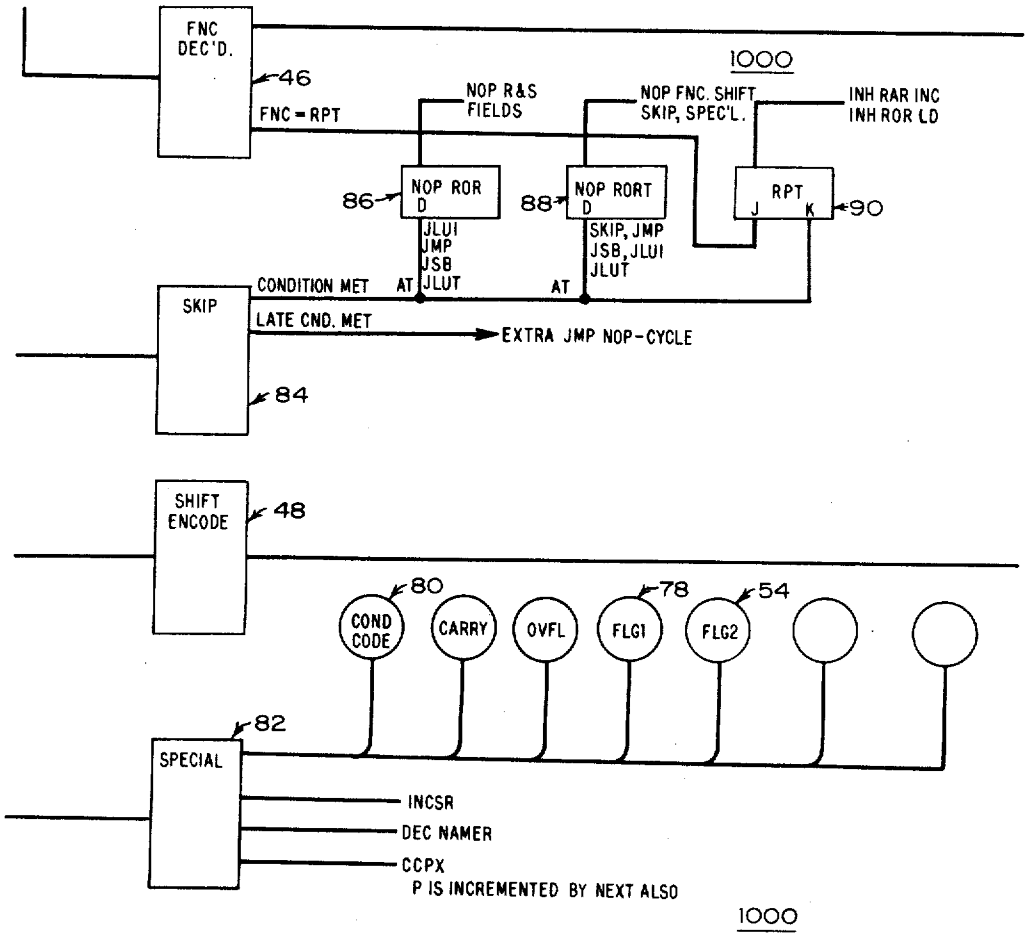
Figure 2G:
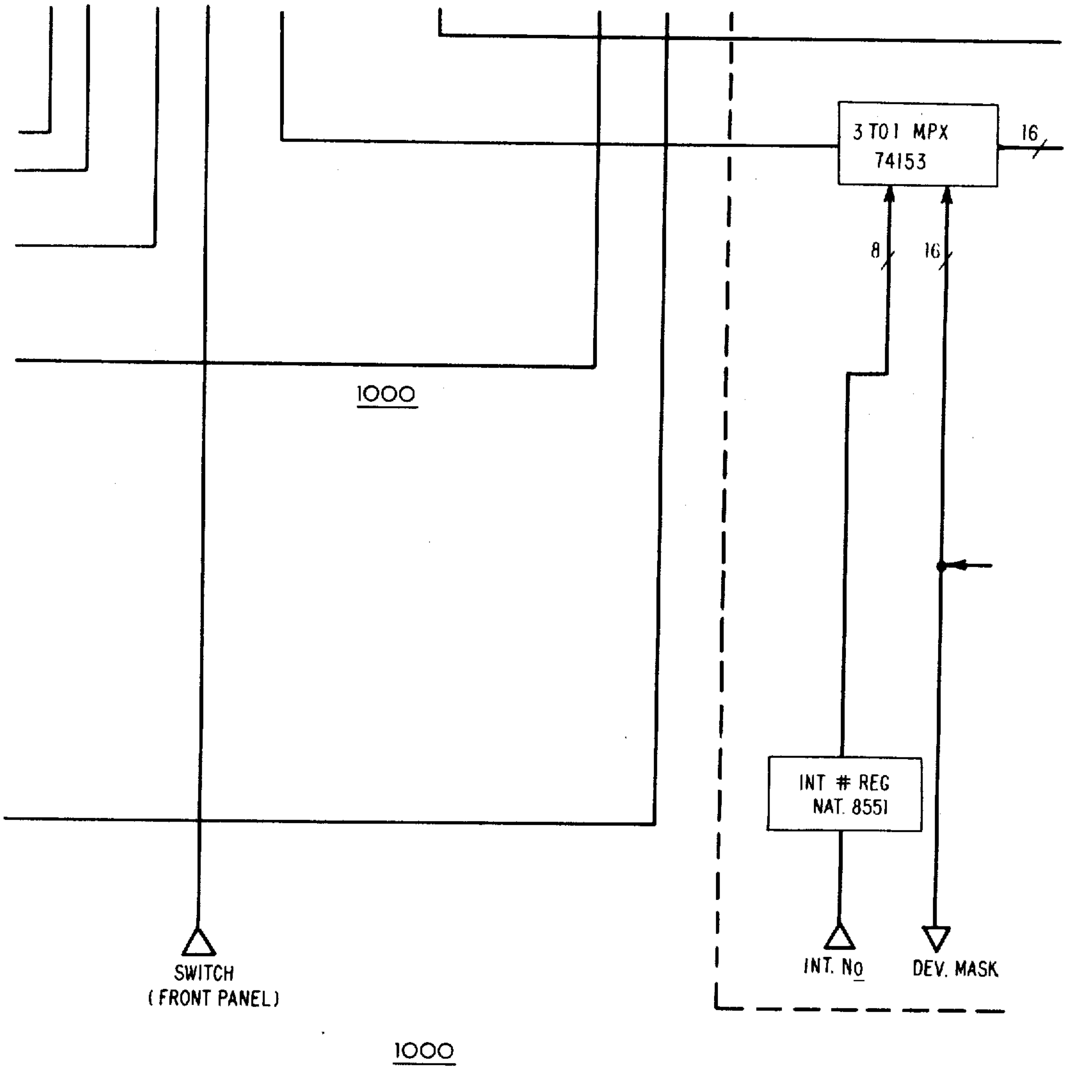
Figure 2H:
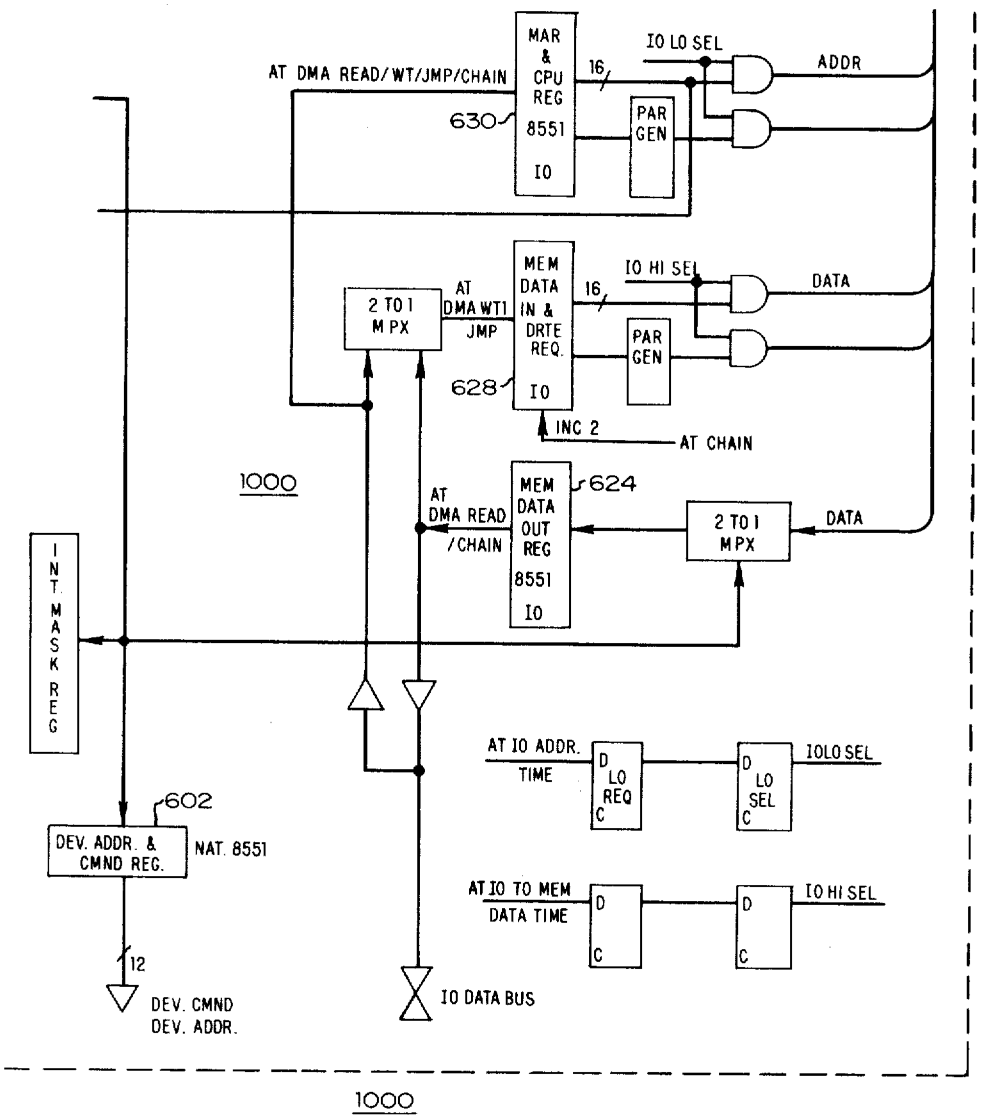

The current instruction register 21 contains the instruction that is currently being executed by the central processor. The instruction may have many formats of instructions (labeled *a,b,c,d,e* and *f* in the drawing). The format *f* is a memory reference instruction which has an *x*-bit that specifies whether or not to include the index register in the address computation, an I-bit that specifies whether or not to use indirect addressing, and the address portion of the field. The address portion of the field consists of 10 bits which specify the register that is to be addressed relative to the base register, and this register may be among the ones in register file 10*b* and, in particular, it may be Q, DB, P or SM. In addition to specifying which of these registers the address is relative to, the remaining number of bits of the dddress field specify how far away from that register. These bits may be encoded so that the maximum range on this displacement is available for the most often used addressing modes. For example, with respect to the P register and with respect to the DB register, the address can be up to 255 words away. With respect to the Q register in the positive direction the address can be 127 words away and with respect to the Q register in the negative direction the address 63 words away. With respect to SM in the negative direction, the address can also be 63 words away. With respect to this address, then, it must be determined which bits are address and which bits are specifying a base register. In particular, with respect to the table of FIG. 65, the current instruction register 21 provides actual bit patterns to do the mapping relative to the base register and provides the number of bits available for displacement range. Thus, for base register P, the sixth bit is a zero and the seventh is the sign bit and bits 8 through 15 give the range of 255. Similarly, the other four entries in the table have selected bits for specifying base register and range. The means for mapping from these bits looks at bits six, seven, eight and nine to determine the ones that define the base register. The bits are scanned left to right to sense at least the sixth bit and as many at least, as bits six through nine. These bits are decoded to yield the two signals QS and DS whose two-bit values are also shown in the table of FIG. 65. These two bits, QS and DS, correspond to the two least significant bits of the S- or selection inputs to the S-bus decoder 34 in FIG. 2*f.* These two bits then specify to the selection circuitry 12b which of these four registers are to be summoned up to be added into the address, as later described herein. Thus, the decoded Huffman bits yield the QS, DS and cause the proper register to be selected onto the S-bus and stored into the register 14b at the end of the proper operating cycle as previously described in connection with the Look-Up Table and the NEXT instruction as the beginning of a new instruction.

In order to determine the address from this memory reference instruction, register must be determined and the remaining bits are used to determine the proper sign (i.e., plus or minus) depending on which address mode is in operation. This is the function of the pre-adder. The pre-adder control 36, as shown in FIG. 2, has inputs of the W-bit from generator 27 and also the NEXT command of the microprocessor. The pre-adder control 36 then determines whether to add or subtract by looking at the proper bits of the current instruction register 21 and puts out a signal called add-subtract 36*a* that is applied to the pre-adder 30 of FIG. 2*c*. Also, an index register may hage been specified in the instruction format by the *x*-bit. The index register is not added in at this time, if the instruction is indirect. If the instruction is direct, the index register is added in if, and only if, the *x*-bit is a one. The index in this machine is a logical index so that for double-word instructions, the index register contains the number of double words that the address is to be displaced by. If it is a byte instruction, the index register contains the number of bytes of displacement and if it is a normal integer of single-word instruction, the index register contains the number of words. In order to account for this logical nature of the index register, there is provided a selection circuit 32 which shifts the output of the *x* register (i.e., register 96 in register 10*a*) either one bit to the left or one bit to the right, depending on whether it is a double-word or a byte instruction. This provides the physical value in the index register which is the number of words as opposed to the number of double words or the number of bytes, respectively. Another possible output of selection circuit 32 is zero which occurs when either *x*-bit is zero, or the I-bit is a one. Under these conditions nothing is added into the index register, because this would be equivalent to adding in a value of zero. Thus, one input to the pre-adder 30 is a function of *x*, ($F_x$, in FIG. 2) which is either the shifted index register or zero, based on the specified bits. The other input B of circuit 30 is called controlled CIR (8-15), which input comes from the pre-adder control 36.

Referring now to FIG. 65 it should be noted that various numbers of bits of the displacement have to be added in, for example, bits 10 through 15 are added in in the Q minus or S minus addressing mode, bits 9 through 15 are added in in the Q plus addressing mode and bits 8 to 15 are added in in the P plus or minus or DB plus addressing mode. Thus, based upon bit 6 through 9, the pre-adder control 36 determines how many of the bits should be presented to the input of the pre-adder 30. The pre-adder 30 is an adder that either adds or subtracts in response to the control signal generated by pre-adder control 30. The resultant output from pre-adder 30 is selected by the selector 12*a* during the NEXT cycle such that the sum of the shifted or unshifted index register and the controlled output of the CIR 21 are placed and stored into the temporary register 14*a*. This occurs at the same time the base register is selected from the register file 10*b* by means of the selection circuitry 12*b* and stored into the temporary register 14*b*. Thus, in one cycle the base register is stored in register 14*b* and the displacement plus the proper shifted index stored in register 14*a*. On the next cycle, the ALU 16 will add these two to come up with the total effective address for the instruction including the base plus index, if desired, plus the displacement part of the current instruction register. No further shifting is performed on it and the output (i.e., U-bus) of shifter 18 is the total effective address desired upon completion of the address computation. Thus, from this example of the instruction format f from the current instruction register 21, it can be seen how the pre-adder effects the format of the instruction.

The other use of the pre-adder has to do with the other formats of instructions when not working with an address. In this situation, it is not necessary to come up witha base register stored in register file 14*b*, rather it is necessary merely to come up with the controlled number of bits out of CIR 21 as the input to pre-adder 30. For all other formats, no index is added in on input A to pre-adder 30 and the zero output of the X selection by selection circuit is picked up along with the proper number of bit for input B to pre-adder 30. No register is selected out of register file 10*b* so zero stored into register 14*b* at the end of the operating cycle when not operating on format *f*. The control bit applied to input B of pre-adder 30 by current instruction register 21 can vary for the format A which has the 4-bit K-field through the remaining formats d and e which have the 8-bit operand or argument field. Therefore, the pre-adder control logic 36 must also be able to separate out these bits just as it did the displacement bits in format *f*. Pre-adder control 36 always requires 4 bits, because it always picks up at least the 4-bits of the K-field. In addition, it may need five bits for the format c where the argument is plus or minus 5 bits, it may need six bits for the format *c* which has a full 6-bit positive argument. It may also need the full eight bits 8– 15 for the formats *d* or *e*. The pre-adder control 36 does this selecting based on the contents of the current instruction register 21 and it provides the exact number of bits with leading zeros for the unwanted bits as the input B to the pre-adder 30. Then, as before in address computation, the zero coming out of selection circuit 32 is added to the control bits since the index is not needed in this case and is then selected by selection circuit 12*a* and stored into the temporary register 14*a*. The pre-adder 30 may add or subtract, based on whether the positive or negative of the argument is selected out of the current instruction register 21. The positive or negative is determined by the W-bit (i.e., the output of the W flip-flop 27), which is a function of the W-bit stored in the look-up table number 23 and which was read out at the start of this particular instruction. Therefore, the W-bit is a specific function of the instruction in the current instruction register 21 and determines whether to add or subtract the controlled CIR bit. This yields either the positive or the negative of the 4-,5-,6- or 8-bit field previously described in connection with the different formats and provides a full 16-bit operand stored into register 14*a*. It should be noted that, starting with a sign and magnitude form of instruction (i.e., all operands, arguments and K-fields are given as positive numbers), and that by doing the subtraction in pre-adder 30, the full 15-bit twos-complement form of instruction is produced. Also, it should be noted that a zero is stored in register 14b because a base register is not needed on non-format f instructions. Therefore, on the next cycle, in the pipelined operation as previously described, the contents of register 14*a* (i.e., the effective output of the pre-adder 30, negated, if desired) is added to the contents of register 14*b* (previously described to be zero) in the ALU 16, the output of the ALU 16 is the operand in either 4- or 16-bit positive, or 16-bit twos-complement form and is available on the U-bus unshifted, so that on the first micro-instruction, the actual desired operand is available in similar manner to the actual desired effective address being available for use in memory reference instructions as previously described. Therefore, when executing the first line of microcode in a microprogram from ROR[6] of the first rank, the R- and S-fields can specify and U-bus option at the output of shifter 18, which is either on a memory reference to the effective address or on a non-memory reference to the operand that we are interested in. This may be read in to start operation right away on the first cycle. Alternately, the output of pre-adder 30 as it was stored previously in the register 14a may be selected at any other time during the microprogram. Therefore, this operand is always available during the execution of an instruction.

Shifting Scheme for Arithmetic Operations

Referring to the FIG. 2 implementation of the shifting scheme and the central processor, the circuit relationships are shown for the divide-subtract step and the multiply-add step operations in the micro-instruction set. The shifting scheme involves the two pipeline registers 14*a* and 14*b*. Register 14*a* is not only a parallel-load register, but is also a shift-left register and register 14*b* is a parallel-load and a shift-right register. The arithemtic logic unit (ALU) 16 is utilized for the multiply-add and dividesubtract steps. The shifter 18 is used in various modes depending on whether single, double or triple-word shifting is involved, as shown in the FIG. 66 detailed portion of the FIG. 2 simplified block diagram. The scratch-pad 1 (SP1) register 42 within the register file 10*a* is a shift-left and parallel-load register.

There are three modes of shifting of single words involved. In a logical shift, the end conditions are such that the bit going off the end in the direction of the shifting is lost and a logical zero is brought in to fill in open bit places. In arithmetic shifts, the sign bit which is bit zero of the word remains what it is and the shift is either left into the sign bit (i.e., leaving the sign bit alone and filling in with zeros from the right hand end into bit 15), or it is an arithmetic shift right, in which case the sign bit propagates into bit one as the bits are shifted toward the right hand end. In circular shifting the bit that comes off one end gets fed into the other end. Thus, of the logical, arithmetic and circular shifting, there can be either shifting left or shifting right.

Figure 66:
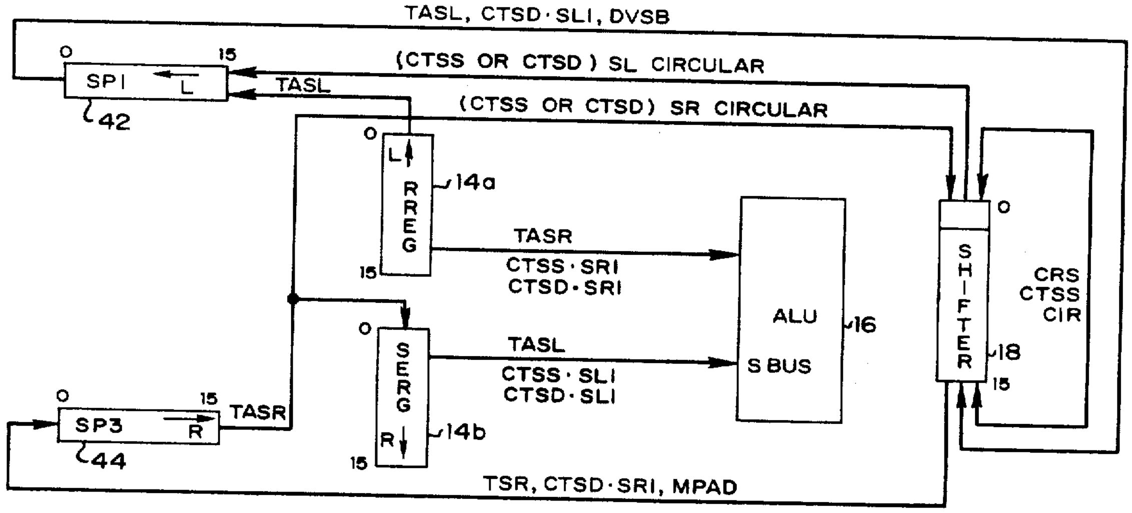
FIG. 66: | Shifting Scheme Block diagram; |
|

In the present apparatus, the single-word shifting operations involve the shifter 18. It includes circuitry in the end bits 0 and 15 of the shifter, as shown in FIG. 66, that perform the operations needed for maintaining the sign bit in arithmetic shifts and for bringing the end bits around on circular shifts. The operations of the shifter 18 are defined by the shift field which comes from the RORT 8 and the shift decoder 48. These operations are as follows. The shifter 18 can either pass the 16-bit word from the output of the ALU 16 through to the U-bus without any shifting, or with a shift left, one place or a shift right, one place. Also, shifter 18 can interchange the two 8-bit bytes, so that bits 8 to 15 come out on bits zero to 7 or so that bits zero to 7 come out on bits 8 to 15. It can also interchange the two bytes and zero the bits 8 to 15, or interchange them and zero the bits zero through 7. Also the shifter 18 can pass the bits 8 to 15 straight through and zero the remaining bits, or it can pass the bits zero through 7 straight through and zero the bits 8 to 15. All combinations of passing through and zeroing on bytes are documented in the shift field, as outlined in Appendix 1.

In addition, controls to do the multiple word shifts and the multiplies and divides are provided by the decodings out of the function field decoder 46, as outlined in Appendix 1. The designators in the function field so outlined include TASL, TASR (triple arithmetic shift left, triple arithmetic shift right), CTSD (controlled shift double), CTSS (controlled shift single), CRS (circular shift), DVSD (divide subtract), MPAD (multiply, add), and others. In order to do double word shifts, a shifter in addition to shifter 18 is required so the output of the shifter 18 is fed back to either register 42 or register 44, depending on whether the shifting is left or right, to do double word shifts. Shifter 18 and register 42 do a double word shift left, and shifter 18 and register 44 do a double word shift right. Shifter 18 always contains the most significant bits on either double or triple word shifting. Thus, as shown in FIG. 66, the nomenclature TASR and CTSD anded with shift-right one (SR1) indicates that when either triple or arithemetic shift-right, or a controlled shift-double and a shift-right, the SR1 will be controlling shifter 18 and the CTSD will be controlling the operation of scratch pad three (SP3). Controlled shift-double and controlled shift-single are just functions that indicate either a single shift or a double shift and whether it is circular arithmetic or logical. These functions come from the current instruction register 21 with the format for shift instructions indicated at format c in FIG. 2. The SUB OP 1 bits of format c instructions determines the desired shift either circular, arithemtic or logical. Control designation CTSS indicates a shift for single words and therefore affects only shifter 18. Control designation CTSD indicates a shift for double words and affects shifter 18 and the registers 42 and 44. For triple shifts, three words or 48 bits are required and this is accomplished in response to a TASL instruction (a triple arithmetic shift left) by shifter 18, register 42 and additionally register 14*a*, the triple shift in response to a TASR instruction (a triple arithmetic shift right), is accomplished by shifter 18, register 44 and additionally register 14*b*. It should be noted that the instructions on the control lines from registers 14*a* and 14*b* appear to be reversed, i.e., the TASL instruction appears on the lower or S-bus input to the ALU 16. This indicates that a triple arithmetic shift left places the most significant bit to be shifted by shifter 18 is placed into the S-register 14*b*. Therefore, the most significant bit will pass through the arithmetic logic unit (ALU) 16 and be shifted by shifter 18. The intermediate significant bits or middle bits of the triple word will be held in scratch pad one (SP1) 42. And, the least significant bits of the triple word will be held in the R-register 14*a*. Thus, in this example, the total 48-bit triple shift left is accomplished by shifter 18, and registers 42 and 14*a*. The triple shifts are only arithmetic, so on a triple arithmetic shift left, for example, zeros are brought into bit 15 of register 14*a* to complete the sequence and the sign bit (i.e. bit zero) of the shifter 18 would remain the same as in an arithmetic shift. For a triple arithmetic shift right, the most significant word being shifted is placed in the register 14a and passes through the ALU 16 to be shifted by shifter 18. This interchanges where the most significant bits are held depending on whether it is shift-left or shift-right. Similarly, on a triple arithmetic shift right, the shift is through scratch pad three (SP3) 44 and register 14*b*. In the case of the shift right, the sign bit or zero bit is propagated to the right to bit one of shifter 18, as in a normal arithmetic shift. Note that for double word shifts it is not important what is stored in the other of the registers 14*a* or 14*b*. For controlled shift double, left shift, the most significant bits are put in register 14*b*, and in the controlled shift double, right shift, the most significant bits are put in register 14*a*, as in the triple shift. This will also be true for controlled shifts single, left and right.

The circular shifting occurs only on single or double words, not on triple words. One of the instructions is a controlled shift double, circular shift which is accomplished over signal paths from both ends of shifter 18 to the scratch pad one (SP1) and scratch pad three (SP3). Additionally, circular shifts on single words are accomplished over the signal path between the ends of shifter 18, in a manner as previously described. Thus, the single and double word instructions, for example, cause CTSS CTSD the bits in the current instruction register 21 to be decoded and placed on the right control lines so that the microcode does not have to interpret these bits. They merely appear in the function field in the CTSS instruction or the CTSD instruction with the appropriate direction specified in the shift field in order to perform the desired shifting in connection with the arithmetic operations previously described.

READ AND LOCK MEMORY OPERATION

In multiprocessor configurations of computers, there is a need to prevent more than one central processor from executing the same critical section of the program at the same time. Some means is necessary to prevent or lock out all but one central processing unit (CPU) from this critical section of the program. Traditional solutions in the past have included tying up the memory with a set and lock operation whereby the memory is accessed by one CPU and the entire memory is locked up during the time that CPU is allowed to lock the lockword. In this way, no other CPU can access any part of the same memory module. This has the disadvantage that no other CPU can use this entire block of memory, however big it may be, during the time that the first CPU is checking the particular lockword associated with the critical section.

Figure 67:
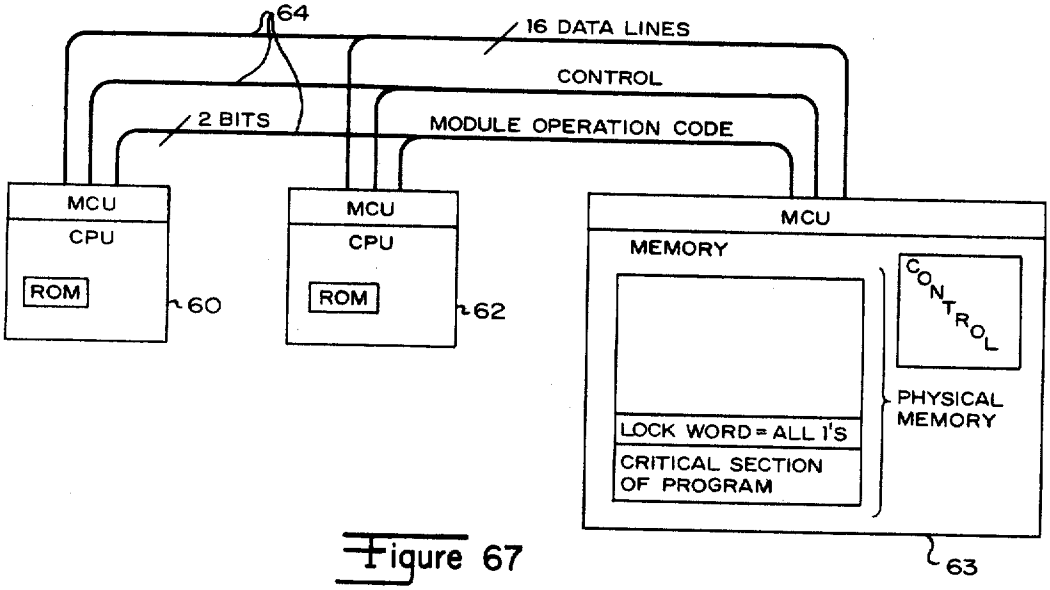
FIG. 67: | Read and Lock Memory; |
| FIGS. 68 through 77h have been cancelled but the numbers are being retained so that all figures appear in sequence. | |
|

In accordance with the present invention, one CPU can automatically test and set a lockword into the lock condition without tying up the entire memory. The CPU can test the word, decide from this word whether it is privileged or allowed to access the following critical section and not tie up the rest of the memory module during this time. Referring now to FIG. 67, there are shown two central processors, i.e., CPU 60 and CPU 62, which are arranged through the data and control lines 64 to access the memory module 63. Each CPU 60, 62 according to the present invention has a module control unit MCU as previously described, which governs access of the respective module onto the common bus 64. This common bus or module control unit bus includes sixteen data lines over which addresses and data can be sent to and from memory and includes a number of control lines for conducting the module operation code. This is a two-bit operation code which allows the central processor 60, 62 to give an instruction to memory 63 to establish the type of operation to be performed. Such instructions may include a do-nothing or no-operation instruction and may include a read-restore operation in which a selected word is read out of the memory and is returned to the CPU that requested it. For example, CPU 60 may send an address over the bus 64 to memory 63 with the operation code that requests the contents of word 100, as an example. The memory 63 then reads out the contents of word 100 and returns it over the sixteen data lines of the bus 64 to CPU 60. If a core memory 63 is involved, the word is written back into the core to complete the read-restore operation. Another instruction is store or clear-write instruction by which a CPU sends an address to the memory 63 over the bus 64 and the operation code sent with it is clear-write. This causes the memory 63 to read the word out and clear out its data register and allows the CPU to send a new data word over the bus 64 to be stored into that address in the memory. Thus, in core memory, the instruction clear-write involves reading out the word (which clears the word, effectively) and then writing new data back in.

The fourth instruction involved in the present invention, is the read-and-set-to-all-ones operation. The CPU desiring to get into the critical section of the memory, first accesses the lock word with this particular operation code. For example CPU 60 will send the address of the lock word to memory 63 over the bus. The MCU will recognize the read-and-set-to-all-ones code and tell the memory control to read out the addressed word, return it over the MCU bus to CPU 60 and at the same time write all ones back into that location of the lock word in memory. The word addressed is now locked, since all ones implies a locked condition. While CPU 60 is looking at what was originally in that location, CPU 62 via its MCU and the MCU bus may request that that particular locked word be read out and set to all ones. Memory 63 will read the word out, send it back to CPU 62 and CPU 62 will find that the word was already all ones. Therefore the word in memory will not be harmed by being set to all ones when it is thus rewritten by the memory. Thus CPU 62, when it looks at the word returned by the special operation code will find that the word returned by the code was locked whereas, CPU 60 found that the word was unlocked. CPU 60 gained access to the critical section of memory on a first come, first served basis and prevented CPU 62 from getting into the same area.

This operation had to be a primitive operation, i.e., an operation that occurs all at once and is therefore uninterruptable. The word was read out and written back in all at once so that one CPU cannot read the word out and then while it is testing for a lock condition before writing all ones back in, another CPU cannot come and do the same thing. Otherwise therefore, both CPU's would believe they had access and had been the only one to set a lock word. In that situation both would start executing the critical section of the program, which is undesirable. This problem occurs in a multiprocessing computer where there is more than one CPU operating at once. If the memory is a core memory, the read-and-set-to-all-ones operation can be very simple. One can arrange the memory states such that when a word is read out of a core memory, the contents of the cores appear as all ones. Then if a CPU does another read of that same word, it will find all ones there. The preferred embodiment is so arranged, and it thereby gets an automatic set to all ones, if it does the read portion of the destructive read out cycle and does not write data back. Therefore, set-to-all-ones is an easy operation. Of course some other memory technology might require an explicit writing of ones back in.

APPENDIX 1

ALPHAMIC MICROPROGRAMMING LANGUAGE FOR THE PREFERRED EMBODIMENT OF THE COMPUTER OF THE PRESENT INVENTION (Note: As used in this and the following appendices, the word "Alpha" refers to the preferred embodiment of the computer of the present invention.)

A BRIEF EXPLANATION OF THE MICROINSTRUCTION FIELDS

There are nine fields in the microinstruction:

The LABEL field may be any characters in columns 1–4 provided that the first character is not the blank character, an asterisk (*), a number sign ( # ), or a slash (/). The asterisk indicates a comment card which will appear on the listing but not affect the assembly. The number sign indicates the end of an ALPHAMIC assembly. The slash forces the next assembled word to reside in the location immediately following the slash. If no number is present after the slash, the next assembled word will be assembled to the start of the next 256 word sector boundary point.

The R-BUS field in columns 6–9 points to the register to be placed in the R-BUS register.

The S-BUS field in columns 11–14 points to the register to be placed in the S-BUS register.

The FUNCTION field in columns 16–19 gives the function that the arithmetic logic unit (ALU) is to perform on the two operands contained in the R-BUS and S-BUS registers or a special function.

The SHIFT field in columns 21–24 denotes how the information resulting from the ALU and placed on the T-BUS should be shifted and placed on the U-BUS.

The STORE field in columns 26–29 points to a register in which the contents of the U-BUS are to be stored.

The SPECIAL field in columns 31–34 has many varied uses which are best explained in that section of this document.

The SKIP field in column 36–39 denotes conditions of the CPU that logical decisions in the micro-program can be made.

TOP OF THE STACK

The stack has a topmost element which is LOGICALLY the quantity A. Similarly, there is a LOGICAL quantity B, C, and D corresponding to the second, third, and fourth word of the stack, respectively. The LOGICAL quantities A, B, C, and D may be either in registers or in memory. This is determined by the SR register. If the SR register is 0 then none of the logical quantities A, B, C, or D are in registers but rather they are located in memory locations (SM), (SM-1), (SM-2), and (SM-3), respectively.

At all times however, there are four registers RA, RB, RC, and RD, which are named by a hardware naming device. In the micro-program the micro-options RA, RB, RC, and RD refer to the hardware named registers and NOT TO THE LOGICAL QUANTITIES A, B, C, and D. There is a correspondence however. For any of the LOGICAL quantities A, B, C, and D, the state of SR indicates where it is located by A, B, C, and D, the state of SR indicates where it is located by the following table:

| SR | A | B | C | D |
|---|---|---|---|---|
| 0 | (SM) | (SM-1) | (SM-2) | (SM-3) |
| 1 | RA | (SM) | (SM-1) | (SM-2) |
| 2 | RA | RB | (SM) | (SM-1) |
| 3 | RA | RB | RB | (SM) |
| 4 | RA | RB | RB | RD |

Note then that if SR = 1, B is in (SM) and if the micro-op RB is used, the contents of the register named RD will be affected, NOT THE LOGICAL quantity B.

Six of the micro-ops regarding the stack must be clear. The micro-store field instruction PUSH does three things:

1. Stores the output of the shifter into the register RD.
2. Increments the SR register.
3. Renames the registers so that N(RA) : = RB, N(RB) : = RC, N(RC): = RD, N(RD) : = RA where N(RA) is read 'the name of RA'.

Similarly the micro-spec field instruction POP does two things:

1. Decrements the SR register
2. Renames the registers so that N(RA) : = RD, N(RB) : = RA, (N(RC) : = RB, N(RD) : = RC.

The micro-functions QUP, QDWN, MREG read and stores are fully explained in the field descriptions and should be used very seldomly since the stack will be preadjusted in most cases.

R-BUS Field

| | |
|---|---|
| (blank) | Zero is placed in the R-BUS register. |
| MREG | SP1(14:15) are added to the contents of the namer register to get a temporary name. This is used to reference a memory element that happens to lie in the TOS. Register SP1(14:15) contains S-B. A TOS used as a store option on the line immediately preceding this instruction will assume this temporary name. |
| PADD | The pre-adder contents is placed in the R-BUS register. |
| PL | The Program Limit register, PL, is placed in the R-BUS register. |
| RA | The register named RA by the hardware namer is placed in the R-BUS register. |
| RB | The register named RB by the hardware namer is placed in the R-BUS register. |
| RBUS | The R-BUS register is unchanged. |
| RC | The register named RC by the hardware namer is placed in the R-BUS register. |
| RD | The register named RD by the hardware namer is placed in the R-BUS register. |
| SP0 | Scratch Pad 0, SP0, is placed in the R-BUS register. |
| SP1 | Scratch Pad 1, SP1, is placed in the R-BUS register. |
| SR | The Stack Register counter, SR, is placed in the R-BUS register, preceded by 13 leading zeros. |
| UBUS | The output of the shifter or U-BUS is placed in the R-BUS register. |
| X | The index register, X, is placed in the R-BUS register. |
| XC | If the indirect bit of the current instruction is zero, then 0 is placed in the R-BUS register, otherwise the index register is placed in the R-BUS register. |
| Z | The stack limit Register is placed in the R-BUS register. |

NOTE: Indirect bit = $(CIR(4) \cdot \overline{Mem\ Ref} + CIR(5) \cdot Mem\ Ref) \cdot \overline{CL1BFF}$ S-BUS Field

| | |
|---|---|
| (Blank) | Zero is placed in the S-BUS register. |
| *CC | SBUS(8:9) : = STATUS(6:7) and if STATUS (6:7) = 00 then S-BUS(7) : = 1 else S-BUS(7) : = 0 All other bits of SBUS are zeroed. |
| CIR | The contents of current instruction register is placed in the S-BUS register. |
| CPX1 | Interrupt status register, active only when the micro-processor is in RUN mode, is placed in the S-BUS register. |

-Continued

| | |
|---|---|
| CPX2 | Interrupt status register, active only when the micro-processor is in HALT mode, is placed in the S-BUS register. |
| *CTRH | S-BUS REG(4:9) : = CNTR(0:5). This will be used mostly in floating point exponent manipulations. |
| *CTRL | S-BUS REG(10:15) : = CNTR(0:5) |
| DB | The data base register, DB, is placed in the S-BUS register. |
| DL | The data limit register, DL, is placed in the S-BUS register. |
| IOA | The I/O address register is placed in the S-BUS register. (Reads Interrupting Device NO.). |
| IOD | The I/O data register is placed in the S-BUS register. (Reads Direct Data Buffer). |
| MASK | The Mask register is placed in the S-BUS register. |
| MOD | A constant is brought to the S-BUS register in the following way: S-BUS(0:4) : = 0; S-BUS(5:7) : = Interrupting module number S-BUS(8:15) : = If CPU1 then 4 else 8. |

*Unless otherwise noted, remaining bits are zero.

| | |
|---|---|
| OPND | The operand register is placed in the S-BUS register. |
| P | The Program counter, P, is placed in the S-BUS register. |
| PADD | The pre-adder contents is placed in the S-BUS register. |
| PB | The Program Base register, PB, is placed in the S-BUS register. |
| Q | The Stack Marker Pointer register, Q, is placed in the S-BUS register. |
| QDWN | It takes the lowest TOS register and put it in the S-BUS register in the following way: the TOS registers are renamed by NAMER + SR. RD is dispatched to the S-BUS and TOS registers are returned to their former names. A TOS register used in the STORE field of the previously executed instruction will assume a temporary name. A DCSR Special Option is needed to complete the Operation. |
| RA | The register named RA by the hardware namer is placed in the S-BUS register. |
| RB | The register named RB by the hardware namer is placed in the S-BUS register. |
| RC | The register named RD by the hardware namer is placed in the S-BUS register. |
| RD | The register named RD by the hardware namer is placed in the S-BUS register. |
| SBUS | The S-BUS register is unchanged. |
| SM | The memory Top of Stack pointer register, SM, is placed in the S-BUS register. |
| SP1 | Scratch Pad register 1, SP1, is placed in the S-BUS register. |
| SP2 | Scratch Pad register 2, SP2, is placed in the S-BUS register. |
| SP3 | Scratch Pad register 3, SP3, is placed in the S-BUS register. |
| STA | The Status register, STA, is placed in the S-BUS register. |
| SWCH | The switch register contents is placed in the S-BUS register. |
| UBUS | The output of the shifter or U-BUS is placed in the S-BUS register. |

–Continued

Function Field

ADD The contents of the R-BUS and the S-BUS registers are added and the result is left on the T-BUS.

ADDO The contents of the R-BUS and the S-BUS are added and the result is left on the T-BUS. The overflow and carry bits are enabled. CCA is set from the U-BUS.

AND The logical AND of the R-BUS and the S-BUS is left on the T-BUS.

TASL Causes a 3 Register Arithmetic Shift left of the UBUS, SP1 and the R-BUS Register containing the most, middle, and least significant words, respectively, SL1 is required in the Shift field and the direction of the shift is left. The sign bit is preserved.

```
T-BUS : = SREG;
UBUS(0): = TBUS(0);
UBUS(1:14): = TBUS(2:15);
UBUS(15) = SP1(0);
SP1(0:14): = SP1(1:15);
SP1(15): = R REG(0);
RREG(0:14): = RREG(1:15);
RREG(15): = 0;
```

TASR Causes a 3 Register Arithmetic Shift Right of the UBUS, SP3, and the S-BUS Register containing the most, middle and least significant words respectively. SR1 is required in the shift field and the direction of the shift is Right. The sign bit is propagated.

```
TBUS: = RREG;
UBUS(0:1): = TBUS(0);
UBUS(2:15): = TBUS(1:14);
SP3(0): = TBUS(15);
SP3(1:15): = SP3(0:14);
SREG(0): = SP3(15);
SREG(1:15): = SREG(0:14);
```

BNDT This operation performs a hardware bounds test of an address. T-BUS : = R-BUS − S-BUS. If CARRY = 1, the next microinstruction is fetched. If CARRY = 0, and the machine is in user mode, a hardware micro-jump is made to address 2. BNDT takes precedence over the skip field.

CAD The 1's complement of the S-BUS is added to the R-BUS and the result placed on the T-BUS.

CADO Same as CAD with addition that the carry and overflow bits are enabled. CCA is set from the U-BUS.

CAND T-BUS : = R-BUS AND (S-BUS).

CRS The T-BUS is circular shifted right (SR1) or left (SL1) one bit and put on the U-BUS. U(O) : = T(15) if SR1, or U(15) : = T(0) if SL1. Implied T-BUS : = R-BUS + S-BUS.

CTSD Controlled shift double
This function performs a double register shift of the T-BUS and a scratch pad register. A left shift, indicated by an SL1 in the shift field, expects the least significant word in SP1. A right shift (SR1) expects the least significant word in SP3. The type of shift is determined from the contents of the CIR as follows. T-BUS : = R-BUS + S-BUS implied

| | | |
|---|---|---|
| | (CIR(7) = 1 | Circular shift |
| (21c) | (CIR(7:8) = 0,1 | Logical shift |
| | (CIR(7:8) = 0,0 | Arithmetic shift |

NOTE: Both SP1 and SP3 get shifted on CTSD.

CTSS Controlled shift single
The T-BUS is shifted in a manner determined by CIR(7:8) as follows. Implied T-BUS : = R-BUS + S-BUS.

| | | |
|---|---|---|
| | (CIR(7) = 1 | Circular shift |
| (21c) | (CIR(7:8) = 0,1 | Logical shift |
| | (CIR(7:8) = 0,0 | Arithmetic shift |

NOTE: The direction is determined by shift field.

DVSB This function performs the subtract, shift, and test necessary to implement a divide algorithm. To start, F2 = 0, the divisor is in the S-Reg., and the double word dividend is the R-Reg. (MSW) and SP1. SL1 must be in the shift field. One bit quotient comes in SP1(15).

```
DVSB ALGOL DEFINITION:
  TBUS: = RREQ (14a) − SREQ (14b);
  UBUS(0:14): = TBUS(1:15); <<BY SL1 in shift field >>
  If ALU carry or F2 = 1 then
    BEGIN
```

-Continued

```
(14a)   RREG(0:14) : = UBUS(0:14);        (output of 18)
        RREG(15) : = SP1(0);
(42)    SP1(0:14) : = SP1(1:15);
        SP1(15) : = 1;
(54)    F2 : = TBUS (0);                  (output of 16)

        END

    else

        BEGIN
          RREG (0:14) : = RREG(1:15);
          RREG(15) : = SP1(0);
          SP1(0:14) : = SP1(1:15);
          SP1(15) : = 0;
          F2 : = RREG (0);

    end
```

INC T-BUS : = R-BUS + S-BUS + 1

INCO Same as INC with the addition that the carry and overflow bits are enabled. CCA is set from the U-BUS.

IOR The R-BUS and S-BUS are logically ORed together and the result placed on the T-BUS.

JMP This function performs a micro-jump to the ROM address specified in bits 20 to 31 if the condition contained in the skip field is met. If the skip condition is not met, the next ROM instruction in sequence is fetched. Also, implied U-BUS : = T-BUS : = S-BUS. Execution requires two clock cycles for non-data-dependent SKIPS and 3 cycles for all data dependent SKIPS.

JSB This function causes a subroutine jump, and is executed like the JMP function with the following addition. The RAR register is stored into the SAVE register before the target address is transferred from the ROR. The return address is saved in the SAVE reg. Since there is 1 SAVE, subroutines may be nested only 1 deep.

MPAD Multiply Add
This function performs the shift, test, and add functions necessary to implement a multiply algorithm. To start, the multiplier is in SP3, the multiplicand is in the R-BUS register, and the S-BUS register = 0. An SR1 is required in the shift field. One bit result comes in SP3(0).
T-BUS : = R-REG (14a) + S-REG (14b); U-BUS(1:15) : = T-BUS(0:14) U-BUS (0) : = ALU carry (56); if SP3(15) (44) = 1, then S-Reg : = U-BUS, SP3(1:15) : = SP3(0:14); SP3(0) : = T(15); else S-REG(1:15) : = S-REG(0:14), SP3(1:15) : = SP3(0:14), SP3(0) : = S-REG(15).

MCU OPTIONS (override special field if there is 'BUSH', 'BSPO' or 'BUSL' in store field).

CMD MCU "to" lines and command Bus are taken from the CRL Register on the Bus transfer.

CRL Takes the MCU bus and stores it in the CRL register. It is used as BUSH CRL.

CWA Clear write address initiates a bus request for a memory and tells the memory that the data on the bus is an address, and that the data will be sent on the next transmission. Memory will hold the address in the memory address register. The memory will be busy for all modules until the data is received via the DATA using a high bus request.

NIR 'Next instruction Register'. NEXT in the skip field brings the new instruction in NIR.

OPND Takes information from MCU bus and puts it in OPND register (used) on BUSH OPND).

RNWA Read no write address initiates a bus request for a memory and tells the memory that the data on the bus is an address the contents of which is to be sent back to the OPND register and not to complete the write cycle leaving all ones in the word read.

RWA Read write address is the same as RNWA except that the original contents of the cell are restored.

RWAN Read Write Address and Next Instruction is the same as RWA except the results are returned to both the OPND and the NIR registers.

RWN Like RWA with the exception that instead of sending the memory cell contents of OPND register, it sends it in NIR (next instruction register).

–Continued

PNLR A control panel function. The appropriate register selected from the front panel is brought to the T-BUS through ALU. This is executed out of ROR2 giving garbage on the first cycle.

PNLS A control panel function. The U-BUS is stored in the appropriate register selected from the front panel.

NOTE: Store and SKIP field must be NOPS.

The following two functions are repeat commands and operate in the following manner. The microinstruction following the repeat command is executed over and over until the skip field condition of the repeated instruction is met. The instruction is then terminated and normal microprocessing proceeds. The skip field of the repeat instruction may not be used, except as shown below. The two repeat functions differ only in what they do during *their* execution, *not* in the operation of the repeated instruction.

REPC Normal repeat function that has implied T-BUS : = R-BUS + S-BUS.

REPN Send skip field contents to CNTR, CNTR(0) = 1, and implied T-BUS : = R-BUS + S-BUS.

ROM Bits 16–31 of this instruction are placed in the R-BUS reg. Implied T-BUS : = R-BUS + S-BUS. Note that immediate operand voids the shift, R, special, and skip fields.

ROMI Same as ROM except implied inclusive-OR of R and S BUS.

ROMN This function is like ROM except implied T-BUS: : = R-BUS AND S-BUS.

ROMX This function is like ROM except implied T-BUS : = R-BUS XOR S-BUS.

RPTY T-BUS : = R-BUS + S-BUS. This function reverses parity generation for diagnostic use only.

SUB T-BUS : = R-BUS – S-BUS.

SUBO Like SUB, except carry and overflow bits enabled. CCA is set from the U-BUS.

UBNT Unconditional bounds test. T-BUS : = R-BUS – S-BUS. If no carry, than a hardware jump to ROM ADDRESS 2.

XOR T-BUS : = R-BUS EXCLUSIVE OR S-BUS.

Shift Field (blank) No shift. U-BUS : = T-BUS.

LLZ "Left to left and zero" places the left byte of the T-BUS in the left byte of the U-BUS and places zeros in the right byte of the U-BUS.

LRZ "Left to right and zero" places the left byte of the T-BUS in the right byte of the U-BUS and places zeros in the left byte of the U-BUS.

RLZ "Right to left and zero" places the right byte of the T-BUS in the left byte of the T-BUS and places zeros on the right byte of the U-BUS.

ROT "Rotate" places the right byte of the T-BUS in the left byte of the U-BUS and the left byte of the T-BUS in the right in the the right byte of the U-BUS.

RRZ "Right to right and zero" places the right byte of the T-BUS in the right byte of the U-BUS and places zeros in the left byte of the U-BUS.

SL1 "Shift left one" shifts the T-BUS one bit left onto the U-bus. When used with TASL, CTSS, CRS, CTSD and DVSB in the function field, refer to those descriptions to determine the action taken. This option may be used alone to perform a single logical shift where zero is brought in and bit 0 is lost.

SR1 "Shift right one" shifts the T-BUS on right onto the U-BUS. When used with TASR, CTSS, CRS, CTSD and MPAD in the function field, refer to those descriptions to determine the action taken. This option may be used alone to perform a single logical right shift where zero is brought in and bit 15 is lost Store Field -Continued (blank) No store.
Stores U-BUS into the COR and into SP0. It disables the special field and enables the MCU options, one of which must be used. It issues a LO Request.

Bush Stores U-BUS in COR (CPU Output Register) and makes a BUS-III request. It disables the special field and enables the MCU options, one of which must be used.

BUSL COR : = U-BUS. Initiates a low request for the bus. It disables the special field and enables the MCU options, one of which must be used.

CTRH Counter high stores U-BUS (4:9) in the counter.

CTRL Counter low stores U-BUS (10:15) in the counter.

DATA Stores the U-BUS into the COR and issues a high request and transfers data to the module last addressed by the "TO" register.

DB Stores the U-BUS in the Data Base register, DB.

DL Stores the U-BUS in the Data Limit register, DL.

IOA Stores the U-BUS into the I/O Address register.

IOD Stores the U-BUS into the I/O Data register.

MASK Stores the U-BUS in the Mask register.

MREG The contents of Namer is added to two bits SP1 (14:15) to obtain temporary name. This is used to reference a memory element that happens to lie in the TOS registers. SP1 (14:15) contains S–E. TOS registers used in the R and S Fields following this instruction will assume the temporary name P Stores the U-BUS into the program counter, P.

PB Stores the U-BUS into the Program Base register, PB.

PL Stores the U-BUS into the Program Limit register, PL.

PUSH Stores the U-BUS into the RD register, increments the SR register by one and at the end of the microinstruction cycle renames the TOS registers such that:
N(RA) : = N(RB) : RC, N(RC) : = RD, N(RD) : = RA.

Q Stores the U-BUS in the Stack Marker Pointer, Q.

QUP The TOS registers are renamed by NAMER + SR. Temporarily named RA : = U-BUS. The TOS register names are returned to NAMER – however incrementing of SR is not implicit. INSR (inc. SR) must appear in the special field in order to increment SR. TOS registers used in the R and S fields following this instruction will assume the temporary name.

RA Stores the U-BUS in the register named RA at the beginning of the cycle.

RAR Stores U-BUS (4:15) in the RAR (0:11). This takes 3 cycles.

RB Stores the U-BUS in the Register named RB at the beginning of the cycle.

RC Stores the U-BUS in the Register named RC at the beginning of the cycle.

RD Stores the U-BUS in the Register named RD at the beginning of the cycle.

SM Stores the U-BUS into the memory stack pointer, SM.

SP0 Stores the U-BUS into scratch pad register 0, SP0.
SP1 Stores the U-BUS into scratch pad register 1, SP1.
SP2 Stores the U-BUS into scratch pad register 2, SP2.
SP3 Stores the U-BUS into scratch pad register 3, SP3.
STA Stores the U-BUS into the Status Register.
X Stores the U-BUS into the index register, X.
Z Stores the U-BUS into the stack limit pointer, Z.

Special Field

NOTE: If store field is "BUSH", "BSP0" or "BUSL" then *special field* is disabled and *MCU options field* is enabled.

(blank) No special option.

CCA Sets the condition code bits in the status word to

–Continued

CCL if T-BUS < 0.
CCE if T-BUS = 0.
CCG if T-BUS > 0.

| | |
|---|---|
| CCE | Sets the condition code bits in the status word to CCE. |
| CCG | Sets the condition code bits in the status word to CCG. |
| CCL | Sets condition code bits in status word to CCL. |
| CCPX | Clears the interrupt status register (CPX1) bits as specified by the true bits on the U-BUS. |
| CCRY | Clear the carry bit in the status word. |
| CCZ | Sets condition code bits in status word to CCE if U-BUS = 0 and CCG if U-BUS not equal 0. |
| CF1 | At the end of the cycle, CF1 clears Flag 1. |
| CF2 | At the end of the cycle, CF2 clears Flag 2. |
| CF3 | At the end of cycle, CF3 clears Flag 3. |
| CLIB | At the end of the cycle, CLIB clears the indirect line until a NEXT option is encountered. |
| CLO | At the end of the cycle, CLO clears the oveflow bit in the status word. |
| CTF | Stores the ALU carry in Flag 1 at the end of the cycle. |
| DCSR | Decrements the SR counter by 1. |
| DECN | Decrements the Namer RA←RB, RB ← RC, RC ← RD, RD ← RA; |
| FHB | U-BUS (0) : = FLAG 1 |
| HALT | Enables the front panel by setting CPX(0) : = 0. |
| HBF | Flag 1 : = U-BUS (0) |
| INCT | Increments the counter by 1 (modulo 64). |
| INSR | Increment SR by 1. |
| LBF | Low bit to flag 2. F2 : = U-BUS (15). |
| POP | This option decrements the SR by 1 and then renames the TOS registers such that: N(RA) : = RD, N(RB) : = RA, N(RC) : = RB, N(RD) : = RC. |
| POPA | Exactly like POP, except CCA is set on the contents of the U-BUS. |
| SCRY | Set the carry bit in the status word. |
| SDFG | Sets the dispatcher flag CPX2(12) : = 1. |
| SF1 | Sets flag 1 at the end of the cycle. |
| SF2 | Sets flag 2 at the end of the cycle. |
| SIFG | Sets the interrupt flag CPX2(11) : = 1. |
| SOV | Sets the overflow bit in the status word at the end of tye cycle. |
| SRO | Sets SR to zero, during the cycle. Note: No other SR operation during the cycle is allowed. |
| CCB | Sets CCB on contents of SP1 (8:15): CCL = Special, CCE = Alphabetic, CCG = Numeric |

NOTE:
CCL = STA (6:7) = 01
CCe = STA (6:7) = 10
CCG = STA (6:7) = 00

Skip Field

The skip field does one of two things:

–Continued

1. Sets the condition met flag or
2. Initiates a hardware micro-jump. A hardware micro-jump needs no jump target in the micro-instruction.

The condition met flag after a REPN or REPC function option indicates the condition on which to terminate the repeated micro-instruction. Otherwise it indicates that the next micro-instruction is to be skipped.

| | |
|---|---|
| (blank) | No skip option |
| BIT6 | Condition met if bit 6 of the U-BUS is a 1. |
| CRRY | Condition met if the carry out of the ALU is a one. (Note: this is *not* the carry bit in the status word.) |
| CTRM | Condition met if the counter is all ones. |
| EVEN | Condition met if the U-BUS (15) = 0. |
| F1 | Condition met if at the beginning of the cycle, flag 1 is set. |
| F2 | Condition met if at the beginning of the cycle, Flag 2 is set. |
| F3 | Condition met if flag 3 is set. |
| *INDR | Condition met if the indirect bit of the current instruction register is set. |
| JLUI | Conditional hardware microjump to the address that the lookup table is displaying if the indirect bit of the CIR is not set. CLIB must be used to guarantee a jump on all instructions. |

$*INDR = (CIR(4)\cdot\overline{MEM\ REF} + CIR(5)\cdot MEM\ REF)\cdot\overline{CLIBFF}$

| | |
|---|---|
| NCRY | Condition met if the carryout of the ALU is zero. (Note this is *not* the carry bit in the status word.) |
| NEG | Condition met if U-BUS (0) = 1. |
| NEXT | This function causes the hardware to get the next user instruction and decode it. If stackup A has just been executed and stackop B is not a NOP, then the hardware executes stackop B. Any other instructions in the CIR causes COR : = P and an RWN to be dispatched to memory. P : = P + 1. CIR : = NIR, and NIR awaits the data from memory. CIR is then decoded, the preadder adjusted and sent to the R-BUS register. This action primes the pipe for the first microinstruction fetch. Implies R-BUS + S-BUS during the first cycle. The S-BUS register contains a Base register in memory reference instructions. |
| NF1 | Condition met if at the beginning of the cycle, flag 1 is cleared. |
| NF2 | Condition met if at the beginning of the cycle, flag 2 is cleared. |
| NPRV | Condition met if at the beginning of the cycle the privileged mode bit is not set. |
| NSME | Condition met if all the bits of the T-BUS are not the same. |
| NZRO | Condition met if the T-BUS is non-zero. |
| ODD | Condition met if the U-BUS (15) = 1. |
| NOFL | Condition met if overflow out of the ALU does not occur. (Note that is *not* the overflow bit in the status word.) |
| POS | Condition met if the U-BUS (0) = 0. |
| RSB | Hardware micro-jump to the address held in the SAVE register. The SAVE register contents is transferred to the RAR register. |
| SR2 | Condition met if the SR register is 2. |
| SR4 | Condition met if the SR register is 4. |
| SRL2 | Condition met if the SR register is less than 2. |
| SRL3 | Condition met if the SR register is less than 3. |
| SRN4 | Condition met if the SR register is not 4. |
| SRNZ | Condition met is the SR register is non-zero. |
| SRZ | Condition met if the SR register is zero. |

–Continued

| | |
|---|---|
| TEST | Condition met if any interrupt is pending. |
| UNC | Condition met unconditionally. |
| ZERO | Condition met if the T-BUS is zero. |

APPENDIX 2

MNEMONICS AND ABBREVIATIONS USED IN THE DISCLOSURE

| | | | |
|---|---|---|---|
| Adrs | Address | IPOLL | Interrupt Poll |
| ALU | Arithmetic Logic Unit | IREQ | Interrupt Request |
| BUSH | Bus High | JMP | Jump |
| BUSL | Bus Low | LO SEL | Low Select |
| CHAN ACK | Channel Acknowledge | LREQ | Low Request |
| CHAN DATA | Channel Data | LSEL | Low Select |
| CHANSO | Channel Service Out | LUT | Look-Up Table |
| CIO | Control Input/Output | MAR | Memory Address Register |
| CMD | Command | MCU | Module Control Unit |
| Comp | Comparator | Mem | Memory |
| Cont | Controller | MOP | Memory Opcode |
| CPU | Central Processor Unit | NIP | Next In Process |
| CRL | Control | NOP | No Operation |
| CTO | Command TO | OPINP | Operand In Process |
| CW | Clear/Write | OPND | operand |
| DC | Device Controller | Prog | Program |
| DEVAD | Device Address | RAM | Random Access Memory |
| DEV # | Device Number | RAR | ROM Address Register |
| DPOLL | Data Poll | RDY | Ready |
| DRT | Device Reference Table | Reg | Register |
| DRTE | Device Reference Table Entry | REQ | Request |
| ENB | Enable | RIL | Reset Interrupt Level |
| EOT | End-of-Transfer | RIO | Read Input/Output |
| HI SEL | High Select | RNW | Read/No Write |
| HREQ | High Request | ROM | Read-Only Memory |
| HSDATA | High-Speed Data | ROR | ROM Output Register |
| HSEL | High Select | RR | Read/Restore |
| IACK | Interrupt Acknowledge | SEL | Select |
| IACTIVE | Interrupt Active | SI | Service In |
| Incr | Increment | SIL | Set Interrupt Level |
| Int Adrs | Interrupt Address | SIN | Set Interrupt |
| IOAW | I/O Address Word | SIO | Start Input/Output |
| IOCW | I/O Control Word | SMASK | Set Mask |
| IOHRQ | I/O High Request | SO | Service Out |
| IOINP | I/O In Process | SR | Service Request |
| IOLRQ | I/O Low Request | SRQ | Service Request |
| IOMOP | I/O Memory Opcode | STRB | Strobe |
| IOP | Input/Output Processor | TIO | Test Input/Output |
| IOPDATA | I/O Processor Data | WC | Word Count |
| IOSTRB | I/O Strobe | WIO | Write Input/Output |

APPENDIX 3

ALPHA EXTERNAL REFERENCE SPECIFICATION

SUBTABLE OF CONTENTS

Section I - System Introduction

Section II - System Hardware Modules

A. CENTRAL PROCESSOR MODULE
B. MEMORY MODULE
C. HIGH-SPEED CHANNELS MODULE
D. BUFFERED BUS COMMUNICATOR MODULE
E. MODULE CONTROL UNIT (MCU) AND DATA BUS

Section III - Descriptions and Formats

A. DEFINITIONS
B. CENTRAL PROCESSOR REGISTERS
C. ADDRESS SPACES (CODE SEGMENTS, STACKS)
D. ADDRESSING CONVENTIONS
E. INSTRUCTION FORMATS
F. DATA FORMATS
G. STACK MARKER FORMATS
H. PROGRAM LABEL FORMATS

Section IV - Tables

A. SEGMENT TABLE POINTER AND CODE SEGMENT TABLE
B. SEGMENT TRANSFER TABLE(STT)
C. CURRENT PCB POINTER (CPCB)
D. PROCESS CONTROL BLOCK (PCB)
E. DEVICE REFERENCE AND EXTERNAL INTERRUPT TABLE (DRT)
F. INTERRUPT STACK BASE AND LIMIT (QI and ZI)

Section V - Input/Output

A. CPU INSTRUCTIONS
B. SIO PROGRAMMING
C. I/O COMMAND CODES

Section VI - Interrupt and Trap Processing

A. EXTERNAL INTERRUPTS
B. INTERRUPT STACK AND DISPATCHER FLAGS
C. INTERNAL INTERRUPTS
D. TRAPS
E. POWER ON AND COLD START PROCESSING
F. SYSTEM HALF

SUBTABLE OF CONTENTS (CONTINUED)

Section VII - Instruction Set

A. LOAD INSTRUCTIONS
B. STORE INSTRUCTIONS
C. MEMORY REFERENCE INTEGER INSTRUCTIONS
D. BRANCH INSTRUCTION
E. CONDITIONAL BRANCHES
F. LOOP CONTROL BRANCH INSTRUCTIONS
G. INTEGER INSTRUCTIONS
H. LOGICAL INSTRUCTIONS
I. DOUBLE INTEGER INSTRUCTIONS
J. FLOATING POINT INSTRUCTIONS
K. BOOLEAN INSTRUCTIONS
L. TEST INSTRUCTIONS
M. INCREMENT AND DECREMENT INSTRUCTIONS
N. ZERO INSTRUCTIONS
O. DUPLICATE AND DELETE INSTRUCTIONS
P. EXCHANGE INSTRUCTIONS
Q. INDEX TRANSFER INSTRUCTIONS
R. INDEX ARITHMETIC INSTRUCTIONS
S. CONTROL INSTRUCTION
T. SINGLE WORD SHIFT INSTRUCTIONS
U. DOUBLE WORD SHIFT INSTRUCTIONS
V. TRIPLE WORD SHIFT INSTRUCTIONS
W. BIT TEST INSTRUCTIONS
X. FIELD INSTRUCTIONS
Y. IMMEDIATE INSTRUCTIONS
Z. IMMEDIATE INDEX INSTRUCTIONS

AA. PROGRAM CONTROL INSTRUCTIONS
BB. MOVE INSTRUCTIONS
CC. I/O AND INTERRUPT INSTRUCTIONS
DD. REGISTER CONTROL INSTRUCTIONS
EE. SPECIAL CONTROL INSTRUCTIONS
FF. LIST SEARCH INSTRUCTION
GG. LOAD LABEL INSTRUCTION
HH. PRIVILEGED MOVES
II. UNASSIGNED INSTRUCTION COMBINATIONS

APPENDIX A - ALPHABETICAL LISTING OF INSTRUCTIONS
APPENDIX B - NUMERICAL LISTING OF INSTRUCTIONS
APPENDIX C - FLOWCHARTS

SECTION I - SYSTEM INTRODUCTION

The ALPHA 1 is a computer system designed for efficient operation in a single or multi-processor/multiprogramming realtime environment. The operating domain for an executing program consists of a stack, an executing code segment and a global (or Common) data area.

The central processor contains address registers for specifying the location and limits of the currently operational address space. Direct addressing modes, with indexing, relative to these registers are provided into the stack and into the currently executing code segment.

Memory protection is provided to assure that all memory references remain within the address space assigned to the executing program. Changes to the address space may be made only when the CPU is in privileged mode under control of the operating system.

The hardware is organized on a modular basis with communication between modules occurring over an asynchronous, priority demand data bus. Modules consist of a central processor, memories, high speed channels, and other equivalent higher level devices. Peripheral devices transfer data to and from memory, or the CPU through and under control of the I/O processor portion of the CPU.

The system architecture incorporates a single bus concept. The maximum number of modules (7) and the communication rate are set to minimize cost and maximize the I/O capabilities of the machine.

Figure 78:
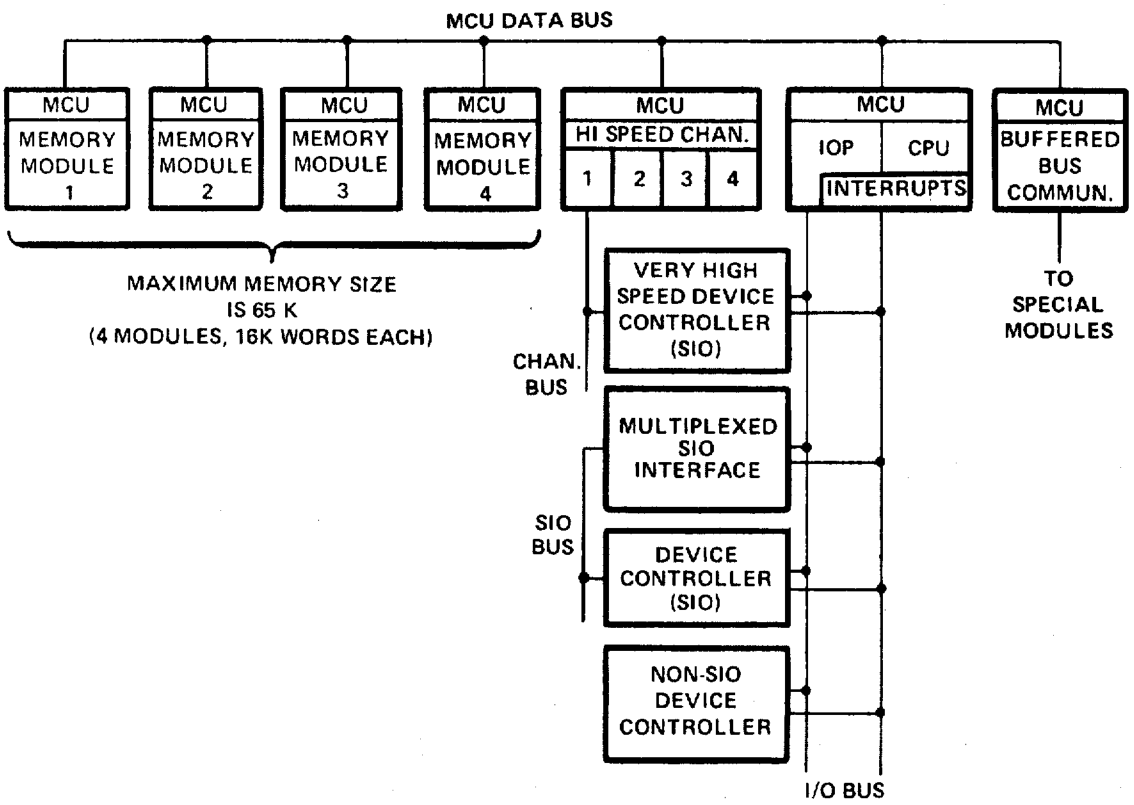
FIG. 78: | System Architecture; |
|

FIG. 78 gives a possible configuration.

SECTION II - SYSTEM HARDWARE MODULES

A. CENTRAL PROCESSOR MODULE

The CPU is a stack oriented processor designed to give both high code density and a flexible addressing structure suitable for a real time environment and a multiprogramming environment.

Figure 79:
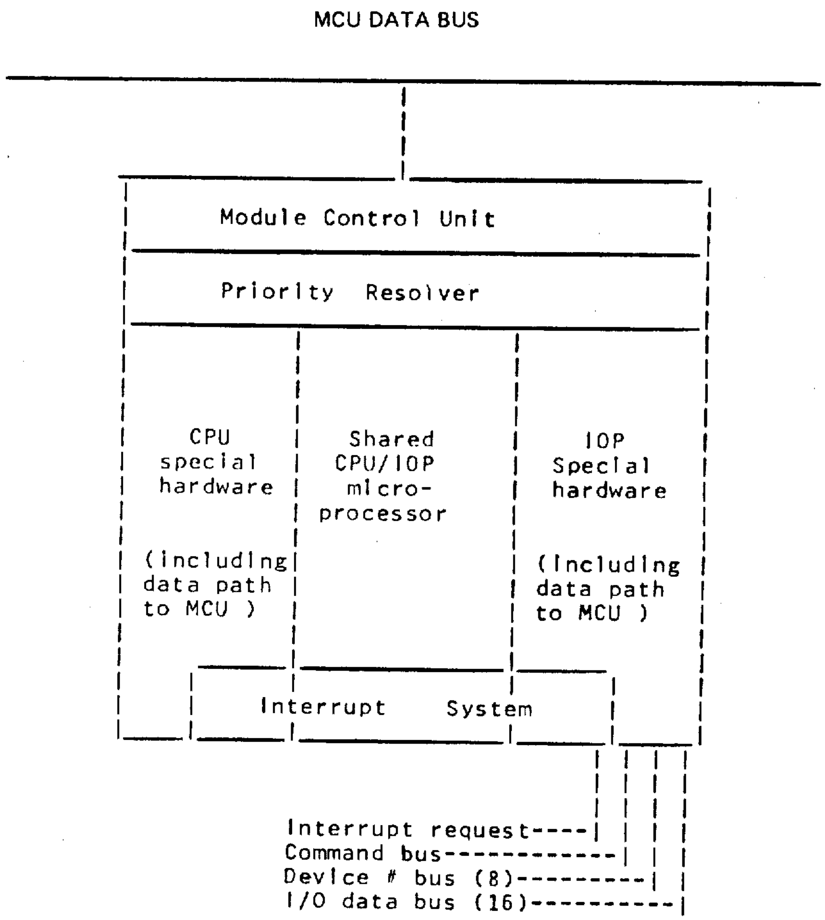
FIG. 79: | CPU/IOP Internal Organization; |
|

The internal organization of the CPU/IOP is designed to give the maximum I/O rate and flexibility at the minimum cost. To this end a major portion of the hardware of the CPU is shared with the IOP. FIG. 79 gives the general configuration.

B. MEMORY MODULE

A memory module may contain up to 65*k* words of any speed storage medium. The maximum addressable storage is 65*k* words.

The memory will run asynchronously to the bus except for communication on the bus. This will facilitate the addition of new memory technologies as they become available. All memory in a given module must be of the same type. A memory module will contain its own address and data registers.

C. HIGH-SPEED CHANNELS MODULE

This module is an optional port onto the internal data bus for high-speed input-output devices. This module will handle up to four channels with up to 8 devices per channel.

D. BUFFERED BUS COMMUNICATOR MODULE

This module presents a standard 16 bit interface from the bus to the outside world.

E. MODULE CONTROL UNIT (MCU) & DATA BUS

The MCU processes requests from the various modules to use the Data Bus. It controls the assignment of the bus time slices to the requesting modules on a two level priority basis. All communication on the Data Bus is synchronous with the MCU clock, although each module may be asynchronous to the other modules.

SECTION III — DESCRIPTIONS AND FORMATS

A. DEFINITIONS

TOS: Top of stack
CIR: Current instruction register
Condition codes

| | | |
|---|---|---|
| CCA sets | CC = CCL | if operand < 0 |
| | CC = CCE | if operand = 0 |
| | CC = CCG | if operand > 0 |
| CCB sets | CC = CCL | if special ASCII character. |
| | CC = CCE | if alphabetic ASCII character, upper & lower case. |
| | CC = CCG | if numerical ASCII character. |
| CCC sets | CC = CCL | if opnd1 < opnd2 |
| | CC = CCE | if opnd1 = opnd2 |
| | CC = CCG | if opnd1 > opnd2 |

B. CENTRAL PROCESSOR REGISTERS

DL: Data limit register — 16 bits
contains the absolute address of the first word of memory available to the user's data space.

DB: Data base register — 16 bits
contains the absolute address of the first location of the directly addressable global area of the stack.

Q: Stack marker pointer — 16 bits
contains the absolute address of the current stack marker being used within the stack.

SM: Memory stack pointer register — 16 bits
contains the absolute address of the last used core location of the stack.

SR: Register stack pointer register — 3 bits
contains the number of registers in the CPU which contain elements on the TOS.

S: Logical quantity which always points to the top element of the stack.
S = SM + SR Z: Stack limit pointer — 16 bits
contains the absolute address of the last word of memory available to the stack.

PB: Program base register — 16 bits
contains the absolute address of the first location of the code segment being executed.

P: Program counter — 16 bits
contains the absolute address of the instruction being executed.

PL: Program limit register — 16 bits
contains the absolute address of the last location of the current code segment.

X: Index Register — 16 bits
contains the index to be used when indexing is involved.

STA: Status register — 16 bits
Includes:

| M | I | T | R | O | C | CC | SEGMENT # |
|---|---|---|---|---|---|---|---|
| 0 | 1 | 2 | 3 | 4 | 5 | 6----7 | 8----------------15 |

where
M = Privileged/User (1/0) Mode Bit
I = Enable/Disable (1/0) External Interrupts bit
T = Enable/Disable (1/0) User traps bit
R = Right Stack Op pending bit - - set to 1 if execution will proceed with Stack Op B. It is not set if Stack Op B is a NOP.
O = Overflow bit
C = Carry bit
CC = Condition code
CCG = 00, CCE = 10, CCL = 01
SEGMENT = The double work index into the Code Segment Table (CST). This index is the segment number of the currently executing code segment.

C. ADDRESS SPACES (CODE SEGMENTS, STACKS)

The address space of a user is divided into separate areas for program code and data. The program code is partitioned into logical code segments, one of which is active in core while the remaining segments are inactive and may reside in core or in secondary store. The data area and the currently executing code segment are directly addressable while the rest of the code segments are callable through a virtual memory structure using program labels. Each code segment has a maximum size of 16K words while the data area may be up to 65K.

Figure 80:
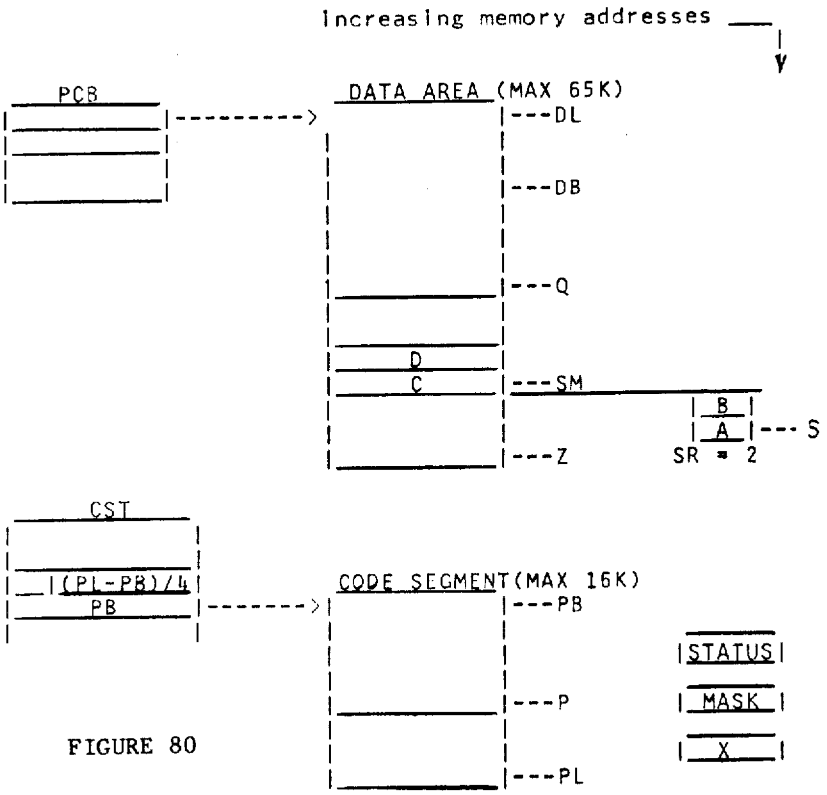
FIG. 80: | Code Segments Addressing; |
|

The active address space of a user (data area and executing code segment) are defined by hardware and are organized as shown in FIG. 80.

D. ADDRESSING CONVENTIONS

1. S relative

Operations use the top elements of the stack as implicit operand addresses and an address computed by subtracting the displacement from S. This mode will typically be used for accessing temporary variables in subroutines.

2. Q relative

Operations use the top of the stack as implicit addresses if needed and an address computed by adding (or subtracting) the displacement field to (from) Q. This is useful for parameter passing and local variable storage in procedures.

3. DB relative

Operations use the top of the stack as implicit addresses if needed and an address computed by adding a displacement field to DB. This is used for global variable addressing.

4. P relative

Operations use the top of the stack as implicit addresses if needed and an address computed by adding (or subtracting) the displacement to (from) P. This is used for branches, procedure calls, literals, etc.

Address computation

The following are definitions used throughout in discussing address computation:
E = Effective address
RA = Relative address = E - BASE
X = If the X-bit, CIR(4), = O then O else then content of the X register
S = SM + SR, where SM and SR are the CPU registers defined previously.
D = Displacement field of instruction word (See E-1 of instruction formats).

The following are the different cases of address computation and how the above quantities are computed.

1. Code, direct
E = P + D + X
or E = P − D + X
RA = E −PB

2. Code, indirect
E = (P +D) + X + P + D
or E = (P − D) + X + P − D
RA = E − PB

3. Data, direct
E = DB + D + X
or E = Q + D + X
or E = Q − D + X
or E = S − D + X
RA = E − DB

4. Data, indirect
E = (DB + D) + X + DB
or E = (Q + D) + X + DB
or E = (Q − D) + X + DB
or E = (S − D) + X + DB
RA = E − DB Bounds check:
If E lies outside of the following ranges, a trap will occur.
Code, direct or indirect
PB < = E < = PL
Data, direct
DL < = E < = SM (memory)
or SM+1 < = E < = S (TOS registers)
Data, Indirect
DL < = E < = SM (memory)
or SM+1 < = E < = S (TOS registers)

Bounds checking is applied according to the following table:

| | USER MODE | PRIVILEGED MODE |
|---|---|---|
| Program transfer | Yes | Yes |
| Operand read | Yes | No |
| Operand write | Yes | No |
| Stack overflow (SM > Z) | Yes | Yes |
| Stack Underflow (SM < DB) | Yes | No |

This gives the following address modes

| | |
|---|---|
| 1. P + D | 13. Q + D |
| 2. P + D + X | 14. Q + D + X |
| 3. (P + D) + P + D | 15. (Q + D) + DB |
| 4. (P + D) + X + P + D | 16. (Q + D) + X + DB |
| 5. P − D | 17. Q − D |
| 6. P − D + X | 18. Q − D + X |
| 7. (P − D) + P − D | 19. (Q − D) + DB |
| 8. (P − D) + X + P − D | 20. (Q − D) + X + DB |
| 9. DB + D | 21. S − D |
| 10. DB + D + X | 22. S − D + X |
| 11. (DB + D) + DB | 23. (S − D) + DB |
| 12. (DB + D) + X + DB | 24. (S −D) + X + DB |

– Continued

Addressing arithmetic is done module 65K words. One level of indirect addressing is allowed. Note that byte addressing is done in the following manner. The target address is calculated and checked for bounds if in user mode. If the test fails, 32K is added to the address and it is checked again. If still out of bounds, a trap is invoked. This allows DL-DB area access in non-privileged mode. However, in privileged mode, the first target address is used since bounds tests are ignored. Note that addressing P relative indirect uses self relative addressing, i.e., the address of the indirect cell to add to the contents of the indirect cell to obtain the final address.

E. INSTRUCTION FORMATS

Instructions may take one of eight formats. Please see Section VII for instruction descriptions.

1. Memory reference

| OP CODE | X | I | ADDRESS |
|---|---|---|---|
| 0------------3, | 4 , | 5 | , 6------------15 |

I Indirect bit

X Indexing to be used

If both X = 1 and I = 1 then post indexing will occur. The displacement is a positive quantity, giving sign-magnitude addressing modes.

Address decoding

| | |
|---|---|
| P+ | CIR (6:7) = 00<br>CIR (8:15) = Displacement<br>Range (P, P + 255) |
| P− | CIR (6:7) = 01<br>CIR (8:15) = Displacement<br>Range (P − 255, P) |
| DB+ | CIR (6:7) = 10<br>CIR (8:15) = Displacement<br>Range (DB, DB + 255) |
| Q+ | CIR (6:8) = 110<br>CIR (9:15) = Displacement<br>Range (Q, Q + 127) |
| Q− | CIR (6:9) = 1110<br>CIR (10:15) = Displacement<br>Range (Q − 63, Q) |
| S− | CIR (6:9) = 1111<br>CIR (10:15) = Displacement<br>Range (S − 63, S) |

| | | CIR 6 7 8 9 10 | 11 12 13 14 15 |
|---|---|---|---|
| P+ | relative | 0 0 | Displace. (0:255) |
| P− | relative | 0 1 | Displace. (0:255) |
| DB+ | relative | 1 0 | Displace. (0:255) |
| Q+ | relative | 1 1 0 | Displace. (0:127) |
| Q− | relative | 1 1 1 0 | Displace. (0: 63) |
| S− | relative | 1 1 1 1 | Displace. (0: 63) |

2. Stack & Control

| 0000 | STACK OP A | STACK OP B |
|---|---|---|
| 0----3 , | 4--------------9 , | 10------------15 |

Execution is from left to right (A first, then B). Interrupts may occur between execution of A and B.

3. Shifts, bit tests, conditional branches

| 0001 | Y | SUBOP 1 | ARGUMENT |
|---|---|---|---|
| 0------3, | 4 , | 5------------9, | 10--------------15 |

Note that in this format the Y bit, CIR(4), is a true index bit on the shift and bit test instructions, and is the indirect addressing bit for the conditional branches.

4. Immediate

| 0010 | SUBOP 2 | OPERAND |
|---|---|---|
| 0------3, | 4-----------7, | 8-------------15 |

5. Linkage and control instructions

| 0011 | SUBOP 3 | ARGUMENT |
|---|---|---|
| 0------3, | 4-----------7, | 8----------------15 |

6. Special Opcodes

| 0011 | 0000 | SPECIAL OP | K-FIELD |
|---|---|---|---|
| 0------3, | 4-----7, | 8-----------11, | 12-----------15 |

7. Move Opcodes

| 0010 | 0000 | MOVE OP | CCF | SDEC |
|---|---|---|---|---|
| 0------3, | 4-----7, | 8-----------10, | 11-----13, | 14-------15 |

8. Mini Opcodes

| 0010 | 0000 | MINI OP | RESERVED |
|---|---|---|---|
| 0------3, | 4-----7, | 8----------11, | 12---------------15 |

F. DATA FORMATS

Fixed point format: 16 bit, two's complement

| S | |
|---|---|
| 0 , | 1-------------------------------------15 |

(For double-word fixed point format, 16 magnitude bits are added on the right).

Logical format, 16 bit positive integer

| |
|---|
| 0-----------------------------------------------15 |

Floating point format, sign + magnitude representation

| S | E | F |
|---|---|---|
| 0 , | 1----------9 , | 10-------------------31 |

S = Fraction sign bit (0 for positive, 1 for negative)

E = Exponent + 256 (Range 0 to 511)

F = Fraction (Range 0 to (2**22) - 1)

Note: In sign + magnitude representation, the fraction is always positive with the S bit containing the sign of the number. The binary point is assumed to the left of bit 10 with an implied leading 1 to the left of the binary point. Thus all floating point numbers are stored in normalized form, but no bit is wasted on the leading 1, making all fraction bits significant. The exception is that 0 is a word containing all 0's.

Decimal value = (−1)**S*2**(E−256) * (1+F*2**(−22))

Decimal value = 0 when S = E = F = 0

Note the following special cases:

| | | | |
|---|---|---|---|
| 0 | 000000000 | 0000000000000000000000 | = 0 |
| 0 | 100000000 | 0000000000000000000000 | = 1 |

Definitions:

floor (X) = largest integer < = X sign (X) = 1, if X > 0

0, if X = 0

−1, if X < 0 exp (X) = floor (logbase 2 X ), if X ¬= 0 undefined, if X = 0 trunc (X) = sign (X) * floor ( X )

round (X,N) = 0, if X = 0

2 ** (exp (X) − N) * sign (X)* floor (2**(N-exp (X)) * X + 0.5), if X ¬= 0 where N + 1 is the number of significant bits

G. STACK MARKER FORMATS

| |
|---|
| X |
| RELATIVE P |
| STATUS |
| DELTA Q |

_S, Q

X = Contents of the Index Register

RELATIVE P = P+1 − PB (The instruction to be returned to)

STATUS = The Content of the Status Register.

DELTA Q = Value to be subtracted from the Q register to obtain the Q value of the caller.

H. PROGRAM LABEL FORMATS

External Program Label

| | | |
|---|---|---|
| 1 | STT Entry # | Segment # |

0 ,1---------------7 , 8------------15

STT Entry = Number to index from PL into the STT table to obtain entry point into the program segment. Segment = Logical entry number into the code segment table (CST).

Local Program Label

| | | |
|---|---|---|
| 0 | U | PB relative address |

0 , 1, 2---------------------15

U = Uncallable bit. When set to 1 this entry point is uncallable from a nonprivileged external segment. If so called, an interrupt to the system results. This bit is ignored when referenced from within the local segment or when in privileged mode.

SECTION IV — TABLES

There are several classes of tables resident in the Alpha operating system. They are classified below:

| NAME | MNEMONIC | # | LENGTH | WHERE |
|---|---|---|---|---|
| Code Seg. Table Pointer | CSTP | 1 | 1 | Fixed location 0 |
| Current PCB Pointer | CPCB | 2 | 1 | CPU # 1 Fixed loca. 4 CPU # 2 Fixed loca. 10 |
| Interrupt Stack Base | QI | 2 | 1 | CPU # 1 Fixed loca. 5 CPU # 2 Fixed loca. 11 |

-Continued

| NAME | MNEMONIC | # | LENGTH | WHERE |
|---|---|---|---|---|
| Interrupt Stack Limit | ZI | 2 | 1 | CPU # 1 Fixed loca. 6 CPU # 2 Fixed loca. 12 |
| Interrupt Reference Flag Counter | IRFC | 2 | 1 | CPU # 1 Fixed loca. 7 CPU # 2 Fixed loca. 13 |
| Device Reference and Ext. Interrupt Table | DRT | 1 | < = 253 | Fixed locations 14 — 1777 4 word entries, 253 max. |
| Code Segment Table | CST | 1 | < = 256 | Starts at location CSTB 2 word entries, 256 max. |
| Segment Transfer Table | STT | var | var | Dynamically allocated |
| Process Control Block | PCB | var | var | Dynamically allocated |

The entries in these tables are described below.

A. SEGMENT TABLE POINTER & CODE SEGMENT TABLE

The code segment table is actually the controlling table of the system. It resides at a location in memory (CSTP pointer) containing a known number of double word code segment descriptor entries determined at system generation time. Each entry contains control information about the segment and gives the length and starting address of the segment. Segment = 0 is reserved implicitly for external interrupt use and since each external interrupt has associated with it a PB1 in its DRT table entry, CST entry 0 is not needed; therefore, the first word of the zeroth entry in the CST contains the number of words (SDTL) in the CST, exclusive of the zeroth double word entry. The second word of the zeroth entry is unused. There are a maximum of 255 double word descriptors. The following items may be found in the Code Segment Table:

1. Monitor intrinsic
2. Library subroutines
3. Processors and shared programs
4. User programs (both segmented & non-segmented)
5. Internal interrupts and Traps Note that external interrupts reside in the DRT, not in the CST.

The entries of the CST have the following form:

| | | | | |
|---|---|---|---|---|
| A | M | T | R | L |
| ADDRESS | | | | |

0 , 1 , 2 , 3 ,4-----------------15

A = Absence bit, set to 1 if the code segment is absent from core.

M = Mode bit, set to 1 if segment is to be executed in privileged mode.

T = Trace bit, set to 1 if trace feature is used. This is checked only by the PCAL instruction.

R = Reference bit, set to 1 when this descriptor is accessed.

L = for an N word code segment, L = N/4 and PL = PB + 4 * L − 1. Note: N is always an exact integer multiple of 4 and that the maximum L = 2* * 12 − 1 = 4095. The maximum segment size, therefore is to 16,380 words.

ADDRESS = Absolute address of PB if the segment is present, otherwise it indicates the absolute disc address.

B. SEGMENT TRANSFER TABLE (STT)

A segment transfer table is associated with each segment and appended to each generated program segment at load time. PL - addressing is used by the PCAL and LLBL instructions to access the table. It contains 1 word entries of two basic tpes which are the program labels having the formats given in section III - H. References to external programs segments use an External Program Label.

External Program Label Entry Format

| 1 | STT ENTRY # | SEGMENT # |
|---|---|---|
| 0 | ,1-----------------7 | ,8-----------------15 |

STT ENTRY # = Number to index from PL to obtain entry point into segment.

SEGMENT # = Logical entry number in CST.

References from within the segment or calls through external labels to this segment use the Local Program Label.

Local Program Label Entry Format

| 0 | U | PB Relative Address |
|---|---|---|
| 0 | , 1 | ,2----------------------15 |

U = Uncallable bit prevents calls from unprivileged external segments to this section of code.

PL entry (The last word of any program segment)

| 0 | U | 000000 | STTL |
|---|---|---|---|
| 0 | , 1 | ,2--------7 | ,8------------15 |

STTL = # of entries in this Segment Transfer Table (STT).

A transfer through STT entry # 0 implies that execution will begin at P = PB. Note: Any call outside the current program segment may only reference the first 128 entries in any other segment transfer table (PL, PL - 127), due to only 7 bits available in the External Program Label. Calls internal to the current program segment may reference any of the 255 entries.

C. CURRENT PCB POINTER (CPCB)

The current PCB pointer is one word of core in a dedicated location unique to each CPU which points to the process control block which is currently executing on that CPU.

D. PROCESS CONTROL BLOCK (PCB)

A process control block is associated with each process. This variable length block (entries to be defined) keeps track of the location of the process's stack area, etc.

E. DEVICE REFERENCE & EXTERNAL INTERRUPT TABLE (DRT)

Figure 81:
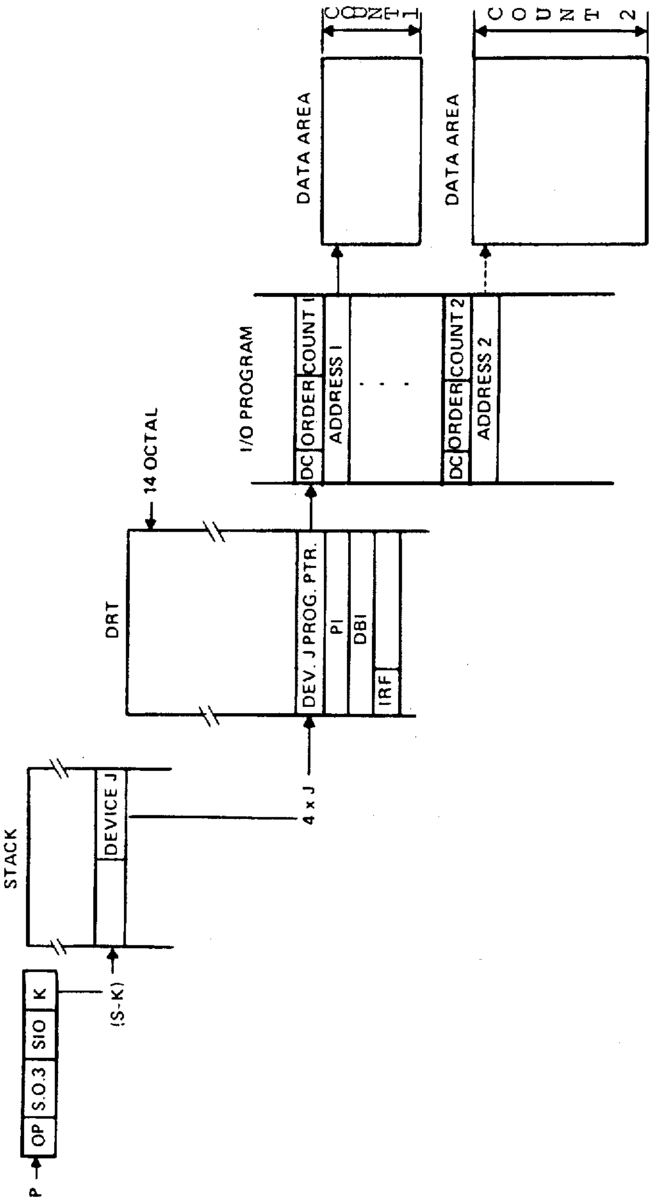
FIG. 81: | Device Reference and External Interrupt; |
|

This dedicated table contains one 4 word entry for each device number, up to the maximum of 253 devices, as shown in FIG. 81. The first word of each entry corresponds to a unique device and contains the address of the next I/O command instruction for that device. The second word of each entry contains the absolute program address PI at which execution will begin for that external interrupt, and the third word contains the absolute data base address DBI associated with that external interrupt. Bit 0 of the fourth word is the Interrupt Reference Flag, IRF. It may be set by the SIRF instruction to indicate the presence of an interrupt from the device. Note that device numbers 0, 1, 2 do not exist.

F. INTERRUPT STACK BASE AND LIMIT (QI & ZI)

These two dedicated locations point to the start and end of the memory area allocated to the interrupt stack.

FIXED MEMORY ALLOCATION

| Octal Location | Use | |
|---|---|---|
| 0 | CSTP → Code Segment Table | |
| 01 | Cold Load P | |
| 02 | | |
| 03 | | |
| 04 | CPCB 1 | |
| 05 | Q11 | |
| 06 | Z11 | |
| 07 | Interrupt Counter 1 | |
| 10 | CPCB2 | |
| 11 | Q12 | |
| 12 | Z12 | |
| 13 | Interrupt Counter 2 | |
| 14 | I/O prog. dev. 3 | I/O program address=4*device # |
| 15 | PI dev. 3 | PI address=4*device #+1 |
| 16 | DBI dev. 3 | DBI address=4*device #+2 |
| 17 | IRF Jev. 3 | IRF address=4*device #+3 |
| . | | |
| . | | Address calculation above is in octal. |
| . | | |
| 1774 | I/O prog. dev. 255 | Note that the DRT need contain only as many entries as there are devices on the system. |
| 1775 | PI dev. 255 | |
| 1776 | DBI dev. 255 | |
| 1777 | IRF dev. 255 | |

Code Segment Table

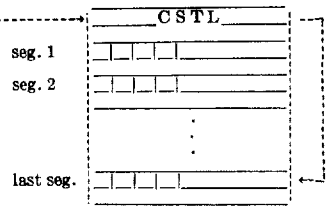

SECTION V - INPUT/OUTPUT

I/O programming is handled by a portion of the CPU microprogram along with special hardware which enables data transfer between devices and memory to proceed in parallel with normal CPU operation.

A. CPU INSTRUCTIONS

There are five CPU I/O instructions and addressing capability for 253 device controllers. The I/O instructions are: Start I/O (SIO), Read I/O (RIO), Write I/O (WIO), Test I/O (TIO), and Control I/O (CIO). They expect a device controller number in the stack. For TIO and for a rejected SIO, RIO or WIO a 16 bit device status word (DSW) is returned to the top of the stack.

Start I/O (SIO) causes the irritation of an I/O program pointed to by an entry in the Device Reference Table (DRT). The DRT is a table beginning in memory location percent 14 containing at most 253 four word entries. Each table entry corresponds to a unique device number and the first word contains the address of the next I/O command instruction for that device.

The execution of an SIO causes the transfer of the DRT entry specified by the instruction to be made to the corresponding device controller. The controller then assumes control of the I/O program execution and transfers data to and from the bus. Note that once the device operation has been initiated, the CPU is free to continue processing. Both tasks run concurrently until device termination caused by the appropriate I/O command instruction.

B. SIO PROGRAMMING

An SIO type transfer is initiated by the CPU executing a Start I/O instruction for the desired device, assuming that there is an I/O Command program stored in memory. The DRT entry associated with the device must be pointing to the beginning of the I/O Command program.

The I/O Command program consists of a set of doubleword instructions which controls the transfer of data between device and memory. The format of an I/O instruction doubleword is:

| | |
|---|---|
| IOCW | DC ORDER COUNT |
| IOAW | Data Address/Control Info/Sense Storage |
| | 0, 1----3, 4------------------------------------15 |

DC = Data Chain upon command execution complete. DC bit should be 1 if the ORDER code of the next sequential I/O program doubleword is the same as the current ORDER. This applies only to READ and WRITE ORDER codes.

ORDER = I/O operation code

IOCW (4) = used on conditional Jump and End.

COUNT = Logical transfer count-may be bytes, words or records depending upon the particular device controller. All standard controllers will use a word count. The count is a two's complement negative of the 12 bit count. This field may also be used for control information.

IOCW = I/O Command Word

IOAW = I/O Address Word the Transfer address or the control information or the storage for the returned status.

C. I/O COMMAND CODES

CONDITIONAL JUMP (000) if IOCW (4) = 1 a conditional jump to the address given by the IOAW is made at the discretion of the controller. If IOCW (4) = 0 an unconditional jump is made.

RETURN RESIDUE (001) This causes the residue of the count to be returned to the IOAW.

INTERRUPT (010) This causes the device controller to interrupt the CPU.

END (011) End of the I/O program. If IOCW (4) = 1 then the device controller also interrupts the CPU. Returns status to the IOAW.

CONTROL (100) This causes transfer of a 16 bit control word in the IOAW to the device controller, as well as the 12 bit count field.

SENSE (101) This causes transfer of a 16 bit status word from the device to the IOAW.

WRITE (110) This causes COUNT words of data to be transferred between core and the device starting at the address given by the IOAW.

READ (111) This causes COUNT words of data to be transferred between the device and core starting at the address given by the IOAW.

SECTION VI - INTERRUPT AND TRAP PROCESSING

A. EXTERNAL INTERRUPTS

Figure 82:
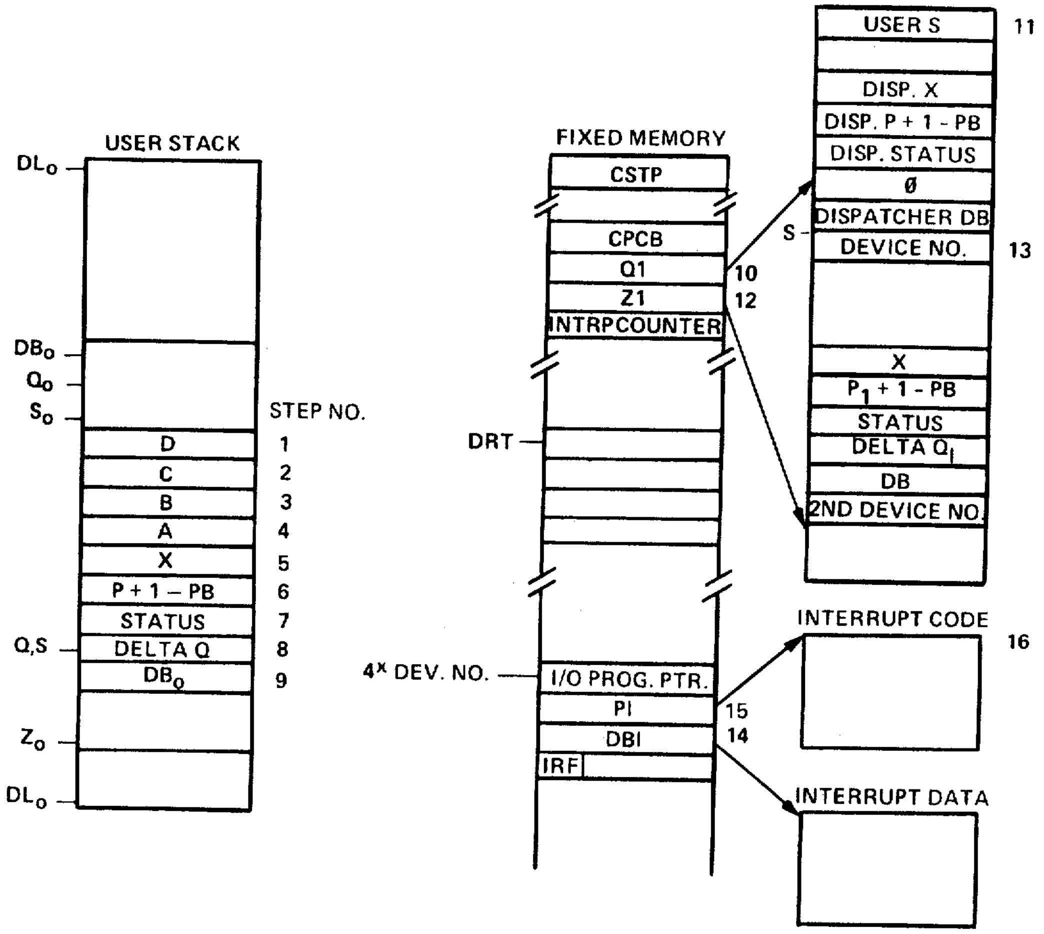
FIG. 82: | External Interrupt Processing; |
|
Figure 83A:
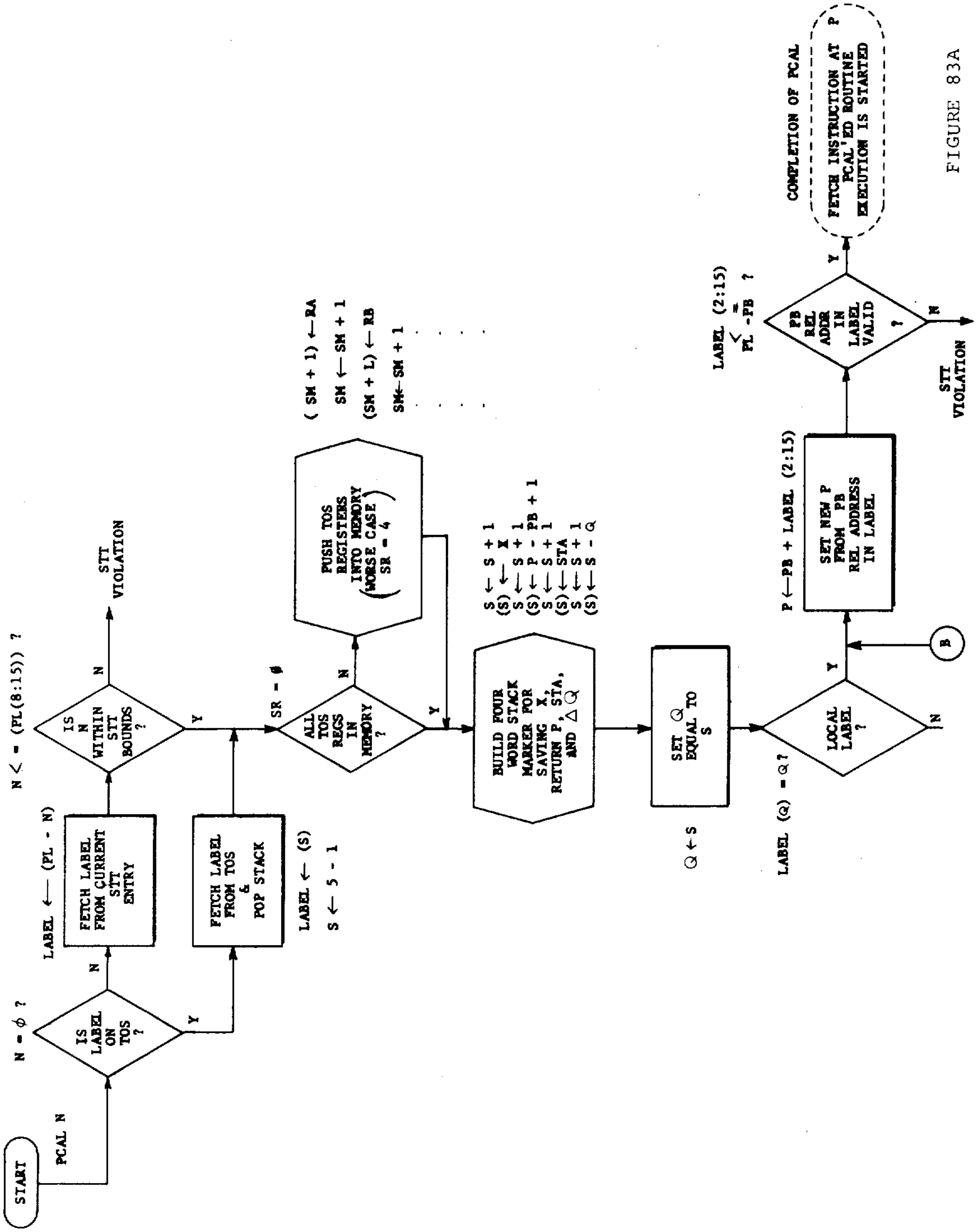
FIG. 83a–d: | Execution of P CAL N Flow Chart; |
|
Figure 83B:
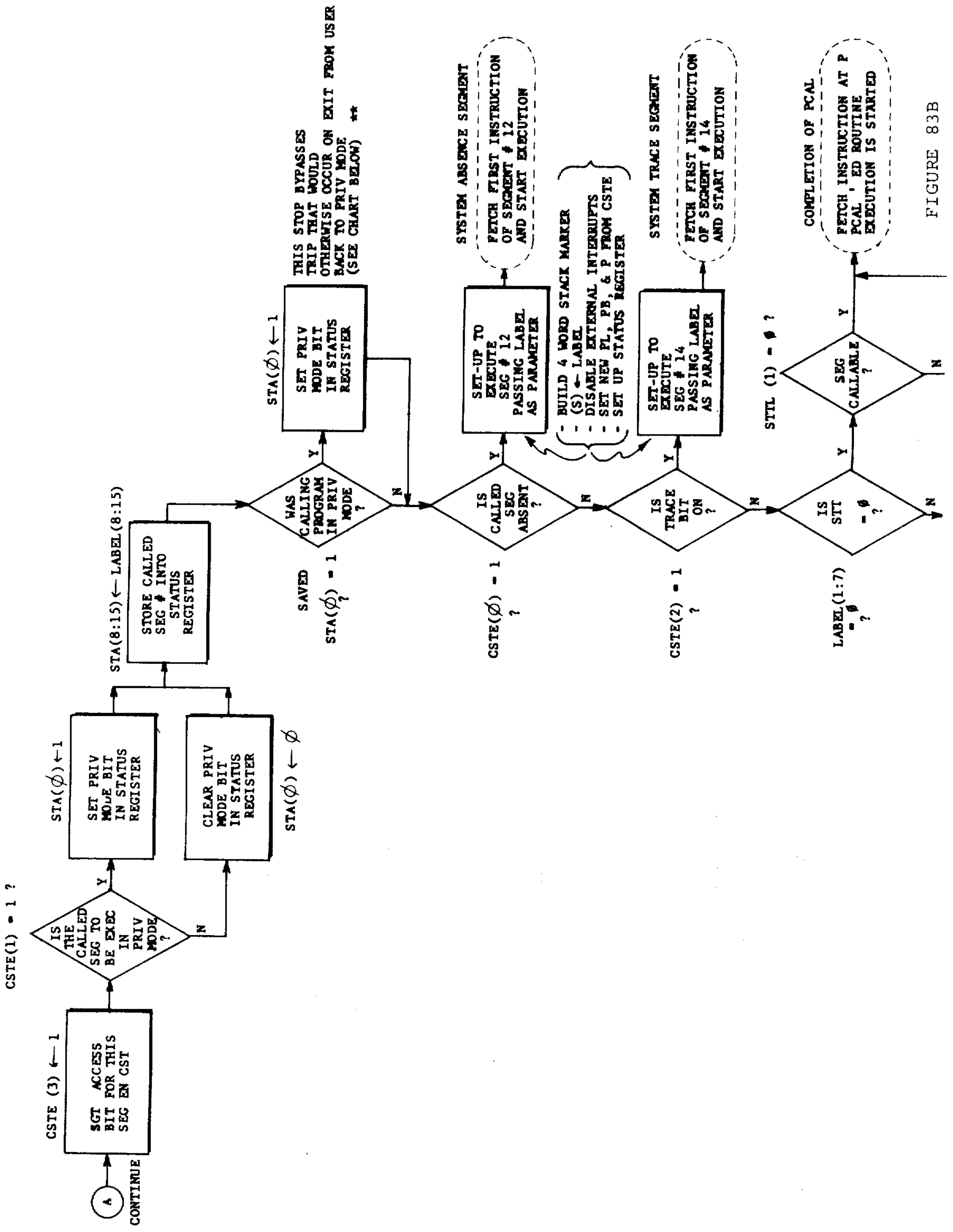
Figure 83C:
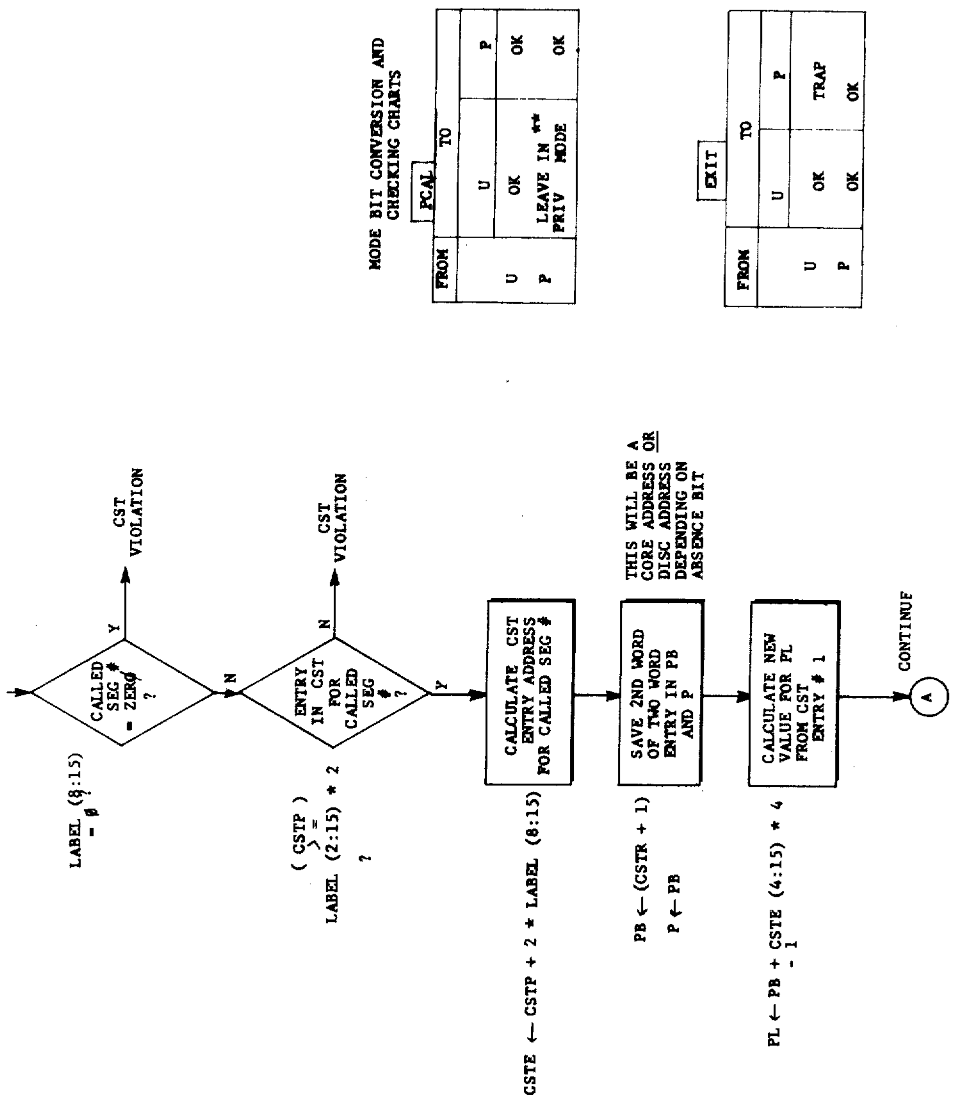
Figure 83D:
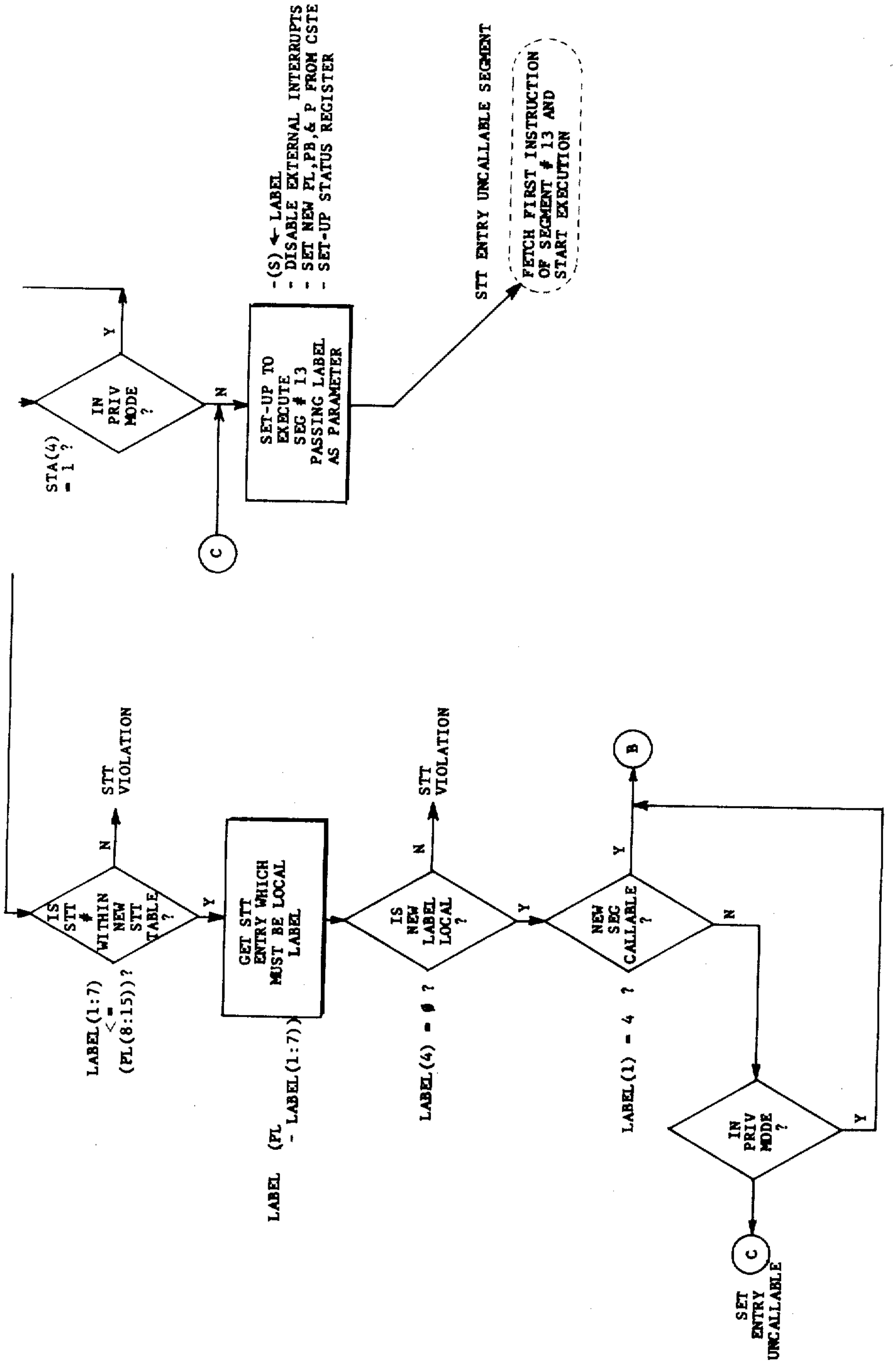
Figure 84A:
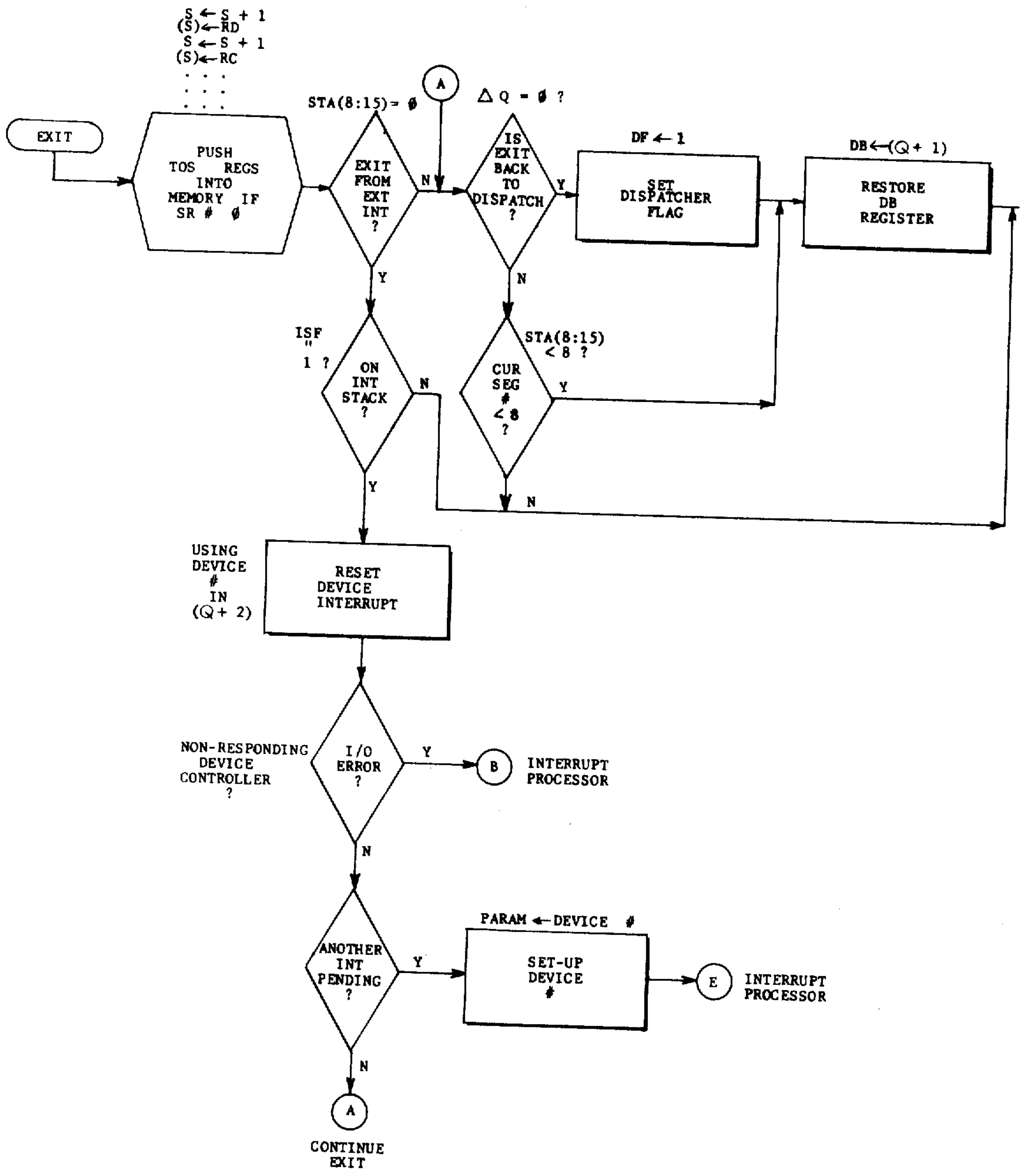
FIG. 84a–e: | Exit N; |
|
Figure 84B:
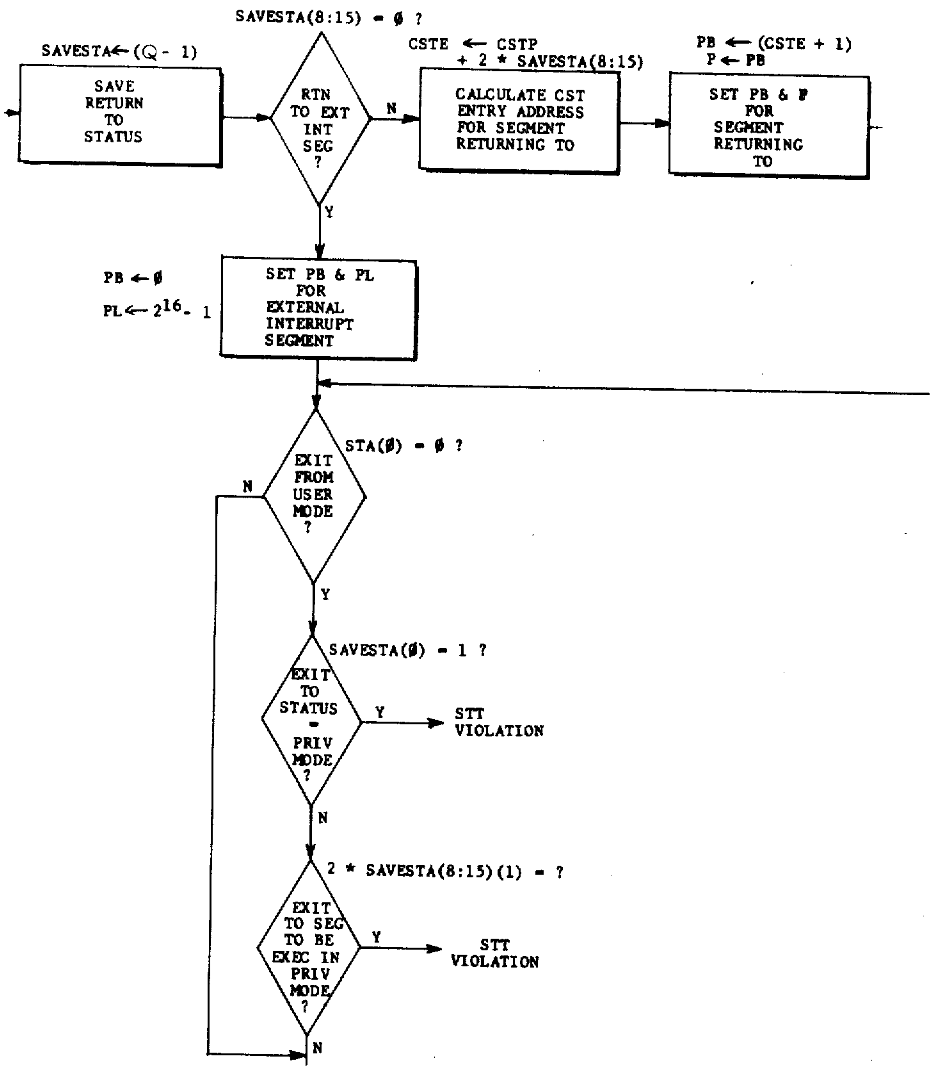
Figure 84C:
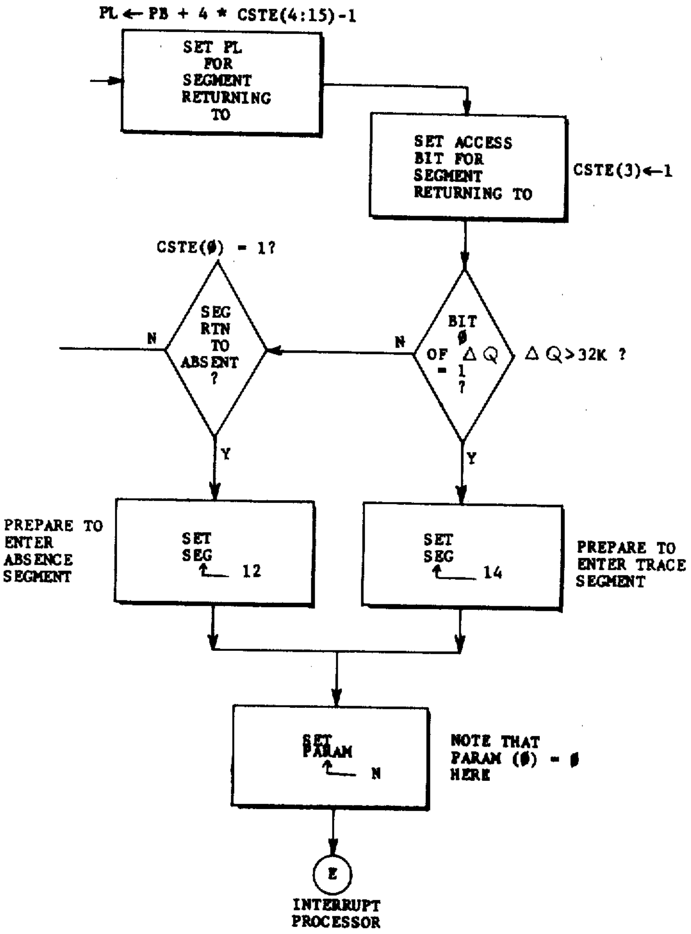
Figure 84D:
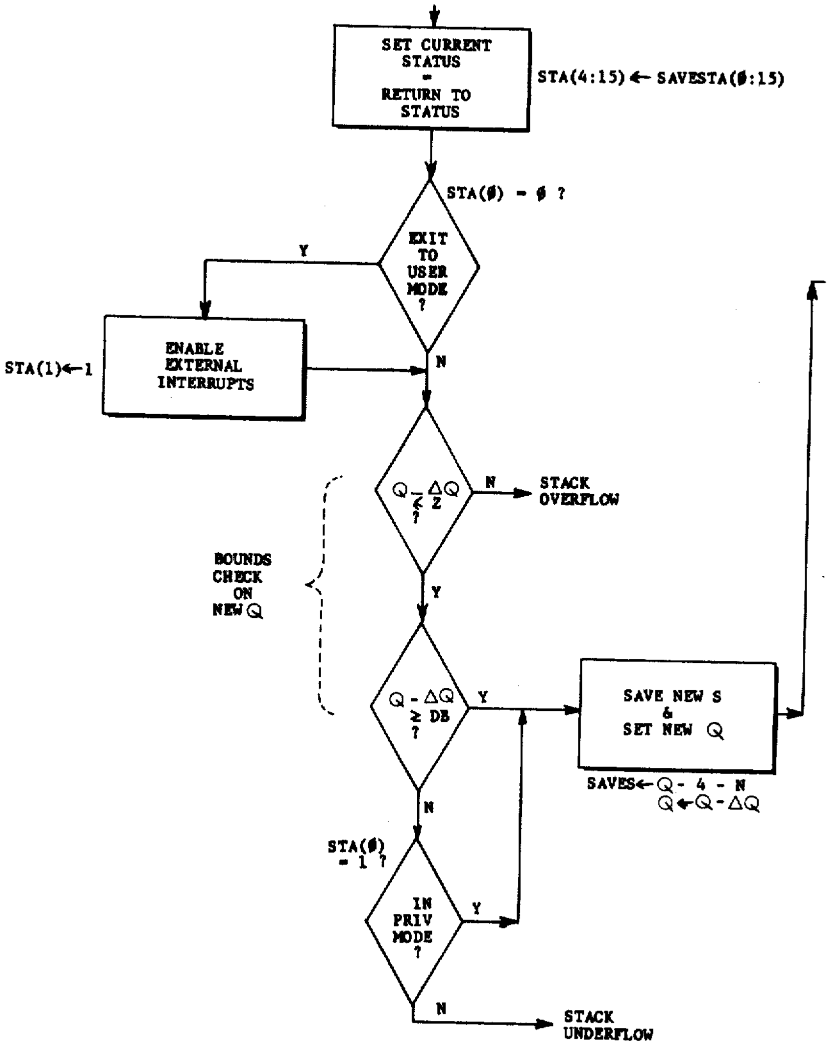
Figure 84E:
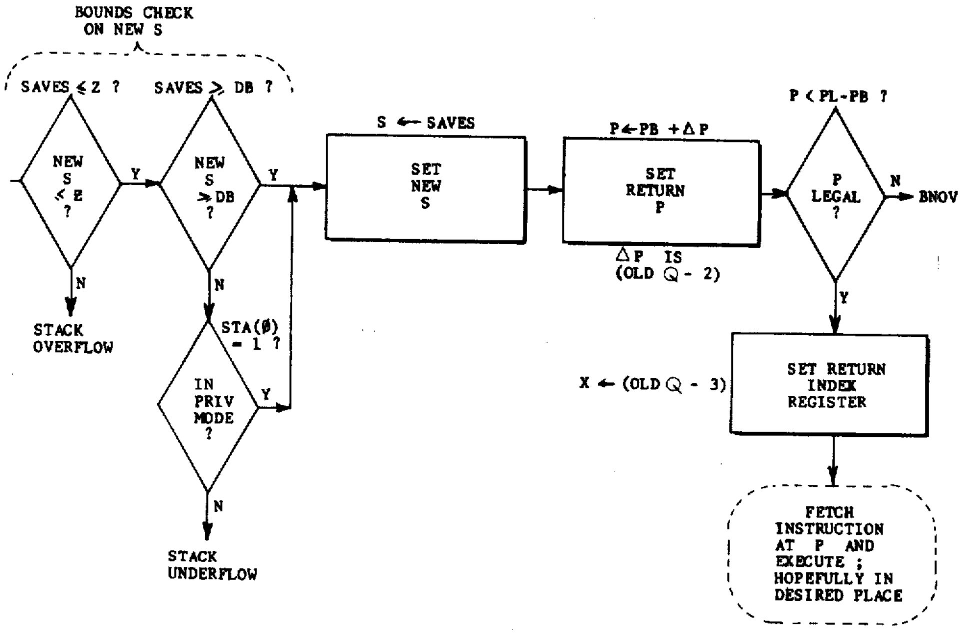
Figure 85A:
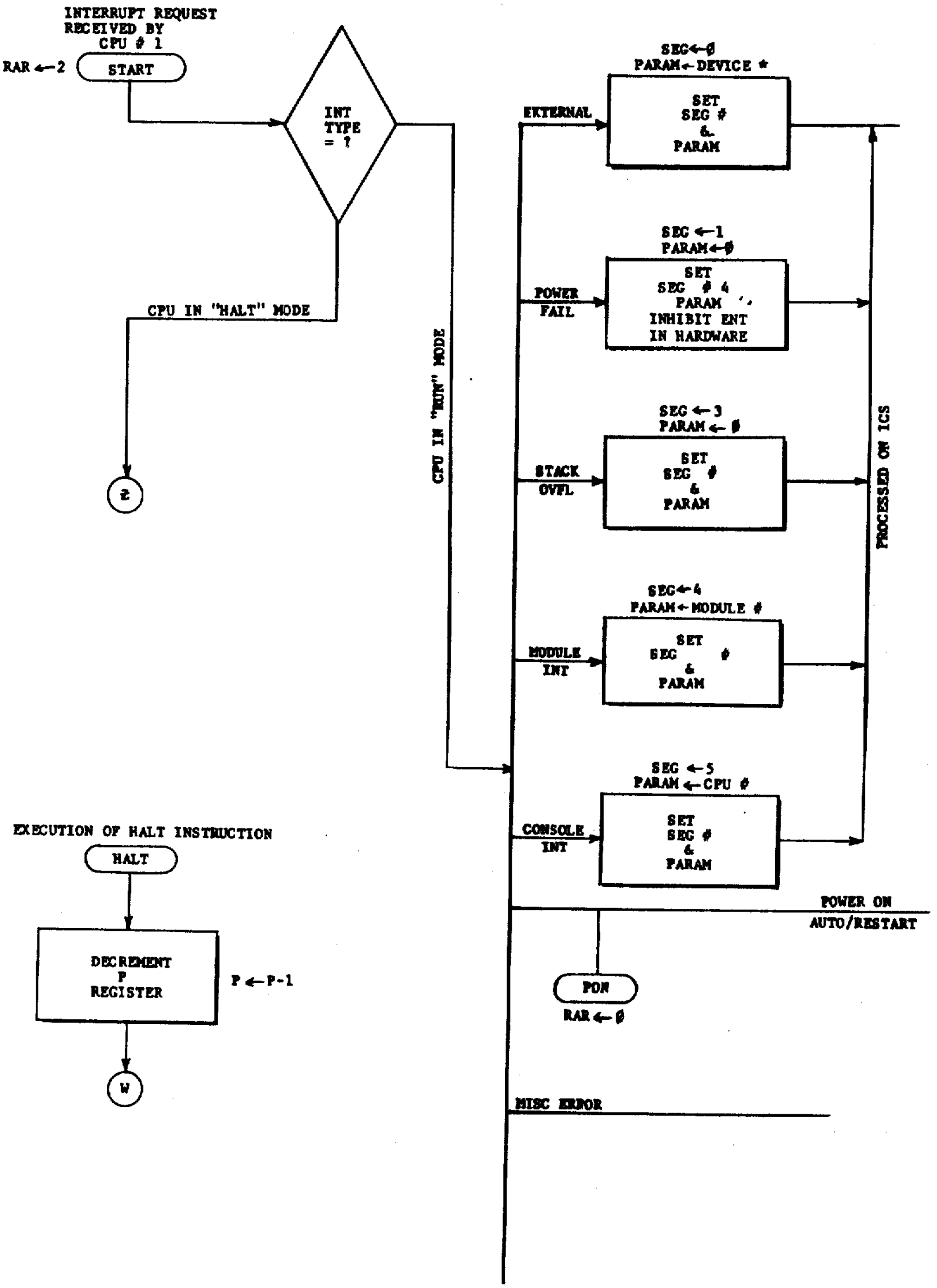
Figure 85B:
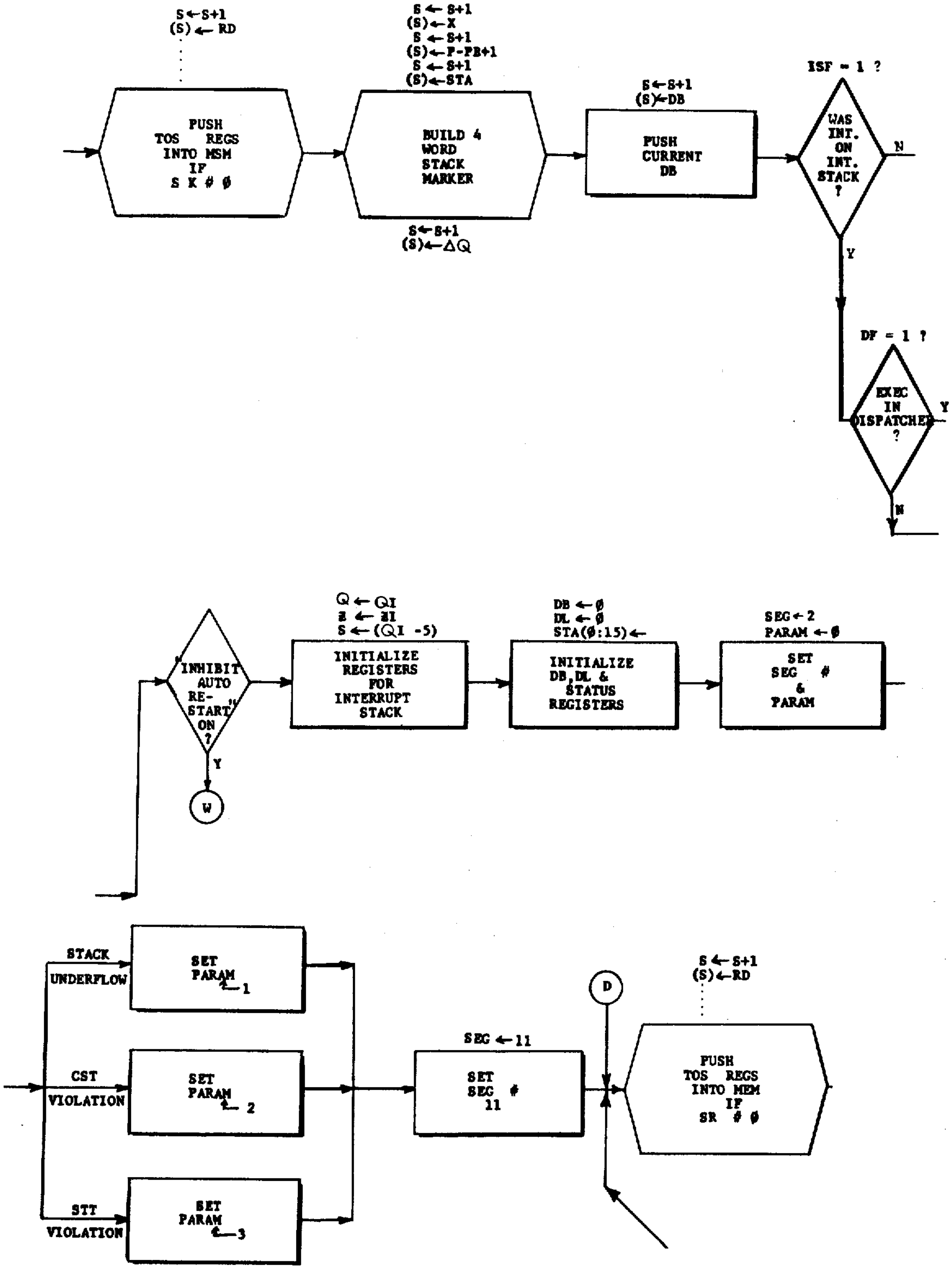
Figure 85C:
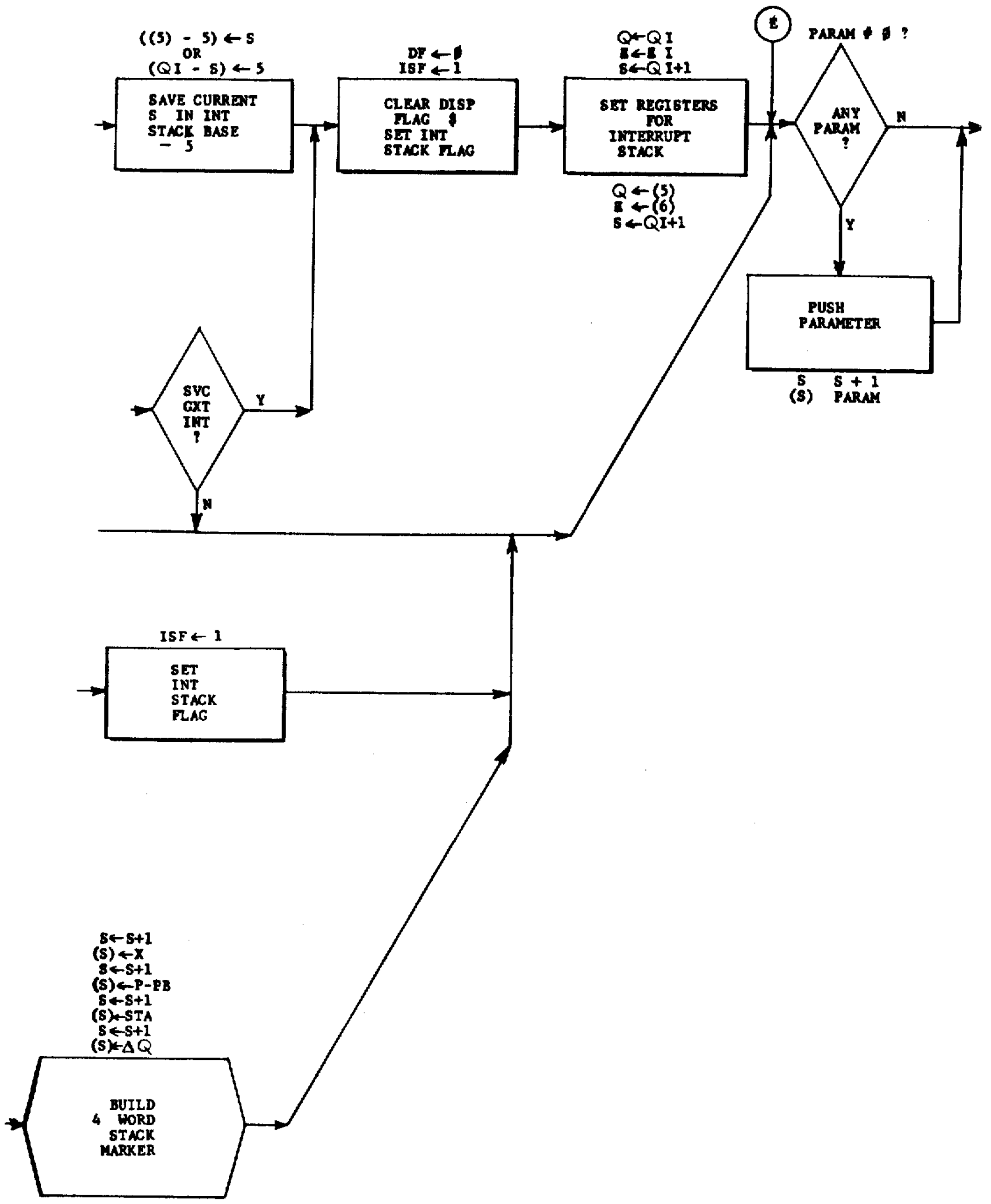
Figure 85D:
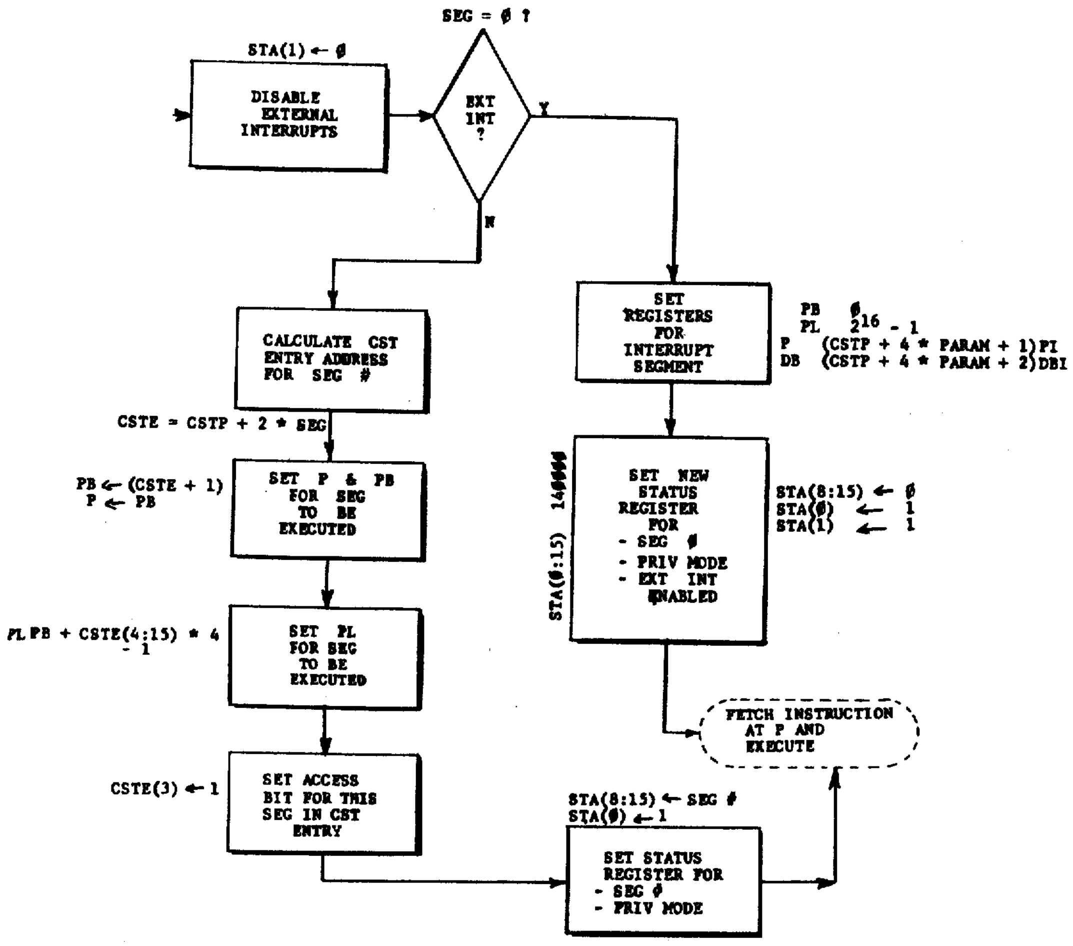
Figure 85E:
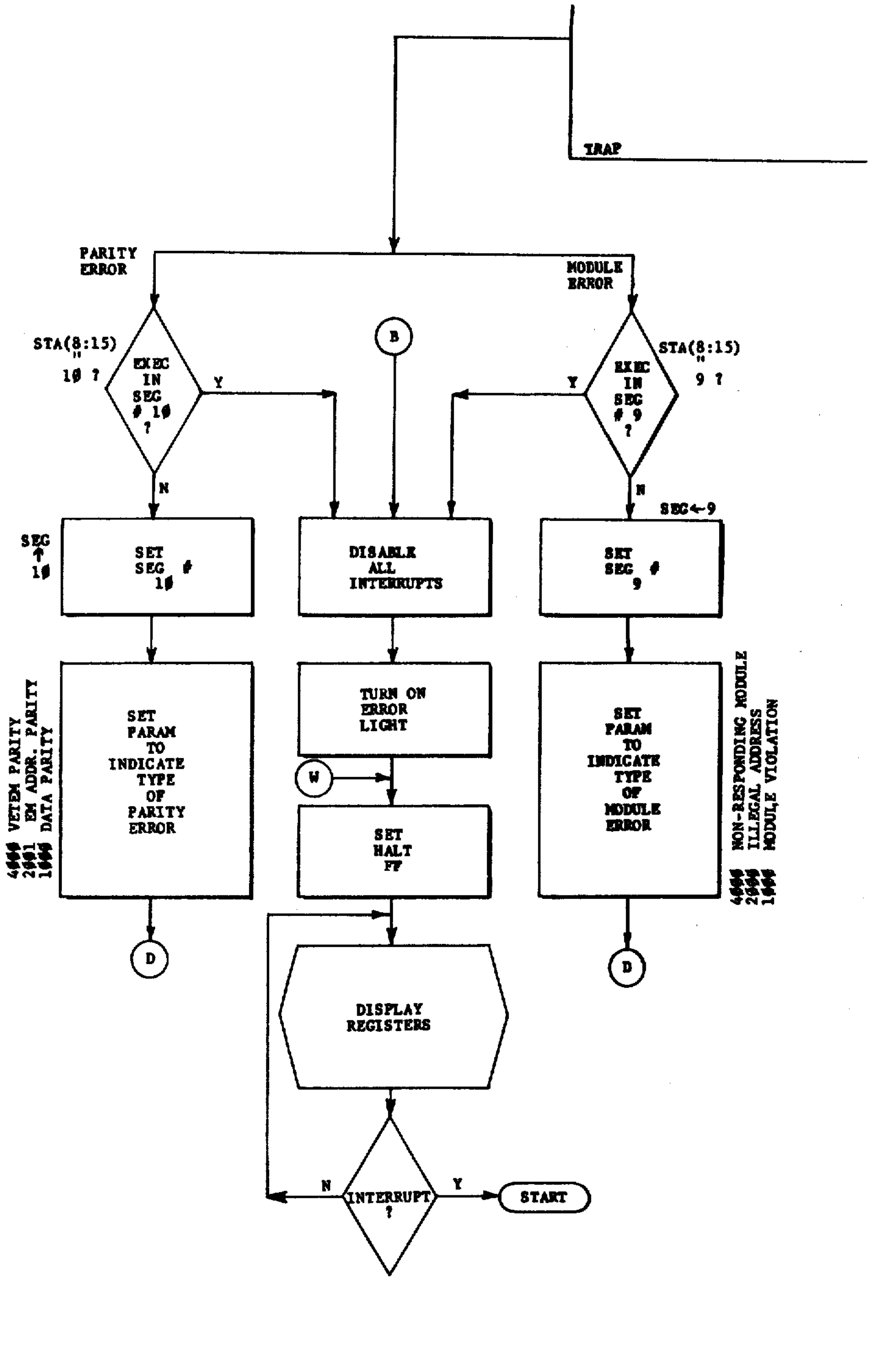
Figure 85F:
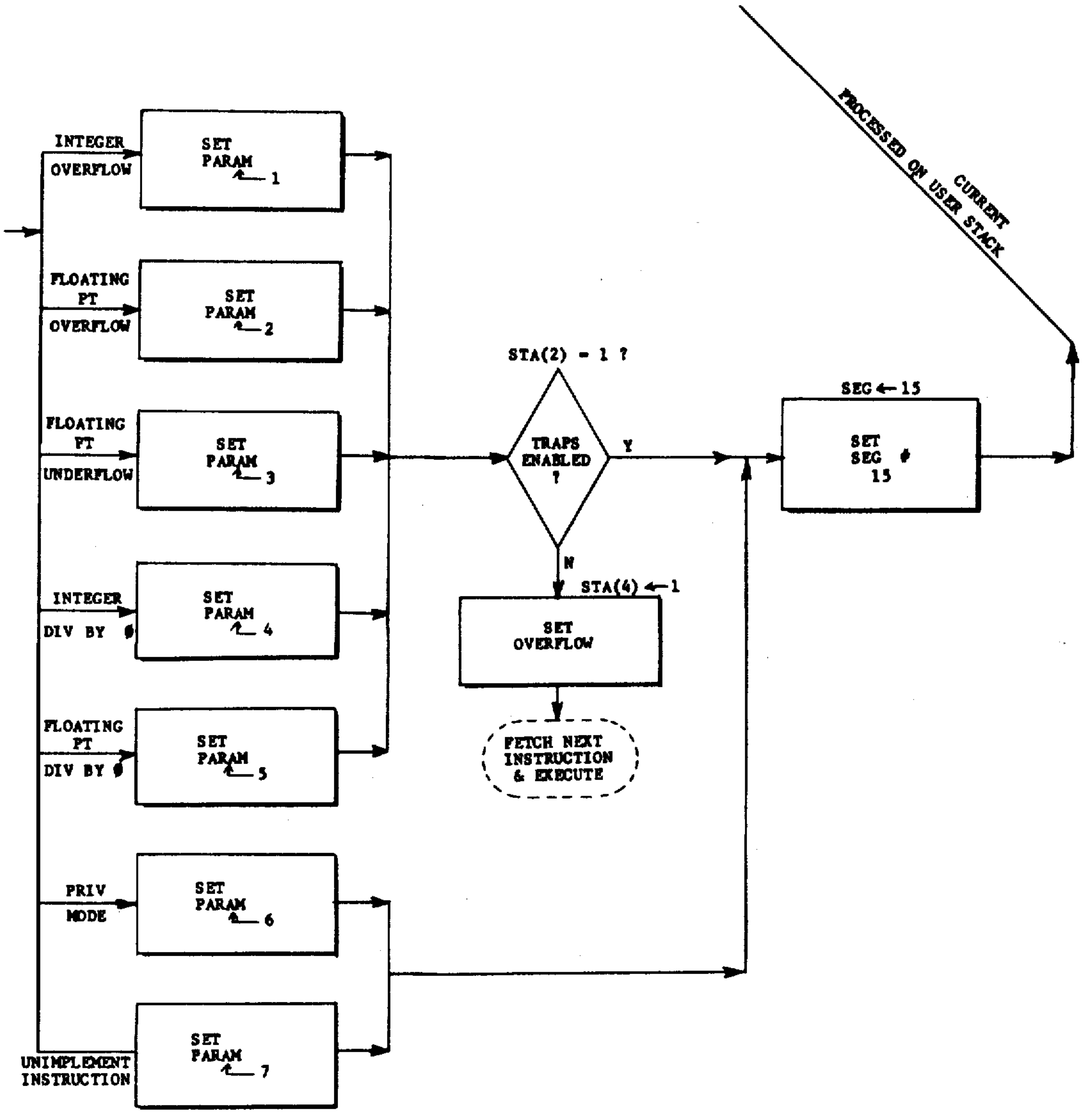
Figure 85G:
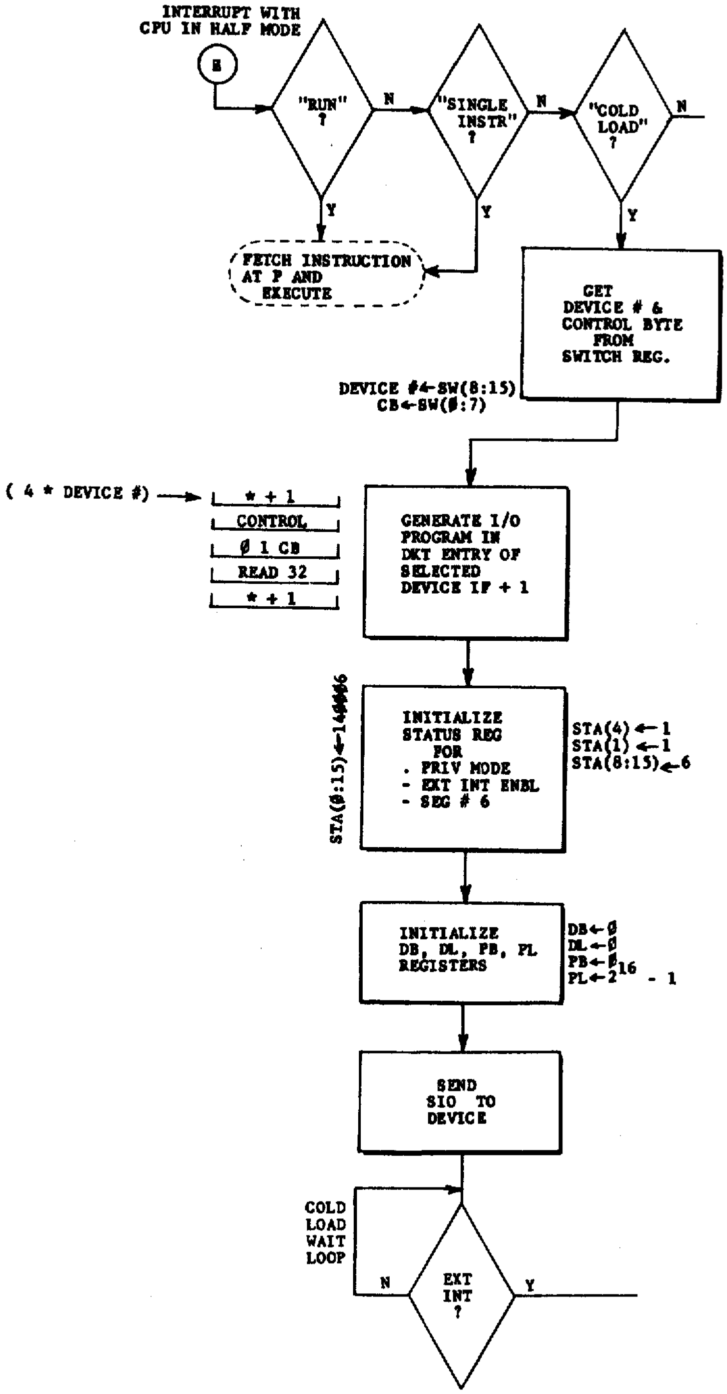

The external interrupt structure is a "polling[ structure with a maximum of 253 devices allowed on the Inerrupt Poll (IP) line as shown in FIG. 82.

Servicing of the external interrupts is done in descending order of priority, i.e., the highest priority interrupt is serviced first. The interrupt prior of a device is determined by its logical proximity to the CPU on the IP line. The interrupt structure is nested such that a higher priority interrupt can pre-empt a lower one. A 16 bit Mask register is provided for the purpose of masking off groups of external interrupts. Up to 16 external interrupts may be assigned to a mask group.

In the ALPHA I/O system there are four characteristic numbers or values associated with an I/O device. (Note that they are fixed at hardware system configuration time.) These are Device Number Data Service Priority, Interrupt Priority and Interrupt Mask Number. These characteristic values are all independent of each other, giving the following advantages:

1. Device Numbers may be numbered consecutively, starting at 3 and proceeding to the number of devices on the system. When a new I/O device is added to the system, it is merely assigned the next highest available number, if desired.
2. Since both Data Service and Interrupt Priorties are independent of device number, a new device to the system may be placed anywhere in the priority chain, independent of physical location within the cabinet.
3. Since Data Service Priority and Interrupt Priority are independent of each other, a device which requires a high data transfer rate may be assigned a low interrupt priority, if desired (such as a disc), or a device which has a very low data rate may be configured to a high priority interrupt (such as an alarm condition).
4. Since Interrupt Masks are independent of device numbers and priorities, devices may be masked in groups related to any desired function. For example if two data terminals were on the system and each has both a high speed and a low speed device, the interrupts could be masked for each terminal, rather than on a data rate basis.

Each device has five interrupt states:

1. Quiescent: Device is not attempting to request an interrupt.
2. Masked: Device is attempting to request an interrupt but its Mask bit is set (= 1).
3. Requesting: Device is requesting an interrupt and its Mask bit is clear (= 0) but there is a higher priority interrupt current and/or active.
4. Current: Device's interrupt routine is currently being executed on the Interrupt Control Stack (ICA). The device's Active bit is set.
5. Active: Device's Active bit is set, but a higher priority interrupt has occurred which is now executing on the ICS.

The interrupt response time is defined to be the maximum time that may elapse between the setting of the active state of an interrupt and the start of the execution of the first instruction of the interrupt routine for the highest priority unmasked interrupt. This response time is at most 80 microseconds, typically 25 microseconds.

Upon receipt of an external interrupt by the CPU, the currently executing instruction is terminated, a standard 4 word stack marker is created on the current stack and then the current DB pointer is pushed onto the stack. The new value of S is stored in QI-5. A hardware interrupt stack flag is set and the stack environment is changed to the Interrupt Stack by setting Q: = QI << from CPU dependent fixed memory location >>;

Z: = ZI << from CPU dependent fixed memoy location >>;

S: = Q + 1;

(S): = Device Number of External Interrupt;

<< note that operating system guarantees (Q) = 0 >>

The CPU references the entry in the Device Reference Table and External Interrupt Table (DRT) for this device number, setting

```
PB : = 0;
PL : = 2**16 - 1        << highest addressable memory location >>;

P : = PI                << from DRT >>;
DB : = DBI              << from DRT >>;
STATUS(8:15) : = 0      << segment # = 0 for all ext. interrupts >>;

STATUS(0:1) : = 11      << priv. mode, enable ext. interrupts >>;
```

Code execution begins in privileged mode at the instruction pointed to by the PI entry for the interrupting device. The external interrupt system is left enabled.

The steps in the External Interrupt processing described above are shown in the following diagram and explanation:

| STEP | ACTION FOR CPU 1. |
|---|---|
| 0 | An External Interrupt request is received by the CPU and the interrupt status is changed from active to current. |
| 1 | The four top of stack registers are pushed into memory if they contain valid |
| 2 | information. This takes a maximum of four cycles if all four are full. |
| 3 | |
| 4 | |
| 5 | A normal four word stack marker is created and pushed into memory, saving X, |
| 6 | P + 1 – PB, STATUS and Delta Q. |
| 7 | |
| 8 | |
| 9 | The current value of the user's DB i. pushed onto his stack in memory. |
| 10 | The Interrupt Stack Base QI is fetched and loaded into the Q register. |
| 11 | The user's current value of S is stored in QI-5. |
| 12 | The Interrupt Stack Limit ZI is fetched and loaded into the Z Register. |
| 13 | Push Device number on stack. |
| 14 | The interrupt program's data base, DBI, is fetched from the DRT and loaded into the DB register. |
| 15 | Using the device number to generate an index into the DRT, the Program Pointer for this device is fetched and stored in the P register. PB is set to zero and PL is set to the highest addressable memory location. STATUS is set to %140000. |
| 16 | The first instruction of the interrupt receiving routine is fetched and execution begins. |

The diagram also shows the items stacked when a higher priority device interrupts the current interrupt. DBI, P+ 1, STATUS, Delta Q are stacked and steps 13 through 16 are followed.

The program exist from an interrupt routine (Segment # = O) executes a hardware read of the device # from (Q + 2) and sends a reset active signal to that device. The normal exit then continues.

B. INTERRUPT STACK AND DISPATCHER FLAGS

The interrupt stack is defined by absolute locations 5 and 6 for CPU 1, and percent 11 and percent 12 for CPU 2. These locations contain the value of Q and Z for interrupt processing respectively. The current process is said to be running on the interrupt stack if the interrupt stack flag is 1.

The interrupt stack flag is set to one whenever processing is transferred to the interrupt stack. This flag is set when any interrupt whose corresponding segment number < = 7 is serviced by the CPU. Simultaneously, the transfer to the interrupt stack takes place, with the first Δ Q set to 0 on the interrupt stack. The interrupt stack flag is also set when SETR(Z) is done such that Z = ZI.

The Dispatcher segment is invoked by the EXIT instruction when it is executed while processing on the interrupt stack and Δ Q = 0 indicating the bottom of the interrupt stack. At this time the Dispatcher flag is set and the dispatcher's PB, P, and PL are set by the CST entry corresponding to the stack marker status word. Q = QI, Z = ZI, and S = Q+1. If an external interrupt occurs while the dispatcher flag is set, the dispatcher is aborted, no stack marker is stacked, Q and Z are restored to QI and ZI, PB: = 0, PL: = 2**16–1; the device number is placed at Q+ 2 and the interrupt is processed. Also the dispatcher flag is cleared.

If the SERTR(Z) command is executed such that Z = ZI the interrupt and dispatcher flags are cleared. However, the dispatcher flag is set only as stated above. Note setting Z = ZI sets interrupt stack flag but clears dispatcher flag.

Also if an EXIT is executed on the interrupt stack and the executing segment is 0 a reset is sent to the device number contained in Q + 2. Any EXIT executed while in segment <= 7 will set DB: = (Q + 1). Note that the dispatcher always runs on the interrupt stack by this definition. The interrupt and dispatcher flags may only be hardware tested.

The console interrupt is inactive only on a System Halt and when the dispatcher flag is set with Interrupter Enable bit is off. A PCAL to a segment ≤ 7 will not affect the flags.

C. INTERNAL INTERRUPTS

The fifteen internal interrupts, including machine check conditions and entry points into the operating system, occupy segment numbers 1 through percent 17 in the Code Segment Table (CST); all user related trap conditions enter one code segment, number percent 17 (see Interrupt and Trap Table).

When an internal interrupt condition is detected by the CPU, the interrupt is serviced as follows:

0. TOS Registers Pushed.

1. A new four word standard format stack marker is placed on the stack.

2. The Privileged mode bit in the STATUS register is changed to the mode indicated in its CST entry, and the segment number set to the CST entry for the particular interrupt being serviced; the Enable/Disable external interrupts bit is set to disable.

3. Segments 1 through 7 are executed on the ICS and the same procedure as above is followed. Segments 8 through 15 are executed on the current stack.

4. If required, a parameter word is pushed onto the current stack.

5. An interrupt CALL is performed through the CST by the hardware, similar to a PCAL instruction except that code execution will begin at PB in the called segment. (This is equivalent to a PCAL through STT entry O.)

D. TRAPS

User relates arithmetic and stack faults (trap # 's through 5) are trapped to segment percent 17, if the Enable/Disable Traps bit in STATUS is enabled. Traps numbered 6 and above always cause a trap. The parameter will be the trap number, as shown in the Interrupt and Trap Table. If traps are disabled, the overflow bit is set on traps 1 through 5.

E. POWER ON AND COLD START PROCESSING

At this time one of two things will happen:

1. If Automatic Restart from a power failure is enabled by a panel switch, then the Power On interrupt segment will begin execution at P = PB. The data control registers DB and DL are made O, Z = ZI, Q = QI, S = (QI − 5), and an Interrupt Call is performed to the Power On internal interrupt, setting PB, P, PL and STATUS from the information in the Code Segment Table (CST).
2. If Automatic Restart is disabled, the computer will HALT. At this point the operator must manually push the Cold Load button, which causes an I/O program to be generated to load memory from a device specified by the operator - set switches on the panel. The Cold Load program reads an 8-bit device number from SWITCH (8:15) and an I/O device control byte from SWITCH (0:7). The I/O program is generated starting at the DRT entry for the input device, and an SIO issued to the device controller. The SIO program format is as follows:

Device Number*4

| | |
|---|---|
| ★ + 1 | |
| CONTROL | |
| CB | CB = Control Byte |
| READ 32 | |
| ★ + 1 | |

The device completes the Cold Load procedures, it generates an interrupt (or part of the I/O program) and the CPU initializes the registers in the following manner and Halts.

PB = DB = DL = O
PL = 2**16 − 1
Z = ZI
Q = QI
S = Q+ 1
P = contents of absolute location 1,
STATUS = 140006
interrupt stack flag = 1;
dispatcher flag = 0

F. SYSTEM HALT

The System Halt light on the front panel is lit by the microprogram by one of the following conditions. The CPU reset as well as a powerfail and power on sequence are the only way to clear this condition.

1. A parity error while attempting to process a parity error interrupt or while executing in the parity error segment.
2. A module error while attempting to process a module error or while executing in the module error segment.
3. A parity error while attempting to process a module error or vice-versa.
4. Absence bit = 1 in any of the first percent 17 CST entries.
5. Code Segment Table length < percent 30 words.
6. Unable to reset interrupt line of interrupting device during EXIT from external interrupt routine.

INTERRUPT AND TRAP TABLE

| SEG.# | TYPE | PARAMETER ON TOS |
|---|---|---|
| 23 | | |
| 0 | External Interrupts (via DRT) | Device No. |
| 1 | Power Fail | |
| 2 | Power On | |
| 3 | Stack Overflow | |
| 4 | Module Interrupt | Module No. |
| 5 | Console Interrupt | CPU I.D. |
| 6 | Cold load | |
| 7 | Unassigned | |
| %10 | Unassigned | |
| %11 | Module Error | |
| | Module violation | %1000 |
| | Illegal address | %2000 |
| | Non-responding module | %4000 |
| %12 | Parity Error | |
| | System Parity Error | %40000 |
| | Memory Address Parity Error | %20000 |
| | Data Parity Error | %10000 |
| %13 | Misc. error | |
| | Stack Underflow | 1 |
| | CST violation | 2 |
| | STT violation | 3 |
| %14 | Code Segment Absence | LABEL—If PCAL O—If EXIT |
| %15 | STT Entry Uncallable | LABEL |
| %16 | Trace | LABEL (PCAL only) |
| %17 | Traps | |
| | User traps controlled by trap enable bit in status | |
| | Integer Overflow | 1 |
| | Floating Point Overflow | 2 |
| | Floating Point Underflow | 3 |
| | Integer divide by O | 4 |
| | Floating Point divide by O | 5 |
| | System traps that are always active | |
| | Privileged Instructions | 6 |
| | Unimplemented Instructions | 7 |

SECTION VII—INSTRUCTION SET

MEMORY ADDRESS INSTRUCTIONS

E = Effective address
PDQS = P+, P−, DB+, Q+, Q−, S−
DQS = DB+, Q+, Q−, S−
P = P+, P−
* = Indirect addressing allowable D = Displacement field of instruction word used in address computation. It is always a word displacement even in byte and double word instructions.

L = Displacement field of Conditional Branch instructions. The range is P − 31, P + 31.

X = Indexing allowed

NOTE 1. Unless otherwise specified, when condition code is set, it is set on the new TOS.

NOTE 2. When English definitions are ambiguous, the ALGOL definitions define the instruction.

A. LOAD INSTRUCTIONS

1. LOAD E (*, D, X, PDQS) <Load> Mem. OpCode = 04

```
S: = S + 1;
(S): = (E);
```

The content of E is pushed onto the stack.
Indicators = CCA

2. LDB E (*, D, X, DQS) <Load byte> Mem. OpCode = 15
CIR(6) = O

```
Base ← DB, Q, or S;
E ← BASE + D + if indexed and not INDIRECT then O
else X/2;
FLAG ← if indexed and (X(15) = 1) then TRUE else
FALSE;
TRYAGAIN:
    if not (DB <= E<= S) and USERMODE then
    begin
      E ← E + %100000;
      if not (DB <= E<= S) then BOUNDS VIOLATION
    TRAP;
    end;
      if INDIRECT then
    begin
      E←((E) + if INDEXED then X else O)/2 + DB;
      FLAG ← if ((E) + if INDEXED then X else O) MOD2
    = 1
      then TRUE else FALSE;
    INDIRECT ← FALSE;
      go TRY AGAIN;
    end;
      S : = S + 1;
      (S(0:7)) : = 0;
      (S (8:15)) : = if FLAG then (E (8:15)) else (E (0:7))
```

X contains a byte index. The byte referenced is loaded into the right half of the top of the stack. Note that byte indexing can cover only 32K of addresses. On indirect addressing the word referenced by the direct address (base + D) contains a DB relative byte address. The byte index is added to the relative byte address to obtain the effective byte address.
Indicators = CCB.

3. LDD E (*, D, X, DQS) <Load double> Mem. OpCode = 15
CIR(6) = 1

```
S : = S + 2;
(S − 1,S) : = (E,E +
1);
```

X contains a double word index. The double word in E, E + 1 is pushed onto the stack, most significant word first. On indirect addressing the word referenced by the direct address contains a DB relative word address.
Indicators = CCA 4. LDPP N <Load double from program, positive> Sub OpCode 3 = 10

```
S : = S + 1;
(S) : = (P + N);
S : = S + 1;
(S) : = (P + N + 1);
```

The doubleword contained at P + N is pushed onto the stack.
Indicators = CCA

5. LDPN N <Load double from program, negative> Sub OpCode 3 = 11

```
S : = S + 1;
(S) : = (P − N);
S : = S + 1;
(S) : = (P − N + 1);
```

The doubleword in location P − N is pushed onto the stack.
Indicators = CCA

6. LDX E (*, D, X, PDQS) <Load Index> Mem. OpCode = 13

```
X : = (E);
```

The content of E is loaded into the index register.
Indicators = CCA.

7. LRA E (*, D, X, PDQS) <Load relative address> Mem. OpCode = 17

```
TEMP O = if CIR(6) = O then E − PB else E − DB;
S : = S + 1;
```

-Continued

```
(S) : = TEMP;
```

The effective address is computed in the normal manner and then the appropriate base register (PB for P+− addressing, DB for DB+, Q+−, and S− addressing) is subtracted from the absolute address E. The relative address is pushed onto the stack.
Indicators = Unaffected.

B. STORE INSTRUCTIONS

8. STOR E (*, D, X, DQS) <Store> Mem. OpCode = 05

```
(E) : = (S);
S : = S− 1;
```

The content of the TOS is stored in memory location E. The stack is popped.
Indicators = Unaffected 9. STB E (*, D, X, DQS) <Store byte> Mem. OpCode = 16
CIR(6) = O

```
BASE ← DB, Q, or S;
E ← BASE + D + if indexed and not INDIRECT then O
else X/2;
FLAG ← if indexed and (X(15) = 1) then TRUE else
FALSE;
TRYAGAIN:
    if not (DB < = E < = S) and USERMODE then
  begin
    E ← E + %100000;
    if not (DB < = E < = S) then BOUNDS VIOLATION
  TRAP;
  end;
    if INDIRECT then
  begin
    E ← ((E) + if INDEXED then X else O)/2 + DB;
    FLAG ← if ((E) + if INDEXED then X else O) MOD2
  = 1 then TRUE else FALSE;
    INDIRECT ← FALSE;
    go TRYAGAIN;
  end;
    if FLAG then (E (8:15)) : = (S (8:15)) else (E (0:7)) :
  = (S (8:15));
    S : = S − 1;
```

X contains a byte index. On indirect addressing the word referenced by the direct address (base + D) contains a DB relative byte address. The byte index is added to the relative byte address, and the right hand byte of the TOS is stored into the referenced byte. The TOS is deleted.
Indicators = Unaffected 10. STD E (*, D, X, DQS) <Store double> Mem. OpCode = 16
CIR(6) = 1

```
(E, E + 1) : = (S − 1,S);
S : = S − 2;
```

X contains a double word index. The top two words on the stack are stored at E, E+ 1. On indirect addressing the word referenced by the direct address contains a DB relative word address.
Indicators = Unaffected

C. MEMORY REFERENCE INTEGER INSTRUCTIONS

11. CMPM E (*, D, X, PDQS) <Compare memory> Mem. OpCode = 06

```
CC : = (S) : (E);
S : = S − 1;
```

The condition code is set to pattern C as a result of the comparison of (S) : (E). The stack is popped.
Indicators = CCC 12. ADDM E (*, D,X, PDQS) <Add memory> Men. OpCode = 07

```
(S): = (S) + (E);
```

The content of E is added in integer form to the TOS. The result replaces the operand on the TOS.
Indicators = CCA, Carry, Overflow -Continued 13. SUBM E (*,D,X,PDQS) <Subtract memory> Mem.OpCode = 10

(S) : = (S) − (E);

The content of E is subtracted in integer form from the TOS. The result replaces the operand on the TOS
Indicators = CCA, Carry, Overflow 14. MPYM E (*,D,X,PDQS) <Multiply memory> Mem. OpCode = 11

(S) : = (S) * (E);

The TOS is multiplied in integer form by the content of E. The least significant word of the result replaces the operand on the TOS.
Indicators = CCA, Overflow 15. INCM E (*,D,X,DQS) <Increment memory> Mem. OpCode = 12

(E) : = (E) + 1;

The content of E is incremented by 1 in integer form.
Indicators = CCA, Carry, Overflow 16. DECM E (*,D,X,DQS) <Decrement memory> Mem.OpCode = 12
CIR(6) = 1

(E) : = (E) − 1;

The content of E is decremented by 1 in integer form.
Indicators = CCA, Carry, Overflow

D. BRANCH INSTRUCTION

17. BR E (*,D,X,P or indirect DQS) <Branch> Mem.OpCode = 14 if CIR(6) = 0 then P : = E <<as defined in section III-D>>
else P : = PB + (DB or Q or S +— D) + X; <<indirect add>>

Control is transferred to location E.
Indicators = Unaffected.

E. CONDITIONAL BRANCHES

CIR(10) is the sign of P +— displacement
Range (P − 31, P + 31)
CIR(4) is the indirect bit for cond. branches
L = signed range 18. BCC L (*,L,P) <Branch on Condition Code> CIR(5:6) = 01 Mem. OpCode = 14

If CC AND (CCF) ¬= 0 then P : = P + L;

The branch addresses are in the range P − 31, P + 31. Condition code field (CCF) in instruction is CIR (7:9). Control is transferred to location P + L under the following conditions:

If CCF = O. Never branch
1. Branch if CC = CCL
2. Branch if CC = CCE
3. Branch if CC = CCL or CCE
4. Branch if CC = CCG
5. Branch if CC = CCG or CCL
6. Branch if CC = CCG or CCE
7. Always Branch Indicators = Unaffected.

19. BCY (*,L,P,) <Branch on carry> Sub OpCode 1=14 if STATUS(5) = 1 then P : = P + L else P : = P + 1;

If the carry bit of the status bit is on, control is transferred to P + L.
Indicators = Carry cleared 20. BNCY L (*,L,P) <Branch on no carry> Sub OpCode 1 = 15 if STATUS(5) = 0 then P : = P + L else P : = P + 1;

If the carry bit of the status bit is off, control is transferred to P + L.
Indicators = Carry cleared -Continued- 21. BOV L (*,L,P) <Branch on overflow> Sub OpCode 1 = 30 if STATUS(4) = 1 then P : = P + L else P : = P + 1;

If the overflow bit in the status word is on, control is transferred to P + L
Indicators = Overflow cleared 22. BNOV L (*, L,P) <Branch on no overflow> Sub OpCode 1 = 31 if STATUS(4) = 0 then P : = P + L else P : = P + 1;
If the overflow bit in the status word is off, control is transferred to P + L
Indicators = Overflow cleared 23. BRO L (*, L,P) <Branch on TOS odd> Sub OpCode 1 = 36 if (S(15)) = 1 then P : = P + L;
S : = S − 1

If the TOS is odd, control is transferred to P + L. The stack is popped.
Indicators = Unaffected 24. BRE L (*,L,P) <Branch on TOS even> Sub OpCode 1 = 37 if (S(15)) = 0 then P : = P + L;
S : = S−1

If the TOS is even, control is transferred to P + L. The stack is popped.
Indicators = Unaffected 25. IABZ L (*,L,P) <Increment A, branch if zero> Sub OpCode 1 = 07

(S) : = (S) + 1;
if (S) = O then P : = P + L else P : = P + 1;

The TOS is incremented. If the result is then zero, control is transferred to P + L.
Indicators = CCA, Carry, Overflow 26. IXBZ L (*, LMP) <Increment X, branch if zero> Sub OpCode 1=12

X : = X + 1;
if X = 0 then P : = P + else P : = P + 1;

The index register is incremented. If the result is then zero, control is transferred to P +L.
Indicators = CCA, Carry, Overflow 27. DABZ L (*, L,P) <Decrement A, branch if zero> Sub OpCode 1 = 27

(S) : = (S) − 1;
if (S) = O then P : = P + L else P : = P + 1;

The TOS is decremented. If the result is then zero, control is transferred to P + L.
Indicators = CCA, Carry, Overflow 28. DXBZ L (*,L,P) <Decrement X, branch if zero> Sub OpCode 1 = 13

X : = X − 1;
if X = 0 then P : = P + L else P : = P + 1;

The index register is decremented. If the result is then zero, control is transferred to P + L.
Indicators = CCA, Carry, Overflow 29. CPRB L (*,L,P) <Compare range and branch> Sub OpCode 1 = 26

```
if (S−1) < = X < = (S) then
begin
  CC : = CCE;
  P : = P + L;
end else
begin
  if X > (S − 1) then CC: = CCL;
  if X > (S) then CC : = CCG;
end;
  S : = S − 2;
```

– Continued

The integer in the index register is tested to determine if it is within the interval defined by the upper bound integer on the TOS and the lower bound integer found in the second word of the stack. The condition code is set by the comparison. If the integer in X is within the range then the branch to P + L occurs. The upper and lower bounds on the TOS are popped.
Indicators = Condition Code

F. LOOP CONTROL BRANCH INSTRUCTIONS

30. TBA E (D,P) <Test, branch, A> CIR(4:6) = 000 Mem. OpCode = 05

```
VAR : = ((S-2) + DB);
STEP : = (S-1);
FINAL : = (S);
if STEP > = 0 then
  if VAR > FINAL then S : =S - 3 else P: = E;
if STEP < 0 then
  if VAR < FINAL then S : = S - 3 else P: = E;
```

This instruction requires that the top 3 elements of the stack are (TOS, TOS - 1, TOS - 2) the final value, the step size and the address (DB + relative) of the variable respectively. VAR is tested against the limit. If the limit is not exceeded, then pop the top 3 words from the stack and execution continues at P + 1. If the limit is not exceeded, then control is transferred to E. The branch addresses are in the range P – 255, P + 255.
Indicators = Unaffected.

31. MTBA E (D,P) <Modify, Test, Branch, A> CIR(4:6) = 010 Mem.OpCode = 05

```
VAR : = ((S - 2) + DB);
STEP : = (S - 1);
FINAL : = (S);
VAR : = VAR + STEP;
((S - 2)) : = VAR;
if STEP > = 0 then
  if VAR > FINAL then S : = S - 3 else P : = E;
if STEP < 0 then
  if VAR < FINAL then S : = S - 3 else P : =E;
```

This instruction requires that the top 3 elements of the stack are (TOS, TOS - 1, TOS - 2) the final value, the step size and the address (DB + relative) of the variable respectively. The step size is added in integer form to the variable, the sum replaces the old value of the variable, and the sum is tested against the limit. If the limit is exceeded then pop all 3 from the stack and execution continues at P + 1. If the limit is not exceeded, then control is transferred to E. The branch addresses are in the range P – 255, P + 255.
Indicators = Unaffected.

32. TBX E (D,P) <Test, branch, X>CIR(4:6) = 100 Mem. OpCode = 05

```
VAR : = X;
STEP : = (S-1);
FINAL : = (S);
if STEP > = 0 then
  if VAR > FINAL then S : = S - 2 else P : = E;
if STEP < 0 then
  if VAR < FINAL then S : = S - 2 else P : = E;
```

This instruction requires that the index register contains the variable, and that the top 2 words of the stack are (TOS, TOS - 1) the final value and the step size respectively. VAR is tested against the limit. If the limit is exceeded, then pop the top 2 words from the stack and execution continues at P + 1. If the limit is not exceeded, then control is transferred to E.
Indicators = Unaffected.

33. MTBX E (D,P) <Modify, Test, Branch, X>CIR(4:6) = 110 Mem. OpCode = 05

```
VAR : = X;
STEP : = (S-1);
FINAL : = (S);
VAR : = VAR + STEP;
X : = VAR;
if STEP > = 0 then
  if VAR > FINAL then S : = S - 2 else P : = E;
if STEP < 0 then
  if VAR < FINAL then S : = S - 2 else P: = E;
```

– Continued

This instruction requires that the index register contains the variable, and that the top 2 words of the stack are (TOS, TOS - 1) the final value and the step size respectively. The step size is added in integer form to within the variable, the sum replaces the old value of the variable, and the sum is tested against the limit. If the limit is exceeded, then pop the top 2 words from the stack and execution continues at P + 1. If the limit is not exceeded, then control is transferred to E. The branch addresses are in the range P – 255, P + 255.
Indicators/Unaffected.

G. INTEGER INSTRUCTIONS

34. CMP <Compare> Stack OpCode = 17

```
C : = (S-1) : (S);
S : = S - 2;
```

The condition code is set to pattern C as a result of the integer comparison of (S–1) : (S). The operands are deleted.
Indicators = CCC 35. ADD <Add> Stack OpCode = 20

```
(S - 1) : = (S - 1) + (S);
S : = S - 1;
```

The top two words of the stack are added in integer form and they are then popped. The resulting sum is pushed onto the stack.
Indicators = CCA, Carry, Overflow 36. SUB <Subtract> Stack OpCode = 21

```
(S - 1) : = (S - 1) - (S);
S : = S - 1;
```

The top word of the stack is subtracted in integer form from the second word and they are popped. The resulting difference is pushed onto the stack.
Indicators = CCA, Carry, Overflow 37. MPY <Multiply> Stack OpCode = 22

```
(S - 1) : = (S - 1) * (S);
S : = S - 1;
```

The top two words of the stack are multiplied in integer form. The two words are deleted, and the least significant word of the double length product is pushed onto the stack.

If the high order 17 bits (including the sign bit of the second word) are not all zeros, or all ones, overflow is set.
Indicators = CCA, Overflow 38. DIV <Divide> Stack OpCode = 23

```
TEMP : = (S - 1)/(S);
(S) : = (S - 1) mod (S);
(S = 1) : = TEMP;
```

The integer in the second word of the stack is divided by the integer on the TOS. The second word is replaced by the quotient, and the top word is replaced by the remainder.
Indicators = CCA, Overflow 39. NEG <Negate> Stack OpCode = 24

```
(S) : = -(S);
```

The TOS is replaced by its 2's complement.
Indicators = CCA, Overflow

H. LOGICAL INSTRUCTIONS

40. LCMP <Logical compare> Stack OpCode = 57

```
CC : = (S - 1) : (S);
S : = S - 2;
```

The condition code is set to pattern C on the comparison of (S–1):(S). The two operands are deleted.
Indicators = CCC 41. LADD <Logical add> Stack OpCode = 60

```
(S - 1) : = (S - 1) + (S) mod 2 ** 16;
S : = S - 1;
```

The top two words of the stack are added as 16 bit positive integers and they are deleted from the stack. The resulting sum is pushed onto the stack.
Indicators = CCA, Carry 42. LSUB <Logical subtract> Stack OpCode = 61

(S − 1) : = (S − 1) − (S) mod 2** 16;
S : = S − 1

The top word of the stack is subtracted in logical form from the second word and they are deleted. The resulting difference is pushed onto the stack.
Indicators = CCA, Carry 43. LMPY <Logical multiply> Stack OpCode = 62

(S − 1,S) : = (S − 1) * (S);

The top two words on the stack are multiplied as 16 bit positive integers. The words are replaced by the double length product with the least significant half on the TOS.

Carry is cleared if the high order 16 bits are all zeros such that the low order 16 bits represent the true result. Otherwise the carry bit is set.
Indicators = CCA, Carry 44. LDIV <Logical divide> Stack OpCode = 63

TEMP : = logical ((S − 2, S − 1)/(S));
(S − 1) : = (S − 2, S − 1) mod (S);
(S − 2) : = TEMP;
S : = S − 1;

The 32 bit positive integer in the 2nd and 3rd words of the stack is divided by the 16 bit positive integer on the TOS. The top three words are deleted. The quotient is pushed onto the stack and then the remainder is pushed on. If overflow occurs, the remainder will be module 2**16.
Indicators = CCA, Overflow 45. NOT <One's complement> Stack OpCode = 64

(S) : = ¬(S);

Converts the top word of the stack to its one's complement.
Indicators = CCA

I. DOUBLE INTEGER INSTRUCTIONS

46. DCMP <Double compare> Stack OpCode = 10

CC : = (S − 3, S − 2):(S − 1,S);
S : = S − 4;

The condition code is set to pattern C as a result of the double word integer comparison of (S−3, S−2):(S−1,S). The two double words are deleted from the stack.
Indicators = CCC 47. DADD <Double add> Stack OpCode = 11

(S − 3,S − 2) : = (S − 3,S − 2) + (S −1,S);
S : = S − 2;

The two double word integers contained in the top 4 elements of the stack are added in double length integer form and they are deleted. The double word integer sum is pushed onto the stack.
Indicators = CCA, Carry, Overflow 48. DSUB <Double subtract> Stack OpCode = 12

(S − 3, S − 2) : = (S − 3, S − 2) − (S − 1,S);
S : = S − 2;

The double word integer contained in the 1st and 2nd words of the stack is subtracted from the double word integer contained in the 3rd and 4th words of the stack. The top 4 words of the stack are deleted and the double word integer result is pushed onto the stack.
Indicators = CCA, Carry, Overflow 49. MPYL <Multiply Long> Stack OpCode = 13

(S − 1,S) : = (S − 1) * (S);

The top two words of the stack are multiplied in integer form. The words are replaced by the double length product, with the least significant half on the TOS.

Carry is cleared if the high order 17 bits (including the sign bit of the second word) are either all zeros or all ones, such that the low order 16 bits represent the true result. Otherwise, the carry bit is set.
Indicators = CCA, Carry, Overflow 50. DIVL <Divide Long> Stack OpCode = 14

TEMP1 : = (S − 2, S − 1)/(S);
TEMP2 : = (S − 2, S − 1) mod (S);
S : = S − 1;
(S) : = TEMP2;
(S − 1) : = TEMP1;

The double word integer in the second and third elements of the stack is divided by the integer in the TOS. The three words are deleted, and the quotient is pushed onto the stack. The remainder is pushed onto the stack.
Indicators = CCA, Overflow 51. DNEG <Double negate> Stack OpCode = 15

(S − 1,S) : = − (S − 1,S);

The double word integer contained in the top 2 words of the stack is negated and replaces the original double word integer.
Indicators = CCA, Overflow

J. FLOATING POINT INSTRUCTIONS

52. FCMP <Floating compare> Stack OpCode = 50

CC : = (S − 3, S − 2):(S − 1,S);
S : = S − 4;

The condition code is set to pattern C as a result of the floating point comparison of (S−3,S−2):(S−1,S). The two floating doublewords are deleted.
Indicators = CCC 53. FADD <Floating add> Stack OpCode = 51

(S − 3, S − 2) : = (S − 3, S − 2) + (S − 1, S);
S : − S − 2;

The two floating point numbers contained in the top 4 words of the stack are added in floating point form. The top 4 words of the stack are deleted and the 2 word sum is pushed onto the stack.

Note: Computed result = round (true result,22) (see Page 14);
Indicators = CCA, Overflow 54. FSUB <Floating subtract> Stack OpCode = 52

(S − 3, S − 2) : = (S − 3, S − 2) − (S − 1, S);
S : = S − 2;

The floating point number contained in the 1st and 2nd words of the stack is subtracted from the floating point number contained in the 3rd and 4th words of the stack in floating point form. The top 4 words of the stack are deleted and the 2 word difference is pushed onto the stack.

Note: Computed result = round (true result,22);
Indicators = CCA, Overflow

55. FMPY <Floating multiply> Stack OpCode = 53

(S − 3, S − 2) : = (S − 3, S − 2) * (S − 1, S);
S : = S − 2;

The two floating point numbers contained in the top 4 words of the stack are multiplied in floating point form. The top 4 words of the stack are deleted and the 2 word result is pushed onto the stack.

Note: Computed result = round (true result, 22);
Indicators = CCA, Overflow

56. FDIV <Floating divide> Stack OpCode = 54

(S − 3, S − 2) : = (S − 3, S − 2) / (S − 1, S);
S : = S − 2;

–Continued

The floating point number contained in the 3rd and 4th words of the stack is divided by the floating point number contained in the 1st and 2nd words of the stack. The top 4 words of the stack are deleted and the 2 word quotient is pushed onto the stack.

Note: Computed result = round (true result, 22);
Indicators = CCA, Overflow

57. FNEG <Floating negate> Stack OpCode = 55

(S − 1, S) : = − (S − 1, S);

The floating point number contained in the top 2 words of the stack is negated in floating point form.
Indicators = CCA 58. FLT <Float> Stack OpCode = 47

S : = S + 1;
(S − 1, S) : = float (S − 1);

Converts the integer on the TOS to a 32 bit floating point number with rounding. The TOS is deleted and the double word floating point result is pushed onto the stack.
Note: Computed result = round (true result, 22);
Indicators = CCA 59. DFLT <Double float> Stack OpCode = 30

(S − 1, S) : = dfloat((S − 1, S));

Converts the double word integer contained in the top 2 words of the stack to a floating point number with rounding.

Note: Computed result = round (true result, 22);
Indicators = CCA

60. FIXT <Fix and truncate> Stack OpCode = 71

(S − 1, S) : = trunc((S − 1, S));

The floating point number contained in the top two words of the stack is truncated and converted to fixed point form.

Carry is cleared if the high order 17 bits (including the sign bit of the second word) are either all zeros or all ones, such that the low order 16 bits represent the true result. Otherwise, the carry bit is set.
Indicators = CCA, Carry, Overflow 61. FIXR <Fix and round> Stack OpCode = 70

(S − 1, S) : = trunc((S − 1, S) + .5·sign(S − 1, S));

The floating point number contained in the top 2 words of the stack is rounded and converted to fixed point form.

Carry is cleared if the high order 17 bits (including the sign bit of the second word) are either all zeros or all ones, such that the low order 16 bits represent the true result. Otherwise, the carry bit is set.
Indicators = CCA, Carry, Overflow

K. BOOLEAN INSTRUCTIONS

62. OR <Or, logical> Stack OpCode = 65

(S − 1) : = (S − 1) or (S);
S : = S − 1;

The top two words of the stack are logically inclusive ORed together, the operands are deleted and the result is pushed onto the stack.
Indicators = CCA on the new TOS 63. XOR <Exclusive or, logical> Stack OpCode = 66

(S − 1) : = ¬(S − 1) and (S) or (S − 1) and ¬(S);
S : = S − 1;

The top two words of the stack are logically exclusive ORed together, the operands are deleted, and the result is pushed onto the stack.
Indicators = CCA on the new TOS 64. AND <And, logical> Stack OpCode = 67

(S − 1) : = (S − 1) and (S);
S : = S − 1;

The top two words of the stack are logically ANDed together, the operands are deleted and the result is pushed onto the stack.
Indicators = CCA on the new TOS –Continued

L. TEST INSTRUCTIONS

65. TEST <Test TOS> Stack OpCode = 25

Indicators = CCA on (S)

66. DTST <Test double word on TOS> Stack OpCode = 27

Carry is cleared if the high order 17 bits (including the sign bit of the second word) are either all zeros or all ones, such that the low order 16 bits represent the true result. Otherwise, the carry bit is set.
Indicators = CCA on double word (S − 1, S)

67. BTST <Test BYTE on TOS> Stack OpCode = 31

Indicators = CCB on (S(8 : 15)).

M. INCREMENT AND DECREMENT INSTRUCTIONS

68. INCA <Increment A> Stack OpCode = 33

(S) : = (S) + 1;

The TOS is incremented in integer form by one.
Indicators = CCA, Carry, Overflow 69. INCB <Increment B> Stack OpCode = 73

(S − 1) : = (S − 1) + 1;

The second word of the stack is incremented in integer form by one. The TOS is unchanged.
Indicators = CCA, Carry, Overflow 70. INCX <Increment index> Stack OpCode = 04

X : = X + 1;

The content of the index register is incremented by one in integer form.
Indicators = CCA, Carry, Overflow.

71. DECA <Decrement A> Stack OpCode = 34

(S) : = (S) − 1;

The TOS is decremented in integer form by one.
Indicators = CCA, Carry, Overflow 72. DECB <Decrement B> Stack OpCode = 74

(S − 1) : = (S − 1) − 1;

The second word of the stack is decremented in integer form by one. The TOS is unaffected.
Indicators = CCA, Carry, Overflow 73. DECX <Decrement X> Stack OpCode = 05

X : = X − 1;

The content of the index register is decremented by one in integer form.
Indicators = CCA, Carry, Overflow

N. ZERO INSTRUCTIONS

74. ZERO <Push zero> Stack OpCode = 06

S : = S + 1;
(S) : = 0;

A zero word is pushed onto the stack.
Indicators = Unaffected

75. DZRO <Double push zero> Stack OpCode = 07

S : = S + 1;
(S) : = 0;
S : = S + 1;
(S) : = 0;

– Continued

Two words containing all zeros are pushed onto the stack.
Indicators = Unaffected 76. ZROB <Zero B> Stack OpCode = 41

(S − 1) : = 0;

The second word of the stack is replaced by zero. The TOS is unaffected.
Indicators = Unaffected.

77. ZROX <Zero X> Stack OpCode = 03

X : = 0;

The content of the index register is replaced by zero.
Indicators = Unaffected

O. DUPLICATE AND DELETE INSTRUCTIONS

78. DEL <Delete A> Stack OpCode = 40

S : = S − 1;

The TOS is deleted.
Indicators = Unaffected

79. DDEL <Double delete> Stack OpCode = 02

S : = S − 2;

The top 2 words of the stack are deleted.
Indicators = Unaffected

80. DDEL <Double delete> Stack OpCode = 01

(S − 1) : = (S);
S : = S − 1;

The second word of the stack is deleted and the stack is compressed. The TOS is unchanged.
Indicators = Unaffected 81. DUP <Duplicate A> Stack OpCode = 45

S : = S + 1;
(S) : = (S − 1);

The top word of the stack is duplicated by pushing a copy of the TOS onto the stack.
Indicators = CCA 82. DDUP <Duble duplicate> Stack OpCode = 46

S : = S + 2;
(S − 1,S) : = (S − 3, S − 2);

The double word in the top two words of the stack is duplicated by pushing a copy of it onto the stack.
Indicators = CCA on new TOS Doubleword

P. EXCHANGE INSTRUCTIONS

83. XCH <Exchange A and B> Stack OpCode = 32

TEMP : = (S − 1);
(S − 1) : = (S);
(S) : = TEMP;

The top 2 words of the stack are interchanged.
Indicators = CCA on the new TOS

84. DXCH <Double exchange> Stack OpCode = 16

TEMP : = (S − 1, S);
(S − 1, S) : = (S − 3, S − 2);
(S − 3, S − 2) : = TEMP;

The top two double word pairs are interchanged on the stack.
Indicators = CCA on the new TOS double word 85. XAX <Exchange A and X> Stack OpCode = 35

-Continued

TEMP : = X;
X : = (S);
(S) : = TEMP;

The content of TOS and the index register are interchanged.
Indicators = CCA on the new TOS 86. XBX <Exchange B and X> Stack OpCode = 75

TEMP : = X;
X : = (S − 1);
(S − 1) : = TEMP;

The second word of the stack is interchanged with the content of the index register.
Indicators = Unaffected 87. CAB <Rotate ABC> Stack OpCode = 56

TEMP : = (S − 2);
(S − 2) : = (S − 1);
(S − 1) : = (S);
(S) : = TEMP;

The third word of the stack is removed from the stack, the top two words are compressed onto the rest of the stack, and the original third word is pushed onto the stack.
Indicators = CCA on the new TOS

Q. INDEX TRANSFER INSTRUCTIONS

88. LDXA <Load X onto stack> Stack OpCode = 44

S : = S + 1;
(S) : = X;

The content of the index register is pushed onto the stack.
Indicators = CCA on the new TOS 89. LDXB <Load X into B> Stack OpCode = 42

(S − 1) : = X;

The second word of the stack is replaced by the content of the index register. The TOS is unaffected.
Indicators = CCA on the new B 90. STAX <Store A into X> Stack OpCode = 43

X : = (S);
S : = S − 1;

The TOS replaces the content of the index register, and the stack is popped.
Indicators = CCA on the new X 91. STBX <Store B into X> Stack OpCode = 26

X : = (S − 1);

The second word of the stack replaces the content of the index register. The stack is unchanged.
Indicators = CCA on the new X

R. INDEX ARITHMETIC INSTRUCTIONS

92. ADAX <Add A to X> Stack OpCode = 36

X : = X + (S);
S : = S − 1;

The TOS is added to the content of the index register in integer form. The sum replaces the content of the index, the TOS is popped.
Indicators = CCA on the new X, Carry, Overflow 93. ADBX <Add B to X> Stack OpCode = 76

X : = X + (S − 1);

The second word of the stack is added to the content of the index register in integer form, and the result replaces the content of the index register.
Indicators = CCA on new X, Carry, Overflow 94. ADXA <Add X to A> Stack OpCode = 37

–Continued

```
(S) : = (S) + X;
```

The content of the index register is added to the TOS, and the sum replaces the TOS.
Indicators = CCA on the new TOS, Carry, Overflow 95. ADXB <Add X to B> Stack OpCode = 77

```
(S – 1) : = (S – 1) + X;
```

The content of the index register is added to the second word of the stack in integer form, and the result replaces the second word of the stack.
Indicators = CCA on new (S – 1). Carry, Overflow

S. CONTROL INSTRUCTION

96. NOP <No operation> Stack OpCode = 00

The users program space and data space remain unchanged.
Indicators = Unaffected

```
SHIFTS      Memory opcode = 01
            Sub OpCode = CIR(5:9)
            Bit 4 is a true index bit
            CNT = (CIR(10:15) + (if CIR(4) = 1
              then X else 0)) mod 64;
```

T. SINGLE WORD SHIFT INSTRUCTIONS

97. ASL CNT <Arithmetic shift left> Sub OpCode 1 = 00

The TOS is shifted left CNT bits, preserving the sign bit.
Indicators = CCA

98. ASR CNT <Arithmetic shift right> Sub OpCode 1 = 01

The TOS is shifted right CNT bits, propagating the sign bit.
Indicators = CCA

99. LSL CNT <Logical shift left> Sub OpCode 1 = 02

The TOS is shifted left CNT bits logically.
Indicators = CCA

100. LSR CNT <Logical shift right> Sub OpCode 1 = 03

The TOS is shifted right CNT bits logically.
Indicators = CCA

101. CSL CNT <Circular shift left> Sub OpCode 1 = 04

The TOS is shifted left CNT bits circularly
Indicators = CCA

102. CSR CNT <Circular shift right> Sub OpCode 1 = 05

The TOS is shifted right CNT bits circularly.
Indicators = CCA

103. SCAN <Scan bits> Sub OpCode 1 = 06

```
  if CIR(4) = 0 then X : = –1;
  if (S)¬= 0 then
begin
  while (S(0) = 0 then
begin
  logical shift left A by 1;
  X : = X + 1;
end;
  logical shift left A by 1;
  X : = X + 1;
end else X : = 16;
```

The TOS is shifted left until S(0) = 1, then shifted left one more bit. The shift count is left in the index register.
Indicators = CCA on final TOS –Continued

U. DOUBLE WORD SHIFT INSTRUCTIONS

104. DASL CNT <Double arithmetic shift left> Sub OpCode 1 = 20

The doubleword contained in (S – 1, S) is shifted left CNT bits, preserving the sign bit, (S – 1(0)).
Indicators = CCA 105. DASR CNT <Double arithmetic shift right> Sub OpCode 1 = 21

The doubleword contained in (S – 1,S) is shifted right CNT bits, propagating the sign bit, (S – 1(0))
Indicators = CCA 106. DLSL CNT <Double logical shift left> Sub OpCode 1 = 22

The doubleword contained in (S – 1,S) is shifted left CNT bits logically
Indicators = CCA 107. DLSR CNT <Double logical shift right> Sub OpCode 1 = 23

The doubleword contained in (S – 1, S) is shifted right CNT bits logically.
Indicators = CCA 108. DCSL CNT <Double circular shift left> Sub OpCode 1 = 24

The doubleword contained in (S – 1, S) is shifted left CNT bits circularly
Indicators = CCA 109. DCSR CNT <Double circular shift right> Sub OpCode 1 = 25

The doubleword contained in (S – 1, S) is shifted right CNT bits circularly.
Indicators = CCA

V. TRIPLE WORD SHIFT INSTRUCTIONS

110. TASL CNT <Triple arithmetic shift left> Sub OpCode 1 = 10

The 3 word integer contained in (S – 2, S – 1, S) is shifted left CNT bits preserving the sign bit, (S – 2(0)).
Indicators = CCA on the new TOS Triple word 111. TASR CNT <Triple arithmetic shift right> Sub OpCode 1 = 11

The 3 word integer contained in (S – 2, S – 1, S) is shifted right CNT bits propagating the sign bit, (S – 2(0)).
Indicators = CCA on the new TOS Triple word 112. TNSL <Triple normalizing shift left> Sub OpCode 1 = 16

```
  if CIR(4) = 0 then X : = 0;
  if (S – 2, S – 1, S)  ¬= 0 then
begin
  while (S – 2(6)) = 0 do
begin
  X : = X + 1;
  arithmetic left shift 1 of (S – 2, S – 1, S);
end;
end else X : = X + 42;
```

The top 3 words of the stack are shifted left arithmetically until (S – 2(6)) = 1. The shift count is stored in the index register.
Indicators = CCA on final value of (S – 2,S – 1,S)

W. BIT TEST INSTRUCTIONS

113. TSBM N <Test and set bits in memory> Sub OpCode 3 = 14

```
TEMP : = (DB + N); <<fetch memory cell>>
(DB + N) : = 2**16 – 1; <<set memory cell to all ones>>
(DB + N) : = TEMP or (S) <<set bits>>
(S) : = TEMP and (S) <<get bits>>
```

-Continued

114. TBC CNT <Test bit and set condition code> Sub OpCode 1 = 32

The bit position of the TOS to be tested is specified by (CIR(10:15) + (if CIR(4) ¬= 0 then X else 0)) mod 16
Note that CIR(4) is a true index bit for the bit number
Indicators = CCE if the bit was 0
CCL or CCG if the bit was 1

115. TRBC CNT <Test and reset bit, set condition code> Sub OpCode 1 = 33

This instruction's operation is identical to that of TBC except that the tested bit is reset to 0 after the test.
Indicators = CCE if the bit was 0
CCL or CCG if the bit was 1

116. TSBC CNT <Test, set bit, set condition code> Sub OpCode 1 = 34

This instruction's operation is identical to that of TBC except that the tested bit is set to 1 after the test
Indicators = CCE if the bit was 0
CCL or CCG if the bit was 1

117. TCBC CNT <Test and complement bit and set CC> Sub OpCode 1 = 35

This instruction's operation is identical to that of TBC except that the tested bit is complemented after the test.
Indicators = CCE if the bit was 0
CCL or CCG if the bit was 1

X. FIELD INSTRUCTIONS

J = (CIR(8:11))
K = (CIR(12:15))

118. EXF J,K <Extract field> Sub Code 2 = 15

0< = J< = 15 specifies the first (leftmost) bit in the source field. 0< = K< = 15 specifies the number of bits in the field.

(S(16 − K:15)) : = (S(J:J + K − 1));

(S(0:15 − K)) : = 0;

Bits J, J + 1, J + 2, . . . , J + K − 1 are extracted from the TOS, and the TOS is deleted. The K bit field is right justified with high order zeros, and this result is pushed onto the stack.
Indicators = CCA on new TOS 119. DPF J,K <Deposit field> Sub OpCode 2 = 16

0< = J< = 15 specifies the first bit in the destination field. 0< = K< = 15 specifies the number of bits in the field (S − 1(J:J + K − 1)) : = (S(16 − K:15));
(S − 1(0:J)) : = (S − 1(0:J));
(S − 1(J + K:15)) : = (S − 1(J + K:15));
S : = S − 1;

The K least significant bits of the TOS are placed in bits J, J + 1, . . . , J + K − 1 of the second word of the stack; the remaining bits of the second word of the stack are unchanged. The source operand is deleted from the stack
Indicators = CCA on new TOS

Y. IMMEDIATE INSTRUCTIONS

N = (CIR(8:15))
0< = N< = 255

120. LDI = N <Load immediate> Sub OpCode 2 = 02

S : = S + 1;
(S) : = N;

The immediate positive quantity N is pushed onto the stack as a positive integer.
Indicators = CCA on the new TOS -Continued 121. LDNI = N <Load negative immediate> Sub OpCode 2 = 12

S : = S + 1;
(S) : = − N;

The immediate positive quantity N is 2's complemented and pushed onto the stack as a negative integer.
Indicators = CCA on the new TOS 122. CMPI = N <Compare immediate> Sub OpCode 2 = 04

CC : = (S) : N;
S : = S − 1;

The condition code is set to pattern C as a result of the comparison of the TOS with the positive quantity N. The TOS is deleted.
Indicators = CCC 123. CMPN = N <Compare negative immediate> Sub OpCode 2 = 14

CC : = (S) : − N
S : = S − 1;

The condition code is set to pattern C as a result of the comparison of the TOS with the 2's complement of the positive quantity N. The TOS is deleted.
Indicators = CCC 124. ADDI = N <Add immediate> Sub OpCode 2 = 05

(S) : = (S) + N;

The immediate positive quantity N is added to the TOS in integer form, and the sum replaces the TOS.
Indicators = CCA on the new TOS, Carry, Overflow 125. SUBI = N <Subtract immediate> Sub OpCode 2 = 06

(S) : = (S) − N;

The immediate positive quantity N is substracted from the TOs in integer form, and the result replaces the TOS.
Indicators = CCA, Carry, Overflow 126. MPYI = N <Multiply immediate> Sub OpCode 2 = 07

(S) : = (S) * N;

The immediate positive quantity N is multiplied with the TOS in integer form; the 16 bit integer result replaces the TOS.
Indicators = CCA on the new TOS, Overflow 127. DIVI = N <Divide immediate> Sub OpCode 2 = 10

(S) : = (S) div N;

The immediate positive quantity N is divided into the TOS in integer form; the 16 bit integer quotient replaces the TOS.
Indicators = CCA on the new TOS 128. ORI = N <Logical OR immediate> Sub OpCode 3 = 15

(S) : = (S) or N;

The immediate positive quantity N is expanded to 16 bits with high order zeros and inclusive ORed with the TOS; the result replaces the TOS.
Indicators = CCA 129. XORI = N <Logical Exclusive OR immediate> Sub OpCode 3 = 16

(S) : = ¬(S) and N or (S) and ¬N;

The immediate positive quantity N is expanded to 16 bits with high order zeros and exclusive ORed with the TOS; the result replaces the TOS.
Indicators = CCA 130. ANDI = N <Logical AND immediate> Sub OpCode 3 = 17

–Continued

```
(S) : = (S) and N;
```

The immediate positive quantity N is expanded to 16 bits with high order zeros and ANDed with the TOS; the result replaces the TOS. Indicators = CCA

Z. IMMEDIATE INDEX INSTRUCTIONS

131. LDXI = N <Load X immediate> Sub OpCode 2 = 03

```
X: = N;
```

The index register is loaded with the positive immediate operand N. Indicators = Unaffected 132. LDXN = N <Load X negative immediate> Sub OpCode 2 = 13

```
X : = – N;
```

The index register is loaded with the 16 bit 2's complement of the immediate operand.
Indicators = Unaffected 133. ADXI = N <Add immediate to X> Sub OpCode 3 = 05

```
X : = X + N,
```

The immediate positive quantity N is added to the content of the index register in integer form.
Indicators = CCA on X 134. SBXI = N <Subtract immediate from X> Sub OpCode 3 = 06

```
X : = X – N;
```

The immediate positive quantity N is subtracted from the content of the index register in integer form.
Indicators = CCA on X

AA. PROGRAM CONTROL INSTRUCTIONS

135. PCAL N <Procedure call> Sub OpCode 3 = 02

```
if N = O then
  begin
    TEMP : = (S);
    S : = S – 1;
  end else TEMP : = (PL – N);
S : = S + 1;
(S) : = X;
S : = S + 1;
(S) : = if in middle of interrupting instruction then P–PB
else P+1– PB
S : = S + 1;
(S) : = STATUS;
S : = S + 1;
(S) : = S – Q;
Q : = S;
P : = evaluation of label in TEMP;
```

Control is transferred to the location evaluated by the label contained on the TOS if N = 0 or by the label contained in PL – N otherwise. Then a four word stack marker is placed on the stack. The labels have the two forms discussed in section IV — D. If reference is made to a local label, transfer is made to the PB relative address and the stack linkage is created ignoring the U bit.

If reference is made to an external label whose Segment descriptor table number is different than the present number and the machine is in user mode, the U bit of the target segment linkage must not be set, otherwise a trap occurs. Furthermore if an external label is referenced a local label must occur in the STT table of the called segment. If the Trace bit is on in the Target CST entry the PCAL will be made to the Trace segment, % 16. If a privileged user is calling a user segment it will run in privileged mode.
Indicators = Unaffected 136. SCAL N <Subroutine Call> Sub OpCode 3 = 01

```
if N = 0 then
  begin
    TEMP : = (S);
```

-Continued

```
    S : = S – 1;
  end else TEMP : = (PL – N);
S = S + 1;
(S) : = P + 1 – PB;
P : = evaluation of label in TEMP;
```

Control is transferred to the location pointed to by the evaluation of the local label on the TOS, if N = O, otherwise by the evaluation of the local label at PL – N. The return address is then pushed onto the stack. Labels are evaluated identically to the PCAL instruction, except only local labels are allowed. Non local label gives STT violation trap.
Indicators = Unaffected 137. EXIT N <Procedure and interrupt exit>

```
TEMP : = 4
Begin <<normal exit only>>
  TEMP : = Q – TEMP;
  S : = Q;
  Q : = S – (S);
  S : = S – 1;
  STATUS : = (S); Note that user mode may not EXIT to
  privileged mode and may not change the interrupt
  disable bit, I.
  If STATUS(8:15) = 0 then
    Begin   PB : = 0;
            PL : = 2**16 – 1;
    End
  Else PB, PL : = evaluation of segment descriptor
  specified by
    STATUS (8: 15);
  S : = S – 1;
  P : = PB + (S);
  S : = S – 1;
  X : = (S);
  S : = TEMP – N Note that in exits from interrupt routine
  N must be 0.
End;
```

This instruction is used to return from routines called by the PCAL instruction and by an Interrupt CALL.
If an External Interrupt routine is being EXITed, then the active state of the device's interrupt is reset.
If an External Interrupt is waiting then its routine is CALLed without removing the old stack marker or creating a new one.
Otherwise, a normal exit occurs by setting Q to Q-Delta Q, STATUS to the previous status and P to the previous P. (See Section III-G for the stack marker format.)
See Appendix for Complete Flowcharts of PCAL, EXIT, and the Interrupt Handler.

138. SXIT N <Subroutine exit> Sub OpCode 3 = 04

```
P : = PB + (S);
S : = S – N – 1;
```

This instruction is used to return from subroutines specified by the SCAL instruction.
Indicators = Unaffected 139. HALT K <Halt> Spec. OpCode = 17

This is a privileged instruction. The machine halts. This instruction is non-interruptable and manual intervention is required to restart the machine. The K field is ignored.
Indicators = Unaffected 140. PAUS K <Pause> Spec. OpCode = 01

This is a privileged instruction. The machine pauses. This instruction is interruptable. The K field is ignored.
Indicators = Unaffected 141. XEQ K <Execute> Spec. OpCode = 06

```
CIR : = (S – K);
```

The content of the word in the stack at S – K is placed in the current instruction register to be executed.
Control is returned to the instruction after the XEQ unless a transfer of control was executed.

Note: Executing a stack op with the right stack op not a NOP is illegal.
Indicators = Set by the executed instruction or Stack Ops –Continued

```
BB. MOVE INSTRUCTIONS
        MEMORY OPCODE = 02
        SUB OPCODE 2 = 00
        MOVE OPCODE = CIR(8:10)
        SDEC = CIR(14:15)
        CCF = CIR(11:13)
            CIR(11) = Numeric
            CIR (12) = Alphabetic
        PB/DB (0/1) = CIR(11)
```

```
142.    <Move Words>                    Move OpCode =
MOVE                                               00
        BASE : = if (DB relative) then DB else PB;
        While (S)  ¬= 0 do
          Begin
            ((S-2)+DB) : = ((S-1) + BASE);
            (S-2) : = (S-2) + Sign(S);
            (S-1) : = (S-1) + Sign(S);
            (S) : = (S) - Sign(S);
          End;
        S : = S - SDEC;
```

This instruction expects a signed word count in the TOS, a source word address in TOS-1, and a target word address in TOS-2. If the word count is positive, the words are moved in a left-to-right manner from the source area to the target area. A negative word count will cause a right-to-left move from the source area to the target area.
S is decremented by the amount indicated in the SDEC field.
Indicators = Unaffected.

```
143.    <Move Bytes>                    Move OpCode =
MVB                                                01
        While (S) ¬= 0 do
          Begin
            Comment SAD = Source Byte Address
                    TAD = Target Byte Address;
            If (DB relative) then
            Begin
              SAD : = (S-1) + 2*DB
                If (not PRIV. MODE) and (SAD not legal) then
                  Begin
                    SAD : = SAD + %100000
                  End
            End
            Else <<PB relative>>
                  Begin
                    SAD : = (S-1) + 2*PB
                  End
            TAD : = (S-2) + 2*DB;
            If (not PRIV. MODE) and (TAD not legal) then
                  Begin
                    TAD : = TAD + %100000
                  End;
            (TAD) : = (SAD);
            (S-2) : = (S-2) + Sign (S);
            (S-1) : = (S-1) + Sign (S);
            (S) : = (S) - Sign (S);
          End;
        S : = S - SDEC;
```

This instruction expects a signed byte count in the TOS, a source byte address in TOS-1, and a target byte address in TOS-2. If the byte count is positive, the bytes are moved in a left-to-right manner from the source area to the target area. A negative byte count will cause a right-to-left move from the source area to the target area.
S is decremented by the amount indicated in the SDEC field.
Indicators = Unaffected

```
144.    <Move Bytes While>              Move OpCode =
MVBW                                               04
        Comment SAD = Source Byte Address
                TAD = Target Byte Address
      R : SAD : = (S) + 2*DB;
        If (not PRIV. MODE) and (SAD not legal) then
          Begin
            SAD : = SAD + %100000
          End;
        If (CCB on (SAD) ⊂ CCF) then
          Begin
            TAD : = (S-1) + 2*DB;
            If (not PRIV. MODE) and (TAD not legal) then
              Begin
                TAD : = TAD + %100000
              End;
              (TAD) : = If CIR(13) = 1<<upshift>> and
              (SAD) is a lower case letter
              then upshift ((SAD)) ELSE (SAD);
              (S-1) : = (S-1) + 1;
              (S) : = (S) + 1;
              GOTO R
        End;
```

–Continued

```
        S : = S - SDEC;
```

This instruction expects a source byte address in the TOS and a target byte address in TOS-1. As long as the byte in the source string is one of the types specified by CCF, it is moved. If the byte is to be moved and the upshift bit is on and the byte is a lower case letter the target byte will be an upshifted copy of the source byte.
S is decremented by the amount indicated in the SDEC field.
Indicators = CCB on the last character scanned.

```
145.    <Scan While>                    Move OpCode =
SCW                                    02 CIR(11) = 1
        Comment SAD = Source Byte Address (absolute); (17
        bits)
      R : SAD : = (S-1) + 2*DB;
        If (not PRIV. MODE) and (SAD⊄[DB,S]) then
          Begin
            SAD : = SAD + %100000
          End;
        If (SAD) = (S(8:15)) then
          Begin
            (S-1) : = (S-1) + 1;
            GOTO R
          End;
        CARRY : = If (SAD) = (S(0:7)) then 1 else 0;
        CC : = CCB on (SAD);
        S : = S - SDEC;
```

This instruction expects the TOS to contain a terminal character in the left byte and a test character in the right byte. The second word of the stack contains a source byte address. Bytes are scanned until the source string presents a character different from the test character. If the terminating character is the same as the left byte of the TOS, the Carry bit is set.
S is decremented by the amount indicated in the SDEC field.
Indicators are CCB on the last character scanned, and CARRY.

```
146. SCU  <Scan Until>                  Move OpCode =
                                        03 CIR(11 = 1
        Comment SAD = Source Byte Address (absolute 17 bits)
      R : SAD : = (S-1) + 2*DB;
        If (not PRIV. MODE) and (SAD ⊄ DB,S]) then
          Begin
            SAD : = SAD + %100000
          End;
        If (SAD)  ¬= (S(8:15)) and (SAD)  ¬= (S(0:7)) then
          Begin
            (S-1) : = (S-1) + 1;
            GOTO R
          End;
        CARRY : = If (SAD) = (S(0:7)) then 1 else 0;
        S : = S - SDEC;
```

This instruction expects the TOS to contain a terminal character in the left byte and a test character in the right byte. The second word of the stack contains a source byte address. Bytes are scanned until either the terminal or test character is encountered. The address of this character is found in the second word of the stack. If the last character scanned = the terminal character the CARRY = 1 else CARRY = 0.
S is decremented by the amount indicated in the SDEC field.
Indicators = CARRY.

```
147.    <Compare Bytes>                 Move OpCode =
CMPB                                               05
        Comment SAD = Source Byte Address
                TAD = Target Byte Address
        While (S)¬= 0 do
          Begin
            If (DB relative) then
              Begin
                SAD : = (S-1) + 2*DB;
                If (not PRIV.MODE) and (SAD not legal) then
                  Begin
                    SAD : = SAD + %100000
                  End
              End
                Else <<PB relative>>
                  Begin
                    SAD : = (S-1) + 2*PB
                  End;
            TAD : = (S-2) + 2*DB;
            If (not PRIV.MODE) and (TAD not legal) then
              Begin
                TAD : = TAD + %100000
              End
            If (TAD)   = (SAD) then GOTO N;
            (S-2) : = (S-2) + Sign(S);
            (S-1) : = (S-1) + Sign(S);
            (S) : = (S) - Sign(S);
          End;
      N: CC : = If (S) = 0 then CCE else
      If (TAD)> (SAD) then CCG else CCL;
```

–Continued

```
S : = S – SDEC;
```

This instruction expects a signed byte count in the TOS, a source byte address in TOS-1, and a target byte address in TOS-2. If the byte count is positive bytes from the source area are compared to bytes from the target area in a left-to-right manner. A negative byte count will cause a right-to-left comparison. The instruction terminates when either a comparison fails or the byte count in the TOS reaches zero.
S is decremented by the amount indicated in the SDEC field.
Indicators = If (byte count = 0) then CCE else
If (final target byte > final source byte) then CCG else CCL.

CC. I/O AND INTERRUPT INSTRUCTIONS

For the I/O instructions assume the following definitions:

(S–K(8:15)) contains a device number.
K is a four bit displacement 0 < = K < = 15.
All I/O and Interrupt control instructions are PRIVILEGED.
A non-responding device controller will terminate I/O instructions and set indicator to CCL.

148. SIO K <Start I/O> Spec. OpCode = 07

```
Device # : = (S – K(8:15)):
If non-responding device controller then
CC = CCL and terminate instruction;
Begin
  If SIO not ready then
    Begin
      S: = S + 1;
      (S) : = Device Status;
      CC: = CCG;
    End else
    Begin
      Send SIO command to device;
      CC = CCE;
    End;
End;
```

The I/O instruction status is pushed on the stack if the SIO is not ready. This is a privileged instruction.
Indicators = Condition Code.

149. RIO K <Read I/O> Spec. OpCode = 10

```
Device # : = (S – K(8:15));
If non-responding device controller then
CC = CCL else
Begin
  If RIO not ready then
    Begin
      S : = S + 1;
      (S) : = Device Status;
      CC : = CCG;
    End else;
    Begin
      S : = S + 1;
      (S) : = 16 bit word from device;
      CC : = CCE;
    End;
  End
```

The 16 bit direct data word from the device specified is pushed onto the stack. The I/O instruction status is pushed onto the stack if the RIO is not ready. This is a privileged instruction.
Indicators = Condition Code 150. WIO K <Write I/O> Spec. OpCode = 11

```
Device # : = (S – K(8:15));
If non-responding device controller then
CC = CCL else
Begin
  If WIO not ready then
    Begin
      S : = S + 1;
      (S) : = Device Status;
      CC : = CCG;
    End else
    Begin
      16 bit word to device : = (S)
      S = S – 1;
      CC : = CCE;
    End;
End;
```

-Continued

Assume TOS contains the data word. The 16 bit data word is obtained from the stack and transmitted to the output device specified by the right byte of the content of S – K. If the WIO is ready, the data word is deleted; otherwise, the I/O instruction status is pushed onto the stack. This is a privileged instruction.
Indicators = Condition Code 151. TIO K <Test I/O> Spec. OpCode = 12

```
Device # : = (S – K(8:15));
If non-responding device controller then
CC : = CCL else
Begin
  S : = S + 1;
  (S) : = Device Status;
  CC : = CCE;
End;
```

The 16 bit device status word is pushed onto the stack. Note that TIO does not reset the device status bits. This is a privileged instruction.
Indicators = Condition Code 152. CIO K <Control I/O> Spec. OpCode = 13

```
Device # : = (S – K(8:15));
If non-responding device controller then
CC : = CCL else
Begin
  16 bit control word to device : = (S);
  S : = S – 1;
  CC : = CCE;
End;
```

Assume TOS contains the control word. The 16 bit control word is obtained from the stack and transmitted to the device specified by the right byte of the content of S – K. If no error is detected, the control word is deleted. This is a privileged instruction.
Indicators = if non-responding module then CCL else CCE.

153. SED K <Set enable/disable external interrupts> Spec. OpCode = 02

```
STATUS(1) : = CIR(15);
```

The interrupt system is enabled or disabled corresponding to the least significant bit of the instruction. K = 1 implies enable, K = 0 disable. This is a privileged instruction.
Indicators = Unaffected 154. SIN K <Set interrupt> Spec. OpCode = 16

```
If non-responding device controller then
CC : = CCL and terminate instruction else
CC : = CCE and set device interrupts
```

Sets the interrupt flip flop in the device specified by the content of S – K. This is a privileged instruction.
Indicators = if error then CCL else CCE 155. SIRF K <Set external interrupt reference flag> Spec. OpCode = 15

```
Device     : = (S – K);
E : = Device    * 4 + 3;
If (E(O)) = 1 then
  Begin
    (E(O)) = O;
    Interrupt Counter : = Interrupt Counter + 1
  End
```

The IRF bit in the Device Reference Table (see Section IV – F) corresponding to the device number in the stack at S – K is set to O. S remains unchanged. This is a privileged instruction.
Indicators = Unaffected 156. SMSK <Set Mask> Spec. OpCode = 04

```
Temp : = Status(1);
Status(1) : = O;
If interrupt pending then
  Begin
    Status(1) : = Temp;
    Go To Interrupt Handler
  End else
16 bit mask word to all device controllers : = (S);
If I/O error then CC : = CCL else
```

–Continued

```
Begin
  S : = S – 1;
  CC : = CCE;
  STA(1) : = Temp;
End;
```

Assume TOS contains the mask word. The 16 bit mask is transmitted to all device controllers. If no error is detected; the mask is deleted. Note that if there is an I/O error, it means that one or more devices were unable to accept the new mask, while others did accept it. This leaves the I/O in an unknown state. Also, Status(1) = O if an I/O error. This is a privileged instruction.

157. RMSK K <Read Mask> Spec. OpCode = 05

```
S : = S + 1;
(S) : = 16 bit device mask
```

This instruction transfers the 16 bit mask word to the TOS. This is a privileged instruction.
Indicators = Unaffected 158. CMD K <Command> Spec. OpCode = 14

```
MCU Module # : = (S – K(12:15));
Command : = (S – K(10:11));
16 BIT DATA WORD : = (S);
S : = S – 1;
```

The 16 bit data word in the TOS and the 4 bit command in S – K(10:11) are sent over the MCU bus to the module given in S – K(12:15); the data word is deleted from the stack. This is a privileged instruction.
Indicators = Unaffected

DD. REGISTER CONTROL INSTRUCTIONS

159. PSHR N <Push registers> Sub OpCode2 = 11

```
if CIR(15) = 1 then PUSH(S – DB);
if CIR(14) = 1 then PUSH(O – DB);
if CIR(13) = 1 then PUSH(X);
if CIR(12) = 1 then PUSH(STATUS;
if CIR(11) = 1 then PUSH(Z – DB);
if CIR(10) = 1 then PUSH(DL – DB);
if CIR(9) = 1 then PUSH(DB);

where
  PUSH(REGISTER) is defined to be
  Procedure PUSH (Register);
  Value register; Integer register;
  Begin
    S : = S + 1;
    (S) : = REGISTER;
  End;

Note for pushing S – DB the following occurs:
  S : = S + 1;
  (S) : = S – DB – 1;
```

The registers specified by CIR(9:15) are pushed onto the stack.
Indicators = Unaffected 160. SETR N <Set registers> Sub OpCode2 = 17

```
if CIR(9) = 1 and PRIV. MODE then POP(DB);
if CIR(10) = 1 and PRIV. MODE then POP(DL + DB);
if CIR(11) = 1 and PRIV. MODE then POP(Z + DB);
if CIR(12) = 1 and if PRIV. MODE then
            POP(STATUS(0:15)) else
            POP(STATUS(2,4:7)
if CIR(13) = 1 then POP(X);
if CIR(14) = 1 then POP(O + DB);
if CIR(15) = 1 then POP(S + DB);
where
  POP(REGISTER) is defined to be
  procedure POP(Register);
    Begin
      Register : = (S);
      if Register ¬= "S"
        then S : = S – 1;
    End;
```

-Continued

The registers specified by CIR(9:15) are filled by an absolute value from the TOS for X, STATUS, and DB, and an absolute value computed by adding DB to the TOS for the others. After each register is set, the TOS is deleted.
Indicators = Unaffected 161. ADDS N <Add to S> Sub OpCode3 = 12

```
tl,6 if N > O then S : = S + N;
if N = O then S : = S – 1 + (S);
```

If the eight bit operand is zero, the content of the TOS is added to S – 1, otherwise the operand is added to S.
Indicators = Unaffected 162. SUBS N <Subtract from S> Sub OpCode3 = 13

```
if N > O then S : = S – N;
if N = O then S : = S – (S);
```

If the eight bit operand is zero, the content of the TOS is subtracted from S – 1, otherwise the operand is subtracted from S.
Indicators = Unaffected 163. XCHD K <Exchange DB> Spec OpCode = 03

```
TEMP : = DB;
DB : = (S);
(S) : = TEMP;
```

This instruction expects a new DB value on the TOS. The current DB replaces that value on the TOS, while the new value is placed in DB. K is ignored.
This is a privileged instruction.
Indicators = Unaffected

EE. SPECIAL CONTROL INSTRUCTIONS

164. PLDA <Privileged load from absolute address> Mini OpCode = 15 CIR(15) = 0

```
S : = S + 1;
(S) : = (X);
```

The content of the index register is a 16 bit absolute address; the content of this address is pushed onto the stack. This is a privileged instruction.
Indicators = CCA 165. PSTA <Privileged store into absolute address> Mini OpCode = 15 CIR(15) = 1

```
(X) : = (S);
S : = S – 1;
```

The content of the index register is a 16 bit absolute address; the top word of the stack is stored into memory at that address, and then deleted from the stack.
This is a privileged instruction.
Indicators = Unaffected 166. RSW <Read Switch register> Mini OpCode = 14 CIR(15) = 0

```
S : = S + 1;
(S) : = Switch register;
```

The content of the Switch register is pushed onto the stack.
Indicators = CCA

LIST SEARCH INSTRUCTION

167. LLSH <Linked List Search> Mini OpCode = 14 CIR(15) = 1

```
while X > 0 and ((S) + (S – 2)) < (S – 1)) do
Begin
  (S) : = ((S));
  X : = X – 1;
End;
```

Continued

The TOS contains an absolute pointer into a linked list. Each link in the list is an absolute memory address which points to the next link. The second word in the stack (S − 1) is a test word. The third word in the stack (S − 2) is an offset which indicates the position, relative to each link, of a target number.
At each step, the test word is compared to the target number. If the test word is logically less than or equal to the target number, the instruction terminates. Otherwise, the TOS is replaced by the next link, the count (index register) is decremented, and the instruction repeats again.
This is a privileged instruction
Indicators = CCL if terminated on X = 0
CCE if terminated on ((S) + (S − 2)) > = (S − 1)
CCG if terminated on ((S) + (S − 2)) = 2 * * 16 − 1

GG. LOAD LABEL INSTRUCTION

168. LLBL N <Load Label> Sub OPCODE3 = 07

```
if N > (PL(8:15)) then STT violation trap else
Begin
  if (PL - (N(0))) = 1 then
    Begin
      S : = S + 1;
      (S) : = (PL - N);
    End else
  if N > % 177 then STT violation trap else
    Begin
      S : = S + 1;
      (S(0)) : = 1;
      (S(1:7)) : = N;
      (S(8:15)) : = STATUS (8:15);
    End;
End;
```

The label in the STT table at PL − N is loaded onto the TOS if it is in the STT, i.e., N ≤ STTL. If the label is internal and N ≤ % 177 the label is converted to external type and stacked. If the label is internal and N > % 177 then a STT Violation Trap is invoked.
Indicators = Unaffected

HH. PRIVILEGED MOVES

169. MVBL <Move from DB+ to DL+> Move OpCode = 02 CIR(11) = 0

```
While (S) ¬= 0 do
  Begin
    ((S - 2) + DL) : = ((S - 1) + DB);
    (S - 2) : = (S - 2) + Sign(S);
    (S - 1) : = (S - 1) + Sign(S);
    (S) : = (S) - Sign(S);
  End;
S : = S - SDEC;
```

This instruction expects a signed word count in the TOS, a source word address relative to DB in TOS − 1, and a target word address relative to DL in TOS − 2. If the word count is positive, the words are moved in a left-to-right manner from the DB area to the DL area. A negative word count will cause a right-to-left move from the DB area to the DL area.
S is decremented by the amount indicated in the SDEC field
This is a privileged instruction.
Indicators = Unaffected 170. MVLB <Move from DL+ to DB+> Move OpCode = 03 CIR(11) = 0

```
While (S) ¬= O do
  Begin
    ((S - 2) + DB) : = ((S - 1) + DL;
    (S - 2) : = (S - 2) + Sign(S);
    (S - 1) : = (S - 1) + Sign(S);
    (S) : = (S) - Sign(S);
  End;
S := S - SDEC;
```

This instruction expects a signed word count in the TOS, a source word address, DL relative, in TOS − 1, and a target word address, DB relative, in TOS − 2. If the word count is positive, the words are moved in a left-to-right manner from the DL area to the DB area. A negative word count will cause a right-to-left move from the DB area to the DL area.
S is decremented by the amount indicated in the SDEC field.
This is a privileged instruction.
Indicators = Unaffected

11. UNASSIGNED INSTRUCTION COMBINATION

Stack OpCode = 72
Sub OpCode1 = 17
with 6 bit L parameter, optional indexing or indirect addressing with the Y bit
Sub OpCode2 = 01
with 8 bit N parameter
Spec. OpCode = 00
each with 4 bit K parameter
Mini Op = 16 Bits 12, 13, 14, 15 = 0 Reserved
Mini Op = 16 Bits 12, 13, 14, 15 nonzero available
Mini Op = 17

APPENDIX A — ALPHABETICAL LISTING OF INSTRUCTIONS

| | | |
|---|---|---|
| 92. | ADAX | <Add A to X> |
| 93. | ADBX | <Add B to X> |
| 35. | ADD | <Add> |
| 124. | ADDI | =N <Add immediate> |
| 12. | ADDM | E (*, D, X, PDQS) <Add memory> |
| 161. | ADDS | N <Add to S> |
| 94. | ADXA | <Add X to A> |
| 95. | ADXB | <Add X to B> |
| 133. | ADXI | =N <Add immediate to X> |
| 64. | AND | <And, logical> |
| 130. | ANDI | =N <Logical AND immediate> |
| 97. | ASL | CNT <Arithmetic shift left> |
| 98. | ASR | CNT <Arithmetic shift right> |
| 18. | BCC | L (*, L, P) <Branch on Condition Code> |
| 19. | BCY | L (*, L, P) <Branch on carry> |
| 20. | BNCY | L (*, L, P) <Branch on no carry> |
| 22. | BNOV | L (*, L, P) <Branch on no overflow> |
| 21. | BOV | L (*, L, P) <Branch on overflow> |
| 17. | BR | E (*, D, X, P or indirect DQS) <Branch> |
| 24. | BRE | L (*, L, P) <Branch On TOS even> |
| 23. | BBRO | L (*, L, P) <Branch on TOS odd> |
| 67. | BTST | <Test byte on TOS> |
| 87. | CAB | <Rotate ABC> |
| 152. | CIO | K <Control I/O> |
| 158. | CMD | K <Command> |
| 34. | CMP | <Compare> |
| 147. | CMPB | <Compare bytes> |
| 122. | CMPI | =N <Compare immediate> |
| 11. | CMPM | E (*, D, X, PDQS) <Compare memory> |
| 123. | CMPN | =N <Compare negative immediate> |
| 29. | CPRB | L (*, L, P) <Compare range and branch> |
| 101. | CSL | CNT <Circular shift left> |
| 102. | CSR | CNT <Circular shift right> |
| 27 | DABZ | L (*, L, P) <Decrement A, branch if zero > |
| 47. | DADD | <Double add> |
| 104. | DASL | CNT <Double arithmetic shift left> |
| 105. | DASR | CNT <Double arithmetic shift right> |
| 46. | DCMP | <Double compare> |
| 108. | DCSL | CNT <Double circular shift left> |
| 109. | DCSR | CNT <Double circular shift right> |
| 79. | DDEL | <Double delete> |
| 82. | DDUP | <Double duplicate> |
| 71. | DECA | <Decrement A> |
| 72. | DECB | <Decrement B> |
| 16. | DECM | E (*, D, X, DQS) <Decrement memory> |
| 73. | DECX | <Decrement X> |
| 78. | DEL | <Delete A> |
| 80. | DELB | <Delete B> |
| 59. | DFLT | <Double float> |
| 38. | DIV | <Divide> |
| 127. | DIVI | =N <Divide immediate> |
| 50. | DIVL | <Divide Long> |
| 106. | DLSL | CNT <Double logical shift left> |
| 107. | DLSR | CNT <Double logical shift right> |
| 51. | DNEG | <Double negate> |
| 119. | DPF | J,K <Deposit field> |
| 48. | DSUB | <Double subtract> |
| 66. | DTST | <Test double word on TOS> |
| 81. | DUP | <Duplicate A> |
| 28. | DXBZ | L (*, L, P) <Decrement X, branch if zero> |
| 84. | DXCH | <Double exchange> |
| 75. | DZRO | <Double push zero> |
| 118. | EXF | J,K <Extract field> |
| 137. | EXIT | N <Procedure and interrupt exit> |
| 53. | FADD | <Floating add> |
| 52. | FCMP | <Floating compare> |
| 56. | FDIV | <Floating divide> |
| 61. | FIXR | <Fix and round> |
| 60. | FIXT | <Fix and truncate> |

APPENDIX A – ALPHABETICAL LISTING OF INSTRUCTIONS – Continued

| | | |
|---|---|---|
| 58. | FLT | <Float> |
| 58. | FMPY | <Floating multiply> |
| 57. | FNEG | <Floating negate> |
| 54. | FSUB | <Floating subtract> |
| 139. | HALT | K <Halt> |
| 25. | IABZ | L (*, L, P) <Increment A, branch if zero> |
| 68. | INCA | <Increment A> |
| 69. | INCB | <Increment B> |
| 15. | INCM | E (*, D, X, DQS) <Increment memory> |
| 70. | INCX | <Increment index> |
| 26. | IXBZ | L (*, L, P) <Increment X, branch if zero> |
| 41. | LADD | <Logical add> |
| 40. | LCMP | <Logical compare> |
| 2. | LDB | E (*, D, X, DQS) <Load byte> |
| 3. | LDD | E (*, D, X DQS) <Load double> |
| 120. | LDI | =N <Load immediate> |
| 44. | LDIV | <Logical divide> |
| 121. | LDNI | =N <Load negative immediate> |
| 5. | LDPN | N <Load double from program, negative> |
| 4. | LDPP | N <Load double from program, positive> |
| 6. | LDX | E (*, D, X, PDQS) <Load Index> |
| 88. | LDXA | <Load X onto stack> |
| 89. | LDXB | <Load X into B> |
| 131. | LDXI | =N <Load X immediate> |
| 132. | LDXN | =N <Load X negative immediate> |
| 168. | LLBL | N <Load Label> |
| 167. | LLSH | <Linked list search> |
| 43. | LMPY | <Logical multiply> |
| 1. | LOAD | E (*, D, X, PDQS) <Load> |
| 7. | LRA | E (* D, X, PDQS) <Load relative address> |
| 99. | LSL | CNT <Logical shift left> |
| 100. | LSR | CNT <Logical shift right> |
| 42. | LSUB | <Logical subtract> |
| 142. | MOVE | <Move words> |
| 37. | MPY | <Multiply> |
| 126. | MPYI | =N <Multiply immediate> |
| 49. | MPYL | <Multiply Long> |
| 14. | MPYM | E (*, D, X, PDQS) <Multiply memory> |
| 31. | MTBA | E (D, P) <Modify, Test, Branch, A> |
| 33. | MTBX | E (D, P) <Modify, Test, Branch, X> |
| 143. | MVB | <Move bytes> |
| 169. | MVBL | <Move from DB+ to DL+> |
| 144. | MVBW | <Move bytes while> |
| 170. | MVLB | <Move from DL+ to DB+> |
| 39. | NEG | <Negate> |
| 96. | NOP | <No operation> |
| 45. | NOT | <One's complement> |
| 62. | OR <Or, logical> | |
| 128. | ORI | =N <Logical OR immediate> |
| 140. | PAUS | K <Pause> |
| 135. | PCAL | N <Procedure call> |
| 164. | PLDA | <Privileged load from absolute address> |
| 159. | PSHR | N <Push registers> |
| 165. | PSTA | <Privileged store into absolute address> |
| 149. | RIO | K <Read I/O> |
| 157. | RMSK | K <Read Mask> |
| 166. | RSW | <Read switch register> |
| 134. | SBXI | =N <Subtract immediate from X> |
| 136. | SCAL | N <Subroutine Call> |
| 103. | SCAN | <Scan bits> |
| 146. | SCU | <Scan until> |
| 145. | SCW | <Scan while> |
| 153. | SED | K <Set enable/disable external interrupts> |
| 160. | SETR | N <Set registers> |
| 154. | SIN | K <Set interrupt> |
| 148. | SIO | K <Start I/O> |
| 155. | SIRF | K <Set external interrupt reference flag> |
| 156. | SMSK | <Set Mask> |
| 90. | STAX | <Store A into X> |
| 9. | STB | E (*, D, X, DQS) <Store byte> |
| 91. | STBX | <Store B into X> |
| 10. | STD | E( (*, D, X, DQS) <Store double> |
| 8. | STOR | E (*, D. X, DQS) <Store> |
| 36. | SUB | <Subtract> |
| 125. | SUBI | =N <Subtract immediate> |
| 13. | SUBM | E (*, D, X, PDQS) <Subtract memory> |
| 162. | SUBS | N <Subtract from S> |
| 138. | SXIT | N <Subroutine exit> |
| 110. | TASL | CNT <Triple arithmetic shift left> |
| 111. | TASR | CNT <Triple arithmetic shift right> |
| 30. | TBA | E (D, P) <Test, branch, A> |
| 114. | TBC | CNT <Test bit and set condition code> |
| 32. | TBX | E (D, P) <Test, branch, X> |
| 117. | TCBC | CNT <Test and complement bit and set CC> |
| 65. | TEST | <Test TOS> |
| 151. | TIO | K <Test I/O> |
| 112. | TNSL | <Triple normalizing shift left> |
| 115. | TRBC | CNT <Test and reset bit, set condition code> |
| 116. | TSBC | CNT <Test, set bit, set condition code> |
| 113. | TSBM | N <Test and set bit in memory> |
| 150. | WIO | K <Write I/O> |

APPENDIX A – ALPHABETICAL LISTING OF INSTRUCTIONS – Continued

| | | |
|---|---|---|
| 85. | XAX | <Exchange A and X> |
| 86. | XBX | <Exchange B and X> |
| 83. | XCH | <Exchange A and B> |
| 163. | XCHD | K <Exchange DB> |
| 141. | XEQ | K <Execute> |
| 63. | XOR | <Exclusive or, logical> |
| 129. | XORI | =N <Logical Exclusive OR immediate> |
| 74. | ZERO | <Push zero> |
| 76. | ZROB | <Zero B> |
| 77. | ZROX | <Zero X> |

APPENDIX B — NUMERICAL LISTING OF INSTRUCTIONS

| | | | |
|---|---|---|---|
| 1. | LOAD | E (*,D, X, PDQS) <Load> | Mem. OpCode=04 |
| 2. | LDB | E (*, D, X, DQS) <Load byte> | Mem. OpCode=15 |
| 3. | LDD | E (*, D, X, DQS) <Load double> | Mem. OpCode=15 |
| 4. | LDPP | N >Load double from program, positive> | Sub OpCode 3=10 |
| 5. | LDPN | N <Load double from program, negative> | Sub OpCode 3=11 |
| 6. | LDX | E (*, D, X, PDQS) <Load Index> | Mem. OpCode=13 |
| 7. | LRA | E (*, D, X, PDQS) <Load relative address> | Mem. OpCode=17 |
| 8. | STOR | E (*, D, X, DQS) <Store> | Mem. OpCode=05 |
| 9. | STB | E (*, D, X, DQS) <Store byte> | Mem. OpCode=16 |
| 10. | STD | E (*, D, X, DQS) <Store double> | Mem. OpCode=16 |
| 11. | CMPM | E (*, D, X, PDQS) <Compare memory> | Mem. OpCode=06 |
| 12. | ADDM | E (*, D, X, PDQS) <Add memory> | Mem. OpCode=07 |
| 13. | SUBM | E (*, D, X, PDQS) <Subtract memory> | Mem. OpCode=10 |
| 14. | MPYM | E (*, D, X, PDQS) <Multiply memory> | Mem. OpCode=11 |
| 15. | INCM | E (*, D, X, DQS) <Increment memory> | Mem. OpCode=12 |
| 16. | DECM | E (*, D, X, DQS) <Decrement memory> | Mem. OpCode=12 |
| 17. | BR | E (*, D, X, P or indirect DQS) <Branch> | Mem. OpCode=14 |
| 18. | BCC | L (*, L, P) <Branch on Condition Code> | Mem. OpCode=14 |
| 19. | BCY | L (*, L, P) <Branch on carry> | Sub OpCode 1=14 |
| 20. | BNCY | L (*, L, P) <Branch on no carry> | Sub OpCode 1=15 |
| 21. | BOV | L (*, L, P) <Branch on overflow> | Sub Opcode 1=30 |
| 22. | BNOV | L (*, L, P) <Branch on no overflow> | Sub OpCode 1=31 |
| 23. | BRO | L (*, L, P) <Branch on TOS odd> | Sub OpCode 1=36 |
| 24. | BRE | L (*, L, P) <Branch on TOS even> | Sub OpCode 1=37 |
| 25. | IABZ | L (*, L, P) <Increment A, branch if zero> | Sub OpCode 1=07 |
| 26. | IXBZ | L (*, L, P) <Increment X, branch if zero> | Sub OpCode 1=12 |
| 27. | DABZ | L (*, L, P) <Decrement A, branch if zero> | Sub OpCode 1=27 |
| 28. | DXBZ | L (*, L, P) <Decrement X, branch if zero> | Sub OpCode 1=13 |
| 29. | CPRB | L (*, L, P) <Compare range and branch> | Sub OpCode 1=26 |
| 30. | TBA | E (D, P) <Test branch A> | Mem. OpCode = 05 |
| 31. | MTBA | E (D, P) <Modify, Test, Branch, A> | Mem. OpCode =05 |
| 32. | TBX | E (D, P) <Test, branch X> | Mem. OpCode = 05 |
| 33. | MTBX | E (D, P) <Modify, Test, Branch, X> | Mem. OpCode=05 |
| 34. | CMP | <Compare> | Stack OpCode=17 |
| 35. | ADD | <Add> | Stack OpCode=20 |
| 36. | SUB | <Subtract> | Stack OpCode=21 |
| 37. | MPY | <Multiply> | Stack OpCode=22 |
| 38. | DIV | <Divide> | Stack OpCode=23 |
| 39. | NEG | <Negate> | Stack OpCode=24 |
| 40. | LCMP | <Logical compare> | Stack OpCode=57 |
| 41. | LADD | <Logical add> | Stack OpCode=60 |
| 42. | LSUB | <Logical subtract> | Stack OpCode=61 |
| 43. | LMPY | <Logical multiply> | Stack OpCode=62 |
| 44. | LDIV | <Logical divide> | Stack OpCode=63 |
| 45. | NOT | <One's complement> | Stack OpCode=64 |
| 46. | DCMP | <Double compare> | Stack OpCode=10 |
| 47. | DADD | <Double add> | Stack OpCode=11 |

APPENDIX B–NUMERICAL LISTING OF INSTRUCTIONS–Continued

| | | | |
|---|---|---|---|
| 48. | DSUB | <Double subtract> | Stack OpCode=12 |
| 49. | MPYL | <Multiply Long> | Stack OpCode=13 |
| 50. | DIVL | <Divide Long> | Stack OpCode=14 |
| 51. | DNEG | <Double negate> | Stack OpCode=15 |
| 52. | FCMP | <Floating compare> | Stack OpCode=50 |
| 53. | FADD | <Floating add> | Stack OpCode=51 |
| 54. | FSUB | <Floating subtract> | Stack OpCode=52 |
| 55. | FMPY | <Floating multiply> | Stack OpCode=53 |
| 56. | FDIV | <Floating divide> | Stack OpCode=54 |
| 57. | FNEG | <Floating negate> | Stack OpCode=55 |
| 58. | FLT | <Float> | Stack OpCode=47 |
| 59. | DFLT | <Double float> | Stack OpCode=30 |
| 60. | FIXT | <Fix and truncate> | Stack OpCode=71 |
| 61. | FIXR | <Fix and round> | Stack OpCode=70 |
| 62. | OR | <Or, logical> | Stack OpCode=65 |
| 63. | XOR | <Exclusive or, logical> | Stack OpCode=66 |
| 64. | AND | <And, logical> | Stack OpCode=67 |
| 65. | TEST | <Test TOS> | Stack OpCode=25 |
| 66. | DTST | <Test double word on TOS> | Stack OpCode=27 |
| 67. | BTST | <Test byte on TOS> | Stack OpCode=31 |
| 68. | INCA | <Increment A> | Stack OpCode=33 |
| 69. | INCB | <Increment B> | Stack OpCode=73 |
| 70. | INCX | <Increment index> | Stack OpCode=04 |
| 71. | DECA | <Decrement A> | Stack OpCode=34 |
| 72. | DECB | < Decrement B> | Stack OpCode=74 |
| 73. | DECX | <Decrement X> | Stack OpCode=05 |
| 74. | ZERO | <Push zero> | Stack OpCode=06 |
| 75. | DZRO | <Double push zero> | Stack OpCode=07 |
| 76. | ZROB | <Zero B> | Stack OpCode=41 |
| 77. | ZROX | <Zero X> | Stack OpCode=03 |
| 78. | DEL | <Delete A> | Stack OpCode=02 |
| 79. | DDEL | <Double delete> | Stack OpCode =02 |
| 80. | DELB | <Delete B> | Stack OpCode=01 |
| 81. | DUP | <Duplicate A> | Stack OpCode=45 |
| 82. | DDUP | <Double duplicate> | Stack OpCode=46 |
| 83. | XCH | <Exchange A and B> | Stack OpCode=32 |
| 84. | DXCH | <Double exchange> | Stack OpCode=16 |
| 85. | XAX | <Exchange A and X> | Stack OpCode=35 |
| 86. | XBX | <Exchange B and X> | Stack OpCode=75 |
| 87. | CAB | <Rotate ABC> | Stack OpCode=56 |
| 88. | LDXA | <Load X onto stack> | Stack OpCode=44 |
| 89. | LDXB | <Load X into B> | Stack OpCode=42 |
| 90. | STAX | <Store A into X> | Stack OpCode=43 |
| 91. | STBX | <Store B into X> | Stack OpCode=26 |
| 92. | ADAX | <Add A to X> | Stack OpCode= 36 |
| 93. | ADBX | <Add B to X> | Stack OpCode=76 |
| 94. | ADXA | <Add X to A> | Stack OpCode=37 |
| 95. | ADXB | <Add X to B> | Stack OpCode=77 |
| 96. | NOP | <No operation> | Stack OpCode=00 |
| 97. | ASL | CNT <Arithmetic shift left> | Sub OpCode 1=00 |
| 98. | ASR | CNT <Arithmetic shift right> | Sub OpCode 1=01 |
| 99. | LSL | CNT <Logical shift left> | Sub OpCode 1=02 |
| 100. | LSR | CNT <Logical shift right> | Sub OpCode 1=03 |
| 101. | CSL | CNT <Circular shift left> | Sub OpCode 1=04 |
| 102. | CSR | CNT <Circular shift right> | Sub OpCode 1=05 |
| 103. | SCAN | <Scan bits> | Sub OpCode 1=06 |
| 104. | DASL | CNT <Double arithmetic shift left> | Sub OpCode 1=20 |
| 105. | DASR | CNT <Double arithmetic shift right> | Sub OpCode 1=21 |
| 106. | DLSL | CNT <Double logical shift left> | Sub OpCode 1=22 |
| 107. | DLSR | CNT <Double logical shift right> | Sub OpCode 1=23 |
| 108. | DCSL | CNT <Double circular shift left> | Sub OpCode 1=24 |
| 109. | DCSR | CNT <Double circular shift right | Sub OpCode 1=25 |
| 110. | TASL | CNT <Triple arithmetic shift left> | Sub OpCode 1=10 |
| 111. | TASR | CNT <Triple arithmetic shift right> | Sub OpCode 1=11 |
| 112. | TNSL | <Triple normalizing shift left> | Sub OpCode 1=16 |
| 113. | TSBM | N <Test and set bit in memory> | Sub OpCode 3=14 |
| 114. | TBC | CNT <Test bit and set condition code> | Sub OpCode 1=32 |
| 115. | TRBC | CNT <Test and reset bit, set condition code> | Sub Code 1=33 |
| 116. | TSBC | CNT <Test, set bit, set condition code> | Sub OpCode 1=34 |
| 117. | TCBC | CNT <Test and complement bit and set CC> | Sub OpCode 1=35 |
| 118. | EXF | J,K <Extract field> | Sub OpCode 2=15 |
| 119. | DPF | J,K <Deposit field> | Sub OpCode 2=16 |
| 120. | LDI | =N <Load immediate> | Sub OpCode 2=02 |
| 121. | LDNI | =N <Load negative immediate> | Sub OpCode 2=12 |
| 122. | CMPI | =N <Compare immediate> | Sub OpCode 2=04 |
| 123. | CMPN | =N <Compare negative immediate> | Sub OpCode 2=14 |
| 124. | ADDI | =N <Add immediate> | Sub OpCode 2=05 |
| 125. | SUBI | =N <Subtract immediate> | Sub OpCode 2=06 |
| 126. | MPYI | =N <Multiply immediate> | Sub OpCode 2=07 |
| 127. | DIVI | =N <Divide immediate> | Sub OpCode 2=10 |
| 128. | ORI | =N <Logical OR immediate> | Sub OpCode 3=16 |
| 129. | XORI | =N <Logical exclusive OR immediate> | Sub OpCode 3=16 |
| 130. | ANDI | =N <Logical AND immediate> | Sub OpCode 3=17 |
| 131. | LDXI | =N <Load X immediate> | Sub OpCode 2=03 |
| 132. | LDXN | = N <Load X negative immediate> | Sub OpCode 2=13 |
| 133. | ADXI | =N<Add immediate to X> | Sub OpCode 3=12 |
| 134. | SBXI | =N <Subtract immediate from X> | Sub OpCode 3=13 |
| 135. | PCAL | N <Procedure call> | Sub OpCode 3=02 |
| 136. | SCAL | N <Subroutine Call> | Sub OpCode 3=01 |
| 137. | EXIT | N <Procedure and interrupt exit> | Sub OpCode 3=03 |
| 138. | SXIT | N <Subroutine exit> | Sub OpCode 3=04 |
| 139. | HALT | K <Halt> | Spec. OpCode=17 |
| 140. | PAUS | K <Pause> | Spec. OpCode=01 |
| 141. | XEQ | K <Execute> | Spec. OpCode=06 |
| 142. | MOVE | <Move words> | Move OpCode=00 |
| 143. | MVB | <Move bytes> | Move OpCode=01 |
| 144. | MVBW | <Move bytes while> | Move OpCode=04 |
| 145. | SCW | <Scan while> | Move OpCode=02 |
| 146. | SCU | <Scan until> | Move OpCode=03 |
| 147. | CMPB | <Compare bytes> | Move OpCode=05 |
| 148. | SIO | K <Start I/O> | Spec. OpCode=07 |
| 149. | RIO | K <Read I/O> | Spec. OpCode=10 |
| 150. | WIO | K <Write I/O> | Spec. OpCode=11 |
| 151 | TIO | K <Test I/O> | Spec. OpCode=12 |
| 152. | CIO | K <Control I/O> | Spec. OpCode=13 |
| 153. | SED | K <Set enable/disable external interrupts> | Spec. OpCode=02 |
| 154. | SIN | K <Set interrupt> | Spec. OpCode=16 |
| 155. | SIRF | K <Set external interrupt reference flag> | Spec. OpCode=15 |
| 156. | SMSK | <Set Mask> | Spec. OpCode=04 |
| 157. | RMSK | K <Read Mask> | Spec. OpCode=05 |
| 158. | CMD | K<Command> | Spec. OpCode=14 |
| 159. | PSHR | N <Push registers> | Sub OpCode 2=11 |
| 160. | SETR | N <Set registers> | Sub OpCode 2=17 |
| 161. | ADDS | N <Add to S> | Sub OpCode 3=05 |
| 162. | SUBS | N <Subtract from S> | Sub OpCode 3=06 |
| 163. | XCHD | K <Exchange DB> | Spec. OpCode=03 |
| 164. | PLDA | <Privileged load from absolute address> | Mini OpCode =15 |
| 165. | PSTA | <Privileged store into absolute address> | Mini OpCode=17 |
| 166. | RSW | <Read Switch register> | Mini OpCode=14 |
| 167. | LLSH | <Linked list search> | Mini OpCode=16 |
| 168. | LLBL | N <Load Label > | Sub OpCode 3=07 |
| 169. | MVBL | <Move from DB+ to DL+> | Move OpCode=02 |
| 170. | MVLB | <Move DL+ to DB+> | Move OpCode=03 |

APPENDIX C — FLOWCHARTS

Figure 86:
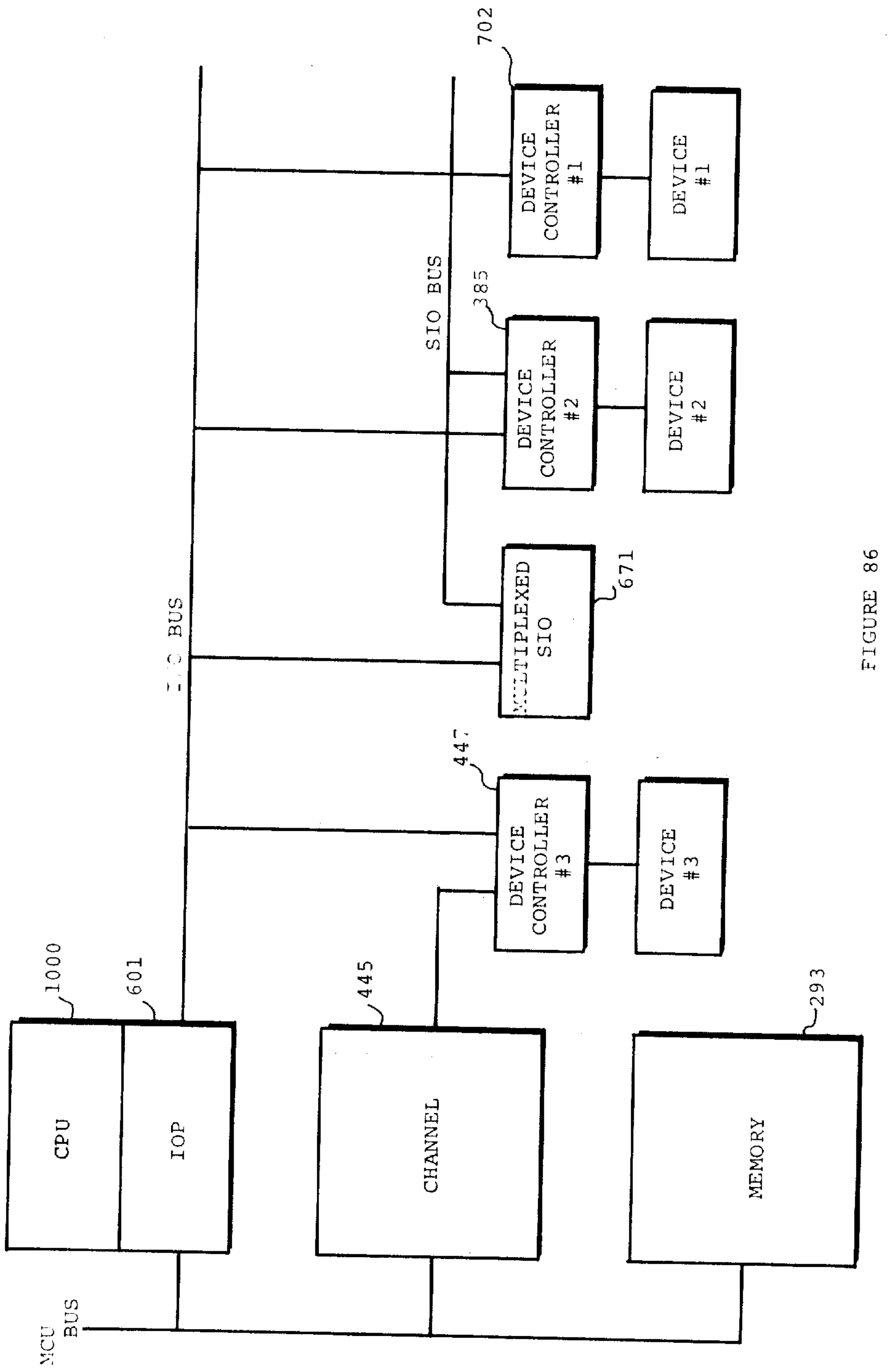
FIG. 86: | IO System Including Channel Multiplexed SIO and CPU Controlled Device; |
|

| | |
|---|---|
| Execution of P CAL N | see FIG. 839-*d* |
| Exit N | see FIG. 84*a*-*c*,*e*,*f* |
| Interrupt Processor | see FIG. 85*a*-*f* |
| IO System Including Channel, Multiplexed SIO and CPU Controlled Device | see FIG. 86 |

ALPHA CONSOLIDATED CODING SHEET

| 0 | 1–3 | 5 | 7–9 | 11 | 14 |
|---|---|---|---|---|---|
| 00 | STACK OPCODES ALL 64 STACK OPS MAY BE USED IN EITHER POSITION (STACK OP A OR B) | 00 | NOP | 40 | DEL |
| | | 01 | DELB | 41 | ZROB |
| | | 02 | DDEL | 42 | LDXB |
| | | 03 | ZROX | 43 | STAX |
| | | 04 | INCX | 44 | LDXA |
| | | 05 | DECX | 45 | DUP |
| | | 06 | ZERO | 46 | DDUP |
| | | 07 | DZRO | 47 | FLT |
| | | 10 | DCMP | 50 | FCMP |
| | | 11 | DADD | 51 | FADD |
| | | 12 | DSUB | 52 | FSUB |
| | | 13 | MPYL | 53 | FMPY |
| | | 14 | DIVL | 54 | FDIV |
| | | 15 | DNEG | 55 | FNEG |
| | | 16 | DXCH | 56 | CAB |
| | | 17 | CMP | 57 | LCMP |
| | | 20 | ADD | 60 | LADD |
| | | 21 | SUB | 61 | LSUB |
| | | 22 | MPY | 62 | LMPY |
| | | 23 | DIV | 63 | LDIV |
| | | 24 | NEG | 64 | NOT |
| | | 25 | TEST | 65 | OR |
| | | 26 | STBX | 66 | XOR |
| | | 27 | DTST | 67 | AND |
| | | 30 | DFLT | 70 | FIXR |
| | | 31 | BTST | 71 | FIXT |
| | | 32 | XCH | 72 | SPARE |
| | | 33 | INCA | 73 | INCB |
| | | 34 | DECA | 74 | DECB |
| | | 35 | XAX | 75 | XBX |
| | | 36 | ADAX | 76 | ADBX |
| | | 37 | ADXA | 77 | ADXB |

| 0 | 1–3 | 4 | 5 | 7–9 | 10 | 11–15 |
|---|---|---|---|---|---|---|
| 01 | SUB OPCODE 1 | X | 00 | ASL | | SHIFT COUNT L |
| | | X | 01 | ASR | | SHIFT COUNT L |
| | | X | 02 | LSL | | SHIFT COUNT L |
| | | X | 03 | LSR | | SHIFT COUNT L |
| | | X | 04 | CSL | | SHIFT COUNT L |
| | | X | 05 | CSR | | SHIFT COUNT L |
| | | X | 06 | SCAN | | |
| | | I | 07 | IABZ | +/− | P RELATIVE DISPLACEMENT |
| | | X | 10 | TASL | | SHIFT COUNT L |
| | | X | 11 | TASR | | SHIFT COUNT L |
| | | I | 12 | IXBZ | +/− | P RELATIVE DISPLACEMENT |
| | | I | 13 | DXBZ | +/− | P RELATIVE DISPLACEMENT |
| | | I | 14 | BCY | +/− | P RELATIVE DISPLACEMENT |
| | | I | 15 | BNCY | +/− | P RELATIVE DISPLACEMENT |
| | | X | 16 | TNSL | | SHIFT COUNT L |
| | | Y | 17 | SPARE | | |
| | | X | 20 | DASL | | SHIFT COUNT L |
| | | X | 21 | DASR | | SHIFT COUNT L |
| | | X | 22 | DLSL | | SHIFT COUNT L |
| | | X | 23 | DLSR | | SHIFT COUNT L |
| | | X | 24 | DCSL | | SHIFT COUNT L |
| | | X | 25 | DCSR | | SHIFT COUNT L |
| | | I | 26 | CPRB | +/− | P RELATIVE DISPLACEMENT |
| | | I | 27 | DABZ | +/− | P RELATIVE DISPLACEMENT |
| | | I | 30 | BOV | +/− | P RELATIVE DISPLACEMENT |
| | | I | 31 | BNOV | +/− | P RELATIVE DISPLACEMENT |
| | | X | 32 | TBC | | BIT POSITION |
| | | X | 33 | TRBC | | BIT POSITION |
| | | X | 34 | TSBC | | BIT POSITION |
| | | X | 35 | TCBC | | BIT POSITION |
| | | I | 36 | BRO | +/− | P RELATIVE DISPLACEMENT |
| | | I | 37 | BRE | +/− | P RELATIVE DISPLACEMENT |

| 0 | 1–3 | 4 | 5–6 | 7 | 8–9 | 10–11 | 12 | 13 | 14–15 |
|---|---|---|---|---|---|---|---|---|---|
| 02 | SUB OPCODE 2 | 00 | MOVE OPS | 0 | MOVE | PB/DB | RESERVED | | SDEC |
| | | | | 1 | MVB | PB/DB | RESERVED | | SDEC |
| | | | | 2 | MVBL | 0 | RESERVED | | SDEC |
| | | | | 2 | SCW | 1 | RESERVED | | SDEC |
| | | | | 3 | MVLB | 0 | RESERVED | | SDEC |
| | | | | 3 | SCU | 1 | RESERVED | | SDEC |
| | | | | 4 | MVBW | CCG | CCE | CCL | SDEC |
| | | | | 5 | CMPB | PB/DB | RESERVED | | SDEC |

APPENDIX 4

ALPHA MULTIPLEXED SIO CARD EXTERNAL REFERENCE SPECIFICATION

REVIEW OF I/O STRUCTURE

To understand the function of the Multiplexed S10 Logic it is necessary to first have an understanding of the general ALPHA I/O structure. For that reason a brief description of the ALPHA I/O system will be included here.

The design of the ALPHA I/O system allows I/O devices to operate independently, and without control, of the CPU. To this end, the I/O bus was given an MCU bus port, shared with the CPU, to ALPHA memory. A simple example of the resultant system is shown in FIG. 1.

By making the IOP an integral part of the CPU, direct commands can be issued to the I/O devices from the CPU itself. This would be the only mode of operation possible in the system of FIG. 1.

With the addition of a Multiplexed SIO card and more sophisticated device controllers, it is possible to control I/O devices without the use of direct CPU commands. FIG. 1 details one such possible I/O system. Computer control of the device controllers in this system is handled by the Multiplexed SIO card. It has the capability of fetching I/O program orders from memory through the IOP and executing them, thereby generating control signals to the device controllers via the SIO bus. The I/O orders and their formats are explained in a later section.

By using RAM's for intermediate storage of the I/O program orders, the S10 card can time division multiplex the execution of up to 16 I/O programs. The particular device controller program serviced during any given time slice is determined by a hardware service priority established at system configuration time.

Devices requiring a transfer rate of greater than 500,000 words/second cannot be handled by the multiplexed I/O bus and will require a direct port to the MCU bus and, thereby, to memory. A channel, which can be shared by up to 8 device controllers, is being designed for this purpose. It will execute only one I/O program at a time, but should have a transfer rate of 1.4 Mega words/second.

An I/O system incorporating a channel, a multiplexed S10 card, and a simple CPU controlled device, is diagrammed in FIG. 86. Device controller 387 can be operated only under direct CPU control, while device controller 385 can also be controlled by an I/O program executed by the multiplexed S10 logic. As with every other device controller, device controller 447 can be directed by CPU commands, in addition to being controlled by the channel 445.

All Data to the non-channel device controllers and the Multiplexed S10 card is transmitted on the I/O Bus, in addition to the CPU control signals, interrupt system signals, and several SIO-IOP communication signals. A complete I/O bus breakdown is given in Table A.

The SIO bus provides for individual service request lines for each of the 16 devices that can be operated by the SIO card, 4 coded lines used to inform a particular device controller that it is currently being serviced by the SIO-IOP, and 22 SIO command and device controller response lines. A complete SIO bus breakdown is given in Table B.

The channel bus replaces the SIO bus on device controllers operating with the channel. The channel bus uses the 16 service request lines for the data path to the device controller, but otherwise creates the same control signals to the device controller as the Multiplexed SIO card.

TABLE A

| | I/O BUS SIGNALS |
|---|---|
| 1 | PARITY LINE |
| 1 | PARITY ERROR LINE |
| 3 | DIRECT CPU COMMAND LINES |
| 8 | DEVICE ADDRESS LINES |
| 3 | SIO TO IOP COMMAND LINES |
| 16 | DATA LINES |
| 8 | INTERRUPT ADDRESS LINES |
| 4 | INTERRUPT REQUEST LINES |
| 1 | INTERRUPT ACKNOWLEDGE LINE |
| 1 | SERVICE OUT STROBE LINE |
| 1 | SERVICE IN RESPONSE LINE |
| 1 | LOW SERVICE REQUEST LINE |
| 1 | HIGH SERVICE REQUEST LINE |
| 1 | I/O RESET LINE |
| 1 | POWER ON LINE |
| 1 | POWER FAIL LINE |
| 1 | CLOCK LINE |

TABLE B

| | SIO BUS SIGNALS |
|---|---|
| 1 | CHANNEL SERVICE OUT LINE |
| 1 | CHANNEL ACKNOWLEDGE LINE |
| 1 | HIGH SERVICE REQUEST LINE |
| 1 | SIO INITIATION REQUEST LINE |
| 16 | SERVICE REQUEST LINES |
| 1 | ACKNOWLEDGE SR LINE |

TABLE B – Continued

| | |
|---|---|
| 4 | DEVICE SELECT LINES |
| 1 | ENABLE SIO LINE |
| 1 | TRANSFER ERROR LINE |
| 1 | CHANNEL ACKNOWLEDGE LINE |
| 4 | TOGGLE LINES |
| 9 | STROBE LINES |
| 1 | JUMP MET LINE |
| 1 | DEVICE END LINE |

MULTIPLEXED SIO LOGIC

Figure 87:
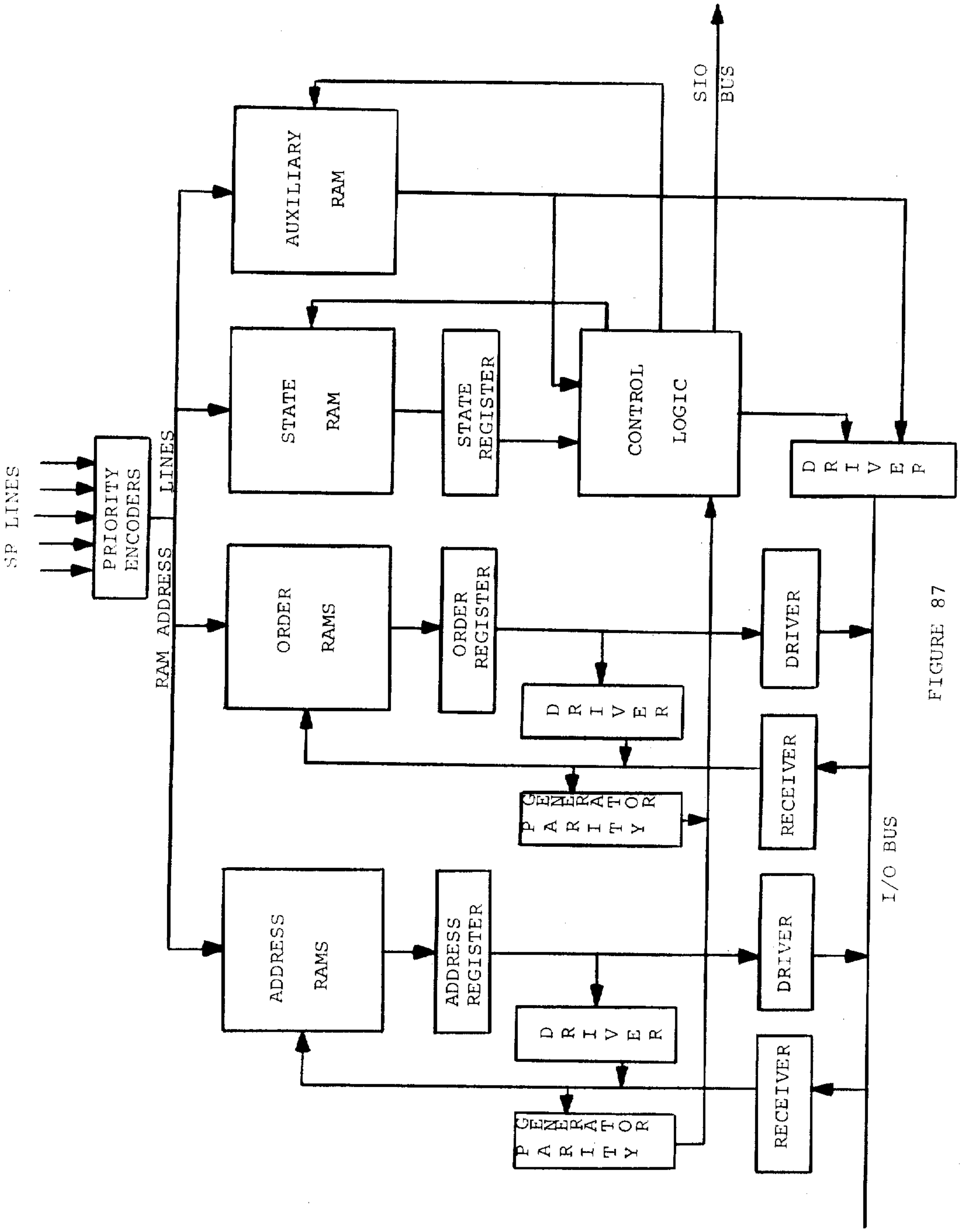
FIG. 87: | Multiplexed SIO Logic Schematic; |
|

FIG. 87 is a block diagram of the SIO card. It can be viewed as three separate machines working in parallel. The first machine, or portion of the logic, executes the SIO programs. This requires the unloading from and storing into the RAM's, incrementing the order and address registers, determining the next state, and generating control signals to the device controllers.

The second portion of logic is the parity control logic. It checks parity on each transfer to the SIO card, transmits odd parity with each address sent to the IOP, checks each output from the state RAM, and will generate an XFER ERROR signal to the device controller whenever it detects an error. This logic is intended to prevent SIO programs from executing outside their actual program area.

The third portion of logic included in the SIO design is the diagnostic controller. This logic is not indicated in FIG. 87, but is included as part of the control logic. It will allow all but the parity RAM to be loaded individually, and each of the RAM's and registers to be read separately. The address and order registers can be incremented with or without first being loaded from their respective RAM's. In addition, the next state function of the SIO control logic can be tested by first loading the order and state RAM's and then performing successive reads from the state RAM. These diagnostic features have been included to allow nearly complete verification of the operation of the Multiplexed SIO card by the CPU when in a bottom-up mode.

The following sections will cover each of the three sections discussed above in somewhat more detail.

SIO PROGRAM CONTROL LOGIC

The SIO Control Logic has the capability of executing 8 I/O orders:

1. Read
2. Write
3. Control
4. Sense
5. Return Residue
6. Interrupt
7. Jump
8. End The format for each of these orders is given in TABLE C. In every case, the first word of each order is stored in the order RAM, while the second word, if needed, is stored in the address RAM. Only the JUMP address or the starting address of the data block of a READ or WRITE is ever actually fetched and stored into the address RAM. The second word of a CONTROL order is always fetched, but is gated to the appropriate device controller to be used as control information and is not loaded into the address RAM. The second word of the INTERRUPT order is always fetched, but is disregarded.

The second word of the SENSE, RETURN RESIDUE, and END orders is used for storage of information from the I/O system. In the case of the SENSE and END orders this second word will be loaded with status information sent from the device controller, while the RETURN RESIDUE order will cause the contents of the SIO card's order RAM to be stored.

TABLE C

| | | |
|---|---|---|
| DC | READ or WRITE | WORD COUNT |
| STARTING ADDRESS OF DATA BLOCK | | |

| | | |
|---|---|---|
| | CONTROL | 12 CONTROL BITS |
| 16 CONTROL BITS | | |

| | | |
|---|---|---|
| | SENSE or RETURN RESIDUE | |
| CELL FOR STATUS or RESIDUE STORAGE | | |

BIT 4

| | | | |
|---|---|---|---|
| | END | INT | |
| CELL FOR STATUS STORAGE | | | |

BIT 4

| | | | |
|---|---|---|---|
| | JUMP | COND | |
| | | | |

| | | |
|---|---|---|
| | INTER-RUPT | |
| | | |

As mentioned earlier the SIO card time division multiplexers the execution of up to 16 I/O programs. During each time slice an address is sent to memory, which is then followed by data to or from that address.

All transfers on the I/O bus are asynchronous and are controlled by a handshake. Initiation of each address-data transfer is done by the device controller by generating a service request to the SIO logic. If the SIO logic receives any service requests it will, in turn, request service from the IOP. The IOP then responds with a data poll, which is dacey chained from one SIO card to the next. The highest priority SIO requesting service will stop the poll and proceed through an address transfer sequence.

An address transfer sequence consists of 3 major segments:

1. Securing a valid RAM address
2. Unloading RAM's and generating a select code to the device controllers
3. Returning an address and command to the IOP with the response to the data poll (Service In)

A detailed description of the address transfer sequence is given in Appendix I and the associated timing diagrams can be found in Appendix III. It will suffice to say here that the actions to be taken by the IOP during the data transfer sequence are determined by a command sent to the IOP from the SIO logic during the entire address-data transfer.

If the DRT entry is to be sent by the IOP to the SIO logic, the IOP will increment the entry by 2 after it is transferred and then restore it in memory.

Should the command to the IOP be a JUMP, the IOP will increment the address sent to it during the data transfer sequence by 2 and then store it into the DRT.

In both of the above cases the DRT entry to be affected is determined by transferring the device number during the address transfer sequence. By placing the device number on bits 6–13 of the DATA BUS the device number is mapped into the correct DRT entry of four times the device number.

In the case of data into memory from the I/O devices, the IOP will merely transfer the data it receives during the data transfer sequence to the memory address it receives during the address transfer sequence.

Finally, data out, from the address received by the IOP during the address transfer sequence, is sent to the I/O device during the data transfer sequence.

A detailed description of the data transfer sequence can be found in Appendix I, with corresponding timing diagrams in Appendix III. The portion of the data transfer sequence that is of concern here is the control signals sent by the SIO logic to the selected controller during the transfer.

If the SIO logic is executing either a SENSE or END a Programmed Status Strobe will cause the selected device to gate its status to the DATA BUS, and hence to memory through the IOP.

Execution of a WRITE order will cause a Programmed Write Strobe to be issued to the selected device controller. The controller uses the signal to strobe data into a holding register from the DATA BUS. Transfer of the data to the device is then under control of the device controller.

The READ order execution will proceed similar to the WRITE, but the Programmed Read Strobe signal will gate from the controller's holding register onto the DATA BUS. At the same time the Programmed Read Strobe is issued another signal, READ NEXT WORD, will be issued. This signal can be used by device controllers to initiate the transfer of the next data word from the device to the controller. As is apparent, the READ NEXT WORD signal will precede the Programmed Read Strobe by one pulse. That is, one RD NEXT WD pulse will occur before the first Programmed Read Strobe, and the last Programmed Read Strobe will not have an accompanying RD NEXT WD signal.

The execution of the CONTROL ORDER WILL GENERATE 2 signals - Program Command 1 and Programmed Control Strobe. At the same time the SIO logic loads the CONTROL order into the Order RAM. It will generate the Program Command 1 signal to the selected device controller. This will inform the controller that the 12 least significant bits on the DATA BUS - bits 4 through 15 - can be used as control information.

Programmed Control Strobe will be issued by the SIO card whenever it fetches the second word of the CONTROL order, and, as explained earlier, the information on the DATA BUS will be used by the selected controller as control information.

By creating the 2 control signals, device controllers can optionally use up to 28 bits of the CONTROL order for control information. This will reduce the number of CONTROL orders needed for complex device controllers such as the ISS moving head disc controller. This, and other capabilities, will reduce the dedicated memory required for I/O driver programs.

Execution of the INTERRUPT order will generate a SET INT signal to the device controller, forcing its interrupt flip-flop to set. This can also be done during execution of the END order by setting bit 4 to a one in the order word.

Execution of the JUMP order will cause one signal to be sent to the device controller and one response to be returned. At the time the SIO logic receives the jump address from the IOP, it will send the SET JUMP signal to the selected device controller. This signal will be used to clock the controller's Jump flip-flop. The inputs to this flip-flop are determined solely by the controller designer, but their function is to permit conditional jumps in I/O programs. This is accomplished by having the SIO logic examine the Jump flip-flop's output when it to requests the DRT entry from the IOP. A conditional Jump order, with a set Jump flip-flop at the device controller, will cause the jump address to be transferred to the IOP. A conditional jump order and a reset Jump flip-flop will cause the SIO logic to issue a regular request for the DRT contents. Thus, the I/O program can be caused to jump when certain conditions are met in the device controller hardware, or to continue executing sequentially if the conditions are not met. Additionally, an unconditioned jump can be performed by setting bit 4 of the JUMP order to zero. The SIO logic will perform as described above for a successful conditional jump.

Finally, execution of the RETURN RESIDUE instruction does not generate any signals to the device controller, but gates the SIO logic's ORDER RAM to the IOP via the DATA BUS.

With the above information it now becomes possible to describe how the SIO logic combines a series of address-data transfers together to perform the necessary control functions to the device controllers.

Each I/O order follows a specified sequence of address-data transfers, first to be fetched, and then executed. The processing of each order can be in one of four states:

A Fetch the 1st word of the I/O order

B Fetch or Store into the 2nd word of the I/O order

C Fetch or Store into the DRT

Figure 88:
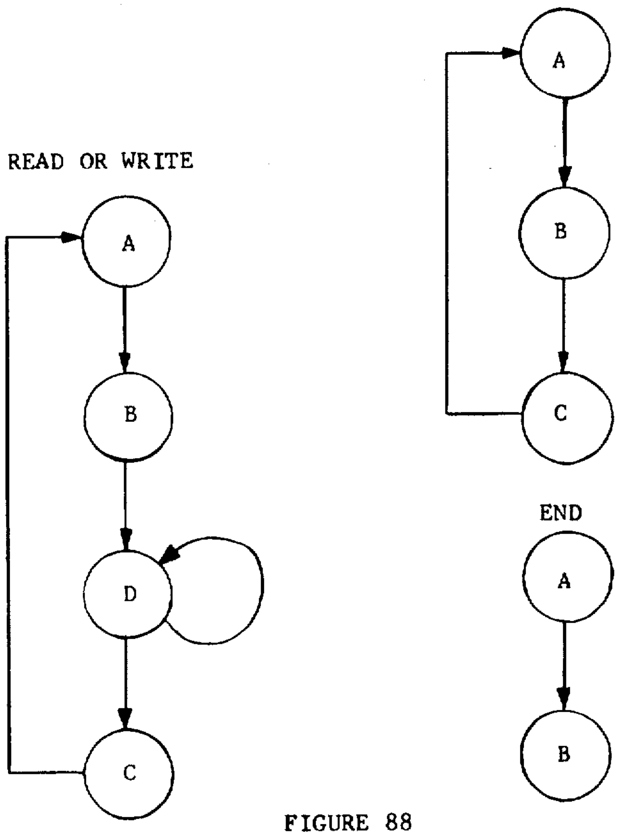
FIG. 88: | Control, Sense, Return Residue, Jump and Interrupt State Diagrams; |
|

D If READ or WRITE, transfer data until the word count rolls over or the device terminates the order with DEVICE END The next state to be entered by the SIO logic when it services a particular device is kept in the state RAM. The state RAM is updated every time the SIO logic services a device - its updata is determined by the state just unloaded from the state RAM and the particular order currently being processed. The state sequences vary for each order, and are presented in FIG. 88. In FIG. 88, the circles correspond to the states stored in the state RAM, while the transitions can be viewed as an address - data transfer. The letters assigned to the states correspond to the 4 state descriptions given above. A complete flowchart detailing all the actions taken by the SIO Program Control Logic is given in FIG. 98 through 107 of Appendix IV.

The SIO logic operates identically on all orders in state A by loading the data it receives from the IOP into its order RAM, loading state B into its state RAM, and restoring the incremented address it unloaded from the address RAM.

In state B the logic examines the new order, determining what signals to issue and what next state to load into the state RAM. As can be seen, for READ or WRITE orders, the next state is state D, and for all other orders except END it is state C. No next state is stored if the order is END. When information is stored into the RAMs during the data transfer sequence, the DATA BUS will be loaded into the address RAM, the order RAM will be loaded with its old contents, and the state RAM will be loaded with the proper next state.

The next state for state C is A. In state C, the SIO logic will always gate the device number to the JOP during the address transfer sequence. All orders but JUMP will cause the returning data to be loaded into the address RAM. An unconditional jump, or a conditional jump with the device controller's jump flip-flop set, will cause the SIO logic to gate the address unloaded from the address RAM to the IOP. At the same time, the address will be loaded back into the address RAM to be used later as the address of the next order. If a conditional jump is not met — i.e., the device controller's jump flip-flop is not set — the JUMP will proceed as all the other orders by loading the data returned by the IOP into the address RAM.

In state C, in all cases, the order RAM will be loaded with its old contents and the state RAM will be loaded with a next state of A.

The last of the four states, state D, is entered whenever data is to be transferred to or from the device. The next state for state D is state D until the word count rolls over or the device controller terminates the transfer. Both the address and the word count are incremented for every data word transferred to or from the device. They are restored into their respective RAM's and the next state of D is stored into the state RAM. When the word count rolls over, the next state loaded into the state RAM becomes C.

If the device controller terminates the READ or WRITE prematurely, the SIO logic will receive a DEVice END. The receipt of the DEV END will force the SIO logic to execute the functions normally done in state C, and will cause the next state loaded into the state RAM to be state A.

This completes the description of the SIO Program Control logic. To summarize, it has been shown that the SIO logic executes I/O programs one address - data sequence at a time, interleaving the transfers for various programs. The rate of execution for a single program is dependent on its device controller's service priority relative to all other device controllers running SIO programs at the same time.

Each address - data transfer is comprised of 2 main segments - an address transfer to the IOP and a data transfer. During the address transfer sequence, the RAM's on the SIO card are addressed and unloaded into registers, and in most cases the address RAM contents are sent to the IOP. During the data transfer sequence, the RAM's are reloaded, the source of data being either the registers or the DATA BUS. Concurrent with these operations signals are sent to the device controller being serviced.

Each address — data sequence completes one state in the execution of an order, with the state transitions determined by the order being executed. This process continues until the last transfer is completed, namely the device controller status transfer during the execution of an END order.

The following sections will describe the other 2 portions of the SIO Card - the Parity Control Logic and the Diagnostic Control Logic. They will detail the error detecting capabilities of the SIO card and the hardware diagnostic provisions made so that the SIO Program Control Logic can be tested under software control.

PARITY CONTROL LOGIC

A portion of the logic on the SIO card is used to monitor several parts of the SIO Program Control Logic and the DATA BUS during execution of I/O programs.

First, every transfer of the SIO card is checked for odd parity. Secondly, the memory may detect 2 violations - bad parity or non-existant memory being addressed. It would then generate a parity error signal back to the SIO logic. If the parity check by the SIO logic detects an error, or if the memory sends back a parity error signal, the SIO Parity Control Logic will generate an XFER ERROR signal to the device controller then being serviced.

This signal is to be clocked into the device controller's XFER ERROR flip-flop on the trailing edge of Channel So. When the flip-flop sets, the device controller should terminate its I/O program by asserting its CLEAR Interface Logic signal, and then generate an interrupt to the CPU. The XFER ERROR flip-flop should also be provided as a status bit.

The Parity Control Logic will also monitor the State RAM by checking for an even number of bits coming from the RAM. Since only one of the four bits should ever be set at a time, the check will catch a faulty RAM or Next State logic. If this error occurs, the Parity Logic will generate an interrupt of its own to the CPU. This will help to isolate failures to one area of the I/O control chain should they occur.

Every address transfer to the IOP must have an accompanying odd parity bit. Since the parity generates require 90 nanoseconds, worst case, to generate parity, it is generated in advance and stored in an auxiliary RAM. Refer to FIG. 87. The generators are placed on the data input lines to the RAM and will generate, or check, parity on the data present on that bus.

If the address RAM's are to be loaded from the register, the registers will be enabled onto this bus beginning with the address transfer cycle. The address may be incremented immediately following its transfer, so that correct parity will be generated in the worst case, 140 nanoseconds after the trailing edge of the data poll. This parity bit will be written into the auxiliary RAM with Service Out, which can be issued no sooner than 160 nanoseconds after the data poll is removed. Thus sufficient time is available to update the address and its parity before they are loaded back into the RAMS.

When the address RAM's are loaded from the DATA BUS, the parity bit that is stored is the bit sent by the IOP. This is due again to the long worst case time to generate the parity locally. The generators will be used, however, and the parity they produce is compared to the parity bit sent. If the 2 differ, an XFER ERROR will be issued to the selected device controller to terminate its program.

Lastly, the parity bit is unloaded from the auxiliary RAM everytime the RAMs are accessed during an address transfer. Therefore, the parity bit for the address is available simultaneously with the address, thus avoiding the problems of delaying the parity for each address by the generation time.

DIAGNOSTIC CONTROL LOGIC

The SIO Diagnostic Control Logic has been included on the Multiplexed SIO card to allow checkout of the SIO Program and Parity Control Logic. As indicated earlier in this manual, the Diagnostic Logic will allow complete diagnostics for all but the control signals to the device controllers.

The formats for the diagnostic command and status words are given in TABLE D, along with the format of the information returned with the state RAM output. What follows is a description of the functions of each of the bits in the three words.

The select number in the Control Word is used as the RAM address. Each number corresponds to the same number service request line from the device controllers. Thus, the portion of the RAMs used by a particular device controller can be examined by issuing a control word with that controller's select number.

Bits 4, 5, and 6 of the control word indicate which set of RAM's of the given select number is to be operated upon. Only one of these 3 bits should be set at a time.

Bit 7, the Load bit, informs the Diagnostic Logic that the registers should be loaded from the RAM's before the registers are gated to the DATA BUS during a READ.

When bit 8 is set, either address register, or the order register will be incremented after it is read. The register incremented is determined by which of the two bits, the address bit or the order bit, has been set.

TABLE D

DIAGNOSTIC CONTROL WORD

| SELECT # | ADDR | ORDER | STATE | LOAD | INCR |
|---|---|---|---|---|---|
| 0 3 | 4 | 5 | 6 | 7 | 8 |

DIAGNOSTIC STATUS WORD

| 0 | 1 | ERROR | SELECT # |
|---|---|---|---|
| 0 | 1 | 2 | 3 6 |

DIAGNOSTIC STATE WORD

| A | B | C | D | EOT | ADDR PAR | STATE PAR |
|---|---|---|---|---|---|---|
| 9 | 10 | 11 | 12 | 13 | 14 | 15 |
| STATE RAM | | | | AUXILIARY RAM | | |

The sequence of events to perform a diagnostic operation is to issue a control word followed by any number of READS or WRITES. Each RAM can be checked by writing any bit pattern into it and then reading it back through the registers to the CPU.

The counting function of the registers can be checked by issuing the following sequence of commands from the CPU:

1. Control with the Load and Incre bits set
2. Write
3. Read
4. Control with the Load bit reset, and Incr bit set Successive Reads should then increment the register, allowing the counting function to be checked.

When the order register is incremented and rolls over, it will set the EOT FF. The EOT FF will remain set until the state B is unloaded from the state RAM, and it will be stored in the auxiliary RAM whenver a WRITE command is issued.

The diagnostic state word is used to verify 2 ports of the program Control Logic — the next state function and the auxiliary RAM inputs.

Reading the STATE RAM will return the contents of the corresponding auxiliary RAM address, and parity on the state read from the state RAM. Besides the EOT FF bit, the auxiliary RAM stores the address parity bit and the data chaining bit of the order register. This last bit is used by the SIO program Control Logic and is not of concern during diagnostic operation. During diagnostics, these 2 bits will also be written into the auxiliary RAM with the EOT bit whenever a write command is issued. It should be noted that the address parity bit will only be correct during diagnostics when the address RAM is loaded from the address register. This occurs because data sent from the CPU does not have parity, but whenever the address RAM is loaded from the DATA BUS, the parity bit is loaded from the parity line.

To check the next state logic the following command sequence should be followed:

1. Control with order bit set
2. Write of the desired order
3. Control with state bit set and order bit reset
4. Read of the state
5. Write of desired starting state If the above sequence is followed by successive Reads and Writes of the state RAM, the next state function for the order set in the order RAM can be verified. Each write to the state RAM must be with 0 for data. The data then written will be determined by the next state logic and can be read with the succeeding Read State Command.

If the last address in the State RAM is known, the address parity circuit can be checked when the state is read back to the computer by checking the address parity bit of the state word.

By setting the EOT FF as explained earlier, the next state function for a READ or WRITE order can be fully checked. In both cases, the State RAM should be set to state D, the data transfer state, since the EOT FF must be set to exit state D. The set EOT FF can be verified by checking the EOT bit in the state word when it is read into the CPU.

The diagnostic state word, then, contains the information needed to check the parity generation logic and the next function of the Program Control Logic.

The status word of the SIO card has 7 valid bits. Bit 0, the SIO permit bit, is always false, while the READ WRITE permit bit, bit 1, is always true. Bits 3–6 contain the select number of the device controller last serviced by the SIO card, and bit 2 will be set if the state RAM parity for that select number was found to be in error.

In summary, the Diagnostic Control Logic permits verification of the RAMS, the counters, all data paths, the next state function of the Program Control Logic, and much of the Parity Control Logic in a stand alone mode. If all of the above is deemed operable by the diagnostic program, the remaining logic can be verified as operable by issuing an SIO program to a selected device controller and then examining the results of that program for any errors.

APPENDIX I

ADDRESS TRANSFER SEQUENCE

Refer to FIG. 87 for the following discussion. Each of the 16 device controllers controlled by the SIO card has a separate service request line. Every Service Request generated by the device controller is acknowledged by the ACK SR line. This signal will reset the controller's service request flip-flop when the request is honored by the SIO card. The signal is issued 1-½ clocks after the SIO card receives the data poll and it will last approximately 80 $n$'s.

Service Requests from the device controller are required:

1. For every transfer during a READ or WRITE
2. To continue program execution after a READ or WRITE
3. To continue program execution after each of the 2 command transfers of a CONTROL order.

Since the above cases are the only times service requests are required from the device controller, they are the only times ACK SR will be issued. Thus asynchronous setting of service requests is possible, as the requests will not be acknowledged until they are actually needed by the SIO logic.

The state of the Service Request lines is latched up during each positive half of the system clock cycle and during the entire duration of an SIO address - data transfer. If a data poll is received by the SIO logic during the positive half of the cycle, the Service Request latches will remain latched for the entire SIO transfer, otherwise the latches are freed to pass a new state of the service request lines onto the priority encoders during the second half of the clock cycle.

The priority encoders are used to generate a 4 bit RAM address and a device select code from the highest priority service request present at their inputs, when the SIO card is not in the diagnostic mode. During the running of diagnostics the priority encoders are disabled and the RAM address is obtained from latches loaded under CPU control.

Under normal operation, if a data poll is received during the positive half of the clock, the select code determined by the encoders is returned to the device controllers, along with a strobe line called Channel Service Out.

The first falling clock edge after receipt of the poll will start the loading of the registers from the RAM's. The load signal will last for one full clock cycle, terminating on the next falling edge. Worst case delays indicate that valid data will appear at the register outputs no later than 80 nanoseconds after the load pulse begins. Thus the control logic will have valid information from the RAM's one clock cycle after a poll is issued.

At the same time the RAM's are being unloaded the select code is sent to the device controllers. That device controller with the select code sent by the SIO card will enable 16 SIO command and response lines. If the device controller is executing a read or write order and terminates the transfer prematurely, it will issue a DEVICE END signal to the SIO logic upon receipt of its select code from the SIO logic. Worst case gate and transmission delays indicate the DEVICE END signal will reach the SIO logic about 80 nanoseconds after the select code is issued by the SIO card. Thus the DEV END signal and valid information, from the RAMs will reach the SIO control logic simultaneously, in the worst case, one clock cycle after a data poll is issued.

If a DEV END was issued or the SIO logic determines it has finished the last I/O order, it will issue the control signal DEV # to the DATA BUS, which will place the selected device controller's device number onto the DATA BUS. At the same time the SIO logic will generate the handshake response to the data poll, Service In. In a worst case situation, the SI signal will be returned after one clock cycle from the issuance of the data poll, while gate and transmission delays will delay the strobing of the device number onto the data bus for an additional 80 nanoseconds or ½ clock cycle. This gives a worst case data bus settling time of 80 nanoseconds before the IOP strobes the data into its address register.

If a DEV END is not issued and the SIO logic is executing an order, it will gate its address register onto the data bus at the same time it generates SI, or one clock after the data poll was issued. This affords a data settling time of 160 nanoseconds for all Address Transfers from the SIO card.

In either of the above cases, the SIO logic will return a CMD IN Signal to the IOP with the SI. The four commands to the IOP are:

1. DRT transfer
2. Jump in progress
3. Transfer to memory
4. Transfer from memory In actuality three signal lines are sent to the IOP, one for each of the first three commands. The fourth command, transfer from memory, is assumed if none of the other three signals is asserted.

When the IOP receives the SI and CMD IN signals it will strobe the data bus into its address register on the next rising system clock edge, providing the SI was received during the previous high portion of the clock cycle. This will provide a minimum of 80 nanoseconds deskewing on data received by the IOP from the device controllers.

When the data is strobed by the IOP the data poll is removed. This will cause the SI and DATA BUS signals to be terminated, completing the address transfer sequence.

Two points should be noted. First the CMD IN to the IOP remains valid until the data transfer sequence is completed. Secondly, the timing as described above dictates that every address transfer will be 2 system clock cycles, or 320 nanoseconds, in duration.

APPENDIX II

DATA TRANSFER SEQUENCE

The Data Transfer Sequence is governed by the Service Out signal issued by the IOP. If data is sent from the IOP, it will be present on the DATA BUS 1/2 clock cycle before and after Service Out is issued. When data is sent to the IOP, Service Out will be used to gate information from the device controller, or SIO logic, onto the DATA BUS. The IOP will allow at least 80 nanoseconds for the bus to settle before strobing the data into its register on a rising clock edge. This settling time is achieved in the IOP by latching the Service in line during the 2nd half of each clock cycle. Thus, the Service In signal will be passed through the latch during the positive 1/2 of the system clock cycle and must become true sometime during the positive half of the cycle in order to strobe the register on the next rising edge. This same mechanism for deskewing incoming data is used on the data poll-service in handshake.

Each service out sent by the IOP during I/O program execution will be used in the SIO control logic as the enabling signal for most of the SIO command strobes. The Service in response to Service Out will be generated by the selected device controller whenever one of the commands below is issued to it by the SIO logic.

1. Programmed Read Strobe
2. Programmed Write Strobe
3. Programmed Status Strobe
4. Program Command 1
5. Programmed Control Strobe In all other cases the SIO logic itself will return the Service In to the IOP.

The Service Out signal will also be used to write information back into the RAM location that was unloaded during the address transfer sequence. The source of the information for each set of RAM's is determined by the control logic. For the ADDRESS and ORDER RAM's, the source is either the registers loaded from the RAM's or the DATA BUS. The RAM's will invert data input to them and must be presented with ground true data. Since the DATA BUS is ground true, it is gated to the RAM inputs through non-inverting receivers. The data setup and hold times for the RAM's can be met when loading from the DATA BUS since the data is valid on the bus 80 nanoseconds on either side of Service Out. When the RAM's are loaded from the registers, the data is gated through an inverting chip, so that the RAM's are again loaded with ground true information. Their outputs will then always present positive true data.

The state RAMs can be loaded from 2 sources - the output of the next state logic or bits 0–3 of the data bus. The second source is used only during diagnostic checkout and is provided to set various states into the state RAM.

Several major actions occur in the SIO logic on the traiing edge of Service Out. The 4 bits of the order register containing the order are zeroed out, as is the state register. This is done to prevent execution of erroneous information while the RAMs are unloaded to service the next request. The trailing edge of Service Out will disable the select code and Channel SO Strobe to the device controller. The falling edge of the strobe will clock four flip-flops on the device controller card. The inputs to these flip-flops are:

1. Toggle Service Request
2. Toggle SIO OK
3. Toggle In XFER
4. Toggle Out XFER

As their names imply, these lines will toggle their respective flip-flops when they are asserted during the falling edge of the Channel So Strobe.

The Service Request flip-flop is used to provide service requests not required from the device controller, but necessary to execute the I/O program. The device controller will issue requests only during a READ OR WRITE, to transfer data; after receiving Program Command 1 or Programmed Control Strobe, to allow the controller to act on the control information sent; and after completion of a READ or WRITE, to allow the controller to perform any housekeeping before continuing the I/O program.

The Service Requests needed to fetch all orders and the DRT entry are provided from the Service Request flip-flop. In addition, it will provide the Service Requests necessary to execute the SENSE, RETURN RESIDUE, JUMP, INTERRUPT, and END orders. At the start of each I/O program, this flip-flop will be set. It will be reset whenever execution of a READ, WRITE, or CONTROL begins and set again upon completion of these orders.

The SIO PERMIT flip-flop is used with controller conditions to form bit 0 of the controller's status. This flip-flop will be set at the beginning of the execution of an I/O program. It will be reset when the SIO logic executes the END order and generates Toggle SIO PERMIT during transfer of the device controller status. As long as it is set, bit 0 of the controller's status will be false, causing rejection of any other SIO commands issued by the CPU to that device.

The IN XFER flip-flop is set for the duration of execution of a READ ORDER. If several READ orders are chained togher, it will remain set until the last READ is completed. The Toggle IN XFER signal will be sent to the controller during the last data transfer, so the IN XFER flip-flop will be reset on the trailing edge of the last Programmed Read Strobe.

The OUT XFER flip-flop operates identically to the IN XFER flip-flop but for WRITE orders. These two flip-flops are provided to inform the controllers of the initiation and completion of a data block transfer.

One additional signal is provided to the device controller to inform it of the status of its I/O program. This is the End of Transfer signal, which is asserted every time the word count rolls over, or when the device generates DEVice END. It is currently used by the disc controllers to enable them to handle chained READS or WRITES that are not exactly multiples of their sector size.

During data transfers the trailing edge of the data poll increments the word count portion of the order register. When this word count rolls over, it will set an EOT flip-flop in the SIO logic, generating the EOT signal to the device controller. Therefore, the signal will be asserted slightly after completion of the address transfer sequence and will remain valid until the data transfer sequence is finished.

The main actions of the data transfer sequence, then, are to store updated information into the RAMs, set the correct state of the 4 flip-flops in the device controller, and transfer data from either the SIO card or the device controller.

APPENDIX III

OPERATING WAVEFORMS

Figure 89:
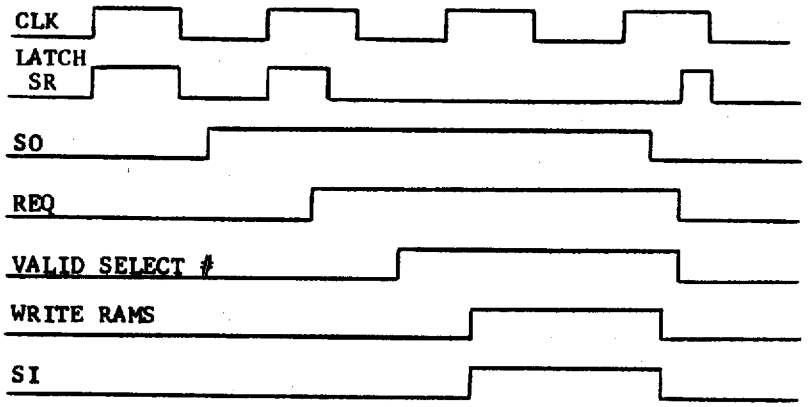
FIG. 89: | Initiation of SIO Program Waveforms; |
|
Figure 90:
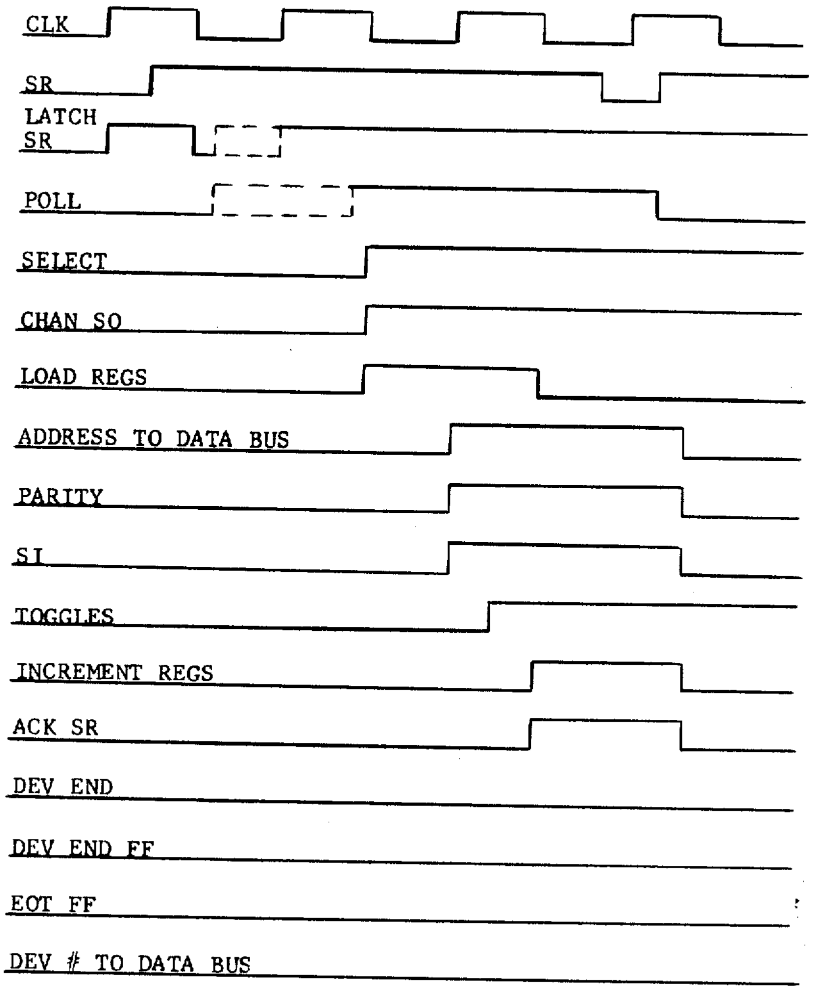
FIG. 90: | Address Transfer W/O Device End or Word Count Rollover Waveforms; |
|

| | |
|---|---|
| Initiation of SIO Program | see FIG. 89 |
| Address Transfer W/O Device End or Word Count Rollover | see FIG. 90 |

Appendix III – Continued

Figure 91:
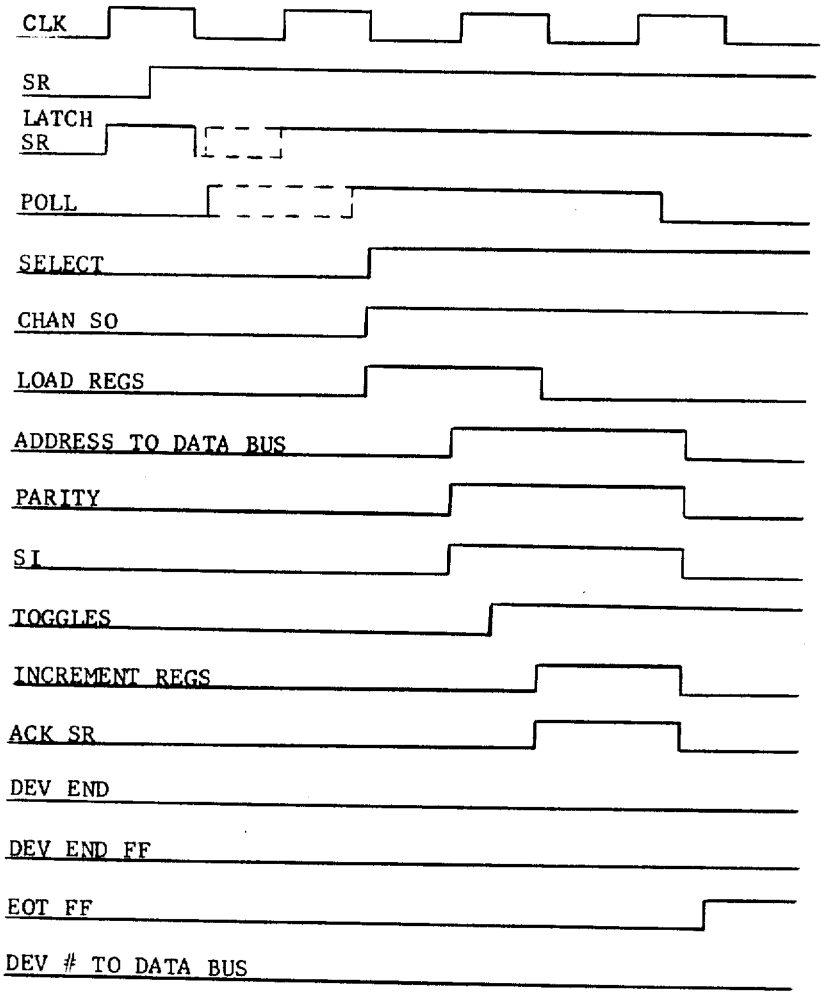
FIG. 91: | Address Transfer with Word Count Rollover Waveforms; |

| | |
|---|---|
| Address Transfer with Word Count Rollover | see FIG. 91 |
| Device Number Transfer due to Receipt of a Device End | see FIG. 92 |
| Device Number Transfer W/O Device End or Word Count Rollover | see FIG. 93 |
| Outbound Transfer to MPLX SIO Card (caused by Device End) with a Transfer Error Detected by MPLX SIO Card | see FIG. 94 |
| Write to a Device Controller with Word Count Rollover | see FIG. 95 |
| Return Residue From MPLX SIO Card W/O a Transfer Error | see FIG. 96 |
| Inbound Transfer from a Device Controller with a Transfer Error Detected by Memory | see FIG. 97 |

APPENDIX IV

SIGNAL FLOWCHARTS

| | |
|---|---|
| Functional Flow Charts Depicting Multiplexer Channel Operation | see FIGS. 98–107 |

APPENDIX 5

HIGH SPEED SELECTOR CHANNEL EXTERNAL REFERENCE SPECIFICATION

ALPHA HIGH SPEED SELECTOR CHANNEL 1.0 Introduction

The Alpha HSC is designed to complement the SIO I/O system of the Alpha. It provides compatibility for high speed I/O devices to interface directly with the Alpha MCU Bus resulting in higher transfer rates than provided by the SIO system. Hardware and software compatibility with the SIO system is maintained, providing versatility and interchangeability. The HSC executes all SIO order pairs, provides buffering and control of the device controller and interfaces with memory.

Each Selector Channel comprises two logic boards, one containing the control logic and the other containing the registers, counters and buffers required for the execution of the SIO program. The two boards communicate using the three connectors across the top of the boards. Each Selector Channel is capable of interfacing with up to 8 device controllers in a shared manner. That is, only one I/O program can execute at any one time. All other devices must wait until the program executing either Ends or Clear Interface is initiated by the device. At this time, one of the other devices may initiate an I/O program. The device executing has complete and dedicated control of the HSC until the program completes or is terminated by some other means, e.g., clear interface.

The HSC communicates with the device controller via the Channel Cable. This 50 connector ribbon cable contains a data path to and from the device (not the same as the I/O Bus) and control signals to and from the device. The cable connects to all those devices which are interfaced to the HSC. See Appendix IV.

The HSC interfaces with the MCU Bus through a logic card called the Port Controller. The Port Controller multiplexes 4 individual HSC onto the MCU Bus. The multiplexing is accomplished by assigning two priority levels within the Port Controller which process HSC requests for MCU Bus service.

Each HSC has a potential transfer rate of 2.0 M words/sec maximum. The actual rate will be determined by the device and memory speeds. Device controllers that interface with the HSC require the Channel-SIO Bus Logic option. This provides for compatibility with the I/O Bus and the Multiplex SIO Board.

2.0

A convenient method to understand the operation of the HSC is to break the overall HSC into a group of smaller logic functions or controllers. These controllers perform some function, e.g., fetch next order pair, each time they are initiated. Then by understanding each function, the overall/channel operation is easily formulated and understood.

The logic functions are:

2.0.1 Initiator Section
2.0.2 Fetch Sequencer
2.0.3 Device Controller Interface
2.0.4 Pre-fetching Sequencer
2.0.5 Program Execution Controller
2.0.6 Terminator Section
2.0.7 Error Controller Often during the explanation of the HSC two phrases will appear; first, Channel SO cycle, and second, Transfer Cycle. These terms are defined in Appendix I.

2.0.1 Initiator Section

Each device controller requesting to start an I/O program must pass through the Initiator Controller once. When the device controller decodes the SIO direct command and initiates a request to the HSC, the HSC sets its Active FF and makes $\overline{\text{Enable}}$ false. No other device controller can now initiate its I/O program as long as the Active FF is set. When the device controller initiated the request, it also puts its device number multiplied by 4 and its select number onto the channel Bus. DEV # * 4 is the address of the DRT where the I/O Program Counter (IOPCNT) resides, and the select number is the effective address of the device running its I/O program.

When the Active FF sets, the Initiator sequencer generates DEV # and Select Enables to load their respective registers, enables the DEV # Register onto the Channel Address lines and initiates a Transfer Cycle Outbound. The sequencer then returns $\overline{\text{SI}}$ to the IOP for the device controller and waits for Request to be removed by the IOP. When Request is removed the Initiator sequencer enables the Fetch Sequencer. The Initiator Section is now complete.

When the Transfer Cycle Outbound was initiated the DEV # * 4 was transferred to memory and the IOPCNT was returned as data and loaded into IOPCNT Counter Register. The Transfer Cycle completes when the IOPCNT is loaded.

The Select number resides permanently in the Select Register. It is encoded and becomes active lines on the Channel Bus to the device. Valid select numbers are 0–5, 14, 15.

2.0.2 Fetch Sequencer

The Fetch Sequencer is used to fetch order parts from memory except for pre-fetching. Whenever the orders Read or Write are executing and chaining is true, the Fetch Sequencer is disabled. But in all other cases, this controller is used for getting the next order to be executed. The sequencer is conditioned to start when the following condition is met. The presently executing order is completed "And" no Transfer Cycle is in progress "And" the initiator section is completed "And" the last order executed was not Read, Write or Command, "And" the presently executing order is not Read or Write with Chaining. If the last order executed was Read without chaining, Write without chaining, or Command, the Fetch Sequencer will start only after the above conditions are met and a Device Service Request is generated by the device controller.

When the conditions are met, the Fetch Sequencer initiates a Transfer Cycle Outbound and enables the IOPCNT onto the Channel Address lines. This transfer Cycle is for the I/O Command Word (IOCW). When data is returned from memory it is loaded into the IOCW Register Active, and the IOPCNT is incremented. The Fetch Sequencer then initiates a second Transfer Cycle Outbound and enables the IOPCNT onto the Channel Address lines. This Transfer Cycle is for the I/O Address Word or Operand (IOAW). When data is returned from memory, it is loaded into the IOAW Register Active, and the IOPCNT is incremented. A flag is set (the order complete FF is reset) at this time indicating to the Program Execution Controller that a new order is present and execution can begin.

2.0.3 Device Controller Interface

This logic section contains the signal lines that interface with the device controller. The lines are defined below and timing diagrams appear in Appendix II. These diagrams are also applicable for the Program Execution Controller. Also see Appendix IV.

2.0.3.1 $\overline{\text{Device Service Request}}$

This signal is used by the device controller to initiate a Chan SO cycle for data transfer or to indicate that the next order pair should be fetched following the execution of Read, Write or Command Order.

2.0.3.2 $\overline{\text{ACK SR}}$

Unlike the MUXSIO Logic, the HSC does not generate ACKSR. This signal used by the device controller to reset the device SR FF is generated in the bus logic. The device can use this signal (Chan Ack) to clear his own SR FF or inhibit it.

2.0.3.3 $\overline{\text{Chan SO}}$

Signal used to initiate the Channel SO cycle. It is used by the device controller in conjunction with the select lines to enable the input buffers to the channel bus. Chan SO remains true until Chan ACK is returned by the device controller.

2.0.3.4 $\overline{\text{Chan ACK}}$

This signal is returned by the device controller in response to the following signals, $\overline{\text{Read Strobe}}$, $\overline{\text{Write Strobe}}$, $\overline{\text{CMD Strobe}}$, $\overline{\text{PCMDI Strobe}}$, $\overline{\text{Sense Strobe}}$, $\overline{\text{In and Out XFER Toggles}}$, $\overline{\text{Set Int}}$, $\overline{\text{Set Jump}}$, Read Next Word, $\overline{\text{WCDV}}$.

The device controller may use Chan ACK to reset the device SR FF.

2.0.3.5 CLOCK

The HSC provides a version of the system clock to be used by the device controller to clock the SERVICE REQUEST FF. The SR FF should be a negative edge triggered device. See Appendix VI for a suitable service request circuit.

2.0.3.6 DEV. END

During the execution of a Read or Write order, the device may prematurely terminate the order by asserting DEV. END. DEV. END will cause the following condition to occur for Read and Write orders.

DEV. END and Write

A. If Chaining:
1. Write strobe is not generated
2. OUT XFER will not toggle
3. DEV END FF will terminate Channel So cycle by generating WCDV.
*4. Wait for DEV SR for next transfer.

*When chaining, the pre-fetch controller is on and the next write order is pre-fetched and waiting in buffers until the actively executing order is complete.

B. If not chaining:
1. DEV END will terminate Channel So cycle.
2. Write Strobe is not generated.
3. OUT XFER Toggle is generated to clear the device OUT XFER FF.

DEV END and Read

A. If chaining:
1. In XFER will not toggle
2. Read next word will be generated for the DEV SR pending.
3. DEV END FF will terminate the Chan So cycle from Read Next Word.
*4. Wait for DEV SR FOR next transfer B. If not chaining:
1. DEV END FF sets, aborting Read next Word.
2. DEV END will terminate the Chan So cycle.
3. In XFER toggle is generated to clear the device IN XFER FF.

The DEV END input to the channel is only active during the execution of Read or Write orders.

2.0.3.7 IN XFER TOGGLE

Signal generated by HSC to toggle the IN XFER FF in the device controller. The device IN XFER FF is clocked on the trailing edge of Chan So.

2.0.3.8 OUT XFER TOGGLE

Signal generated by HSC to toggle the OUT XFER FF in the device controller. The device OUT XFER FF is clocked on the trailing edge of Chan So.

2.0.3.9 REQ

This line is asserted by the device controller when its I/O program is to be executed by the HSC. The device controller asserts REQ in response to the direct I/O command SIO.

2.0.3.10 CLR IL

Clear Interface is a line used by the device controller to prematurely terminate its I/O program. The HSC accepts CLR IL only following the active FF being set, and then immediately terminates the I/O program. The HSC also will restore the current value of the IOPCNT into the DRT at DEV # * 4 in responses to CLR IL.

The signals REG and CLR IL are time-shared on the same line from the device controller. The state of the Active FF in the HSC is used to differentiate between REQ and CLR IL.

2.0.3.11 ENABLE

Enable is similar to the SIO multiplexed signal SIO OK. When no I/O program is executing in the HSC, ENABLE is asserted. As soon as REQ is asserted and the channel goes active, ENABLE is made false. Upon executing the order END or upon receipt of CLR IL, ENABLE is again asserted.

2.0.3.12 SET JMP

Signal generated by the channel during the execution of a conditional jump order to clock the device Jump FF. The device conditions this FF and returns the JMP CONDX MET line to the channel.

2.0.3.13 JMP CONDX MET

The HSC interrogates this input following generating the SET JMP clock. If this line is true then the HSC transfers the IOAW to the IOPCNT and initiates a Transfer Cycle Outbound for the next IOCW. If JMP CONDX MET is false, then a Transfer Cycle is initiated without updating the IOPCNT from the IOAW.

2.0.3.14 SET INT

This strobe line is used to set the device interrupt FF when the Int. Order executes.

If the MSB of WC Register is one when executing and END order, the SET INT strobe is generated.

2.0.3.15 SENSE STROBE

This strobe line is asserted during the execution of the Sense Order and the End Order. The device controller returns the contents of its status register in response to the SENSE STROBE and generates Chan Ack.

2.0.3.16 RD STROBE

The strobe line is asserted during the execution of the Read Order and the following a device generated service request. The device controller returns the contents of its data in buffer and generates Chan Ack.

2.0.3.17 READ NEXT WORD

A signal used in conjunction with the RD STROBE. It is used to indicate to the device controller that a Read Order is beginning and to inform the device controller that it can read a new word from the device.

2.0.3.18 WRITE STROBE

This line is asserted by the channel during the execution of the Write order and in response to a device generated service request. The HSC puts data onto the channel bus and when WRITE STROBE is asserted, the device controller can accept the data. The device controller returns Chan Ack which terminates the WRITE STROBE and then the data. Data is not valid at the leading edge of this strobe.

2.0.3.19 PCMDI

The Programmed Command I strobe indicates to the device controller that the first word of Control information is on the Channel Bus. The device controller must return Chan Ack and generate a device service request for the second word of control information. Data is not valid at the leading edge of this strobe.

2.0.3.20 CMD STROBE

This strobe indicates that the second word of control information is available to the device controller. It is asserted following a device generated service request. The device controller must return Chan Ack and also generate device service request for the program to continue execution. Data is not valid at the leading edge of this strobe.

2.0.3.21 XFER ERROR

The XFER ERROR line from the HSC to the device controller indicates that an error has occurred. The XFER ERROR is generated by the following conditions:

A. Illegal Address - The Address Lines contain an address larger than that which is permitted.

B. Address Error - The memory has detected a Parity Error on the last address sent to memory from the HSC.

C. System Parity Error - the HSC Port Controller has detected a control parity error.

D. Data Parity Error - The HSC has detected a parity error on the data transferred from memory to the channel.

Any of the above conditions will cause the HSC to initiate a Chan So cycle to transfer XFER ERROR to the device controller. The device controller will then generate a CLR IL signal terminating its I/O program and generate an Interrupt. The HSC will terminate the program, restore the IOPCNT to memory and re-assert ENABLE permitting another device controller to initiate the channel with a REQ for service to start an I/O program.

See Appendix IV for the Channel Bus interchange drawing. This drawing gives all the signals and direction that are used for communication between the HSC and its respective device controllers.

2.0.3.22 EOT

The signal EOT (End of Transmission) is passed to the device controller during the Chan SO cycle for the last data word. The word count register is not incremented for DEV END.

2.0.4 Pre-fetching Sequences

The Pre-fetching sequencer is activated whenever Read or Write orders with chaining are executing. To enhance the speed, and to make the transition between orders when chaining is taking place smoother, the next order to execute is fetched and stored in buffer registers until the presently executing order is complete. The pre-fetching takes place during the data transfers conditioned on two simple rules.

Data transfers during Read and Write orders utilize two buffers. For Write Orders, the HSC is actively keeping both buffers full independently of the device controller. For Read orders, the HSC is attempting to keep to the input buffers empty by transferring their contents to memory.

If chaining is active and a Write is executing, a Prefetch cycle will initiate only when both output buffers are full. If a Read order is executing, a Pre-fetch cycle will initiate only when both input buffers are empty.

The Pre-fetch Sequencer must initiate two Transfer Cycles Outbound, the first for the IOCW and the second for the IOAW. The stated conditions pertaining to the input and output buffers in the channel must be valid for both Transfer cycles.

The Pre-fetch sequencer generates the enables to load the buffer registers where the IOCW and IOAW are temporarily stored. When the executing order completes and both data buffers are empty, the logic generates a set of enables to transfer the IOCW and IOAW buffers into the active registers and sets the flag indicating that execution can continue.

For Write orders, when the order completes, the OUTPUT data buffer flags are set to empty so that the pre-fetch sequencer can transfer the buffers to active, but when the Read Order completes, valid data will be present in the input data buffers. One or two Transfer Cycles Inbound will be generated to unload the input data buffers until both input flags are reset. Only when the input flags are reset will the set of enables to transfer the IOCW and IOAW buffers into the active registers be generated.

The inputs into the Pre-fetch Sequencer indicate the state of the order buffers, empty or full, and also indicate the state of the data buffers, empty or full. These signals steer the logic to permit the fetching of the order pair, interleaved with the transferring of data.

2.0.5 Program Execution Controller

The Program Execution Controller encompasses the logic which decodes the order, interfaces with the Device Controller Interface, and initiates Transfer Cycles for data transfer. Also, when the order completes, the Program Execution Controller conditions the fetch sequencer to start for the next order pair.

The program Execution Controller (PEC) initiates whenever the order complete flag is reset indicating that the next order has been fetched and is in the active buffers ready for decoding and execution.

The PEC decodes and executes eight orders: Read, Write, Control, Jump, END, Sense Interrupt and Return Residue. Timing diagrams for these eight orders are found in Appendix II.

Following completion of the order or DEV END in the case of Read or Write, the order complete FF sets indicating that the PEC has completed.

The PEC also initiates Transfer Cycles for data transfer. For example, following the completion of the Sense Order the status information read from the device controller must be transferred to memory.

For Read, Write and Control, Chan So Cycles are initiated by the device control. For Int, Jump, Sense, and END the Chan So cycles are initiated by the HSC. Return Residue requires no Chan So cycle for execution.

2.0.6 Terminator Section

The Terminator Section responds to two inputs, the END order and the device controller generated CLEAR Interface, CLR IL. The Terminator Section must transfer the IOPCNT to the DRT and reenable device controllers to initiate new SIO programs.

The END order resets the Order Complete FF and transfers status to memory. The CLR IL signal from the device controller is asynchronous to the sequencing of the HSC. To make both inputs to the Terminator Sequence similar, the CLR IL FF in the HSC generates the condition to reset the Order Complete FF.

The following sequence of events occur in the Terminator Section when initiated.

2.0.6.1 Fetch Sequencer Inhibited from starting.

2.0.6.2 Order Complete FF resets (CLR IL only. For END, the Order Complete FF has already been set).

2.0.6.3 Channel Active FF and CLR IL FF are reset.
2.0.6.4 When the Channel Active FF resets, the Fetch Sequencer is hard reset.
2.0.6.5 The Initiator Sequencer steps to its reset state removing the qualifiers on the Fetch Sequencer.
2.0.6.6 As soon as the TIP FF resets, then a Transfer Cycle is initiated to restore the IOPCNT in the DRT; A general reset is made.
TIP: Transfer in Progress FF
2.0.7 Error Controller
The Error Controller has four inputs which indicate error.
2.0.7.1 ILLEGAL Address
2.0.7.2 Address Parity Error
2.0.7.3 System Parity Error
2.0.7.4 DATA Parity Error
These errors require the device controller to generate an Interrupt and CLR IL terminating its I/O program. A Chan So cycle is required to transfer the XFER ERROR signal to the device controller.

When the Error Controller detects one of the errors listed above, it conditions the XFER ERROR true and initiates a Chan So cycle. It is possible that the HSC may be presently in a Chan So cycle. To insure that the device controller XFER ERROR FF is set, the Error Controller permits both Chan So cycles to execute concurrently, therefore, only one clock is generated ensuring that the device controller recognizes the error conditions. The concurrent cycles is important. Informing the device controller as soon as possible that an error has occurred permits the device controller to take whatever action is required to protect the integrity of the system.
3.0 General Specifications
3.1 2.0 MEGAWORD/SEC maximum transfer rate; Typical Rates, 2.0 MHZ Read, 1.7 MHZ Write
3.2 SIO Hardware and Software compatibility.
3.3

| | | |
|---|---|---|
| Executes | READ | orders |
| | WRITE | |
| | CONTROL | |
| | SENSE | |
| | INTERRUPT | |
| | JUMP | |
| | RETURN RESIDUE | |
| | END with optional interrupt | |

3.4 Requires the Channel-SIO version of the Bus Logic.

3.5 Fully double buffers for input and output
3.6 Generates XFER ERROR for the following conditions:
3.6.1 Address Parity Error
3.6.2 System Parity Error
3.6.3 Data Parity Error
3.6.4 Illegal Address
3.7 Up to 4 HSC can be multiplex through one port onto the MCU Bus.
3.8 IOPCNT Resident in the HSC — Restored for END orders and device generated CLR IL.
3.9 Operates in a shared mode, with a maximum of 8 device controllers sharing one High Speed Selector Channel.
4.0 The Port Controller provides for multiplexing four HSC onto MCU Bus through a single port or module number. Each HSC requests to the Port Controller for service and indicates the nature of the request, Read Write or Clear Write. The Port Controller resolves priorities, both the Alpha MCU Bus priorities and the internal priorities between the individual HSC.
The Port Controller generates Control Parity on the control lines, MOP, TO, FRM and checks parity on the same set of lines. It also monitors the Address Parity Error from memory and responses by transferring the state of the line to all the HSC Error Controllers.
The Port Controller MCU Bus interface is similar to that used in the IOP.
See Appendix V for the Port Controller Bus Interchange.
4.1 Port Controller Internal Priorities
Two priority levels are established in the HSC to facilitate the throughput in the Port Controller. All Low Requests made to the Port Controller are arranged in priority from 1 to 4, with 1 being the highest, and 4 the lowest. All Low Requests are processed in order according to this scheme.
If one of the Low Requests is accompanied by a High Request (CLEAR Write), as soon as the Low Request is processed, the High Request will override all pending Low Requests. The High Request will execute when enabled. The next Low Request with highest priority will be enabled as soon as the High Request completes.
4.2 FIG. 108 shows a typical MCU Bus Transfer.
5.0 High Speed Selector Channel Diagnostic Capabilities
The HSC does not interface with the Alpha CPU directly. It provides a path from the device controller to and from memory, but does not interface with the IOP. Diagnostics could be run indirectly if a device controller or test fixture provided the link between the HSC and the IO Bus. The test fixture could be programmed in the direct Read/Write mode to provide the various inputs and outputs for the HSC. This would permit the HSC to run test diagnostics.
To maximize the test fixture's usefulness, it must be able to interface with all the signals in the Chan. Bus and provide conditions like CLR IL, DEV END, SERVICE REQUEST, check the STATE of XFER FF, respond to the programmed strobes and the XFER ERROR condition, and provide a jump FF which can be conditioned true and false.
It must also have a data register which can be loaded and read with both the SIO programmed strobes and the direct Read/Write Strobes, control logic to generate device service requests and the Channel-SIO version of the bus logic.

APPENDIX I

A. Channel SO Cycles
Throughout the execution of the I/O program, the HSC must communicate with the device controller over the Channel Bus. The communication may take many forms, transfer data to or from the device controller, set the Interrupt FF in the device controller or interrogate the status of the Jmp FF in the device controller. Also, the signal XFER ERROR must be passed onto the device controller when the HSC detects that the condition has occurred. Whenever the HSC communicates with the device controller, a Channel SO cycle will take place.

This cycle can be initiated either by the device by setting the Service Request FF or by the HSC. When the cycle is initiated, Chan SO is asserted and all pending strobes or control signals are released to the device controller. When the device controller receives Chan SO and providing it is not being addressed by the IOP, the Channel Bus Logic will return Chan Ack. Chan Ack is generated from all the strobes and control signals provided by the HSC. Chan Ack indicates to the HSC that the cycle may terminate. All signals (except data) sent to the device controllers return Chan Ack.

For data transfers (Read or Write), the device Service Request FF is used in addition to requesting service to win priority usage of the bus logic over the IOP.

B. Transfer Cycle

Each HSC communicates with the Port Controller through the Transfer Cycle. This cycle initiates the Port Controller into starting a memory transfer from the HSC. The HSC generates Transfer Cycles whenever data is to be transferred to or from memory, to fetch order pairs, to fetch the IOPCNT from the DRT, and to restore the IOPCNT in the DRT.

The Transfer Cycle can be one of two forms; Inbound or Outbound, see table.

| MOP | 0 | 1 | |
|---|---|---|---|
| CLEAR WRITE | 0 | 1 | INBOUND |
| READ WRITE | 1 | 0 | OUTBOUND |

MOP is defined as Memory Operation, two lines from the HSC to memory indicating what function memory is to perform. The HSC will never initiate a Transfer Cycle if one is presently in progress. The cycle terminates whenever data is received from memory (STROBE) or whenever data is transferred to memory (HSEL). The HSC terminates its Transfer Cycle before memory becomes ready in single memory systems. This permits maximum memory usage by the HSC by initiating a new Transfer Cycle even before memory becomes ready.

APPENDIX II

The timing diagrams for the eight orders executed by the HSC are found in FIG. 109. Also points are indicated to show where Transfer Cycles begin. The timing diagrams show the occurrance of the Chan So cycle for those orders requiring communication with the device controller. The clock is the basic Alpha System Clock, 160 *ns* period.

1.0 Sense

The data from the Sense order is loaded into the memory location following the IOCW. To accomplish this, the IOPCNT is counted down by one and enabled onto the Channel Address lines. The Transfer Cycle initiated is Inbound with the IOPCNT as the address.

2.0 Return Residue

This order requires no device controller interaction. Whenever a new order is transferred into the active register, the WC (word count) is STORED for the last order executed. This permits the Return Residue order to read the WC register for the last order, as shown in FIG. 110.

Returns Residue like Sense returns the data (WC Register) to the location following the IOCW. When the Transfer Cycle is initiated, the IOPCNT is counted down by one and enabled onto the Channel Address lines, as shown in FIG. 111.

3.0 Interrupt

The Interrupt order does not return Chan ACK. The HSC must generate this condition internally to complete the Chan So cycle. No data is transferred for the Interrupt Order.

The Transfer Cyle enables the IOPCNT to the Address lines for the fetching of the next IOCW 4.0 END The End Order executes identically as the Sense order. In addition, if the MSB of the WC register is set to one, then the END order generates an Interrupt Strobe, END returns status to the location following the IOCW. END also conditions the Terminator section to start which transfers the IOPCNT to the DRT and puts the channel in the inactive state. At completion of the End order and with the data transferred to memory, the IOPCNT contains the address of the location END+2.

5.0 JUMP

Both unconditional and conditional jumps are permitted. Conditional jumps test the status of the device controller Jump FF for a valid condition met. The Set Jump Clock used to interrogate device controller Jump FF does not return Chan ACK. The HSC must internally generate the Chan ACK.

In FIG. 112, the Jump Met line is true. If False, the B1 would not be generated, i.e., the IOPCNT would not be updated.

A: The Jmp Condx Met line from the device controller is sampled at time A. If it is true the Jump Met FF sets which transfers IOAW → IOPCNT and initiates the Fetch Sequencer.

5.2 Unconditional Jump - MSB WC = 0

This jump does not require a Chan So cycle - The IOAW is transferred to the IOPCNT and the Fetch Sequencer is initiated, as shown in FIG. 113.

6.0 Command

The command order issues two strobes, PCMDI and CMD STROBE. The first strobes the contents of the IOCW onto the data lines to the device controller. The second strobes the contents of the IOAW word onto the data lines to the device controller. In both cases valid date is not present preceding the strobes, but is present 80 nsec following the the trailing edge of the strobes, as shown in FIG. 114.

7.0 Read and Write

These two orders have similar timing diagrams with two small exceptions. First, the Read order generates Read Next Word Strobes and the Write order does not. The second and most obvious difference is the direction of data transfer, Read, from the device controller and Write, to the device controller.

FIGS. 115 and 116 show the diagrams for Read and Write orders, the differences are pointed out, without chaining, and terminated both by DEV END and Word Count 0. When terminated by Word Count 0, it was assumed that initially the WC Register was set to −3.

Read and Write orders differ somewhat in the way Transfer Cycles are initiated. During Reads and Writes, the Transfer Cycles are initiated by the buffer controllers. These controllers attempt to keep both buffers full during Write orders, and both buffers empty during Read orders. The other orders which transfer data, e.g., Sense, generate Transfer Cycles from the PEC. This is not the case for Read and Write Orders.

To fully understand the operation of DEV END, the reader should refer back to the previous section 2.0.3.6 where it is defined explicitly.

APPENDIX III

The overall Flow Chart for the Selector Channel appears in FIG. 117. This chart shows the various controllers and sections of the logic discussed.

To help understand the chart the block

TABLE E

| HSC | | | DEVICE CONTROLLER |
|---|---|---|---|
| SELECT | 3 | → | |
| | 2 | → | |
| | 1 | → | |
| | 0 | → | |
| DATA | 15 | ↔ | DATA |
| | . | | |
| | . | | |
| | . | | |
| | 0 | ↔ | |
| ENABLE | | → | |
| | | ← | REQ, CLR IL |
| CHAN SO | | → | |
| CLOCK | | → | |
| | | ← | CHAN. ACK |
| | | ← | SERVICE REQUEST |
| | | ← | DEVICE END |
| TOGGLE OUT XFER | | → | |
| TOGGLE IN XFER | | → | |
| SET INT | | → | |
| SR ACK. | | → | |
| SET JUMP | | → | |
| | | ← | JUMP CONDX MET |
| RD STROBE | | → | |
| WRT STROBE | | → | |
| STAT STROBE | | → | |
| CONT STROBE | | → | |
| PCMDI | | → | |
| RD NEXT WORD | | → | |
| END OF XMISSION | | → | |
| XFER ERROR | | → | |

CHAN BUS INTERCHANGE needs to be defined. This block appears whenever a Chan So cycle is in progress. It is not shown for the Read and Write Orders. The charts pertaining to the Read and Write orders are the actual buffer controllers and not the Program Execution Controller.

The two data buffers are indicated by A and B. The Write buffer controller attempts to keep both buffers full. The Read buffer controller attempts to keep both buffers empty.

DEFINITIONS FOR FLOW CHART

1. A,B - Data Buffers
2. IOCW - IO Command Word
3. IOAW - IO Address Word or Operand
4. TIP - Transfer In Progress
5. $\overline{TIP}$ - No transfer in Progress
6. WAIT - Chan So cycle in Progress
7. MOP - Memory operation
8. IOPCNT - IO Program Counter.
9. PAUSE - A STATE where the HSC is waiting for some operation to complete. The various pauses shown are not necessary the same STATE.

APPENDIX IV

High Speed Channel - Device Controller Signal Interface

The arrows indicate the signal direction. Double arrows indicate a bi-directional bus.

APPENDIX V

TABLE F

| HSC | | | PORT CONTROLLER |
|---|---|---|---|
| DATA PARITY | | ↔ | DATA PARITY |
| DATA | 15 | ↔ | DATA |
| | 0 | ↔ | |
| | 1 | ↔ | |
| TO #1 | 2 | → | |
| | 1 | → | |
| TO #2 | 2 | → | |
| | 1 | → | |
| TO #3 | 2 | → | |
| | 1 | → | |
| TO #4 | 2 | → | |
| | 1 | → | |
| MOP; LR #1 | 0 | → | |
| | 1 | → | |
| MOP; LR #2 | 0 | → | |
| | 1 | → | |
| MOP; LR #3 | 0 | → | |
| | 1 | → | |
| MOP; LR #4 | 0 | → | |
| | | ← | STROBE #1 |
| | | ← | STROBE #2 |
| | | ← | STROBE #3 |
| | | ← | STROBE #4 |
| | | ← | LSEL #1 |
| | | ← | HSEL #1 |
| | | ← | LSEL #2 |
| | | ← | HSEL #2 |
| | | ← | LSEL #3 |
| | | ← | HSEL #3 |
| | | ← | LSEL #4 |
| | | ← | HSEL #4 |
| | | ← | Channel Error Line |

PORT CONTROLLER INTERCHANGE

The interchange diagram shows all the signals in the Channel Bus. Each HSC has one bus for all its device controllers. The diagram also shows which logic, the HSC or the device controller, initiates the signal. Those signal names listed under the HSC are initiated by the HSC, those listed under the device controller are initiated by the device controller.

The 16 data lines are used by the device controller to transmit its device number and select number to the HSC during the Initiator sequence.

The REQ, CLR IL line is time shared, both signals initiating from the device controller.

ALPHA CONSOLIDATED CODING SHEET

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 02 | SUB OPCODE 2 | | | 00 | MINI OPS | | | 14 | | RSW | | RESERVED | | | 0 |
| | | | | | | | | 14 | | LLSH | | RESERVED | | | 1 |
| | | | | | | | | 15 | | PLDA | | RESERVED | | | 0 |
| | | | | | | | | 15 | | PSTA | | RESERVED | | | 1 |
| | | | | 01 | SPARE | | | | IMMEDIATE OPERAND N | | | | | | |
| | | | | 02 | LDI | | | | IMMEDIATE OPERAND N | | | | | | |
| | | | | 03 | LDXI | | | | IMMEDIATE OPERAND N | | | | | | |
| | | | | 04 | CMPI | | | | IMMEDIATE OPERAND N | | | | | | |
| | | | | 05 | ADDI | | | | IMMEDIATE OPERAND N | | | | | | |
| | | | | 06 | SUBI | | | | IMMEDIATE OPERAND N | | | | | | |
| | | | | 07 | MPYI | | | | IMMEDIATE OPERAND N | | | | | | |
| | | | | 10 | DIVI | | | | | | | | | | |
| | | | | 11 | PSHR | | | | DB | DL | Z | STA | X | Q | S |
| | | | | 12 | LDNI | | | | IMMEDIATE OPERAND N | | | | | | |
| | | | | 13 | LDXN | | | | IMMEDIATE OPERAND N | | | | | | |
| | | | | 14 | CMPN | | | | IMMEDIATE OPERAND N | | | | | | |
| | | | | 15 | EXF | | | | | | | | | | |
| | | | | 16 | DPF | | | | | | | | | | |

ALPHA CONSOLIDATED CODING SHEET

| 0–3 | | 4–7 | | 8–11 | | 12–15 |
|---|---|---|---|---|---|---|
| | | 17 | SETR | BEGINNING BIT # | | # OF BITS |
| | | | | BEGINNING BIT # | | # OF BITS |
| | | | | DB | DL Z | STA X Q S |
| 03 | SUB OPCODE 3 | 00 | SPECIAL OP | 00 | SPARE | |
| | | | | 01 | PAUS | K FIELD |
| | | | | 02 | SED | K FIELD |
| | | | | 03 | XCHD | K FIELD |
| | | | | 04 | SMSK | K FIELD |
| | | | | 05 | RMSK | K FIELD |
| | | | | 06 | XEQ | K FIELD |
| | | | | 07 | SIO | K FIELD |
| | | | | 10 | RIO | K FIELD |
| | | | | 11 | WIO | K FIELD |
| | | | | 12 | TIO | K FIELD |
| | | | | 13 | CIO | K FIELD |
| | | | | 14 | CHD | K FIELD |
| | | | | 15 | SIRF | K FIELD |
| | | | | 16 | SIN | K FIELD |
| | | | | 17 | HALT | K FIELD |
| | | 01 | SCAL | STT ENTRY # N | | |
| | | 02 | PCAL | STT ENTRY # N | | |
| | | 03 | EXIT | N FIELD | | |
| | | 04 | SXIT | N FIELD | | |
| | | 05 | ADXI | N FIELD | | |
| | | 06 | SBXI | N FIELD | | |
| | | 07 | LLBL | PL– DISPLACEMENT N | | |
| | | 10 | LDPP | P+ DISPLACEMENT N | | |
| | | 11 | LDPN | P– DISPLACEMENT N | | |
| | | 12 | ADDS | IMMEDIATE OPERAND N | | |
| | | 13 | SUBS | IMMEDIATE OPERAND N | | |
| | | 14 | TSBM | DB+ DISPLACEMENT N | | |
| | | 15 | ORI | IMMEDIATE OPERAND N | | |
| | | 16 | XORI | IMMEDIATE OPERAND N | | |
| | | 17 | ANDI | IMMEDIATE OPERAND N | | |

| 0–3 | Instruction | 4 | 5 | 6 | 7 | 8–15 |
|---|---|---|---|---|---|---|
| 04 | LOAD | X | 1 | | | PDQS ADDRESS MODE & DISPLACEMENT |
| 05 | TBA | 0 | 0 | 0 | +/– | P RELATIVE DISPLACEMENT |
| | MTBA | 0 | 1 | 0 | +/– | P RELATIVE DISPLACEMENT |
| | TBX | 1 | 0 | 0 | +/– | P RELATIVE DISPLACEMENT |
| | MTBX | 1 | 1 | 0 | +/– | P RELATIVE DISPLACEMENT |
| | STOR | X | 1 | 1 | | DQS ADDRESS MODE & DISPLACEMENT |
| 06 | CMPM | X | 1 | | | PDQS ADDRESS MODE & DISPLACEMENT |
| 07 | ADDM | X | 1 | | | PDQS ADDRESS MODE & DISPLACEMENT |
| 10 | SUBM | X | 1 | | | PDQS ADDRESS MODE & DISPLACEMENT |
| 11 | MPYM | X | 1 | | | PDQS ADDRESS MODE & DISPLACEMENT |
| 12 | INCM | X | 1 | 0 | | DQS ADDRESS MODE & DISPLACEMENT |
| | DECM | X | 1 | 1 | | DQS ADDRESS MODE & DISPLACEMENT |
| 13 | LDX | X | 1 | | | PDQS ADDRESS MODE & DISPLACEMENT |
| 14 | BR | X | 1 | 0 | +/– | P RELATIVE DISPLACEMENT |
| | BR | X | 1 | 1 | | DQS ADDRESS MODE (INDIRECT) & DISPLACEMENT |
| | BCC | 1 | 0 | 1 | CCG CCE CCL +/– | P RELATIVE DISPLACEMENT |
| 15 | LDS | X | 1 | 0 | | DQS ADDRESS MODE & DISPLACEMENT |
| | LDD | X | 1 | 1 | | DQS ADDRESS MODE & DISPLACEMENT |
| 16 | STB | X | 1 | 0 | | DQS ADDRESS MODE & DISPLACEMENT |
| | STD | X | 1 | 1 | | DQS ADDRESS MODE & DISPLACEMENT |
| 17 | LRA | X | 1 | | | PDQS ADDRESS MODE & DISPLACEMENT |

The control lines in the Port Controller bus are grouped into four sets. Those marked by 1 belong to one set, 2 to a second set, 3 to a third set, and 234 to the fourth set. Each set represents one HSC interface. The 16 data lines are common to all HSC along with the data parity line. Similarly system Clock, Master Reset and Channel Error line are common to all HSC.

Signal Definitions

TO: These lines represent the output of the address to module mapper in each HSC. The Port Controller interrogates the addressed module RDY condition before initiating a MCU Bus transfer.

MOP;LR: These lines perform two functions. Each Transfer cycle is initiated by the LR (Low Request) and the type of transfer to be initiated is coded by the MOP lines.

STROBE: Data directed to each HSC from memory in response to a Read Write memory cycle is "strobed" into the respective HSC by the STROBE lines.

LSEL: The Port Controller strobes the address from the respective HSC onto the MCU bus with the LSEL signal.

HSEL: The Port Controller strobes the data from the respective HSC onto the MCU bus during a clear Write memory cycle with the HSEL signal.

Channel Error Line: The Port Controller passes the state of the Address Error Line and the System Parity Error logic onto the HSC Error Controllers.

The sets of control lines are jumper selectable in the individual HSC. Each channel must be a different number 1 to 4.

APPENDIX VI

FIG. 118 shows a typical device SR FF showing the clock and a method for resetting the FF.

We claim:

1. In a data processing apparatus including a data bus, and a plurality of data processing modules, the improvement comprising a module control unit for each data processing module, each module control unit connecting a data processing module to the data bus and comprising:

multilevel priority means for establishing a high and a low request queue for determining the priority of access to the data bus by each data processing module, the high request queue having priority over the low request queue and each data processing module being assigned a separate priority on each queue;

open loop transmission means connected to said multilevel priority means for determining whether data is being transmitted to the data processing module to which the module control unit is connected, for determining which data processing module data is being transmitted from, and for signaling to another data processing module that data is being transmitted thereto;

module operations means for controlling the operation of other data processing modules by the data processing module to which the module control unit is connected, data bus access means connected to the multilevel priority means, the open loop transmission means and the module operation means for controlling access of the data processing module, the open loop transmission means and the module operation means to the data bus in response to the multilevel priority means.

2. In a data processing apparatus including a plurality of memory modules, each module containing an integral number of addressable storage locations, said integral number being equal to a multiple of a power of 2, each memory module having a module identification number and a data bus for carrying module identification address information, the improvement comprising:

memory mapping means for mapping a selected number of the most significant bits of a memory storage location address into a module identification number to identify a module to which data is to be sent; and a plurality of interleaving means each of interchanging selected bits of memory storage location addresses for placing adjacent addresses in separate memory modules whereby memory locations in each memory module are filled with data sequentially and the storage location addresses of such information are interleaved among memory modules, there being an interleaving means connected between the data bus and the memory mapping means and between each memory module and the data bus.

3. Data processing apparatus including a memory means having a plurality of memory registers for storing logical words, the apparatus comprising:

a plurality of data processing modules for operation on a common set of said plurality of memory registers, each of the data processing modules being responsive to a predetermined logical word contained in a memory register for altering the (CPU) operation of the data processing module on said plurality of memory registers;

means operatively connected with the memory means for selectively reading out and setting in the contents of a selected one of the plurality of memory registers;

circuit means coupling a selected one of the data processing modules to said means for reading out the contents of a selected one of the plurality of memory registers and for setting into the same one of said registers said predetermined logical word for causing another one of the plurality of data processing modules which accesses said selected one of the memory registers subsequently to it being accessed by said one of the data processing modules to read said predetermined logical word and alter the operation of said another one of the plurality of data processing modules on said plurality of memory registers.

4. Data processing apparatus as in claim 3 wherein:

said means includes logic means selectively coupled to said selected one of the memory registers for simultaneously setting in said predetermined logic word in said selected one of the memory registers as the contents thereof are read by said one of the data processing modules.

5. Data processing apparatus as in claim 4 wherein:

each of said plurality of memory registers includes a plurality of bit storage elements operable in either one of two logic states; and said means in reading the contents of said selected one memory register sets the plurality of bit storage elements thereof to the same one logic state as said predetermined logical word.

6. Data processing apparatus for performing logic operations on data under control of instruction, the apparatus comprising:

data processing module for performing logic operations on applied data signals in response to instructions;

source means of instructions to be executed by the data processing module;

first addressable memory device for storing at addressable locations therein logic manifestations for controlling operation of the data processing module to execute the instructions from said source means;

second addressable memory device for storing at addressable locations therein manifestations of addresses in said first addressable memory device;

address generator means coupled to the second addressable memory device for selecting an addressable location therein in response to the combination of a logic control signal and an instruction from said source means for extracting from the second addressable memory device a manifestation of an address location in said first addressable memory device;

means coupling said first addressable memory device and said data processing module for rendering the same operative to perform the logic operation on data signals applied thereto as specified by the instruction manifestation extracted from the location in the first addressable memory device selected in response to the address manifestation from the second memory device; and circuit means coupled to the address generator means for applying selected logic control signals thereto which are representative of corresponding operating conditions of the data processing apparatus for actuating the address generator means to select addressable locations different from the locations in the second addressable memory device which correspond to given instructions from said source means.

7. Data processing apparatus as in claim 6 wherein said circuit means includes logic circuitry coupled to said address generator means for applying a logic control signal thereto to select an addressable location different from said one location in said second addressable memory device for a given instruction from said source means in response to operation of said data processing module on a selected instruction manifestation from said first addressable memory device.

8. Data processing apparatus as in claim 6 wherein said circuit means includes logic circuitry coupled to said address generator means for applying a logic control signal thereto in response to a selected address manifestation extracted from the second addressable memory device for actuating the address generator means to select a different addressable location from the second addressable memory device for a given instruction from said source means.

9. A data processing system for processing information stored at addressed memory locations in response to instructions, said data processing system comprising:

- a plurality of base registers;
- a source of instructions including a portion which specifies a base register mode and which has a variable number of bits depending on the mode, an address displacement portion which has a variable number of bits depending on the mode designated, and including an index register selection code including at least an index bit and an indirect bit;
- at least one index register in addition to said plurality of base registers;
- an arithmetic logic unit;
- a transfer control unit for coupling to selected ones of said base registers to apply the contents thereof to the arithmetic logic unit;
- address mode decoder means for selecting one of said plurality of base registers in response to the mode portion of an instruction and for selecting an index register in response to the appearance of selected combinations of said index and indirect bits in the instruction;
- circuit means coupled to an index register and to the arithmetic logic unit for selectively altering logic signals applied thereto in response to the contents of the index register selected by the address mode decoder means; and
- displacement bit selector means responsive to the mode and address displacement portions of an instruction for applying to the arithmetic logic unit via said circuit means a logic signal which is representative of the address displacement portion of the instruction and which has a constant word length independent of the number of bits in the address displacement portion of the instruction, the arithmetic logic unit processing said logic signal and the contents of the selected base register to produce the address of a selected memory location.

10. A data processing system as in claim 9 wherein:

- the source produces an instruction including an operation code portion;
- said circuit means includes a preadder connected to apply the output of said displacement bit selector means to said arithmetic logic unit, and includes signal multiplying means coupled to apply to the preadder the contents of the selected index register altered by a predetermined factor; and
- an operation code decoder responds to the operation code portion of an instruction for controlling the predetermined factor by which said signal multiplying means alters the contents of the selected index register which are applied to the preadder.

11. A data processing system as in claim 10 comprising means coupling the operation code decoder to the address mode decoder means to alter the selection of one of said plurality of registers corresponding to a given set of bits in the mode portion of an instruction to select therefor another one of said plurality of registers in response to appearance of a selected operation code in the operation code portion of said instruction.

12. Data processing apparatus including a plural number of data processing registers coupled for selectively transferring data manifestations from one to another in succession at a selected clock rate in response to control signals which are provided at substantially the same rate at which the data manifestations are transferred, the apparatus comprising:

- source means of instructions for controlling transfers of data manifestations between data processing registers;
- memory means for storing at a plurality of addressable locations therein logic signals which are representative of said instructions received from said source means for controlling the transfers of data manifestations;
- a number of control registers not less than the plural number of successive data processing registers, said number of control registers being coupled to receive logic signals from said memory means and to transfer substantially the entire logic signals at a selected clock rate from one control register to another in sequence;
- first circuit means responsive to a first portion of the logic signal in a first one of the sequence of control registers for controlling the transfer of data manifestations to a first one of the plural number of successive data processing registers;
- second circuit means responsive to a second portion of the logic signal in a second one of the succession of control registers for controlling the transfer of data manifestations from the first one to a subsequent one of the plural number of data processing registers; and
- third circuit means responsive to a third portion of the logic signal in the last one of the sequence of control registers for activating the source means of instructions to select an addressable location in said memory means to provide logic signals for controlling subsequent transfers at the selected clock rate of data manifestations between data processing registers.

13. Data processing apparatus as in claim 12 wherein said source means of instructions includes a register and said memory means includes a register, each of which registers delays the propagation of signals therethrough in accordance with the selected clock rate;

- said third circuit means includes a plurality of stages of delay means which are operable in selected logic states and which are coupled to provide successive delays of signals propagating through said stages in accordance with the selected clock rate;
- said first circuit means is responsive to operation of the first and a successive one of the plurality of said stages operating in a preselected combination of logic states to inhibit the transfer of data manifestations to a first one of the plural number of data processing registers.

14. Data processing apparatus as in claim 13 wherein said second circuit means is responsive to operation of the first and two successive ones of the plurality of said stages operating in a predetermined combination of logic states to inhibit the transfer of data manifestations from the first one to said subsequent one of the plural number of data processing registers.

15. Data processing apparatus as in claim 13 wherein said third circuit means includes first control means responsive to a preselected combination of the apparatus of selected data manifestations and a selected third portion of the logic signal in said last one of the sequences of control registers for introducing into one of said stages subsequent to the first of the plurality of said stages a signal to be delayed in propagating through said plurality of stages at the selected clock rate for reducing the total propagation delay through said stages.

16. Data processing apparatus as in claim 12 including an arithmetic logic unit for performing arithmetic operations on applied data manifestations, and wherein a pair of said plural number of data processing registers is coupled to selectively transfer data manifestations in parallel to the arithmetic logic unit, the apparatus comprising:

said first circuit means connected to control the transfer of data manifestations substantially simultaneously in parallel to corresponding ones of the pair of data processing registers; and said second control means connected to control the manipulation through the arithmetic logic unit to a successive data processing register of the data manifestations applied substantially simultaneously in parallel to the arithmetic logic unit from a pair of data processing registers.

17. Data processing apparatus including an arithmetic processing unit and comprising:

storage means including a plurality of multiple-address memory means, each including a first set of a plurality of address locations having logic entries therein for forming a segment transfer table and including a second set of address locations having logic entries therein for forming a set of instructions for controlling an operation of the arithmetic processing unit;

a first one of said plurality of address locations of said first set including an entry representative of the number of selected locations contained in said segment transfer table of the first set;

a second one of said plurality fo address locations of said first set containing a logic entry representative of the starting address among said second set of address locations of the start of a set of instructions;

means coupled to the storage means for applying selected logic entries therein to the arithmetic processing unit;

a code segment table comprising a plurality of addressed memory locations, one of said locations including logic entries therein representative of the number of addressed memory locations contained in said code segment table and others of said locations including logic entries therein representative of the beginning addresses in said storage means of each of said plurality of multiple-address memory means; and means responsive to the logic entries in selected addressed memory locations of said code segment table for accessing a selected address location in one of said plurality of multiple-address memory means.

18. Data processing apparatus as in claim 17 wherein said code segment table comprises in other of the addressed memory locations therein a logic entry, a first portion of which is representative of said beginning address of a corresponding multiple-address memory means and a second portion of which is representative of the number of address locations in said first and second sets of said corresponding multiple-address memory means; and said first one of the plurality of address locations in the first set of said multiple-address memory means is located at the address represented by the corresponding said second portion of the logic entry in an address memory location in the code segment table.

19. Data processing apparatus as in claim 17 comprising a third one of said plurality of address locations of said first set of address locations in a selected multiple-address memory means including a logic entry therein, one portion of which represents the address of another selected multiple-address memory means in said storage means and another portion of which represents the address location of a selected entry in said first set of said other selected multiple-address memory means.

* * * * *

UNITED STATES PATENT OFFICE

CERTIFICATE OF CORRECTION

Patent No. 3,820,079 Dated June 25, 1974

Inventor(s) Arndt B. Bergh et al.

It is certified that error appears in the above-identified patent and that said Letters Patent are hereby corrected as shown below:

Column 1, line 10, "Josepth" should read -- Joseph --; between lines 40 and 45 in the Table of Contents, after "Appendix 1" indent "Explanation of Microinstruction Fields";

Column 2, line 4, after "3,750,119" insert -- ; --; line 16, "MCu" should read -- MCU --; line 37, "becaue" should read -- because --;

Column 3, line 20, "interace" should read -- interface --; line 65, "hardward" should read -- hardware --;

Column 4, line 24, "work" should read -- word --;

Column 5, line 3, after "Receipt of" delete "a";

Column 6, line 34, "latchs" should read -- latches --; line 40, "255-by-4" should read -- 256-by-4 --; line 67, after "number" delete " , " and insert -- . --;

Column 7, line 8, "(LEQ)" should read -- (LREQ) --; line 66, "is" should read -- are --;

Column 8, line 23, "is" should read -- are --; line 28, "RDy" should read -- RDY --;

Column 10, line 36, after "CPU" delete " ) "; line 61, "at" should read -- as --;

Column 11, line 40, "Is" should read -- is --;

Column 12, line 33, "priviledged" should read -- privileged --;

ORM PO-1050 (10-69)

USCOMM-DC 60376-P69
★ U.S. GOVERNMENT PRINTING OFFICE : 1969 O—366-334

UNITED STATES PATENT OFFICE

CERTIFICATE OF CORRECTION

Patent No. 3,820,079 Dated June 25, 1974

Inventor(s) Arndt B. Bergh et al

It is certified that error appears in the above-identified patent and that said Letters Patent are hereby corrected as shown below:

Column 13, line 22, "O" should read the number -- 0 --; line 24, "O" should read the number -- 0 --; line 54, "mement" should read -- moment --; line 55, after "discussed," insert -- there is --;

Column 14, line 50, after "selected" and before " . " insert -- ) --; line 52, "or" should read -- nor --;

Column 15, line 18, "Serice" should read -- Service --;

Column 16, line 27, "CUP's" should read -- CPU's --; line 28, after "648" insert -- signal --; line 51, "slip-flop" should read -- flip-flop --; line 52, "to 660" should read -- TO 660 --;

Column 17, line 28, after "RAM's" and before " , " insert -- " --;

Column 19, line 31, after "each" insert -- of --;

Column 20, line 27, "the" should read -- this --; line 39, after "transfer" insert -- is --; line 65, between "end-of" and "transfer" insert a hyphen --;

Column 21, line 12, "issued" should read -- issues --;

Column 22, line 24, delete "in this manual"; line 62, "Is" should read -- is --; line 65, after "DEVAD", "O" should read the number -- 0 --; line 66, after "DEVAD", "O" should read the number -- 0 --;

Column 23, line 3, after "not", "O" should read the number -- 0 --; line 52, "line" should read -- the --;

UNITED STATES PATENT OFFICE
CERTIFICATE OF CORRECTION

Patent No. 3,820,079 Dated June 25, 1974

Inventor(s) Arndt B. Bergh et al.

It is certified that error appears in the above-identified patent and that said Letters Patent are hereby corrected as shown below:

Column 26, line 20, after "controller" insert -- . --; line 38, "stobes" should read -- strobes --; line 40, "send" should read -- sends --; line 42, "3a-n" should read -- 3a-r --; line 58, "asignal" should read -- a signal --; line 67, "interrput" should read -- interrupt --;

Column 27, line 5, "anyone" should read -- any one --;

Column 28, line 24, before "24K" delete "a"; line 55, "whete" should read -- where --;

Column 29, line 48, before "one" delete "which";

Column 30, line 48, "dat" should read -- data --; line 56, "register8" should read -- register 8 --; line 64, "13" should read -- 18 --; line 65, "ro" should read -- or --;

Column 31, line 35, "intoan" should read -- into an --;

Column 32, line 34, after "field" delete "a portion";

Column 33, line 7, "dddress" should read -- address --;

Column 34, line 56, "witha" should read -- with a --;

Column 35, line 54, "and" should read -- the --;

Column 36, line 8, "dividesubtract" should read -- divide-subtract --; line 57, "DVSD" should read -- DVSB --;

Column 37, line 12, "arithmtic" should read -- arithmetic --;

UNITED STATES PATENT OFFICE

CERTIFICATE OF CORRECTION

Patent No. 3,820,079 Dated June 25, 1974

Inventor(s) Arndt B. Bergh et al.

It is certified that error appears in the above-identified patent and that said Letters Patent are hereby corrected as shown below:

Column 41, line 7, "(N(RC)" should read -- N(RC) --; line 50, "CL1BFF" should read -- CLIBFF --; between lines 50 and 55, "S-BUS Field" should read -- R-BUS Field --;

Column 42, between lines 20 and 25, "Device NO.)." should read -- Device NO). --; between lines 35 and 40, after "contents", "is" should read -- are --; line 65, after "contents", "is" should read -- are --;

Column 44, between lines 55 and 60, "(used) on" should read -- (used as --;

Column 45, between lines 50 and 55, second line of the definition of "ROT", after "T-BUS" delete "the right in the";

Column 46, between lines 5 and 10, "Bush" should read -- BUSH --; "BUS-III" should read -- BUS-HI --;

Column 47, line 50, "tye" should read -- the --; between lines 60 and 65, "CCe" should read -- CCE --;

Column 48, line 34, "stackup" should read -- stackop --; between lines 50 and 55, "that" should read -- this --; line 66, after "met", "is" should read -- if --;

Column 49, between lines 25 and 30, "operand" should read -- Operand --;

Column 50, lines 5 and 6, "STACK-S" should read -- STACKS) --; line 36, "HALF" should read -- HALT --;

Column 53, line 24, after "SEGMENT" insert -- # --; "work" should read -- word --;

UNITED STATES PATENT OFFICE
CERTIFICATE OF CORRECTION

Patent No. 3,820,079 Dated June 25, 1974

Inventor(s) Arndt B. Bergh et al.

It is certified that error appears in the above-identified patent and that said Letters Patent are hereby corrected as shown below:

Column 54, line 5, "then" (second occurrence) should read -- the --;

Column 57, line 6, "(logbase 2 X )" should read -- (logbase 2 |X|) --; line 8, "( X )" should read -- (|X|) --; line 11, "* X + 0.5)" should read -- * |X| + 0.5) --; line 38, after "Entry" insert -- # --; line 40, after "Segment" insert -- # --;

Column 58, line 29, " = " should read -- # --; line 39, "intrinsic" should read -- intrinsics --;

Column 60, at approximately line 25, "Q11" should read -- QI1 --; "Z11" should read -- ZI1 --; at approximately line 31, "Q12" should read -- QI2 --; "Z12" should read -- ZI2 --; at approximately line 34, "Jev." should read -- dev. --;

Column 61, line 45, between "Word" and "the" insert " -- ";

Column 62, line 8, " [ " should read -- " --; line 10, "Inerrupt" should read -- Interrupt --; after "line" insert -- , --; line 61, "(ICA)" should read -- (ICS) --;

Column 63, at approximately line 51, "Q1" should read -- QI --; at approximately line 54, "Z1" should read -- ZI --; line 66, "exist" should read -- exit --;

Column 64, line 32, "SERTR(Z)" should read -- SETR(Z) --;

Column 65, line 9, "relates" should read -- related --; line 10, before "through" insert the number -- 0 --; line 59, " , " should read -- ; --;

UNITED STATES PATENT OFFICE

CERTIFICATE OF CORRECTION

Patent No. 3,820,079 Dated June 25, 1974

Inventor(s) Arndt B. Bergh et al.

It is certified that error appears in the above-identified patent and that said Letters Patent are hereby corrected as shown below:

Column 66, line 11, "30" should read -- 36 --; between lines 15 and 20, immediately below "SEG. #" delete "23";

Column 69, line 15, "DOS" should read -- DQS --; immediately below "<Increment memory>" insert -- CIR(6) = 0 --;

Column 70, line 36, "LMP" should read -- L,P --; line 38, "P + else" should read -- P + L else --; at approximately line 65, "if X > (S - 1)" should read -- if X < (S - 1) --;

Column 72, line 4, delete "within"; line 44, "(S = 1)" should read -- (S - 1) --;

Column 75, line 39, ".5 sign" should read -- .5*sign --;

Column 77, line 31, "DDEL" should read -- DELB --; "<Double delete>" should read -- <Delete B> --; line 44, "<Duble duplicate>" should read -- <Double duplicate> --;

Column 79, between lines 55 and 60, "(S(0) = 0" should read -- (S(0)) = 0 --;

Column 81, between lines 30 and 35, before "Code" insert -- Op --;

Column 82, line 35, "substracted" should read -- subtracted --; "TOs" should read -- TOS --;

Column 84, line 3, "S = S + 1;" should read -- S: = S + 1; --;

Column 86, between lines 29 and 30, "03 CIR(11 = 1" should read -- 03 CIR(11) = 1 --;

ORM PO-1050 (10-69)
-160010

USCOMM-DC 60376-P69
★ U.S. GOVERNMENT PRINTING OFFICE : 1969 0—366-334

UNITED STATES PATENT OFFICE

CERTIFICATE OF CORRECTION

Patent No. 3,820,079 Dated June 25, 1974

Inventor(s) Arndt B. Bergh et al.

It is certified that error appears in the above-identified patent and that said Letters Patent are hereby corrected as shown below:

Column 87, line 5, after "positive" insert -- , --;

Column 88, between lines 50 and 55, after "Device" (both occurrences) insert -- # --;

Column 89, between lines 35 and 40, "(O - DB)" should read -- (Q - DB) --; "(STATUS;" should read -- (STATUS); --; between lines 55 and 60, "(O + DB);" should read -- (Q + DB); --;

Column 90, between lines 5 and 10, delete "t1,6"; line 60, before "LIST SEARCH INSTRUCTION" insert -- FF. --;

Column 91, line 4, after "position" delete " . " and insert -- , --; line 5, after "link" delete " . " and insert -- , --; between lines 15 and 20, "OPCODE" should read -- OpCode --; between lines 55 and 60, after "DL" insert -- ) --;

Column 92, between lines 30 and 35, "BBRO" should read -- BRO --;

Column 93, between lines 50 and 55, after "10. STD E" delete " ( " (first occurrence);

Column 94, between lines 15 and 20, after "4. LDPP N" delete " > " and insert -- < --;

Column 95, at approximately line 25, after "<Delete A>", "Stack OpCode=02" should read -- Stack OpCode=40 --;

Column 96, line 60, "839-d" should read -- 83a-d --;

ORM PO-1050 (10-69)
-160010

USCOMM-DC 60376-P69
☆ U.S. GOVERNMENT PRINTING OFFICE : 1969 O—366-334

UNITED STATES PATENT OFFICE

CERTIFICATE OF CORRECTION

Patent No. 3,820,079 Dated June 25, 1974

Inventor(s) Arndt B. Bergh et al.

It is certified that error appears in the above-identified patent and that said Letters Patent are hereby corrected as shown below:

Columns 97 and 98, after the Alpha Consolidated Coding Sheet and the contents thereof, insert the Alpha Consolidated Coding Sheet and the contents thereof which presently appear at the bottom of columns 123, 124 and at the top of columns 125, 126;

Column 97, line 58, "S10" should read -- SIO --;

Column 99, line 2, "S10" should read -- SIO --; line 16, "S10" should read -- SIO --; line 20, "S10" should read -- SIO --; line 24, "Data" should read -- data --; line 25, "S10" should read -- SIO --;

Column 101, lines 44 and 45, "multiplexers" should read -- multiplexes --;

Column 103, line 23, "to" should read -- normally --; line 32, "unconditioned" should read -- unconditional --; line 54, "DEVICE END" should read -- DEVice END --; line 58, "updata" should read -- update --;

Column 104, line 19, "JOP" should read -- IOP --;

Column 105, line 3, "conroller" should read -- controller --; line 21, "of" should read -- to --; line 47, "generates" should read -- generators --;

Column 106, line 9, "problems" should read -- problem --;

Column 107, line 4, "Incre" should read -- Incr --; line 13, "whenver" should read -- whenever --; line 15, "ports" should read -- portions --; line 62, after "next" insert -- state --;

UNITED STATES PATENT OFFICE

CERTIFICATE OF CORRECTION

Patent No. 3,820,079 Dated June 25, 1974

Inventor(s) Arndt B. Bergh et al.

It is certified that error appears in the above-identified patent and that said Letters Patent are hereby corrected as shown below:

Column 109, line 12, after "information" delete " , ";

Column 110, line 53, "traiing" should read -- trailing --;

Column 111, line 4, "OR" should read -- or --; line 31, "togher" should read -- together --;

Column 115, line 36, "FOR" should read -- for --;

Column 117, line 51, after "keep" delete "to";

Column 119, line 31, "is" should read -- are --; line 58, "multiplex" should read -- multiplexed --;

Column 122, line 9, "Chan ACK" should read -- $\overline{\text{Chan ACK}}$ --; line 51, "date" should read -- data --; line 52, delete "the" (second occurrence); line 65, after "Count" insert -- → --; line 66, after "Count" insert -- → --;

Column 123, line 18, after "block" insert -- WAIT -- and delete "TABLE E" and the contents thereof for insertion in Appendix IV after line 15 in column 124;

Column 124, after line 15 delete "APPENDIX V" and the contents thereof and insert the same after line 55 in column 124;

In the Alpha Consolidated Coding Sheet appearing at the bottom of columns 123, 124 and at the top of columns 125, 126, delete the last two lines of column 123, namely, "15 EXF" and "16 DPF"; delete "IMMEDIATE OPERAND N" in column 124 (directly across from "01 SPARE"); insert -- IMMEDIATE OPERAND N -- in column 124 directly across from "10 DIVI" (in column 123);

UNITED STATES PATENT OFFICE

CERTIFICATE OF CORRECTION

Patent No. 3,820,079 Dated June 25, 1974

Inventor(s) Arndt B. Bergh et al.

It is certified that error appears in the above-identified patent and that said Letters Patent are hereby corrected as shown below:

insert -- IMMEDIATE OPERAND N -- in column 124 directly across from "12 LDNI" (in column 123); delete "IMMEDIATE OPERAND N" (last line in column 124); Column 125, delete "17 SETR" and replace it with the following -- 15 EXF
16 DPF
17 SETR --;
Column 125, "LDS" should read -- LDB --; Column 126, "CHD" should read -- CMD --;

Column 125, line 44, before "1" insert -- # --; line 45, before "2" insert -- # --; before "3" insert -- # --; line 45, delete "234" and insert -- #4 --;

Column 127, line 12, "operations" should read -- operation --; line 36, delete "of" (second occurrence) and insert -- for --;

Column 131, line 14, "apparatus" should read -- appearance --;

Column 132, line 3, "fo" should read -- of --.

Signed and sealed this 15th day of April 1975.

(SEAL)
Attest:

RUTH C. MASON
Attesting Officer

C. MARSHALL DANN
Commissioner of Patents and Trademarks